Aug. 10, 1965     A. HAMBURGEN     3,200,372
ERROR DETECTION AND CORRECTION SYSTEM
Filed July 26, 1960     52 Sheets-Sheet 41

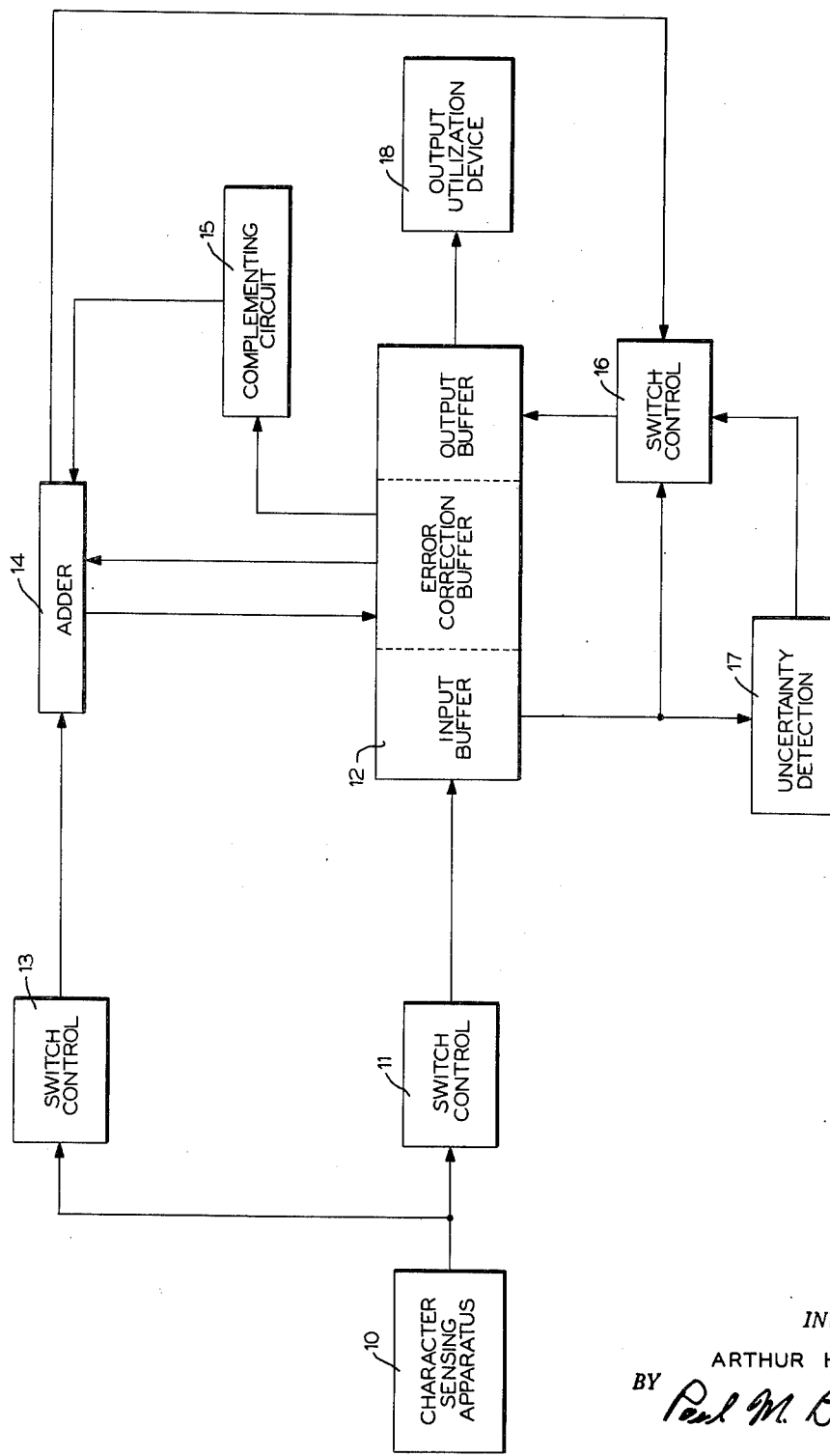

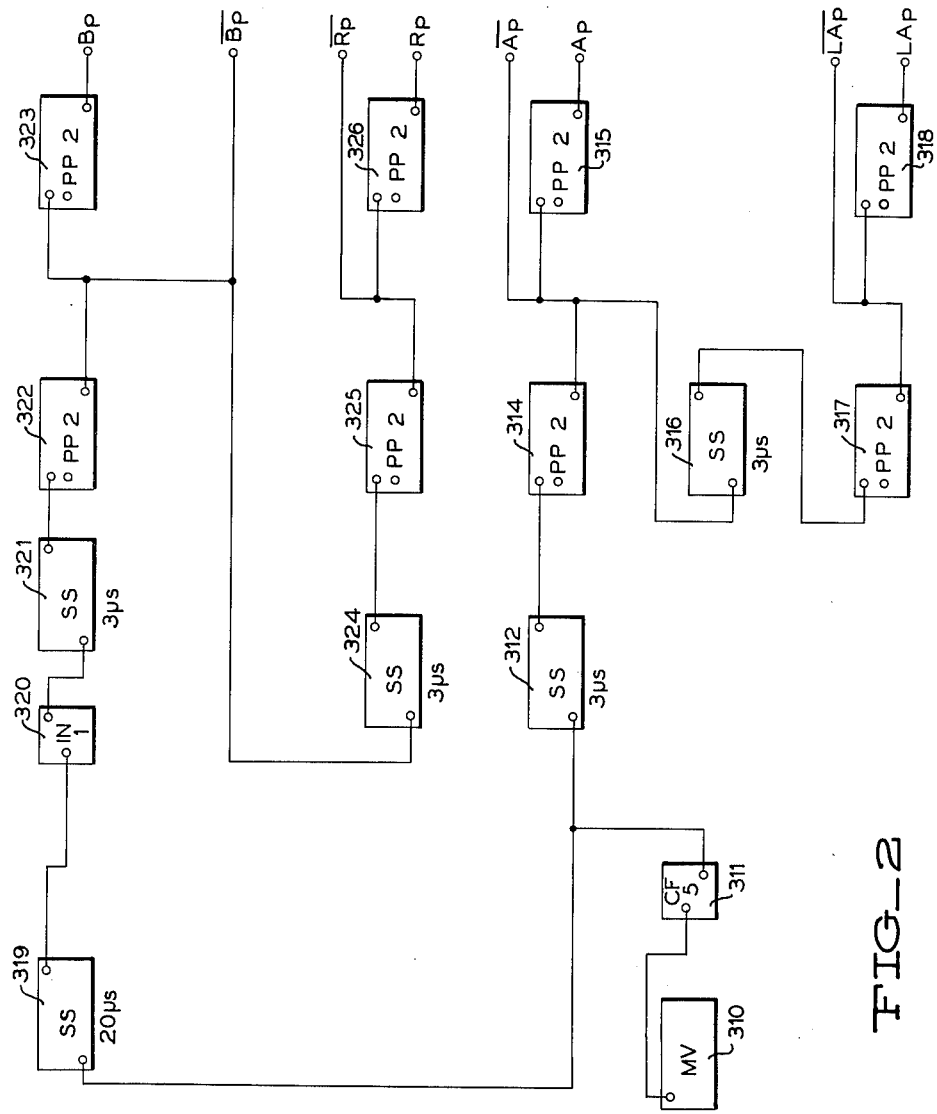
FIG_2

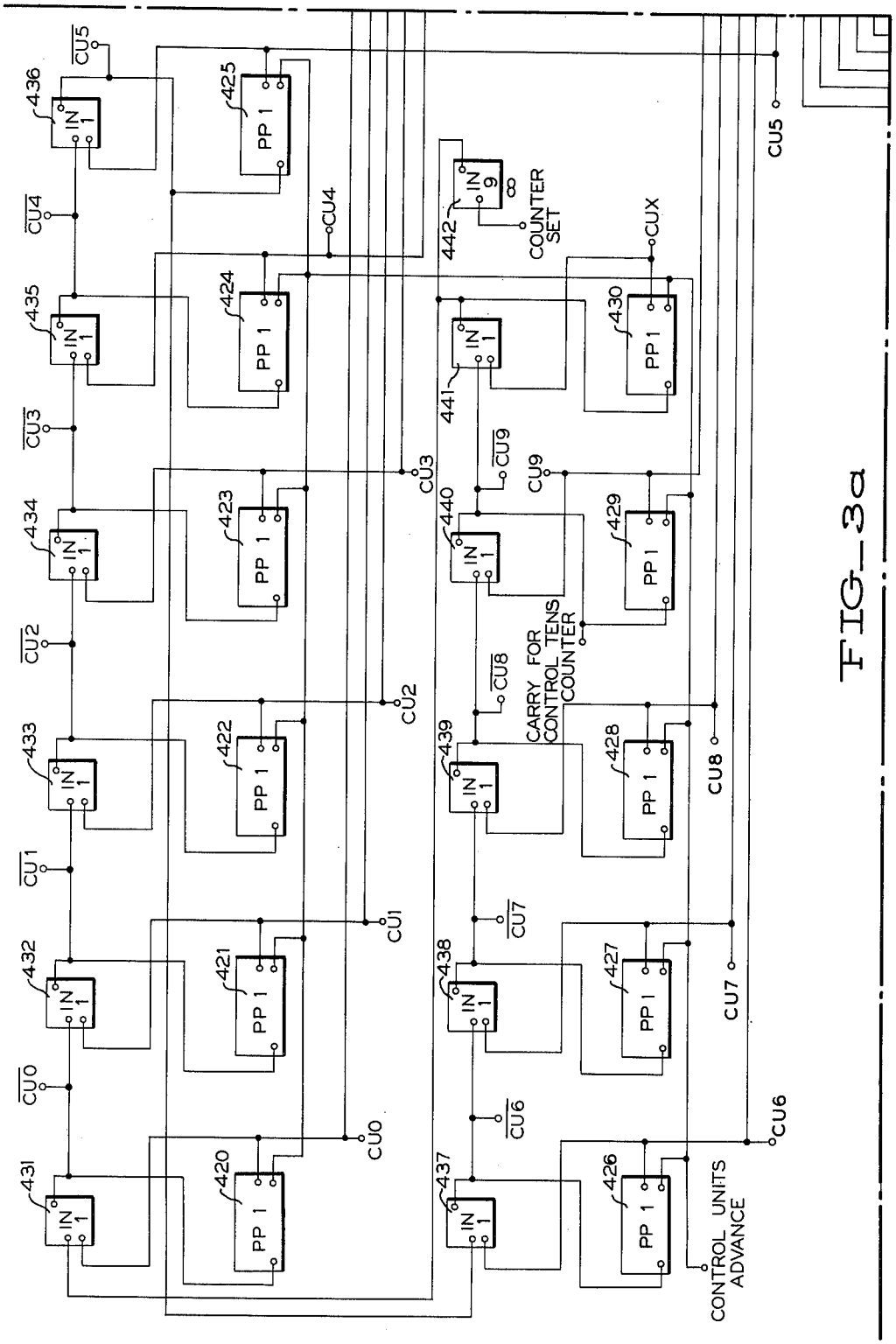

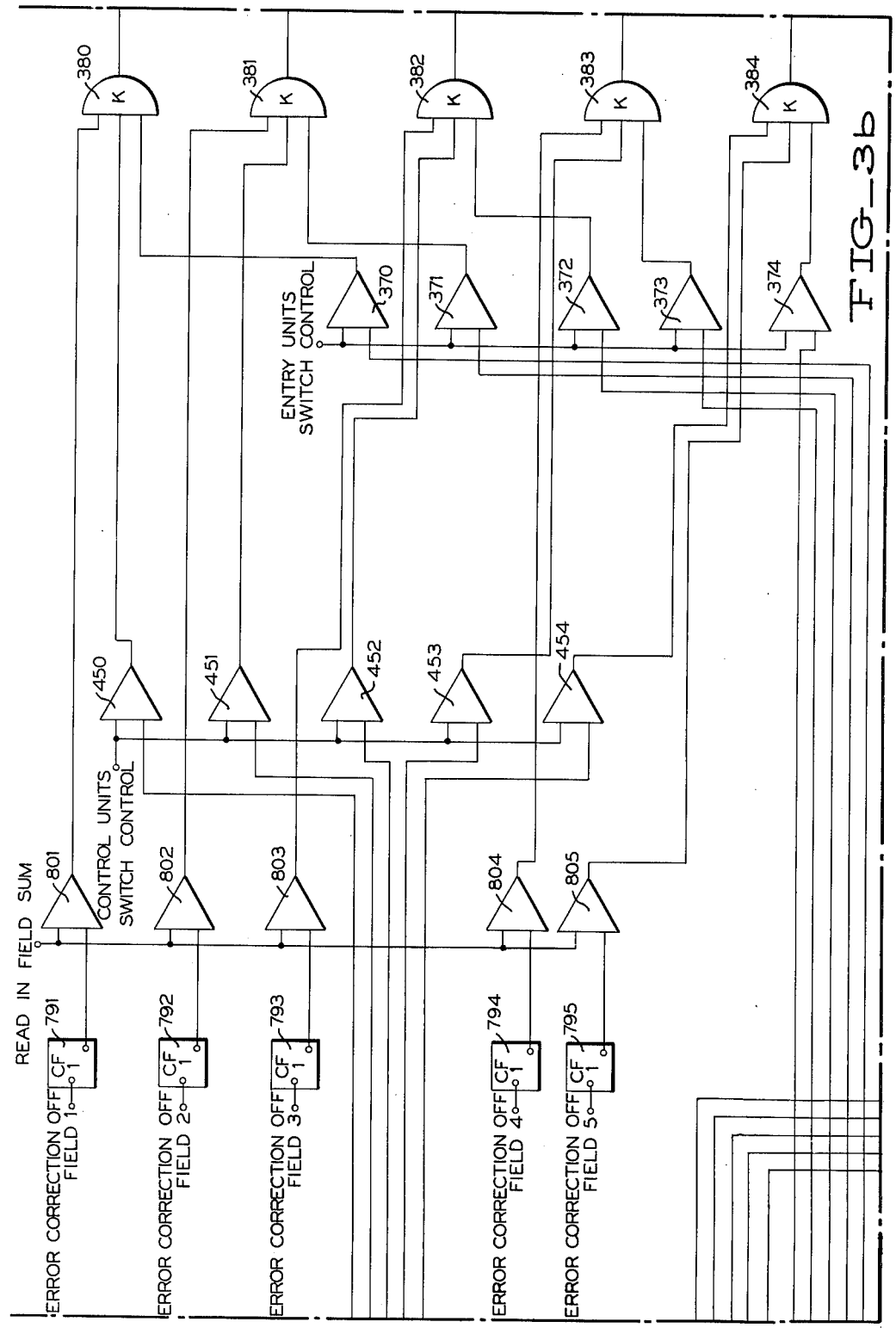

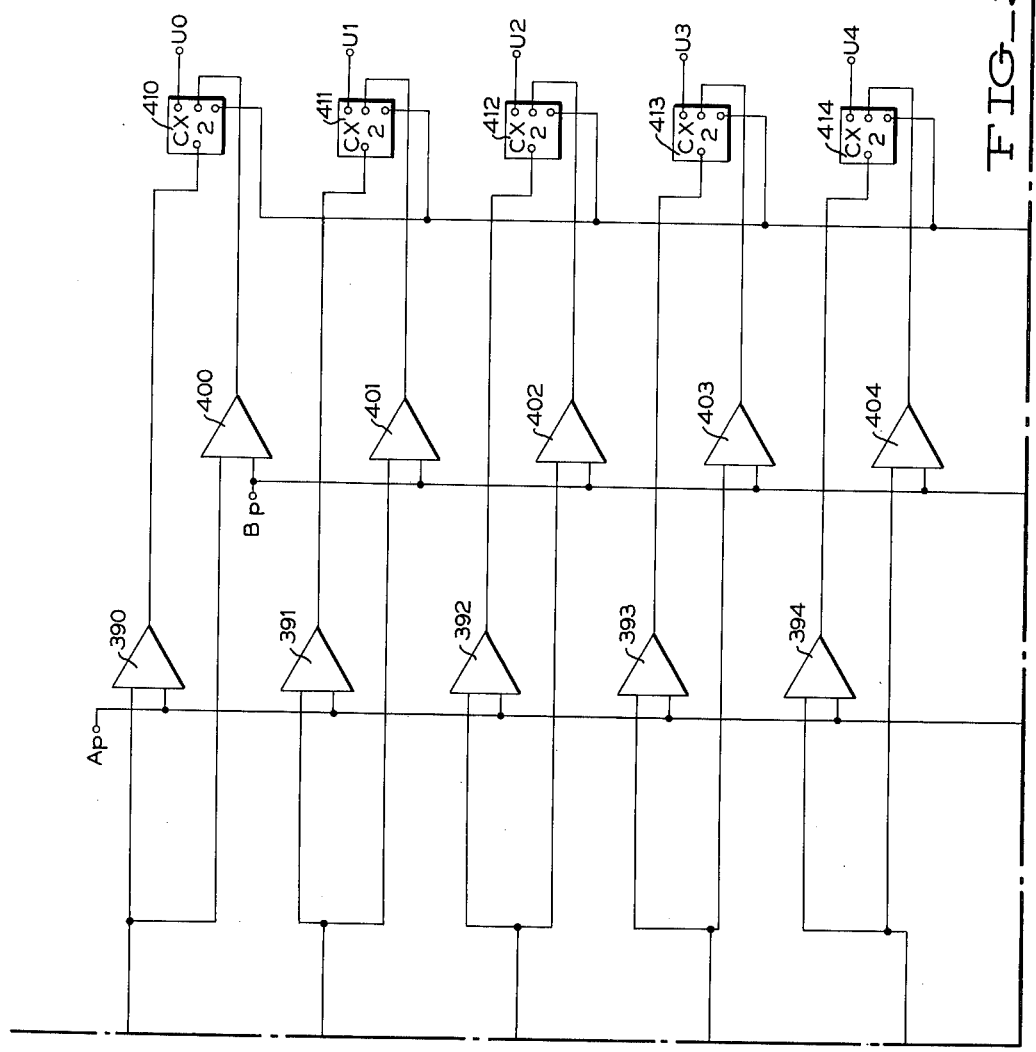

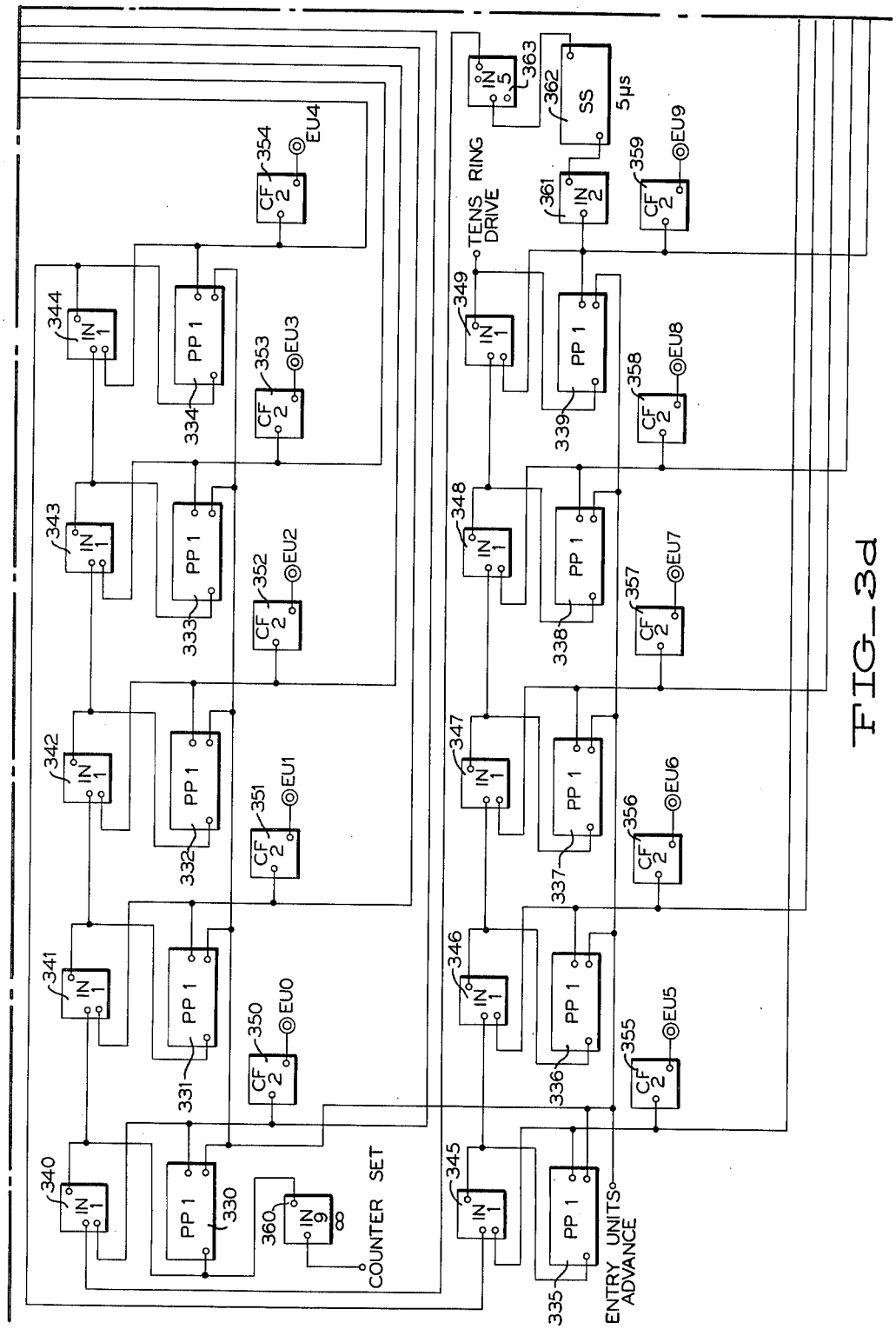

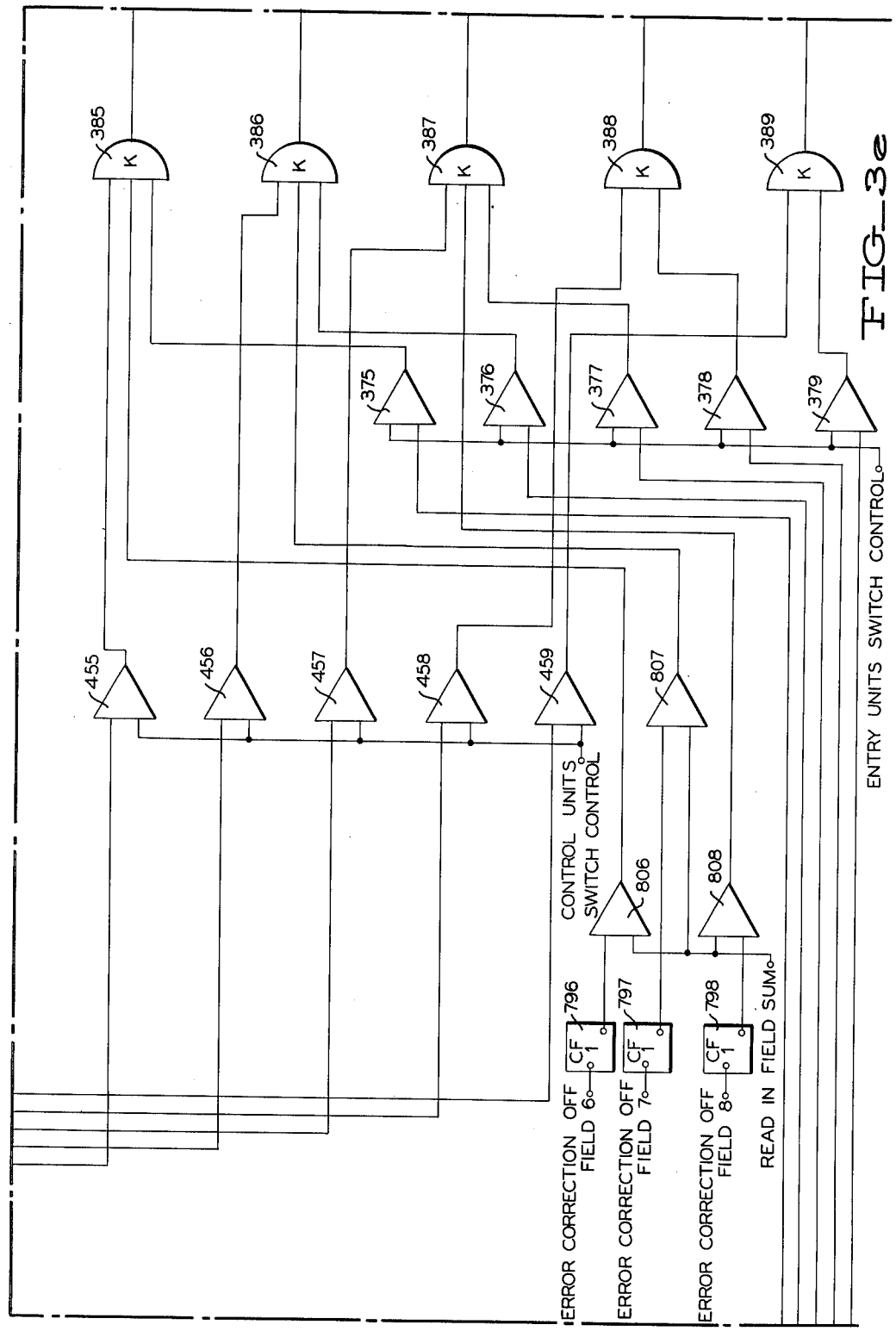

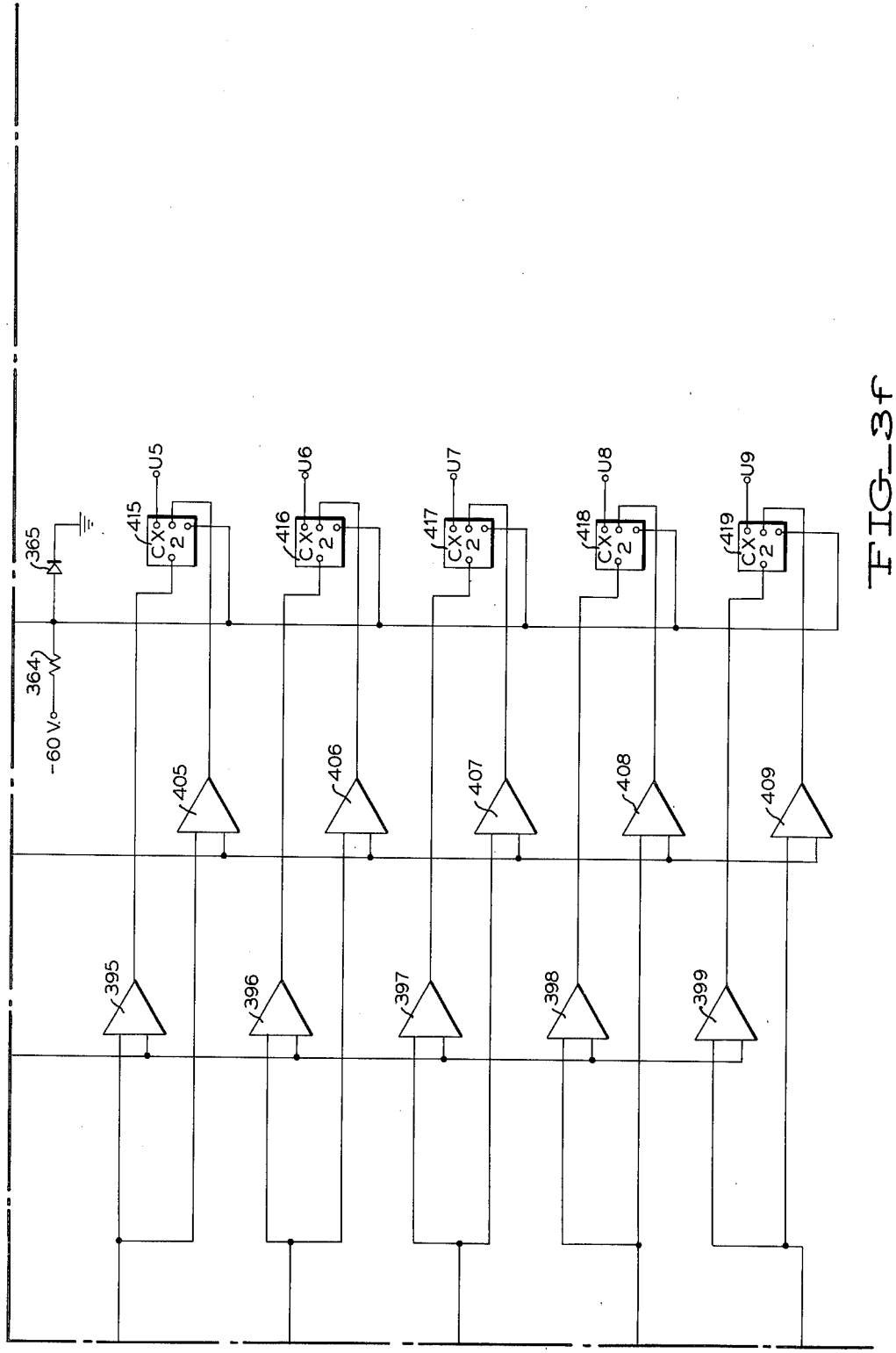

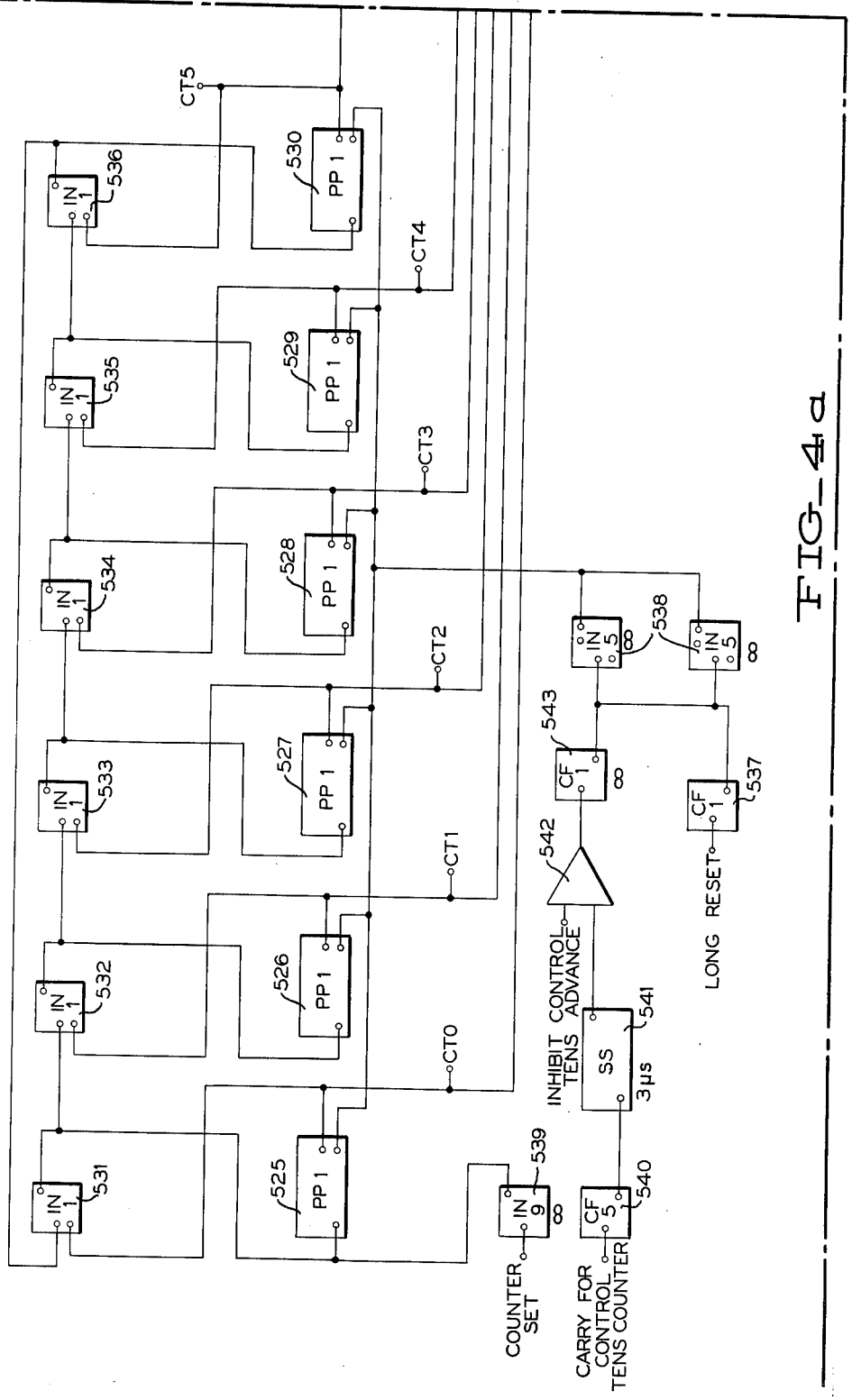

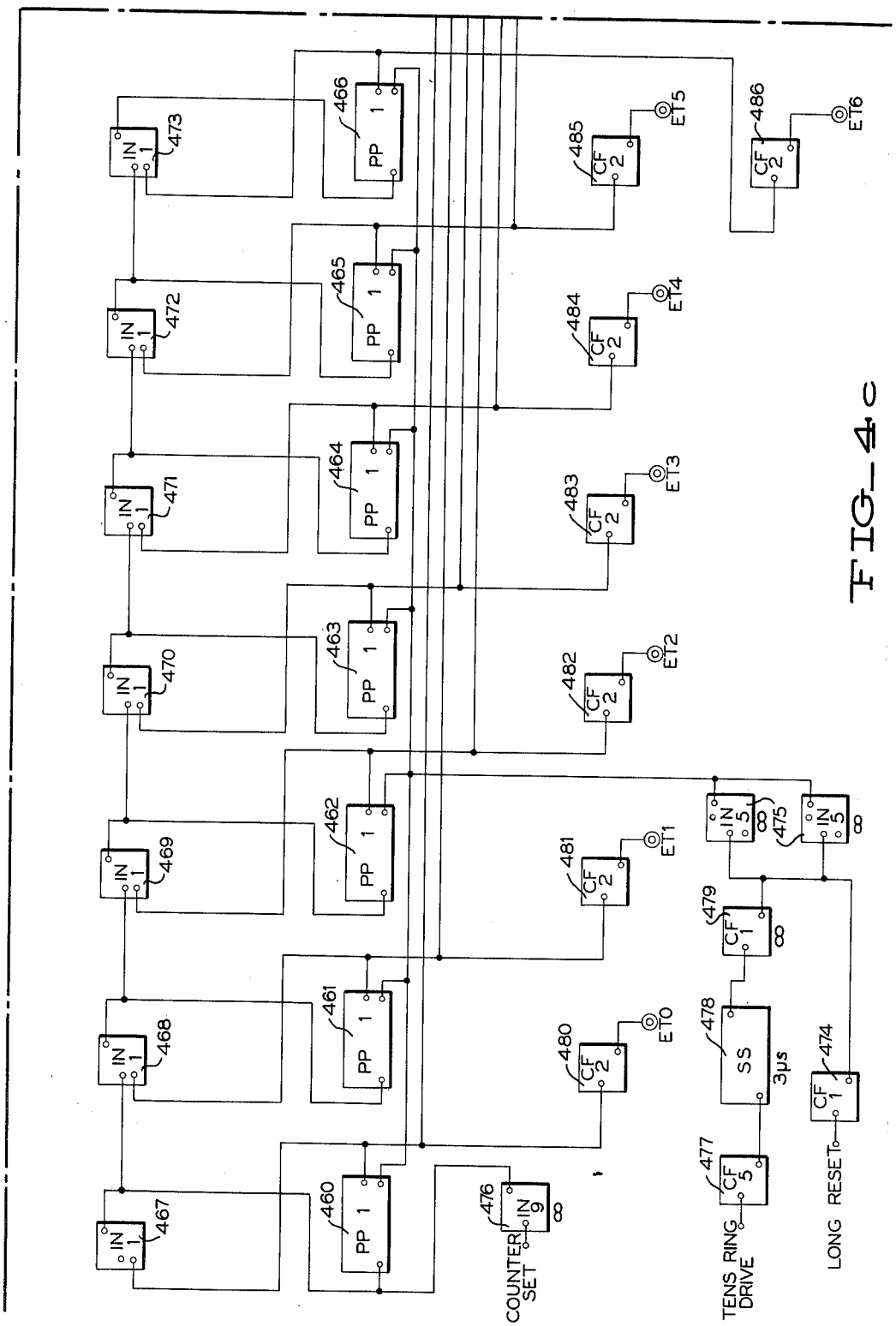
FIG_4c

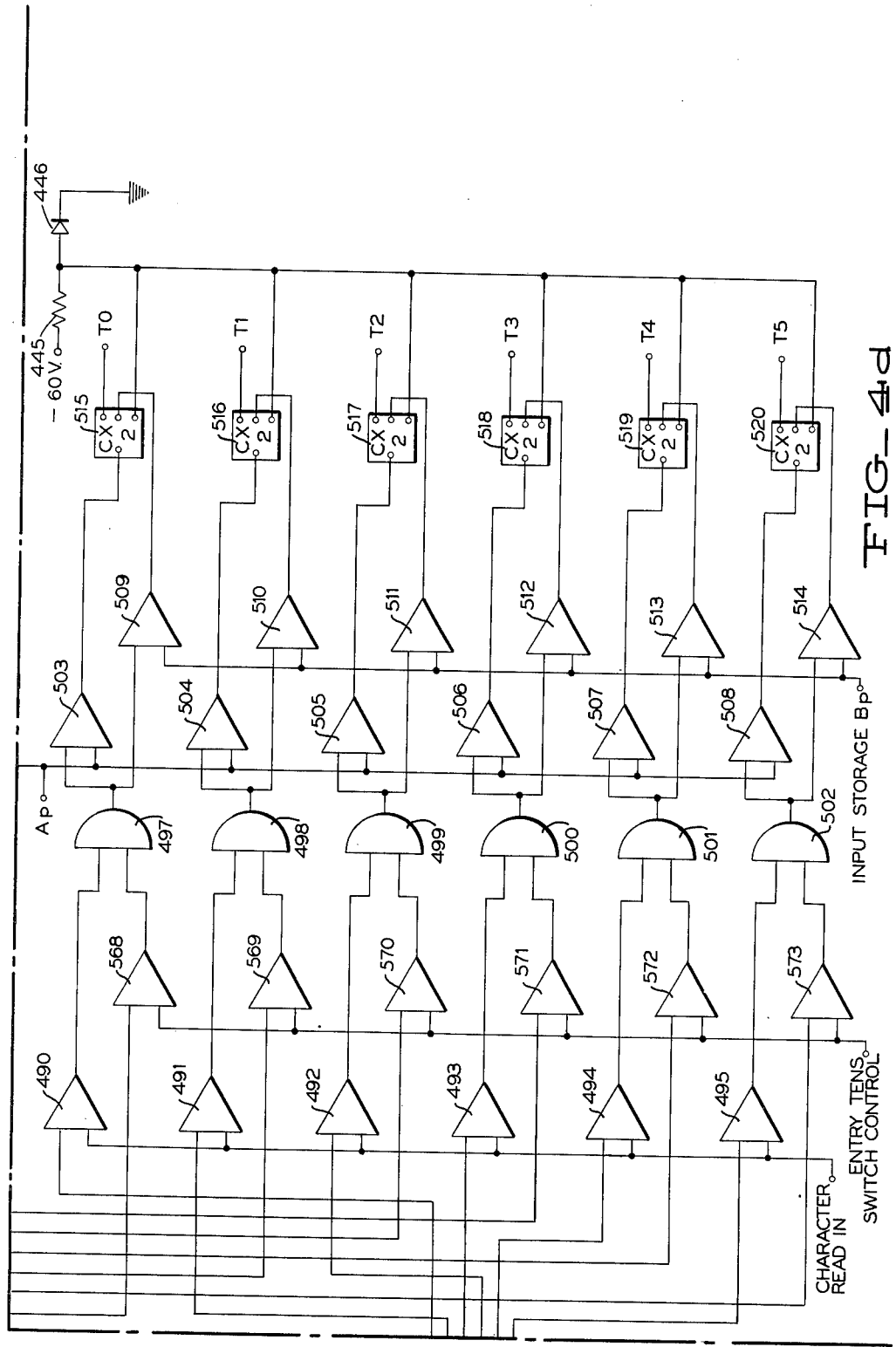

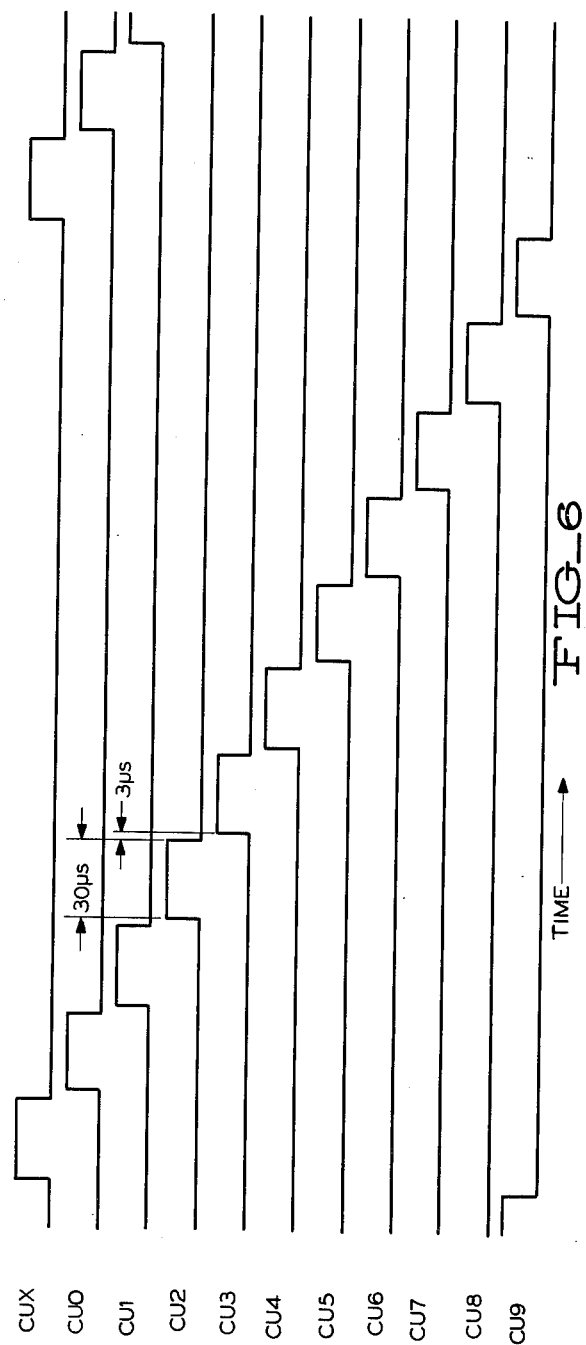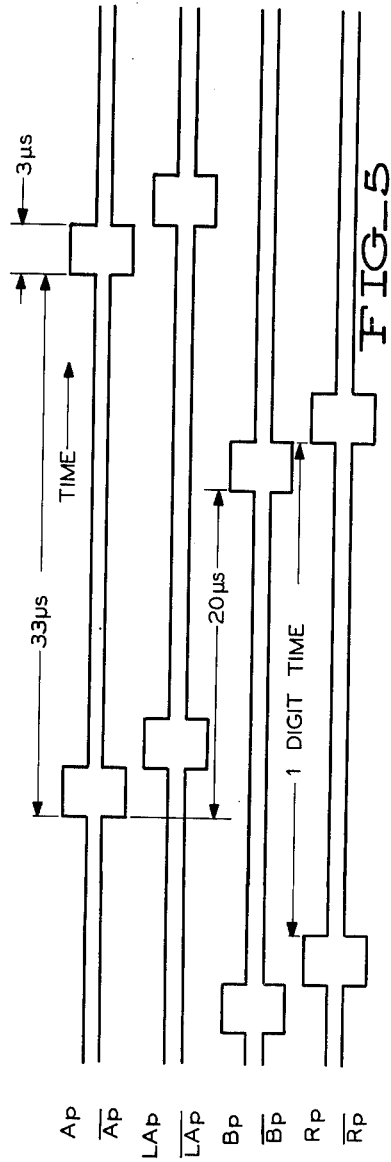

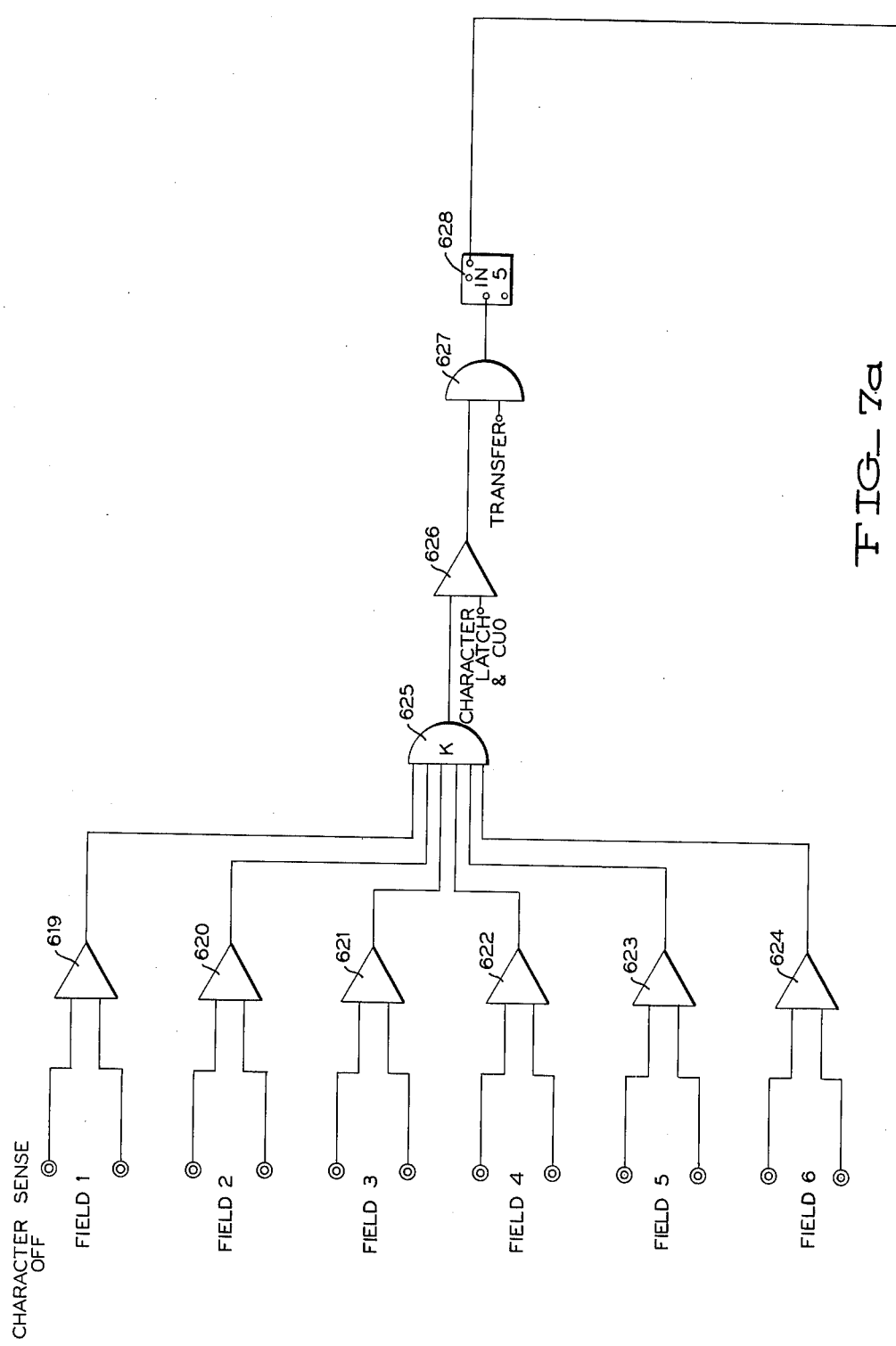

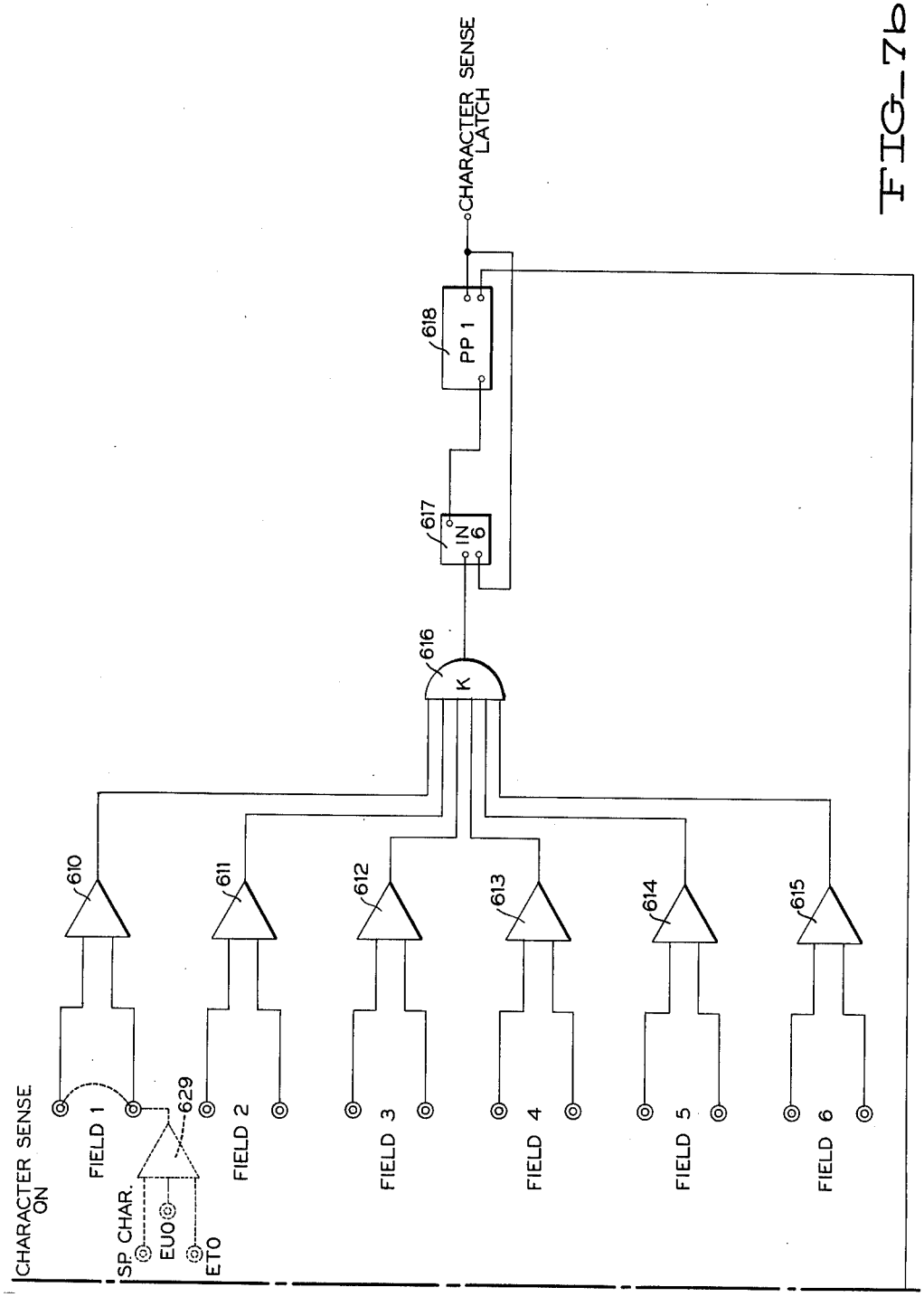

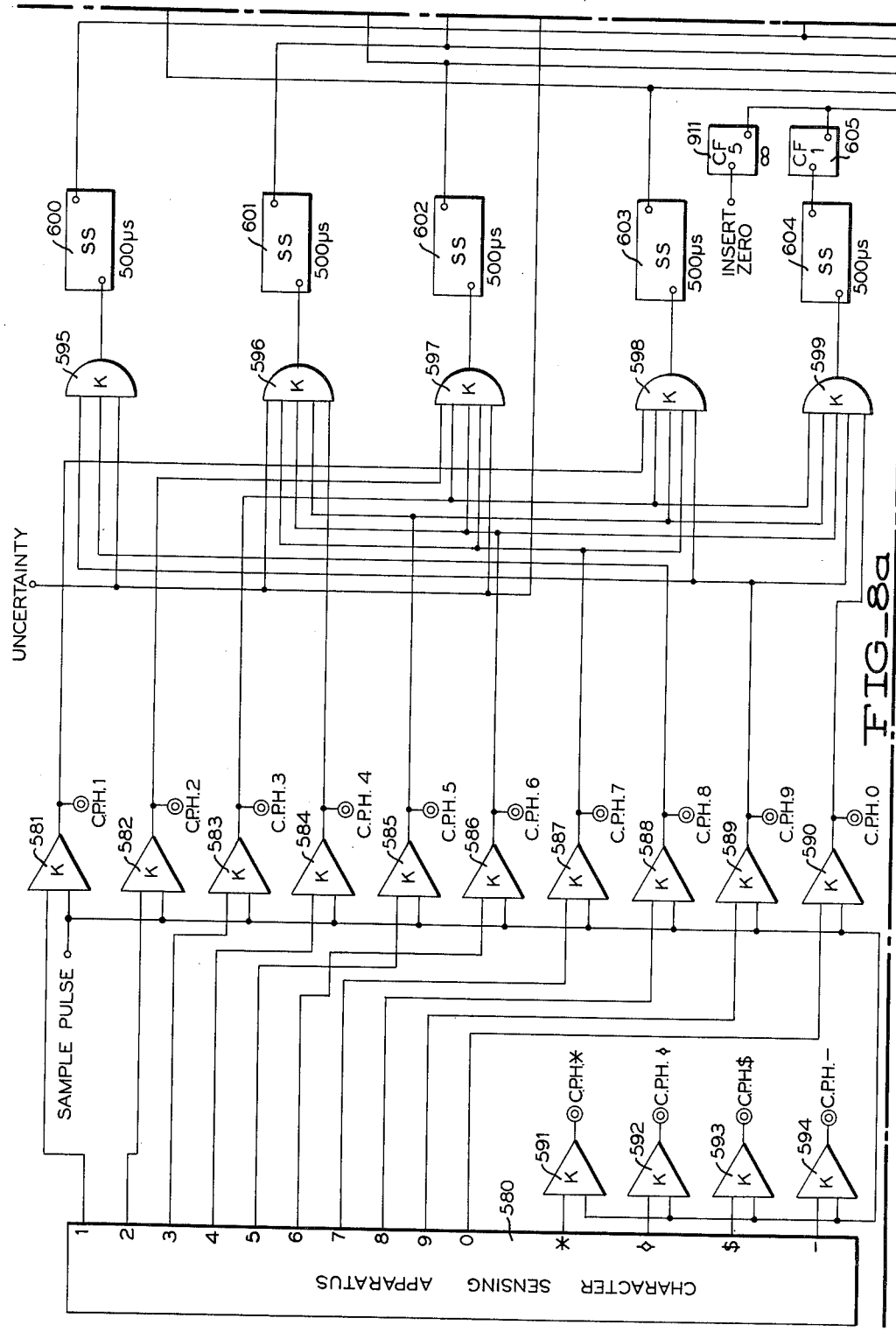

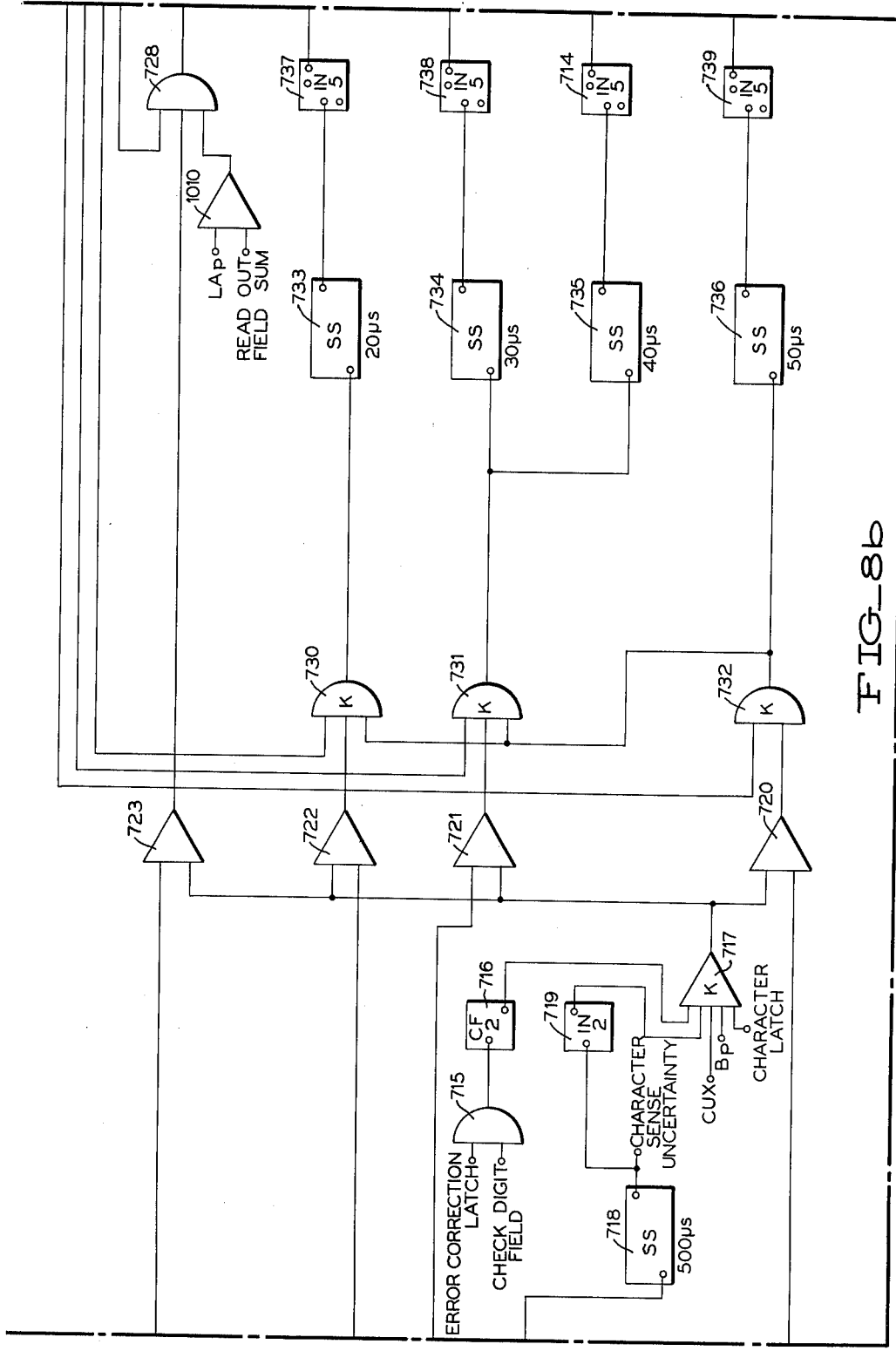

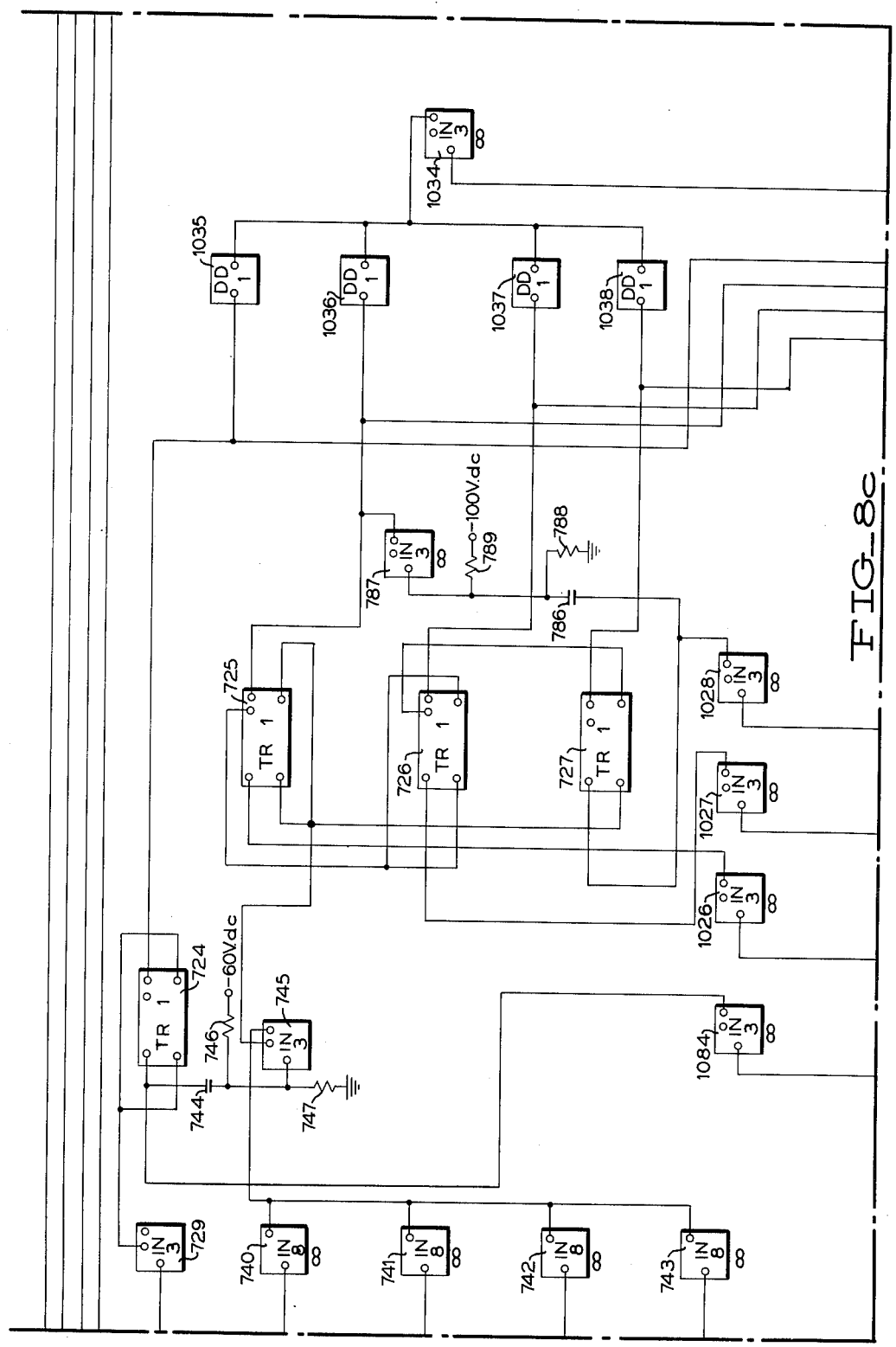

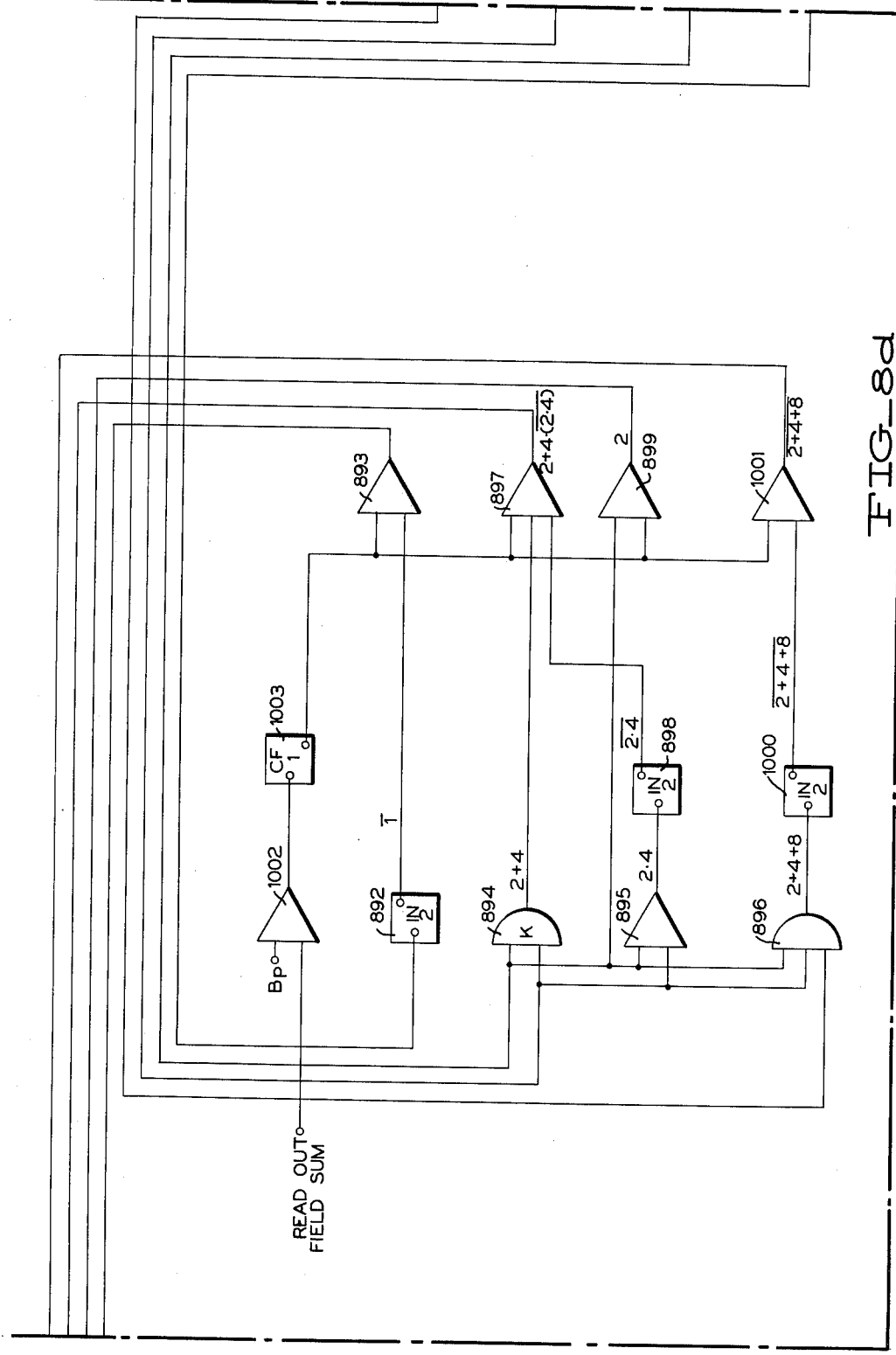

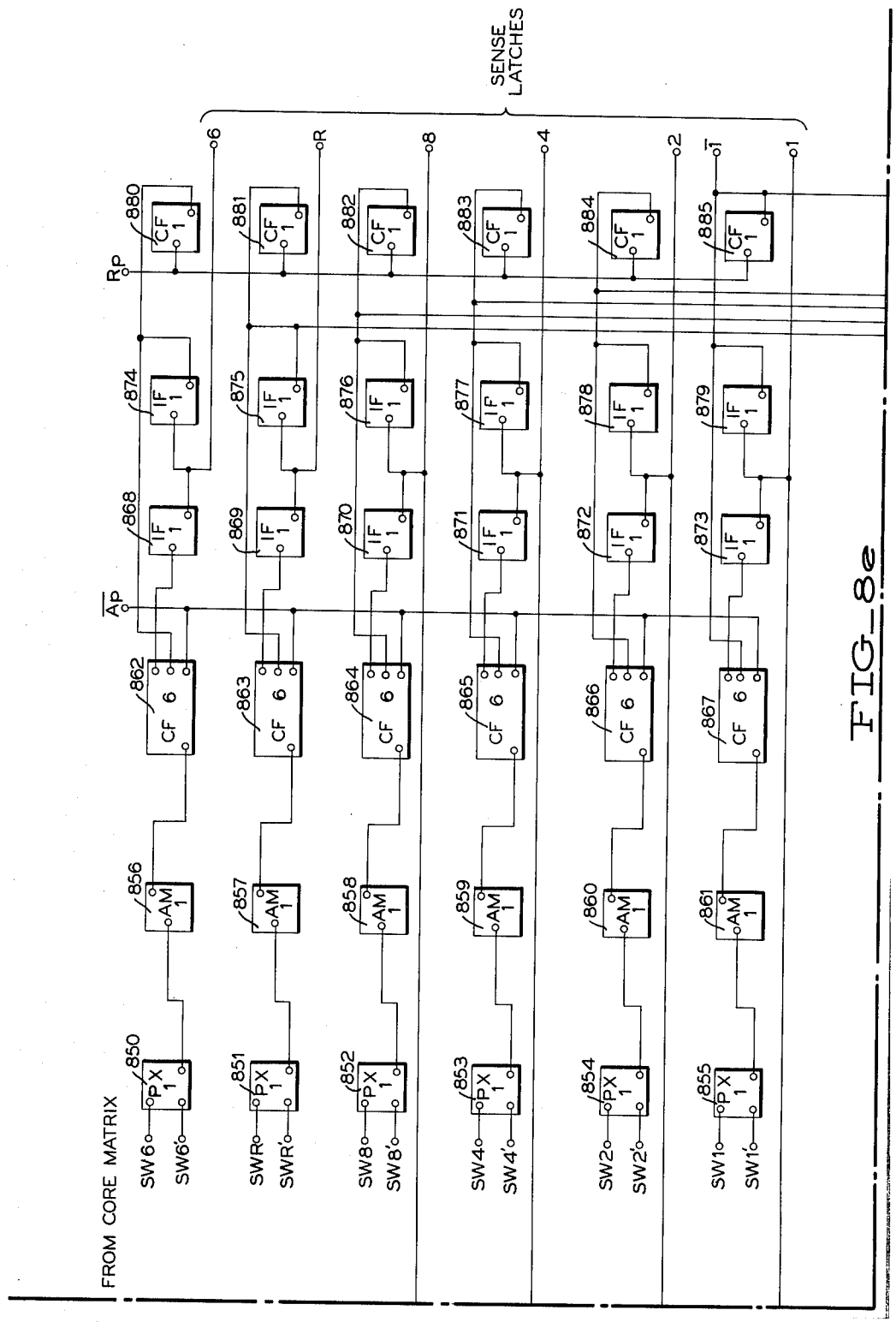

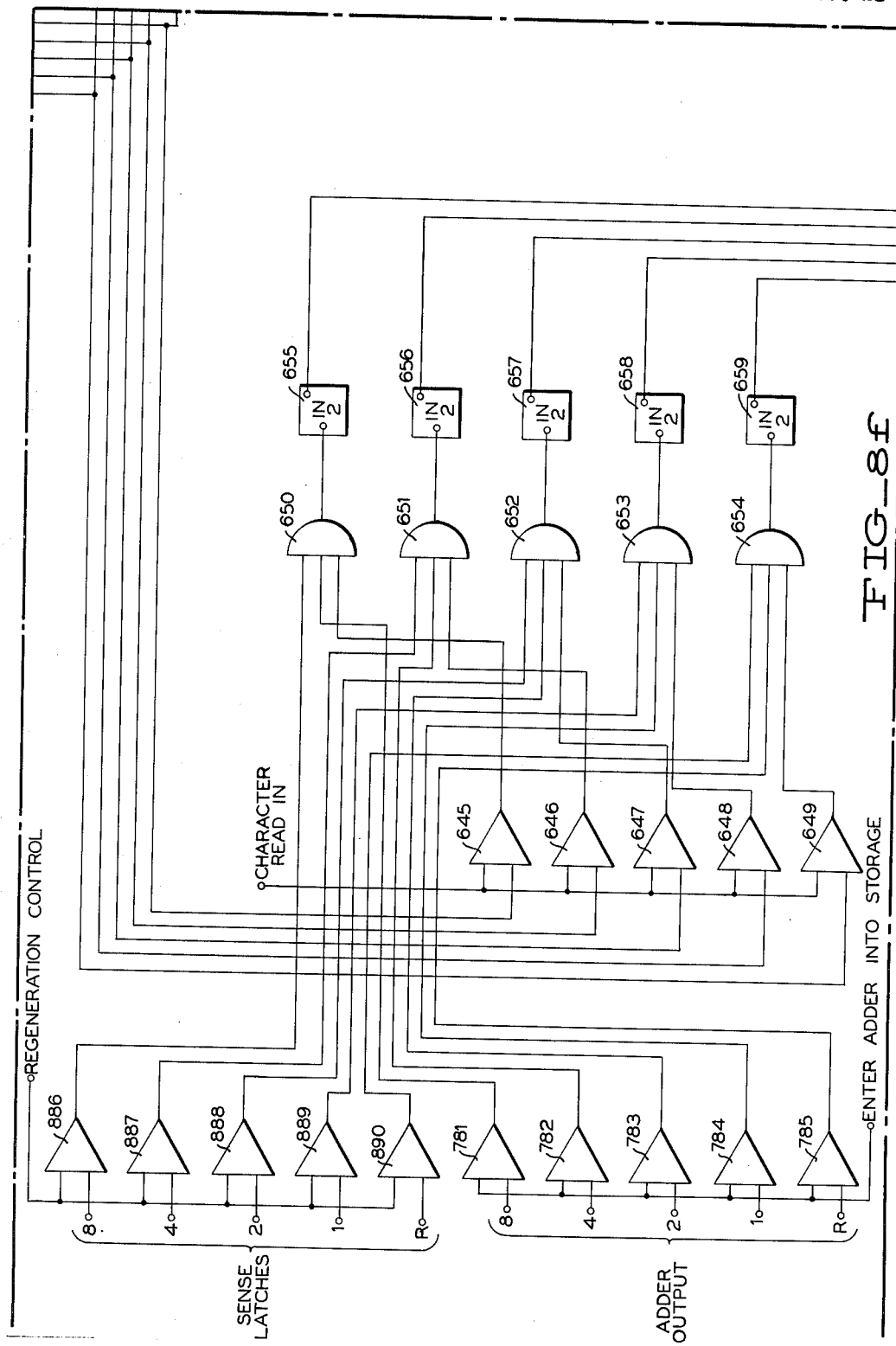

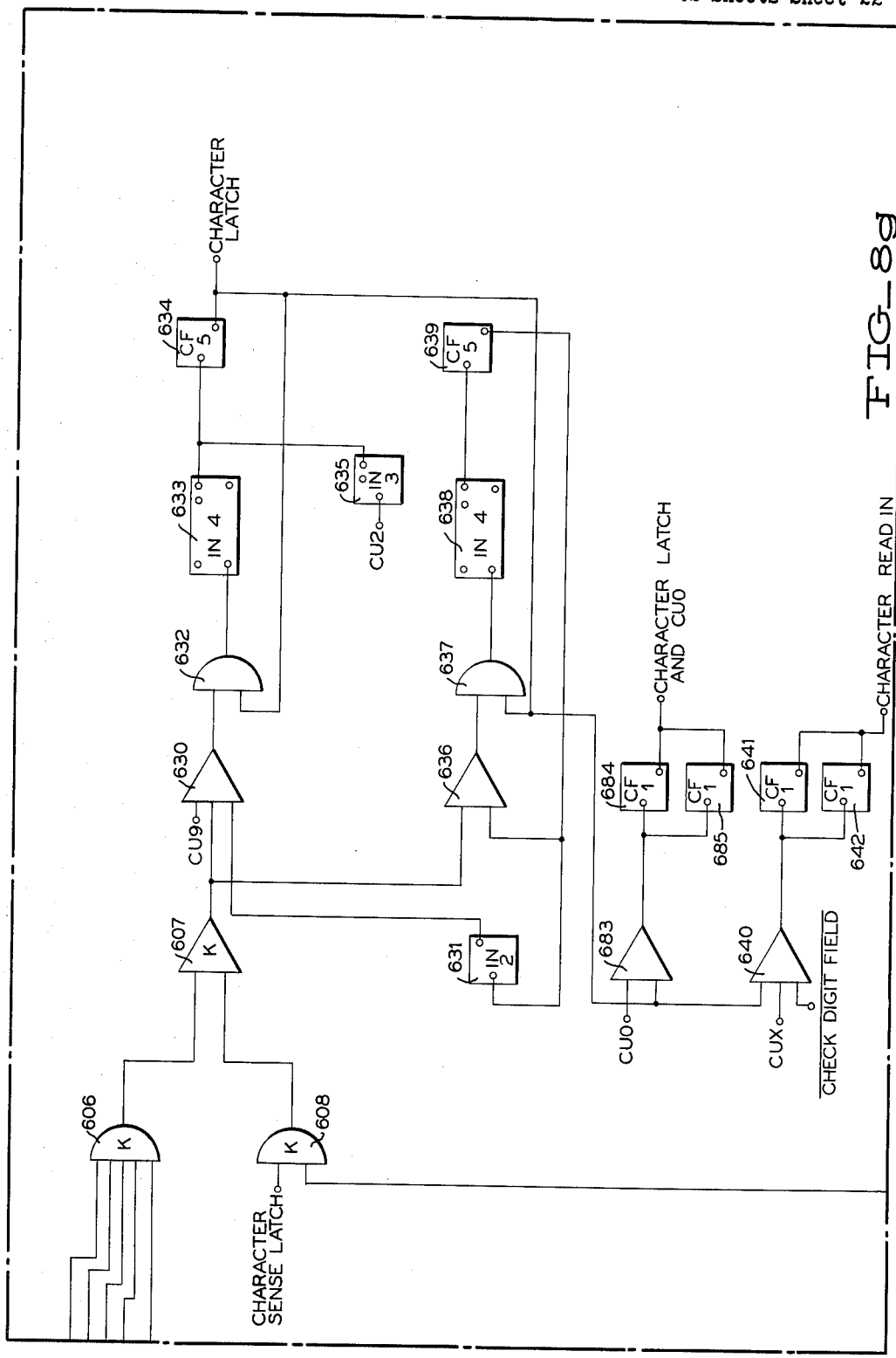

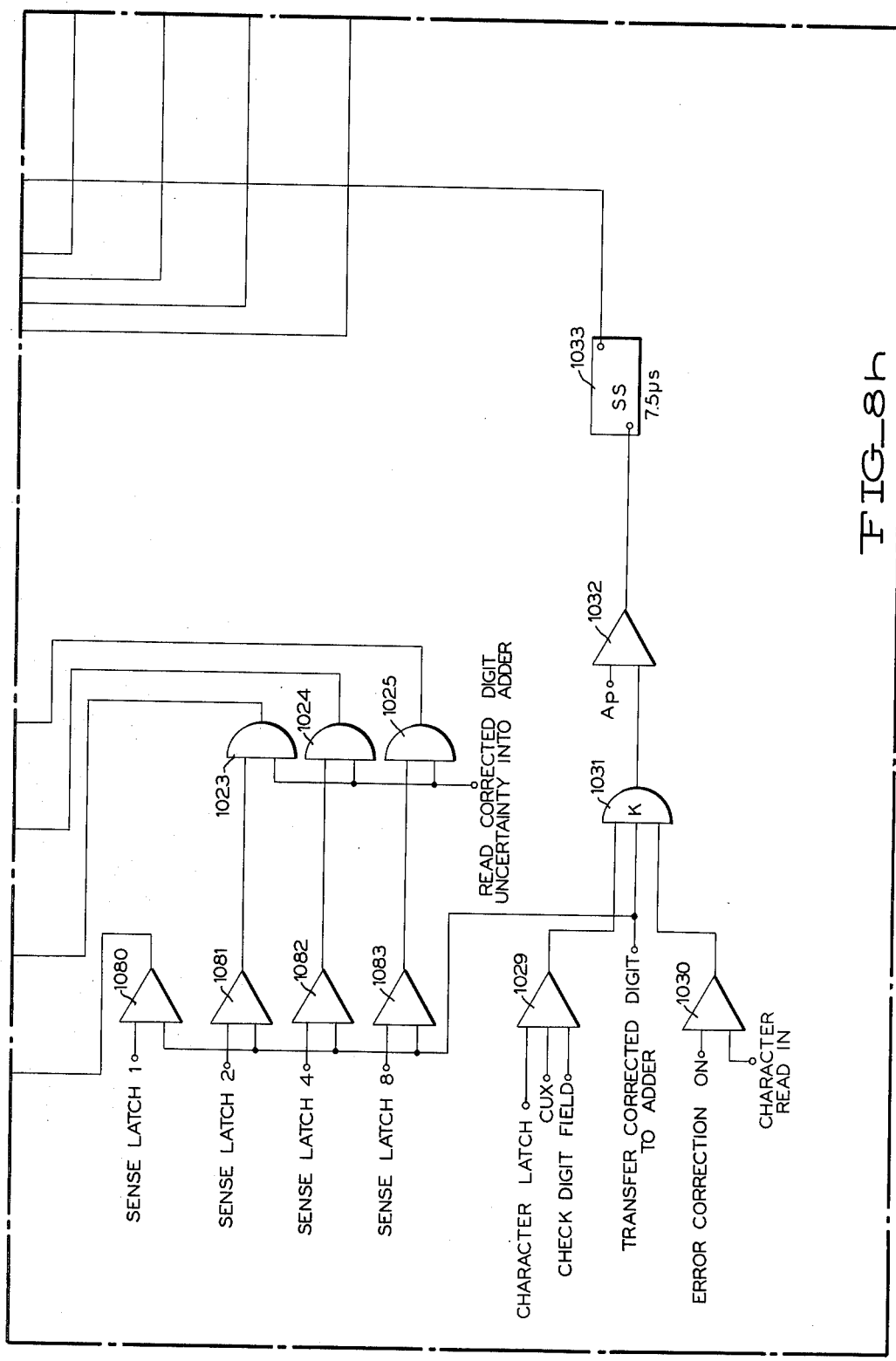

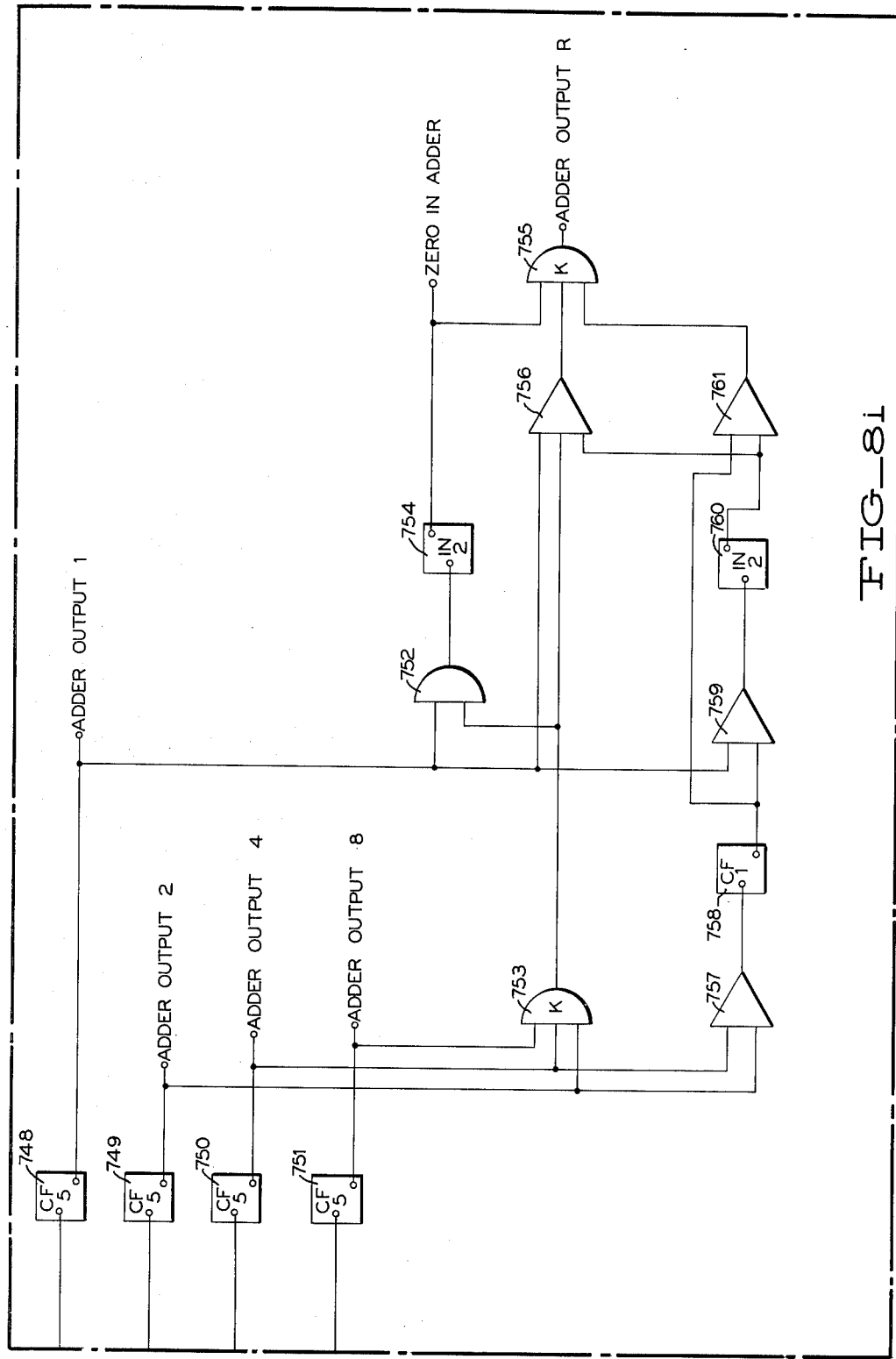

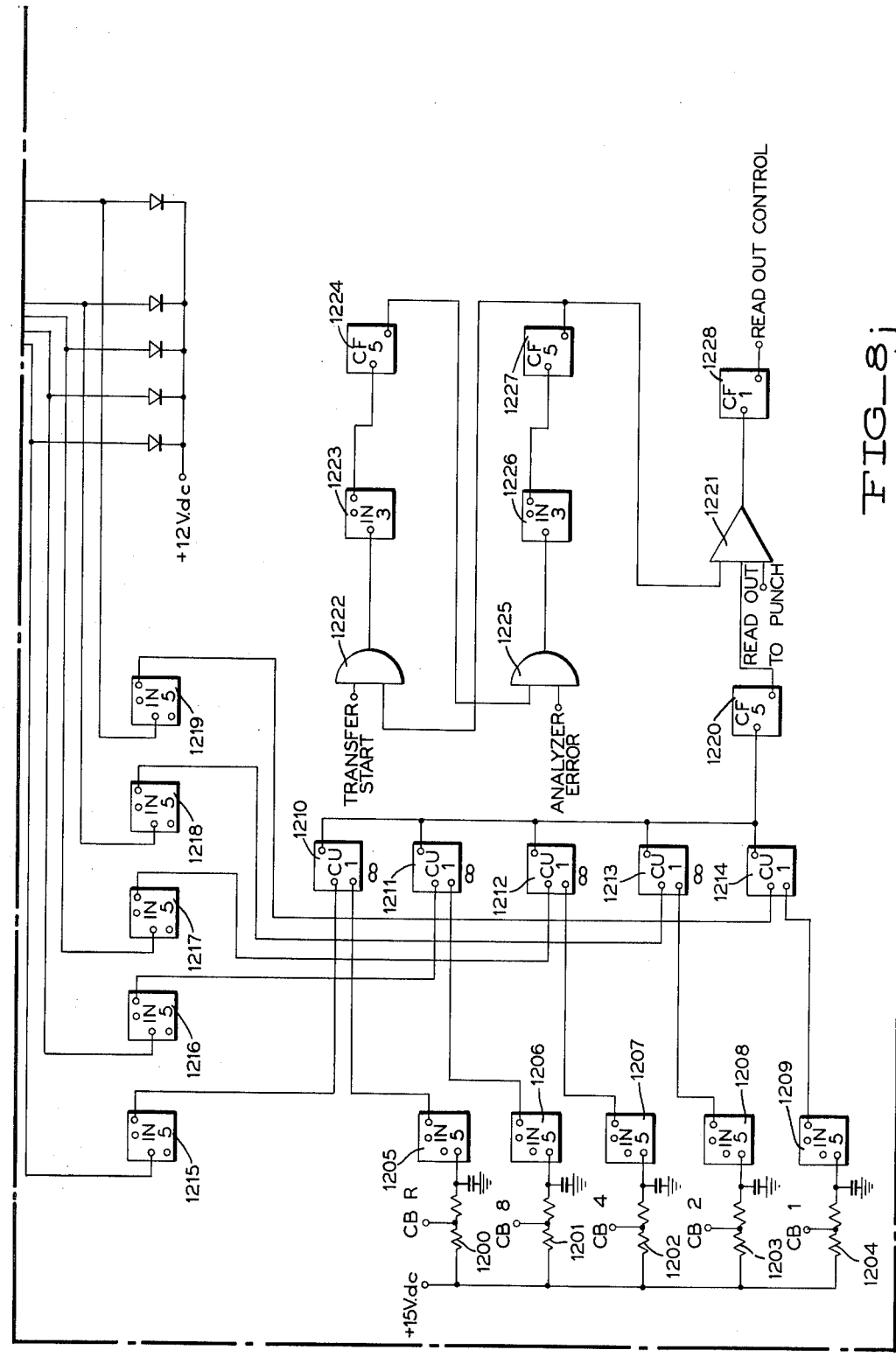

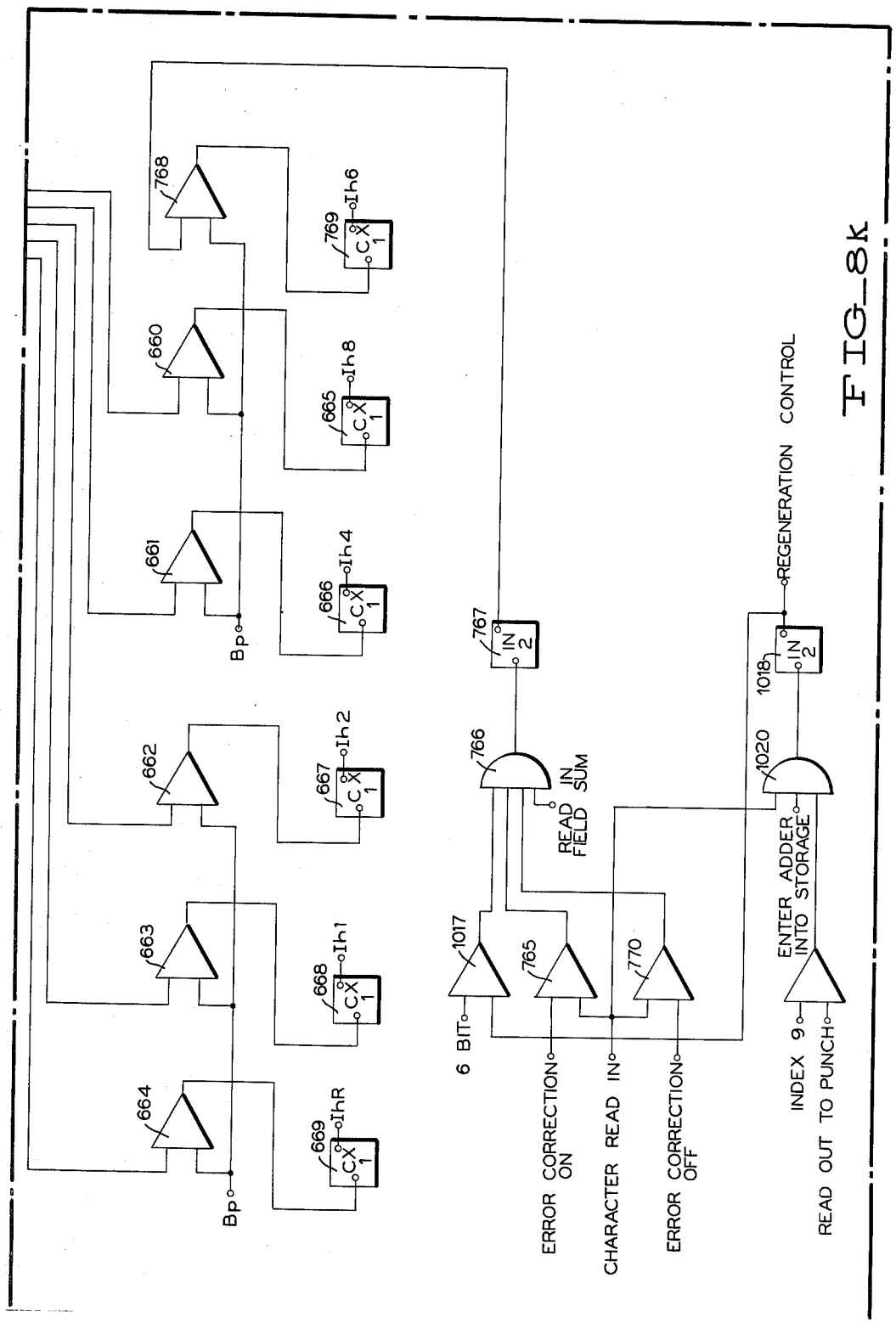

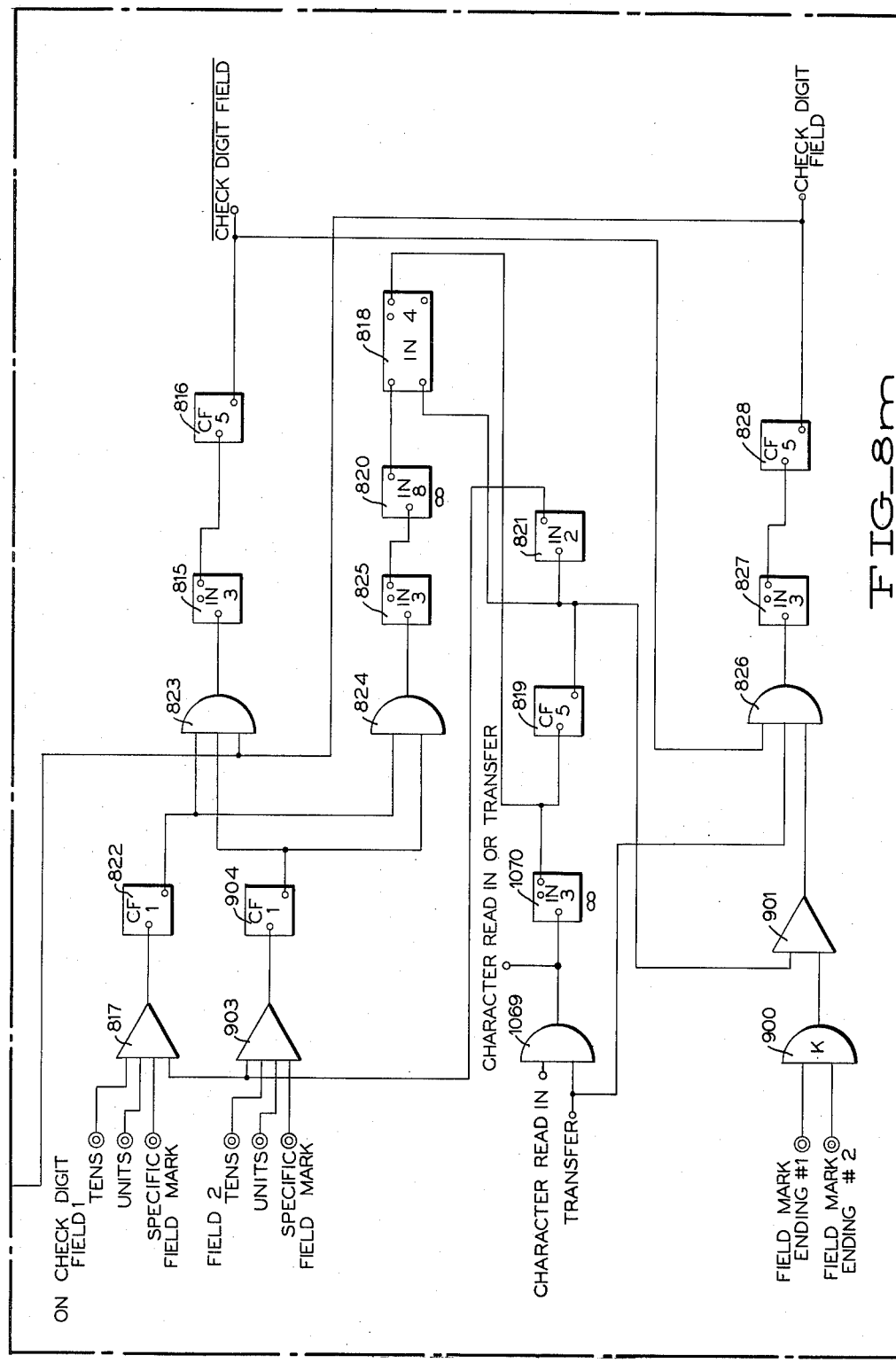

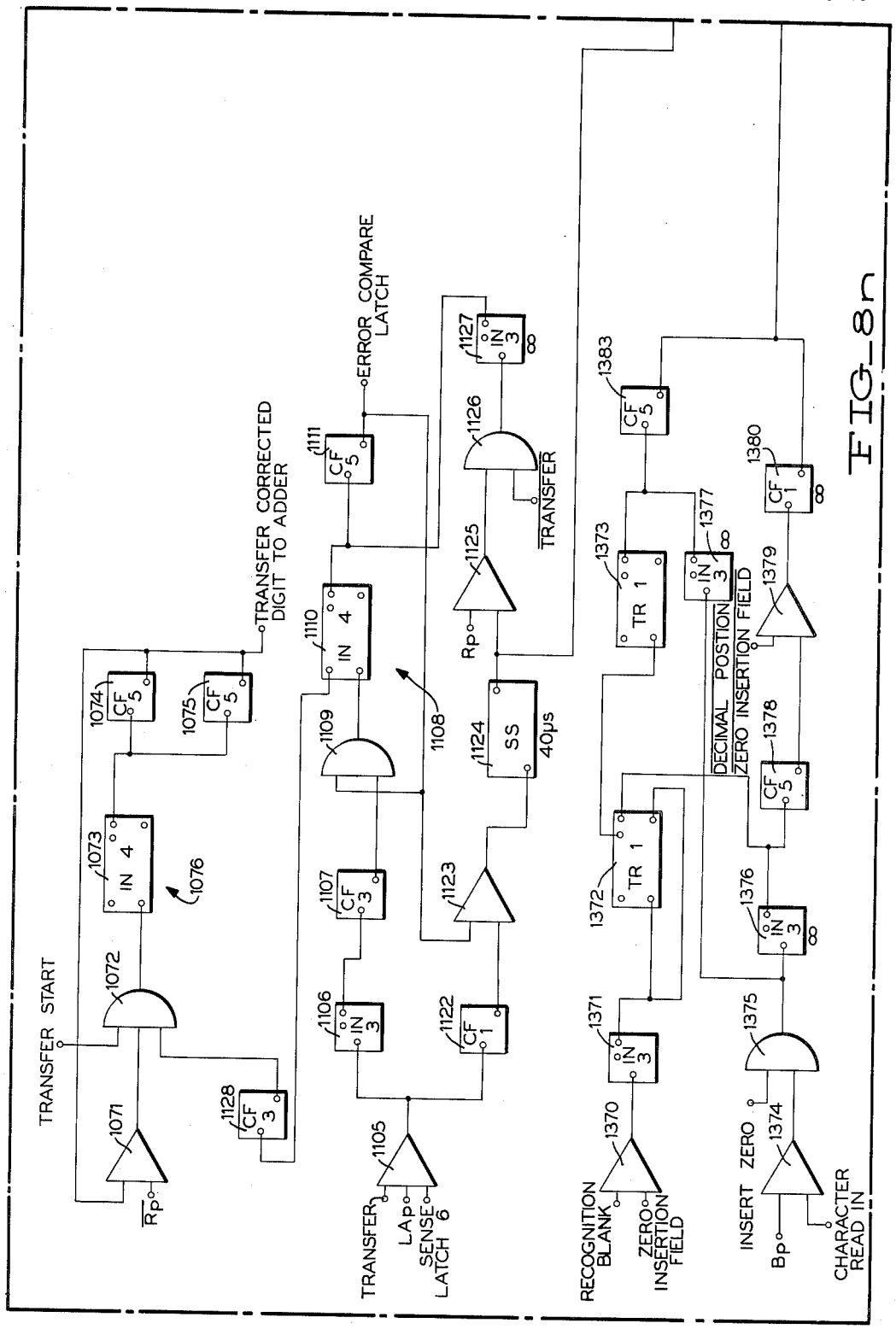

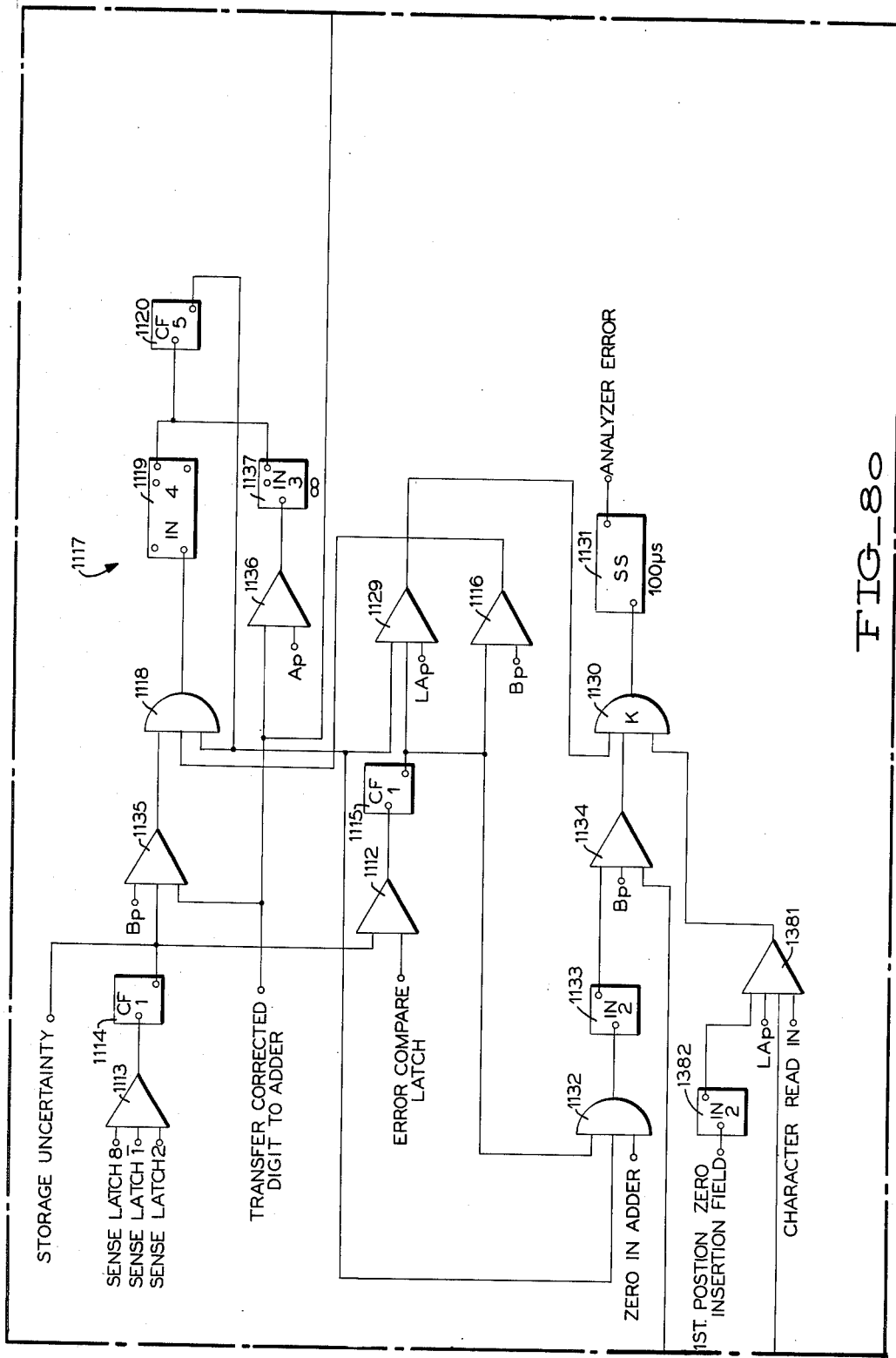

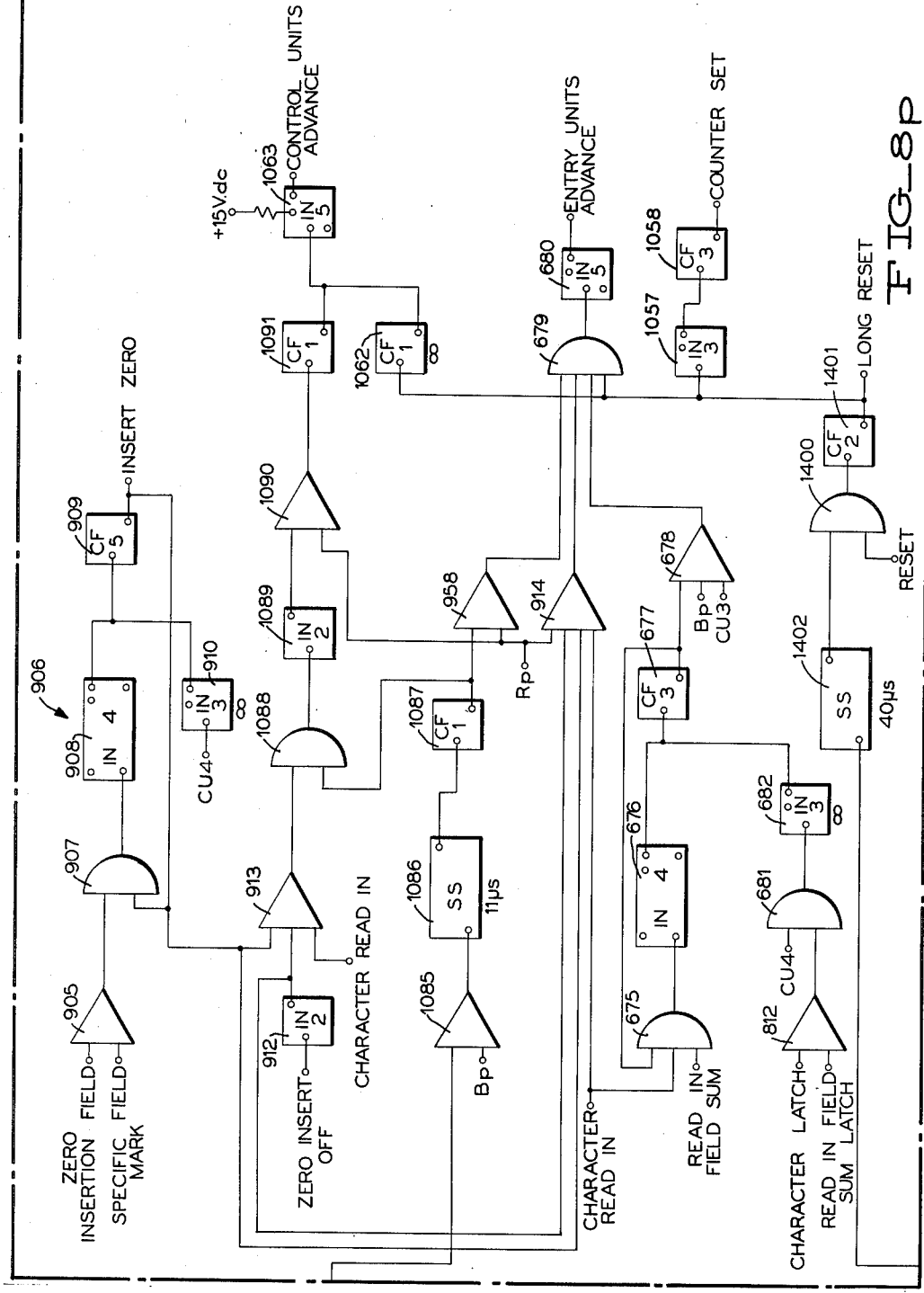

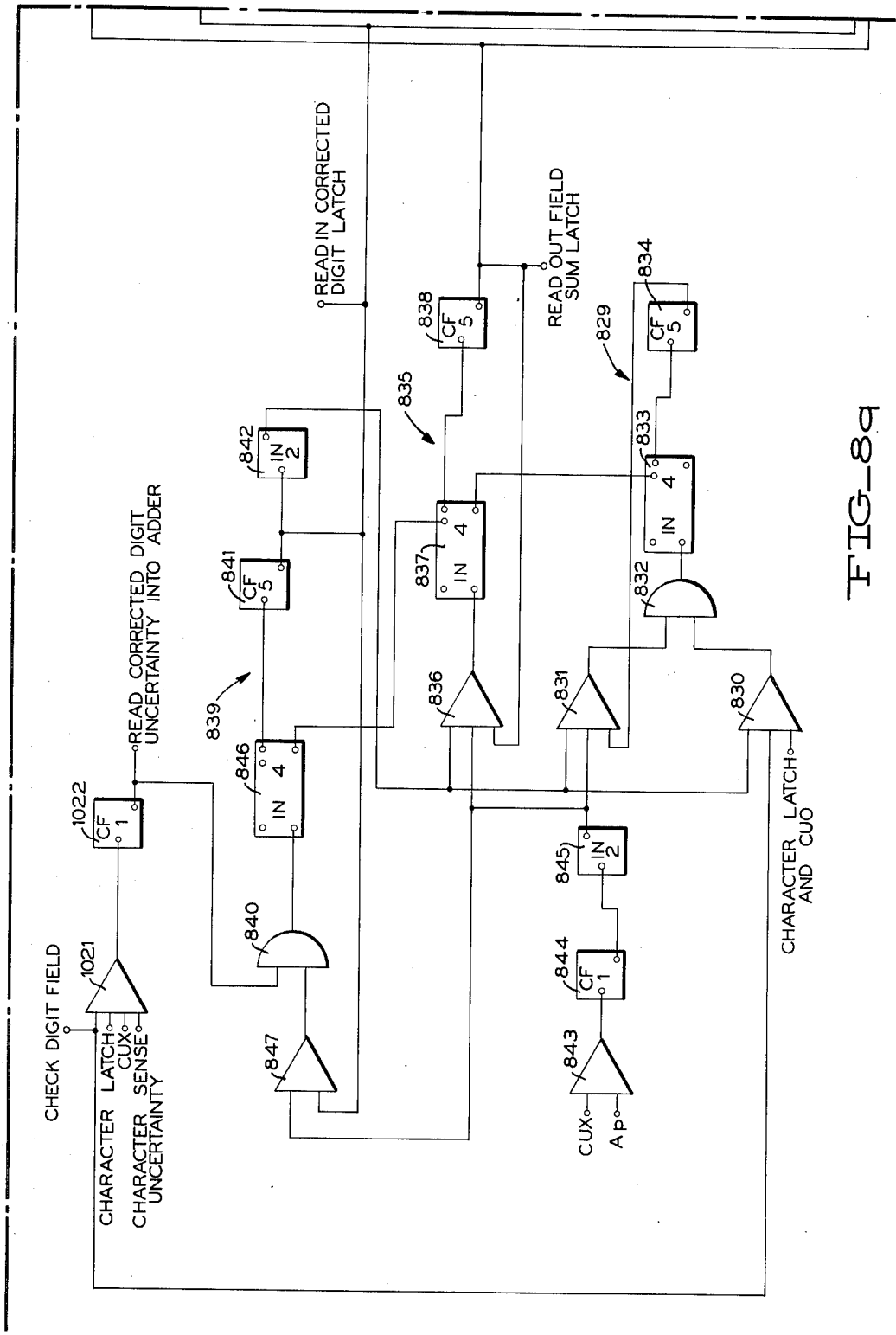
FIG_8q

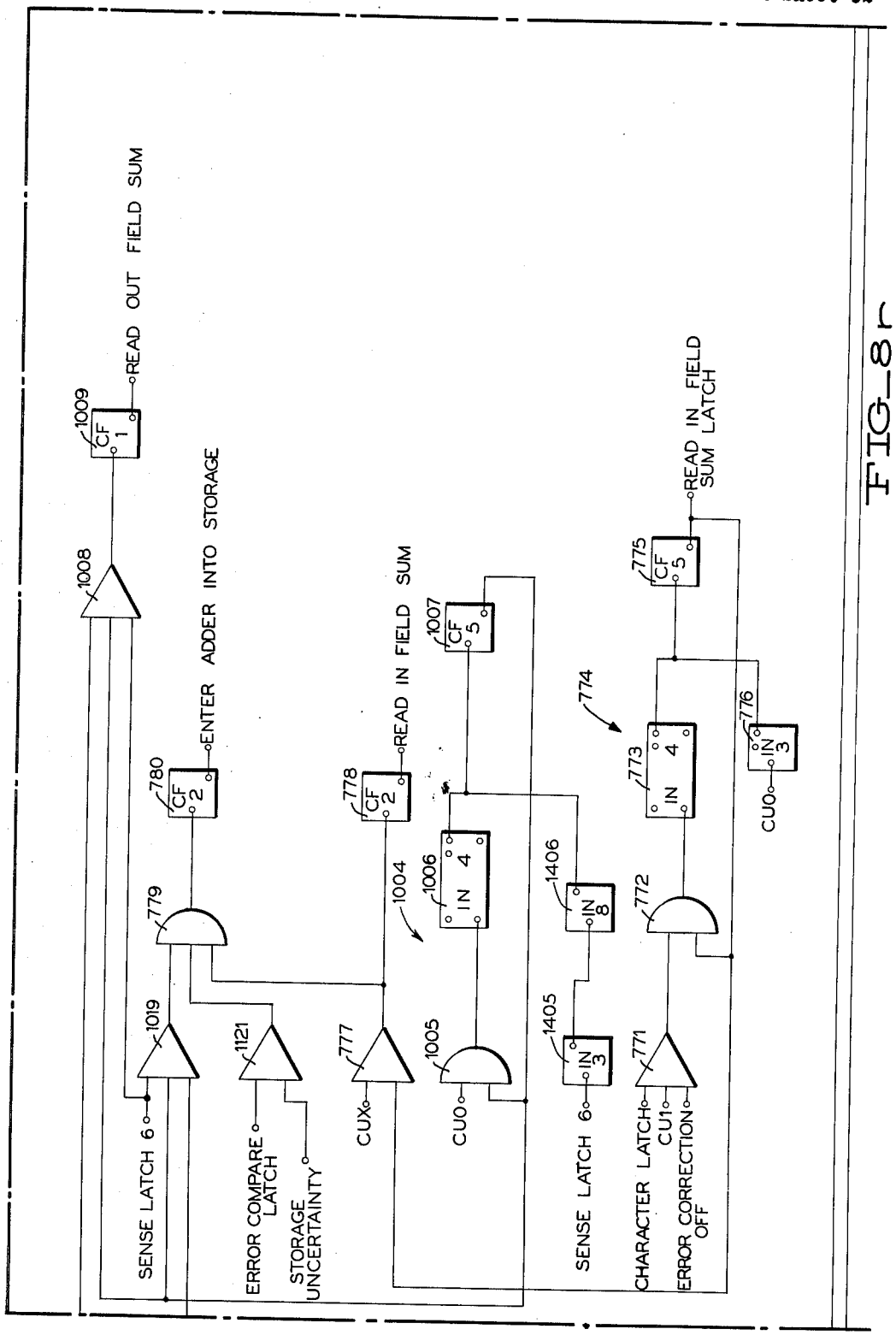

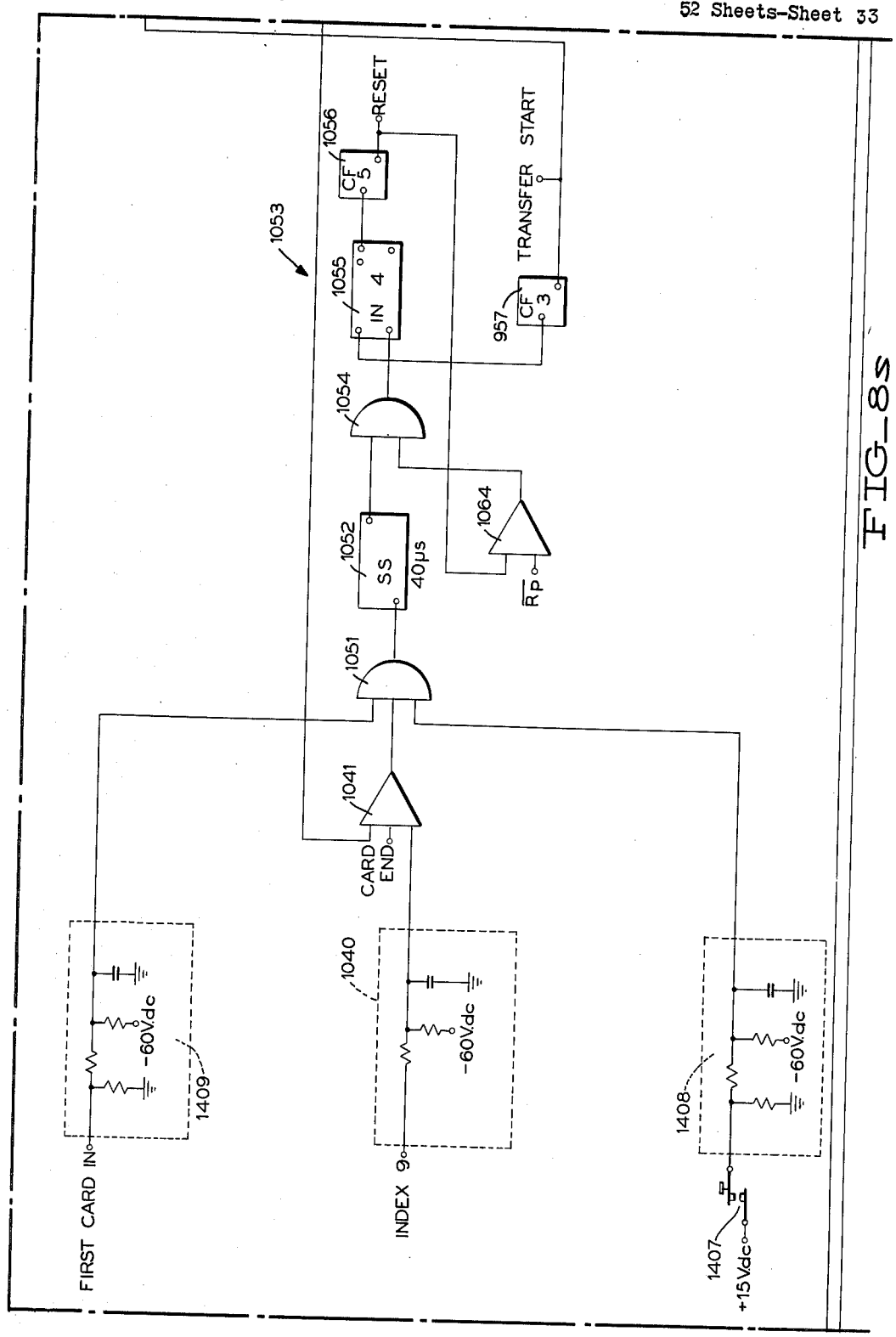
FIG_8s

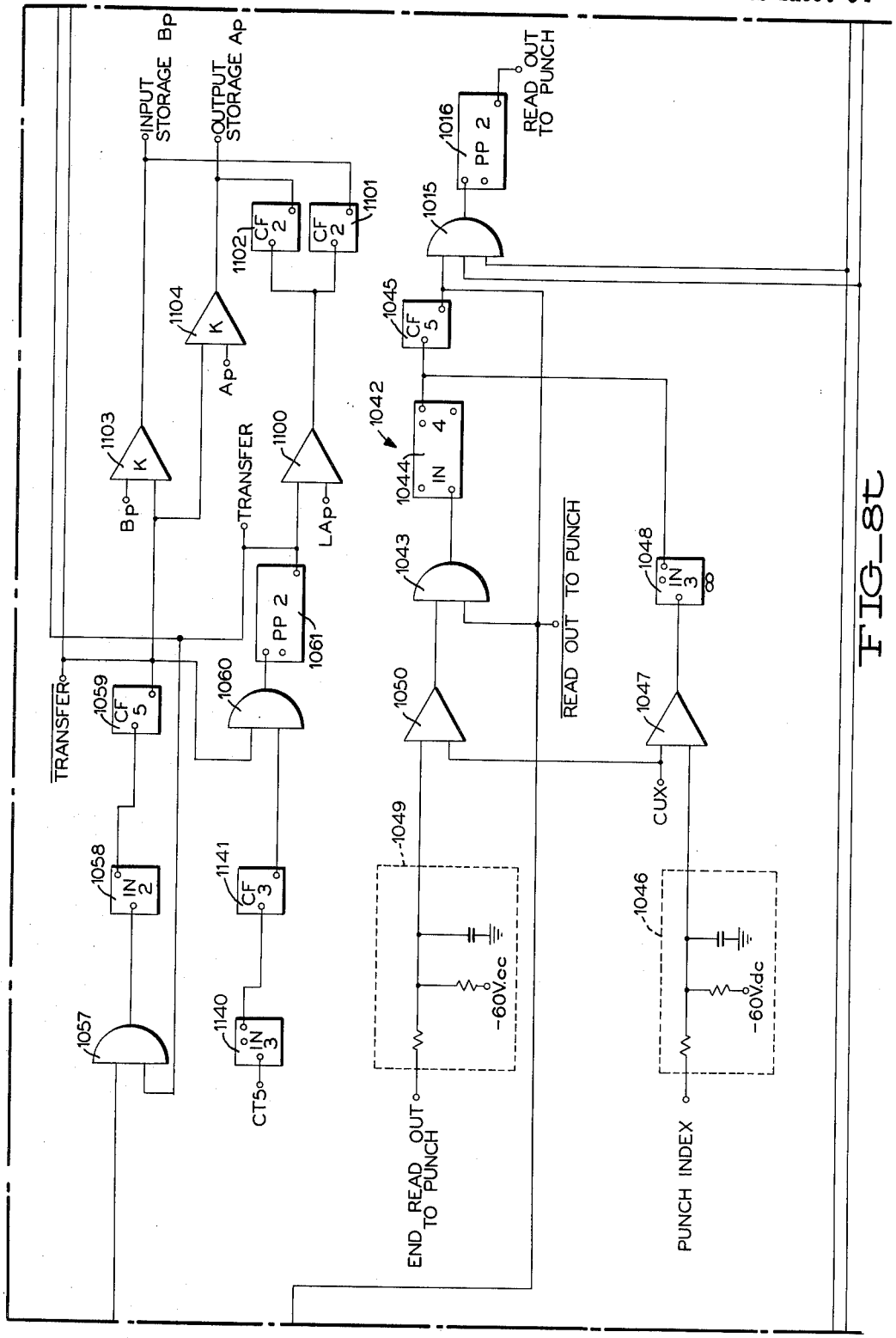
FIG_8t

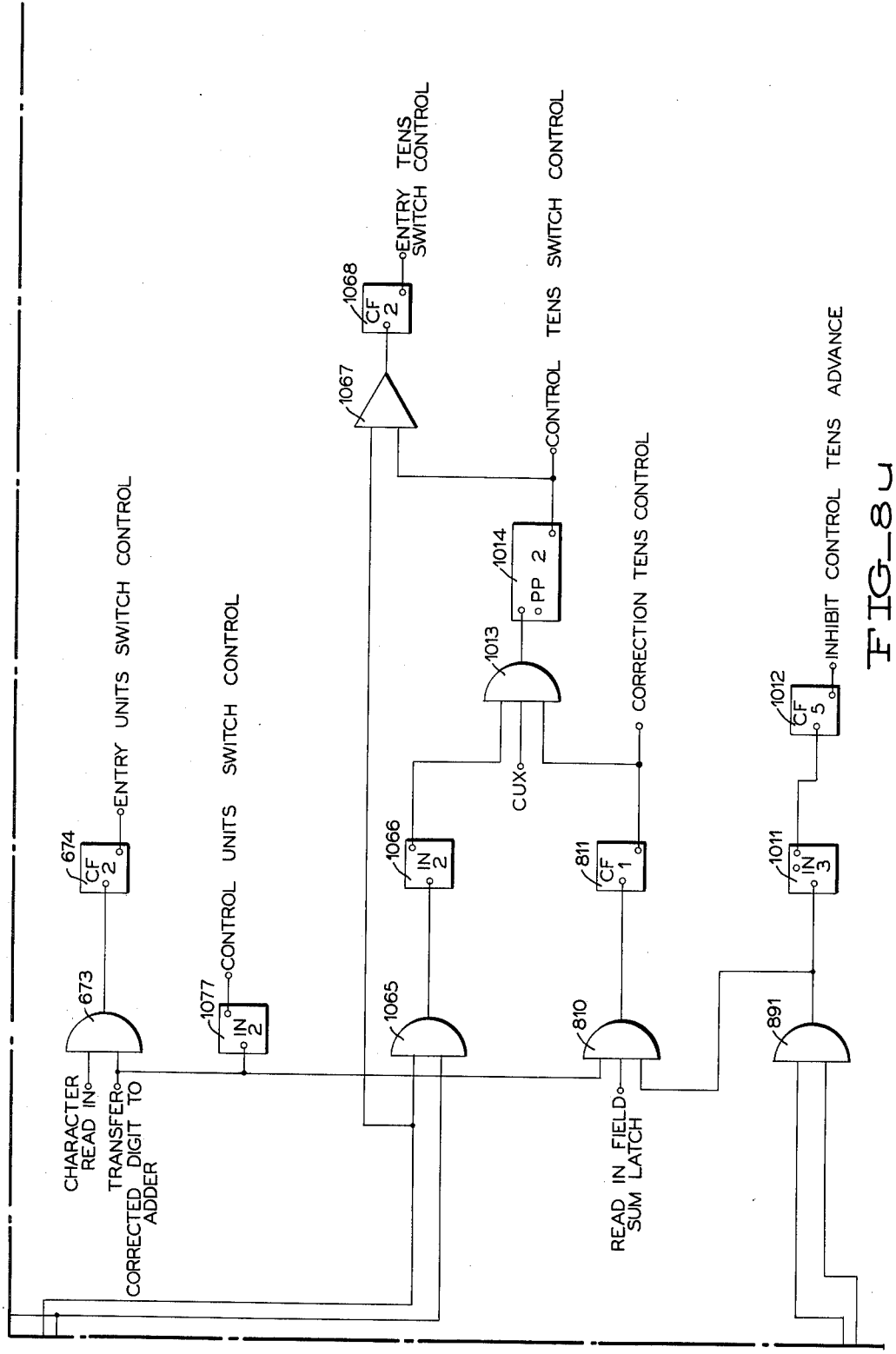

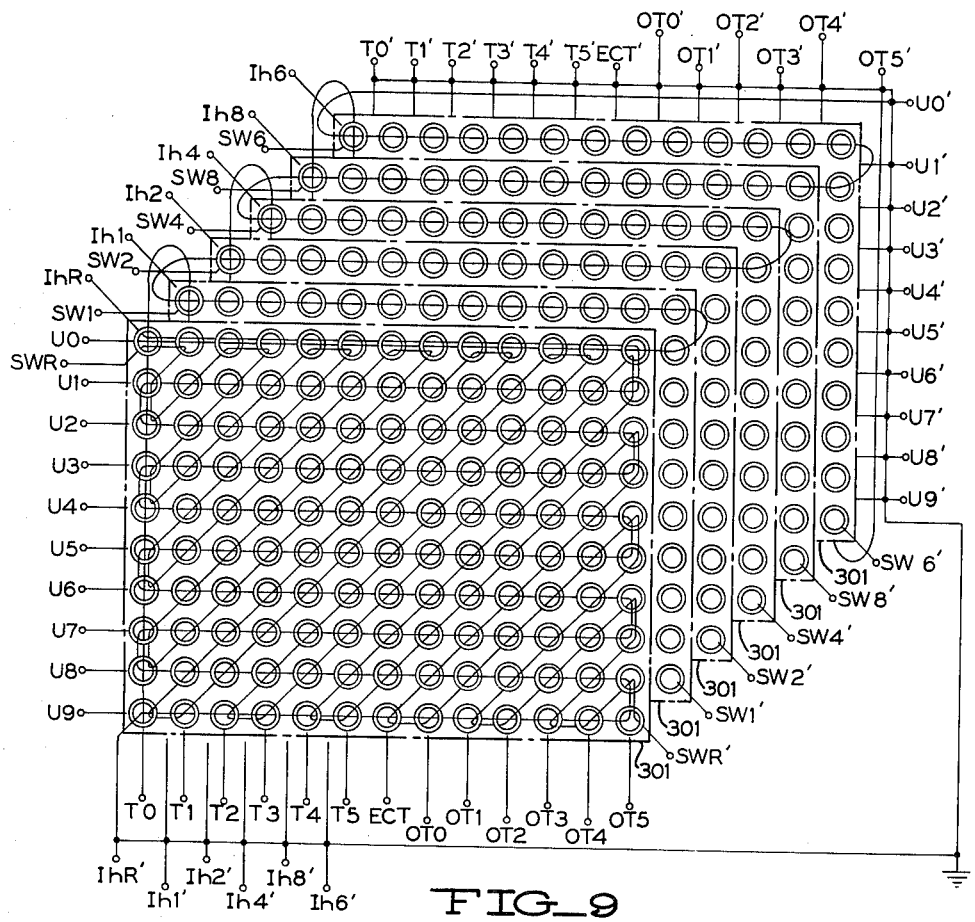
FIG_9
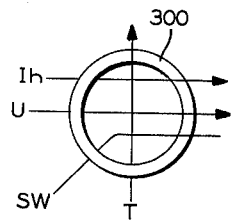
FIG_10
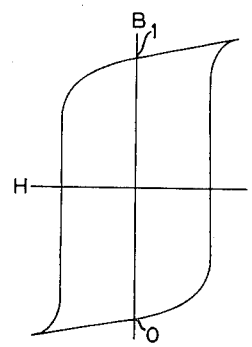
FIG_11

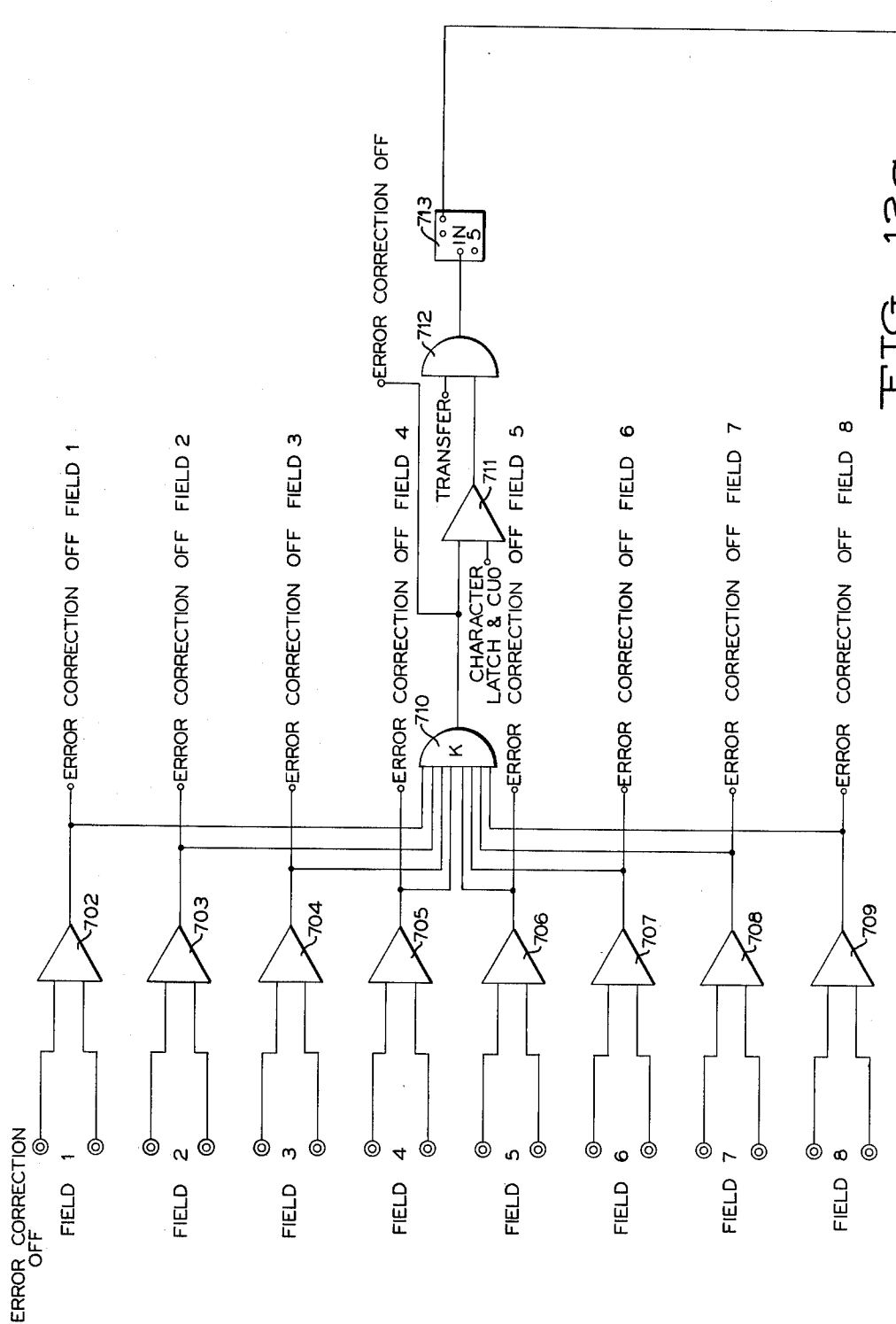

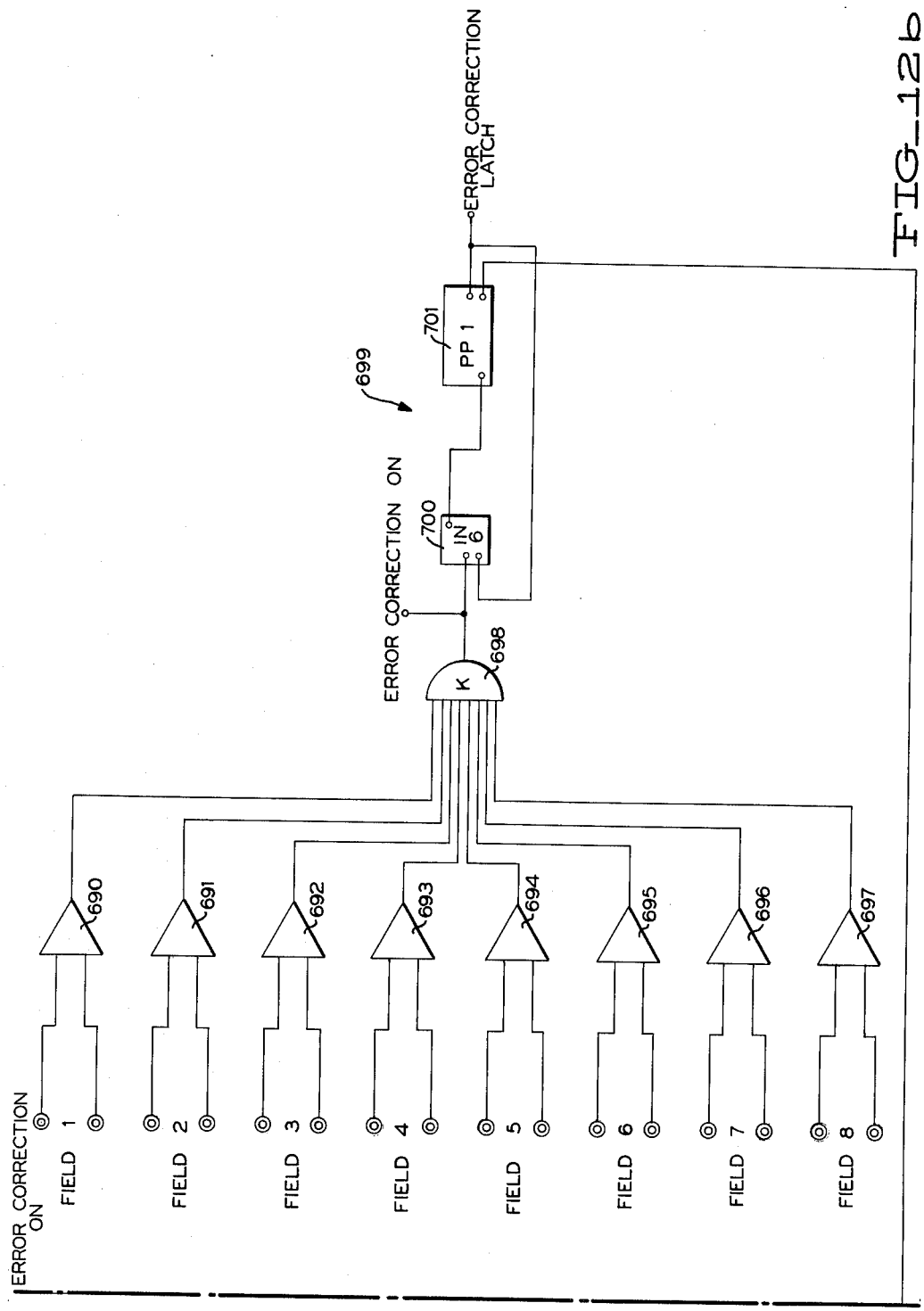

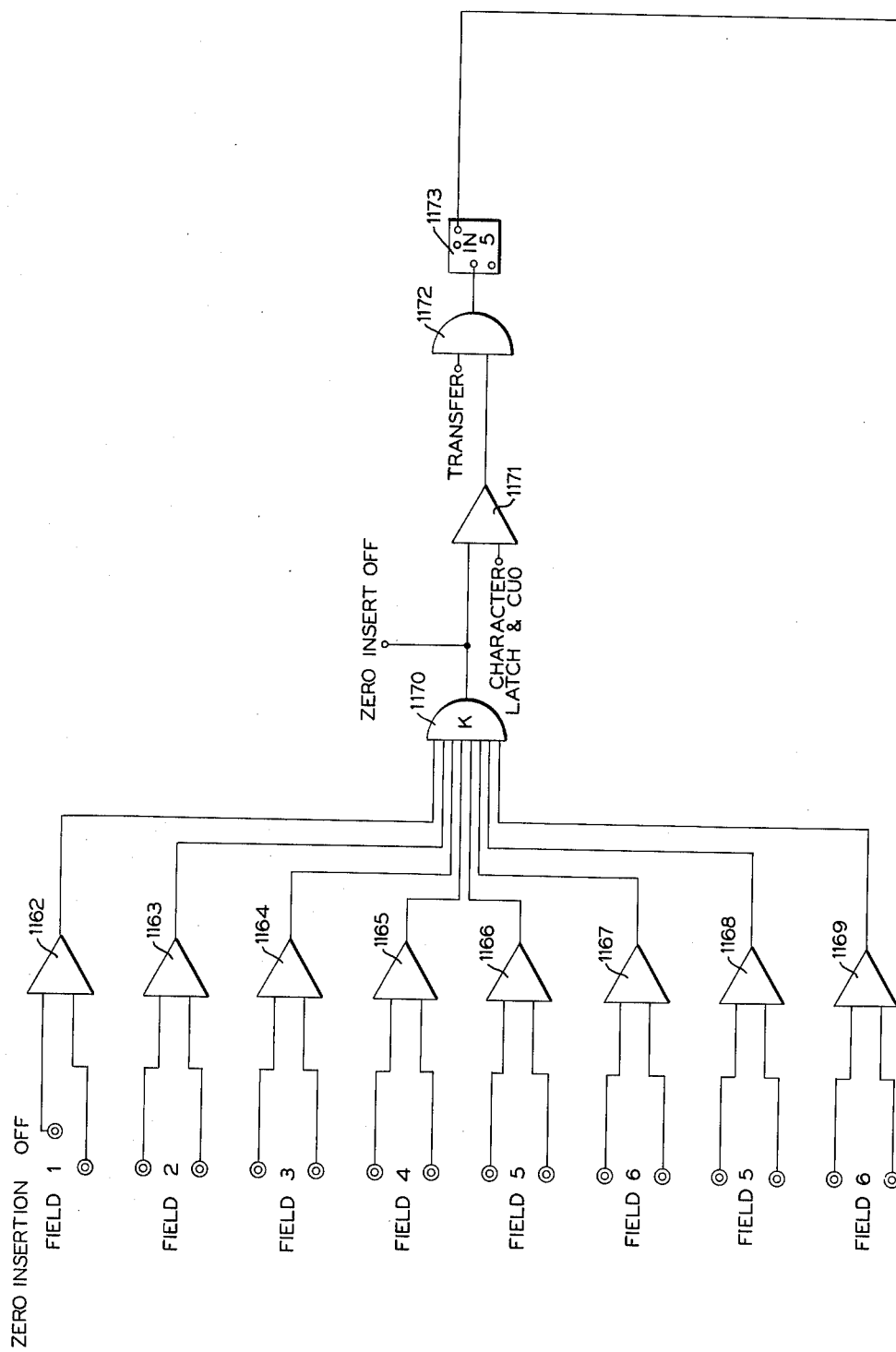

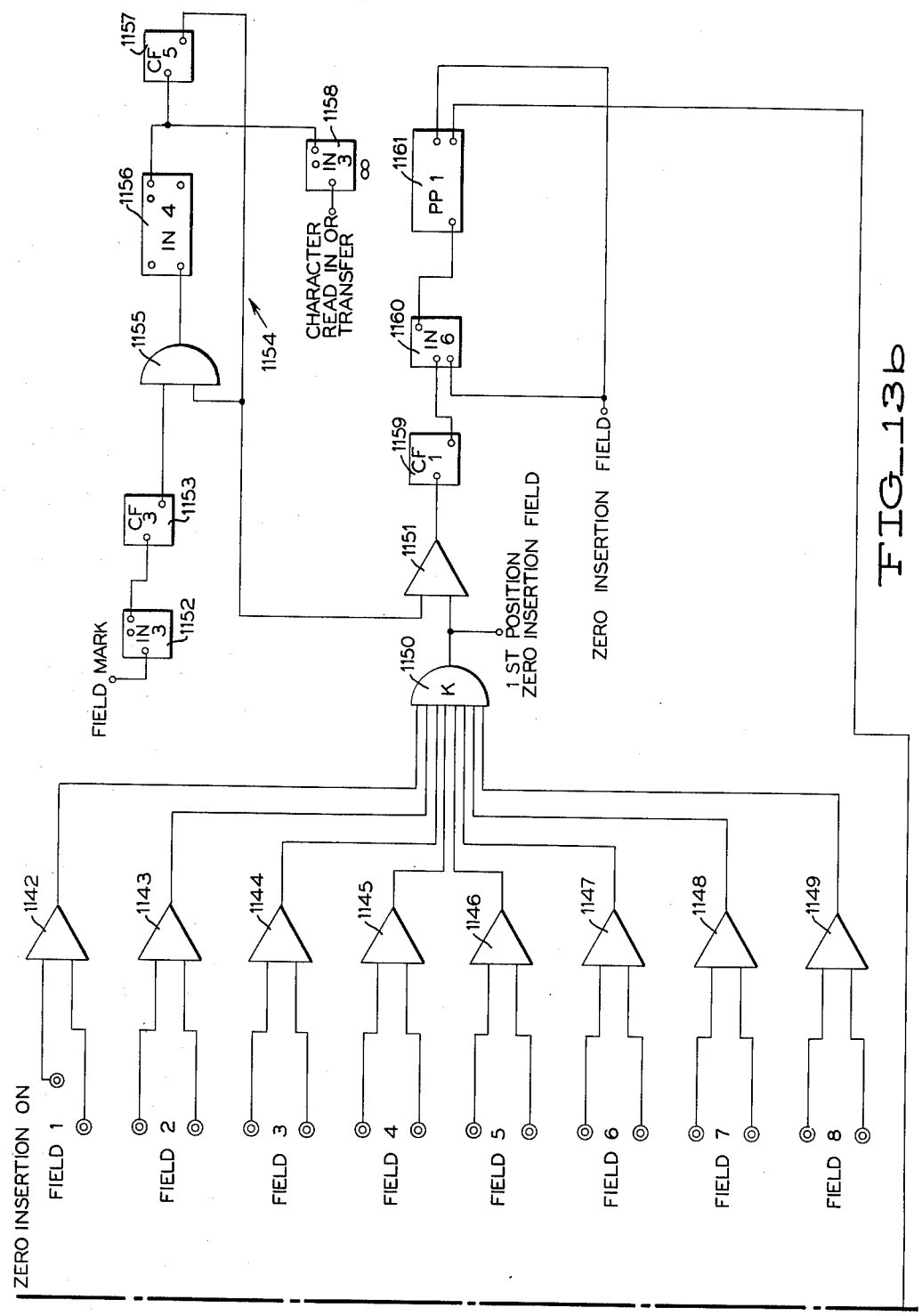
FIG_13b

FIG. 14

| FIG. 3a | FIG. 3b | FIG. 3c |
|---|---|---|
| FIG. 3d | FIG. 3e | FIG. 3f |

FIG. 15

| FIG. 4a | FIG. 4b |
|---|---|
| FIG. 4c | FIG. 4d |

FIG. 16

| FIG. 7a | FIG. 7b |
|---|---|

FIG. 17

| FIG. 8a | FIG. 8b | FIG. 8c | FIG. 8d | FIG. 8e |
|---|---|---|---|---|
| FIG. 8f | FIG. 8g | FIG. 8h | FIG. 8i | FIG. 8j |
| FIG. 8k | FIG. 8m | FIG. 8n | FIG. 8o | FIG. 8p |
| FIG. 8q | FIG. 8r | FIG. 8s | FIG. 8t | FIG. 8u |

FIG. 18

| FIG. 12a | FIG. 12b |
|---|---|

FIG. 19

| FIG. 13a | FIG. 13b |
|---|---|

| FIG. 53a | FIG. 53b |
|---|---|

FIG. 20

FIG_21a
| DECIMAL | BINARY CODED DECIMAL | | | | R |
|---|---|---|---|---|---|
| | 1 | 2 | 4 | 8 | |
| 0 | 0 | 0 | 0 | 0 | 1 |
| 1 | 1 | 0 | 0 | 0 | 0 |
| 2 | 0 | 1 | 0 | 0 | 0 |
| 3 | 1 | 1 | 0 | 0 | 1 |
| 4 | 0 | 0 | 1 | 0 | 0 |
| 5 | 1 | 0 | 1 | 0 | 1 |
| 6 | 0 | 1 | 1 | 0 | 1 |
| 7 | 1 | 1 | 1 | 0 | 0 |
| 8 | 0 | 0 | 0 | 1 | 0 |
| 9 | 1 | 0 | 0 | 1 | 1 |
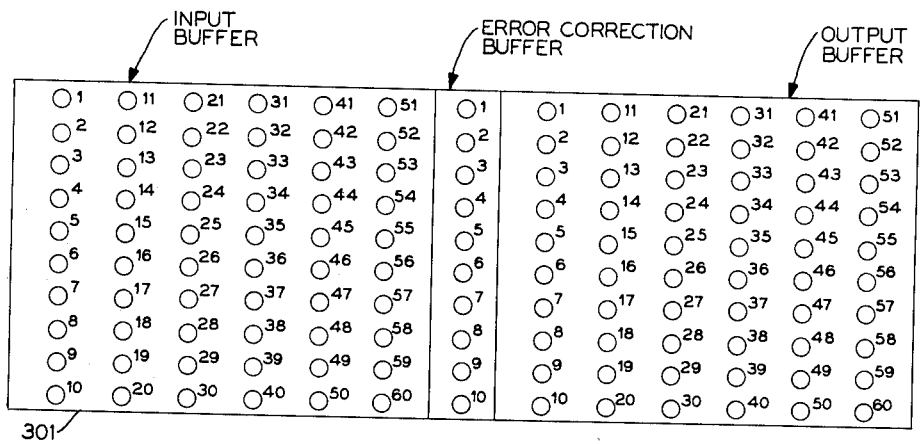
FIG_21b Aug. 10, 1965  A. HAMBURGEN  3,200,372
ERROR DETECTION AND CORRECTION SYSTEM
Filed July 26, 1960  52 Sheets-Sheet 43
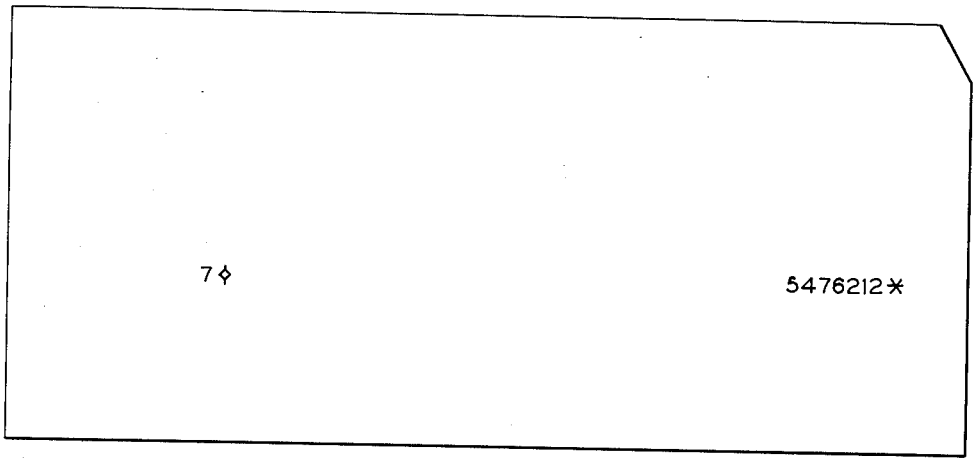
FIG_22a
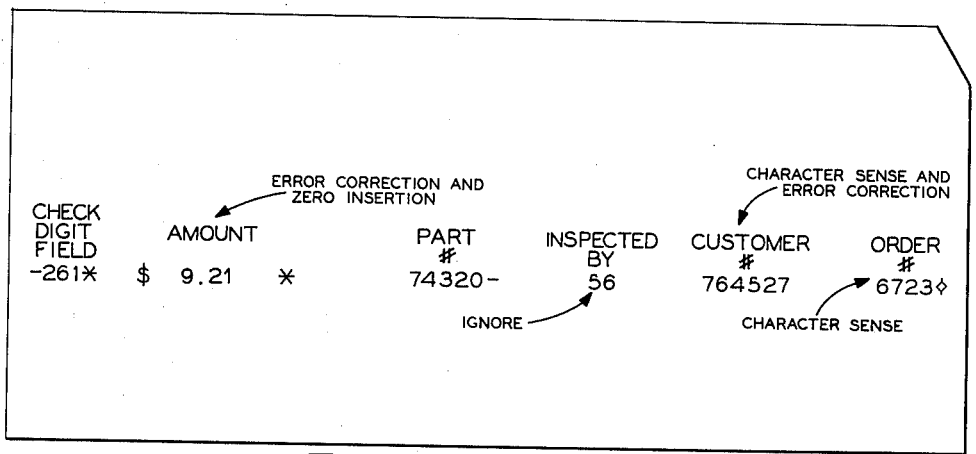
FIG_22b

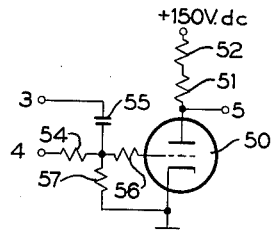
FIG_23a
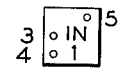
FIG_23b
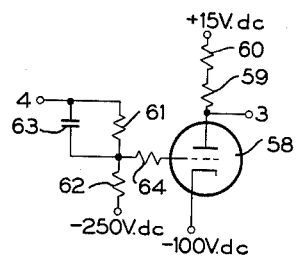
FIG_24a
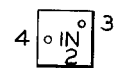
FIG_24b
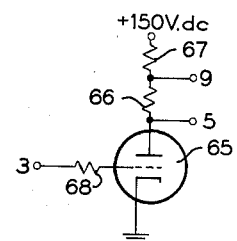
FIG_25a
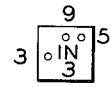
FIG_25b
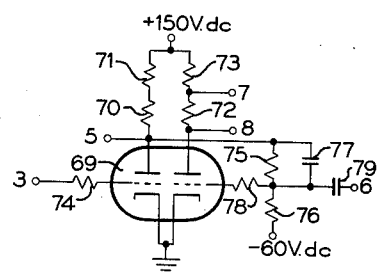
FIG_26a
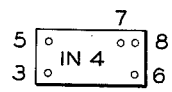
FIG_26b Aug. 10, 1965    A. HAMBURGEN    3,200,372
ERROR DETECTION AND CORRECTION SYSTEM
Filed July 26, 1960    52 Sheets-Sheet 45
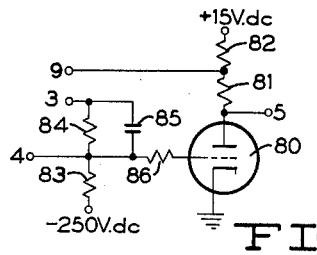 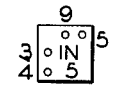
FIG_27a    FIG_27b
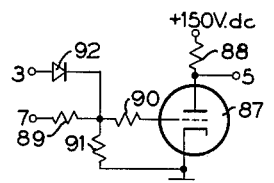 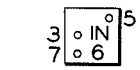
FIG_28a    FIG_28b
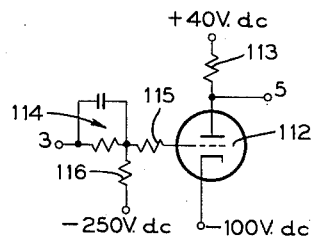 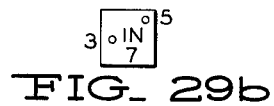
FIG_29a    FIG_29b
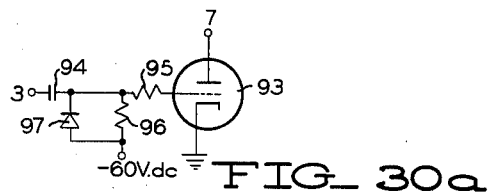 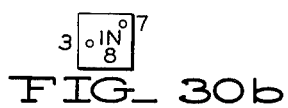
FIG_30a    FIG_30b
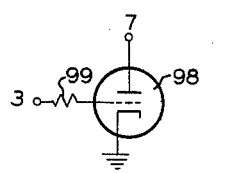 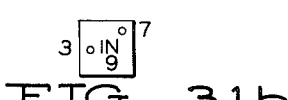
FIG_31a    FIG_31b

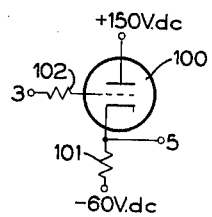
FIG_32a
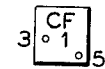
FIG_32b
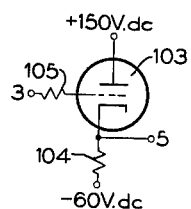
FIG_33a
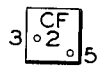
FIG_33b
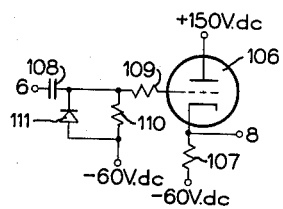
FIG_34a
FIG_34b
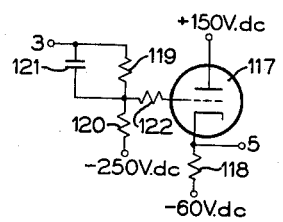
FIG_35a
FIG_35b

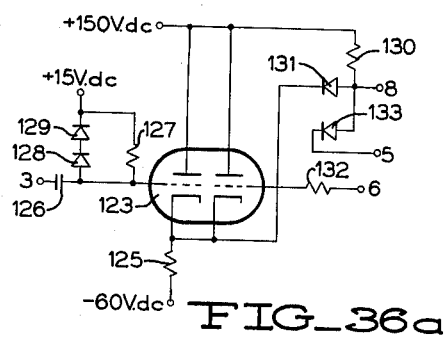
FIG_36a
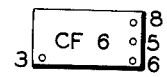
FIG_36b
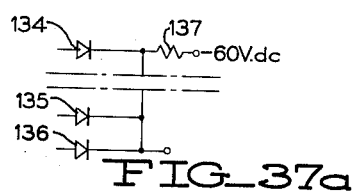
FIG_37a
FIG_37b
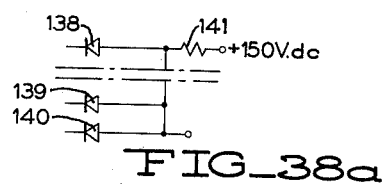
FIG_38a
FIG_38b
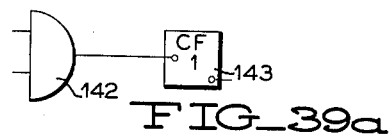
FIG_39a
FIG_39b
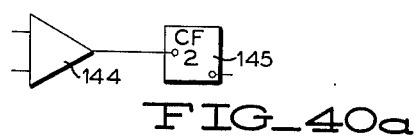
FIG_40a
FIG_40b Aug. 10, 1965  A. HAMBURGEN  3,200,372
ERROR DETECTION AND CORRECTION SYSTEM
Filed July 26, 1960  52 Sheets-Sheet 48
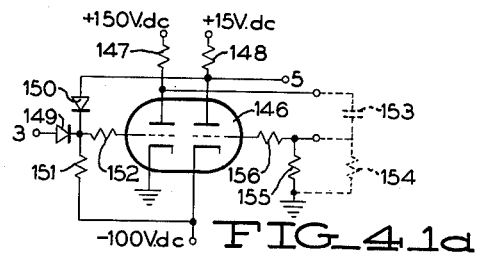
FIG_41a
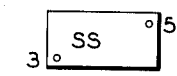
FIG_41b
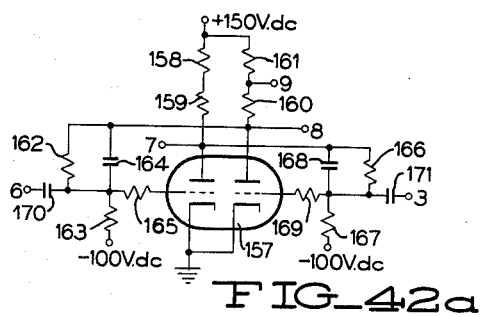
FIG_42a
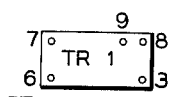
FIG_42b
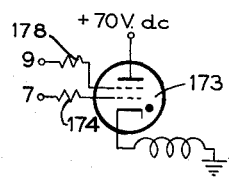
FIG_43a
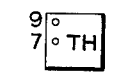
FIG_43b
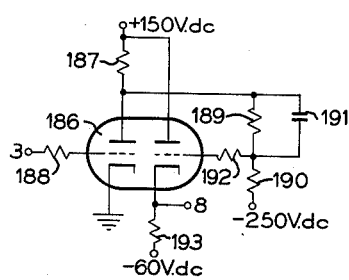
FIG_44a
FIG_44b Aug. 10, 1965    A. HAMBURGEN    3,200,372
ERROR DETECTION AND CORRECTION SYSTEM
Filed July 26, 1960    52 Sheets-Sheet 49

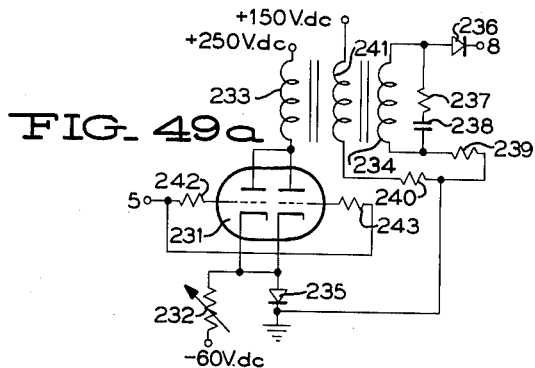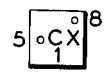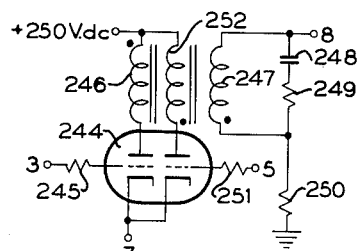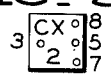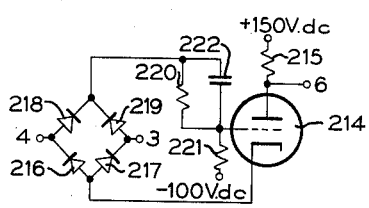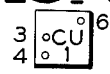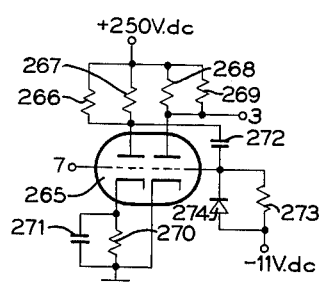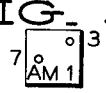

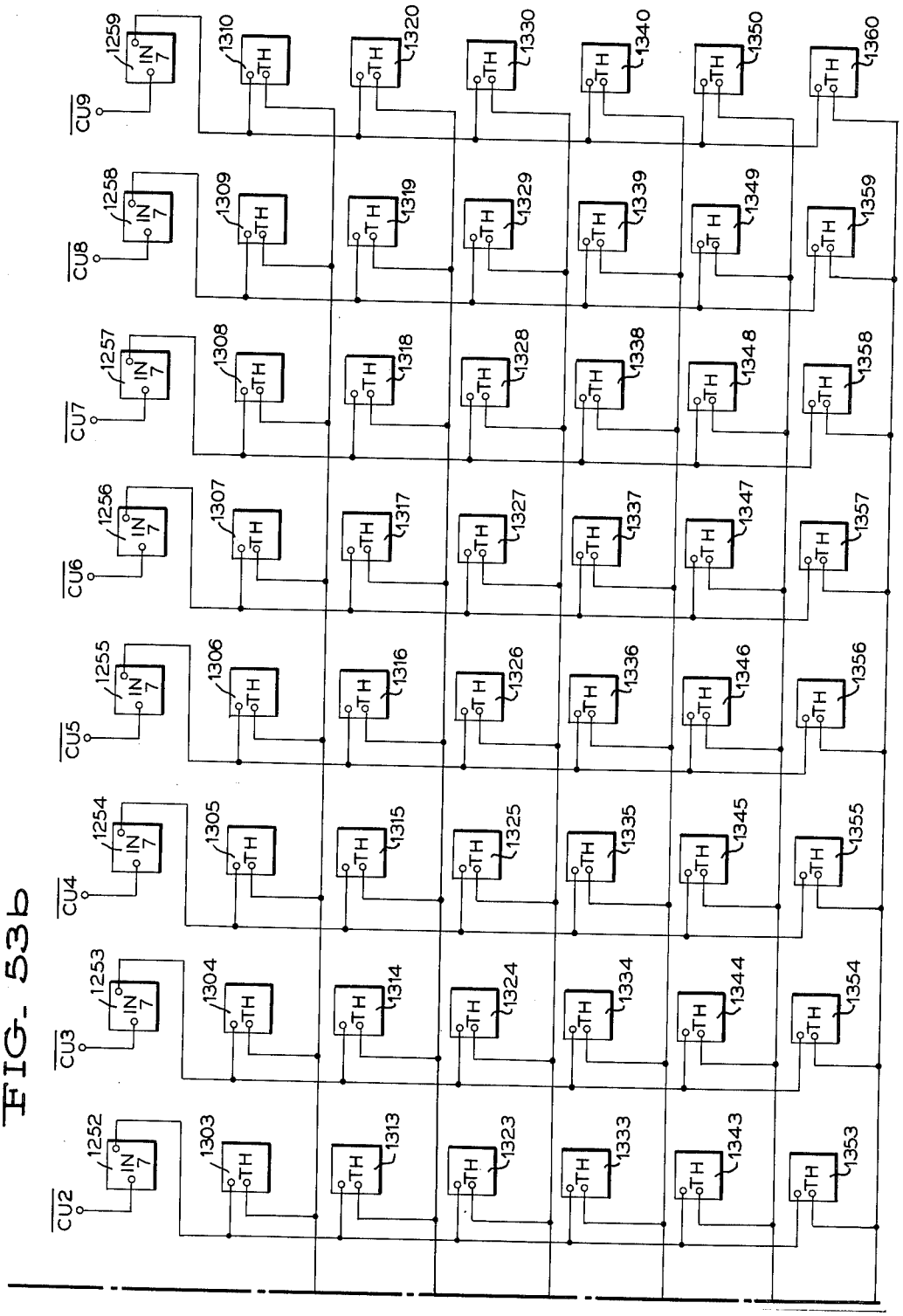

United States Patent Office 3,200,372
Patented Aug. 10, 1965

3,200,372
ERROR DETECTION AND CORRECTION SYSTEM
Arthur Hamburgen, Belmont, Mass., assignor to International Business Machines Corporation, New York, N.Y., a corporation of New York
Filed July 26, 1960, Ser. No. 45,499
21 Claims. (Cl. 340—146.1)

This invention relates to signal translating apparatus and particularly to an error detecting and correcting system for use in conjunction with information sensing apparatus.

The primary object of the present invention is to provide a new and improved signal translating apparatus for detecting and correcting errors in data produced by information sensing apparatus.

Extensive efforts are being made to develop such apparatus. A principal reason for this effort is due to the fact that once the information is sensed it can be used to produce records in the form of punched cards, magnetic tape or other suitable machine readable media. The ultimate goal in developing such apparatus is to achieve 100 percent accuracy in the sensing of character data on record media. An immediate goal is to achieve an accuracy at least comparable to that produced by persons experienced in transcribing the information into machine readable form.

Probably the major factor affecting transcribing accuracy by human operators, as well as automatic sensing machines, is character quality. In printing characters with visible inks or other visible media, factors such as ribbon quality, ink density, type style, etc. cause a wide variation in printing quality. Portions of characters may be much darker or lighter than other portions and character line widths vary considerably from one character to another.

Much has been done to improve the data obtained in scanning characters before the data is fed to a suitable recognition circuit for producing signals representing the identities of the characters scanned. However, printing quality is a factor which always limits the accuracy of a character sensing system in spite of such data improvement means.

In application Serial No. 575,424 which was filed on April 2, 1956, now Patent No. 3,008,123, by W. S. Rohland and E. C. Greanias, a character sensing apparatus is disclosed which has proven to be highly accurate. Circuits are furnished in the recognition portion of the referenced application which almost entirely eliminate substitution errors. A substitution error may be defined as the identification of a particular character as some other character. The manner in which this substitution error elimination is accomplished is by providing a large amount of logic circuitry which looks at the character data produced in scanning a character in considerable detail. The arrangement is such that seldom is a particular character recognized as some other character. In such an arrangement, however, it is possible that a particular character can produce signals representing the correct character as well as some other character which is, of course, incorrect. This occurrence may be termed an UNCERTAINTY. That is, the machine is unable to determine which one of two or more possible character signals represents the character actually scanned. It will be appreciated that it is better to know that an UNCERTAINTY exists than to make a substitution error since those records from which UNCERTAINTIES are produced can be stacked in a separate hopper and later examined visually or fed through the machine again. It has been found that a very large proportion of the records which originally resulted in producing an UNCERTAINTY signal will be properly sensed in a subsequent sensing operation.

The present invention has as its purpose the correction of UNCERTAINTY errors and the detection of substitution errors. Briefly, the present invention comprises a circuit arrangement for receiving the signals produced by a suitable character sensing apparatus, such as that described in the previously referenced application, and storing the signals in a suitable storage means. In one embodiment, illustrated in detail, the characters on the record scanned by the character sensing apparatus are arranged in fields, there being one or more information fields and at least one check digit field. For each of the fields where error correction is desired, a check digit is provided in the check digit field. In this embodiment, the check digit is equal to the units order digit of the sum of the digits in the field to be error corrected. For example, if the characters in a particular information field are 5, 4, 8, 9 and 6, the check digit would be the digit 2. That is, since 5+4+8+9+6 is equal to 32, the units order digit of this sum is 2. This becomes the check digit.

As the characters in a field which is to be error corrected are scanned and signals representing their identity are supplied to the storage means, the signals are also fed to an adder which is capable of producing an output signal equal to the units order digit of the sum of the digits represented by the signals. This units order digit signal is also supplied to the storage means. The same procedure is followed with other information fields. When the first character in the check digit field is scanned and identified, a signal representing its identity is supplied to the adder. Following this, the units order digit of the sum of the first information field is read out of the storage means and supplied to a 9's complementing circuit. The output of 9's complementing circuit is applied to the adder. An additional count of one is inserted into the adder, which, when combined with the output of the 9's complement circuit, actually results in supplying the 10's complement of the units order digit of the field sum to the adder. The 9's complementing circuit is used in the present invention principally because it is simpler to instrument than a 10's complement circuit.

The adder should now have a zero therein, and a carry output should have been obtained at the time the additional count of one was inserted into the adder if all of the characters have been properly identified. Taking the example previously given, the digit 2 from the check digit field places a count of 2 into the adder. The 9's complement of the units order digit of the field sum, which was the digit 2 in the example, results in an additional count of 7 being supplied to the adder. That is, 9—2 is equal to the 7. The extra count of 1 supplied to the adder causes the adder to go to zero, i.e., 2+7+1=10 so that the units order digit of this sum is zero. A signal representing zero is supplied back to the same position in storage where the units order digit of the field sum of the first information field was originally stored.

Thereafter, the next digit in the check digit field is identified and supplied to the adder. Following this, the units order digit of the field sum for the second information field which was to be error corrected is read from the storage means and the same procedure followed as in the case of the first error corrected field.

To this point it has been assumed that all of the characters in the information fields were properly identified. As previously mentioned, this is not always the case. Suppose that in the example previously given the digit 8 in the first information field was identified as both the digit 8 and the digit 3. This is, of course, an UNCERTAINTY and would not enter the adder at all. The field sum would now be 24, i.e., $$5+4+U \text{ (for UNCERTAINTY)} +9+6=24$$

The units order digit of this sum is four and a signal representing this digit would have been entered into storage. When the check digit 2 is scanned and entered into the adder, the 9's complement of the digit 4, which in this instance would be the digit 5, would be entered into the adder. With the additional count of one entered into the adder, the sum in the adder would now be 2 (the check digit)+5 (the nines complement of the digit 4)+1=8. This is the corrected digit.

It will be seen from the above that the circuitry has determined that the character identified as both a 3 and an 8 was actually the character 8. This digit is entered back into the storage means where the original incorrect field sum units order digit 4 was stored.

Once the record has been completely scanned, a transfer operation takes place in the storage means. That is, the information placed in storage representing the characters in the various information fields is now transferred to an output section of the storage means in the order in which it was originally read into the storage means. During the transfer operation, if an UNCERTAINTY condition is detected the corrected digit is substituted therefor. Thus, in the previous example, where an UNCERTAINTY was produced in scanning the digit 8, the information originally placed in the storage means would have been 5, 4 U (UNCERTAINTY), 9 and 6. When the UNCERTAINTY signal is detected during the transfer operation, the corrected digit 8 is substituted for the UNCERTAINTY. Thus, the information actually placed in the output portion of the storage means would be 5, 4, 8, 9 and 6. It will be seen that this corresponds to the digits in the first information field in the example previously given.

A circuit is provided whereby the occurrence of two or more UNCERTAINTY signals in a singe field results in producing an error signal which can be used to cause the record card to be stacked separately. Another circuit is provided to detect substitution errors. This is accomplished by detecting conditions when an UNCERTAINTY does not exist in an information field but the corrected digit is not zero as it should be. For example, if in the example previously given, the digit 8 had actually been identified incorrectly as the digit 3, a substitution error would have occurred. This means that the field sum would be 5+4+3+9+6=27 and the units order digit of this sum would be the digit 7. The computed corrected digit then would be 2 (the check digit)+2 (the nines complement of the digit 7)+1=5. During the transfer operation, the absence of an UNCERTAINTY in the information field would indicate that the corrected digit should be zero. The fact that it is not, is indicative of a substitution error.

There is an instance where the fact that the corrected digit is not a zero is permissible even though there is not an UNCERTAINTY in the information field digits. This instance is when an UNCERTAINTY is produced in the scanning of a digit in the check digit field. It will be seen that if there is not an UNCERTAINTY in the information field, there is very little need to refer to the corrected digit. The only possibility of an undetectable error under these circumstances is where a substitution error occurs in the information field and also an UNCERTAINTY is produced in scanning the check digit for that field. The chances of such a combination of circumstances are extremely low and are worth the chance of an undetectable error. This will be fully appreciated when it is understood that an average of less than four UNCERTAINTY signals occur in every ten thousand characters scanned with a machine constructed according to the invention in the aforementioned Rohland and Greanias application. Since substitution errors were found to be rarer by at least an order of magnitude, the combination of a substitution error in an information field and an UNCERTAINTY for the check digit related to that field is extremely remote.

Once the information is transferred to the aforementioned output portion of the storage means such that error correction has taken place, suitable record producing apparatus may be controlled by the information in said output portion.

Provision is made for having predetermined field sizes in the record having the characters thereon. That is, a field may be assigned to have a predetermined maximum number of characters therein. However, if the actual number of characters to be placed in a field is less than said predetermined maximum, zeros may be automatically inserted in storage to the left of the significant digits in an information field until the number of characters in storage is equal to the said predetermined maximum number. This assures that the fields recorded in the output record media bear the proper relationship to the fields in the record having the characters printed thereon.

The arrangement described above constitutes a preferred embodiment of the invention. However, a number of modifications are possible. For example, the check digit may be employed in its true form, or it may be complemented to numbers other than 9. Also, numbering systems other than to the base 10 can be employed, e.g., to the base 47 which would provide for checking 10 numerals, 26 alphabetic letters, and 11 special characters. As a further extension of the invention, it is apparent that the check digit itself may be checked for error and then corrected, by means of another check digit, depending upon the degree of accuracy required.

It is another object of the present invention to provide an arrangement for detecting the correct identity of a character whose identity is in question as a result of being scanned by a character sensing apparatus.

Another object of this invention is to provide a new and improved arrangement for detecting substitution errors produced by a character sensing apparatus which is scanning one or more characters on a record.

Another object of the invention is to furnish a new and improved arrangement for indicating the correct identity of a character which has not been properly identified by character sensing apparatus.

Another object of this invention is to furnish an error correcting arrangement for receiving groups of one or more output signals from a character reading apparatus and determining which groups of the output signals will be error corrected.

Another object of the invention is to furnish a new and improved circuit arrangement which serves as a buffer between a character sensing system and a record producing apparatus.

A further object of this invention is to furnish an improved buffer storage means between a character sensing system and an output utilization device, the arrangement being such that information may be supplied from the buffer storage means to the output utilization device without interrupting the acceptance of information from the character sensing system.

Another object of the present invention is to produce an error correction arrangement for receiving groups of one or more signals from a character reading apparatus and determining which of the groups will be ignored and which will be used in producing a record.

A still further object of the present invention is to provide storage means for receiving information regarding characters in fields on a record where certain of said fields are predetermined to have a maximum number of characters therein but may contain fewer than said maximum number, the arrangement being such that the information from said storage means is supplied to an output record media in a fashion such that the proper relationship of the information in the various fields is preserved.

The foregoing and other objects, features and advantages of the invention will be apparent from the following more particular description of preferred embodiments of the invention, as illustrated in the accompanying drawings.

In the drawings:

FIG. 1 is a basic schematic block diagram of a preferred embodiment of the present invention;

FIG. 2 is a schematic diagram of the clock circuit employed in the preferred embodiment of the present invention;

Figure 45A:
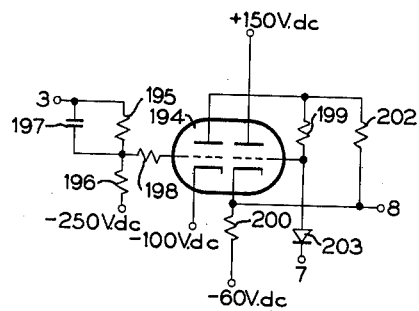
Figure 45B:
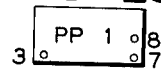
Figure 46A:
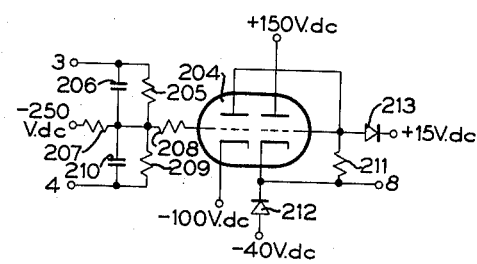
Figure 46B:
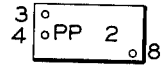
Figure 47A:
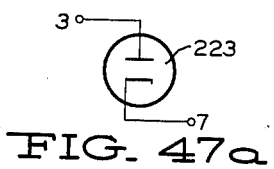
Figure 47B:
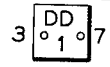
Figure 48A:
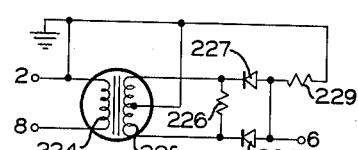
Figure 48B:
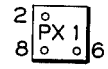
Figure 53A:
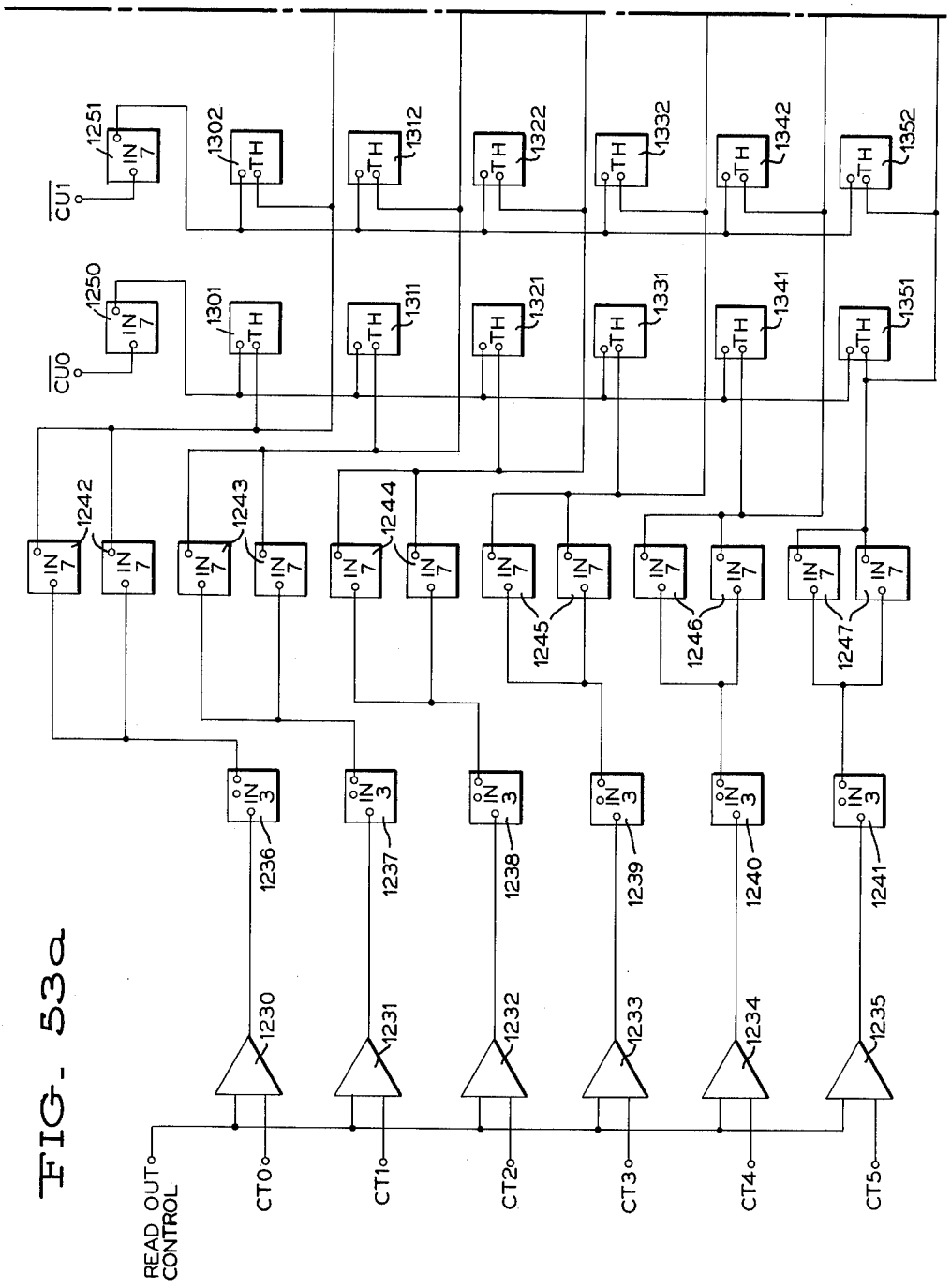

FIGS. 3a, 3b, 3c, 3d, 3e and 3f disclose the entry units and control units counters and the manner in which they are utilized in governing the storage of information in the storage media;

FIGS. 4a, 4b, 4c and 4d disclose a schematic diagram of the entry tens and control tens counters and the manner in which they are utilized in governing the storing of information in the storage media;

FIG. 5 discloses the waveforms produced by the clock circuit shown in FIG. 2;

FIG. 6 discloses the waveforms produced by the control units counter;

FIGS. 7a and 7b together form a schematic diagram of the circuitry utilized to control the beginning and ending of the receipt of character sensing information;

FIGS. 8a through 8k and 8m through 8u disclose a detailed schematic block diagram of the logic portion of the preferred embodiment of the present invention;

FIG. 9 discloses a schematic diagram of the core array utilized in the preferred embodiment of the present invention;

FIG. 10 discloses a single storage position in the core array and show the various windings associated with the core position;

FIG. 11 discloses a typical hysteresis loop for the cores utilized in FIG. 9;

FIGS. 12a and 12b disclose a circuit which is utilized to determine when error correction shall take place;

FIGS. 13a and 13b disclose a circuit for determining when zero insertion shall take place;

FIG. 14 is an assembly diagram for FIGS. 3a through 3f;

FIG. 15 is an assembly diagram for FIGS. 4a through 4d;

FIG. 16 is an assembly diagram for FIGS. 7a and 7b;

FIG. 17 is an assembly diagram for FIGS. 8a through 8k and 8m through 8u;

FIG. 18 is an assembly diagram for FIGS. 12a and 12b;

FIG. 19 is an assembly diagram for FIGS. 13a and 13b;

FIG. 20 is an assembly diagram for FIGS. 53a and 53b;

FIG. 21a discloses a chart of the binary coded decimal coding for the decimal digits 0 through 9;

FIG. 21b discloses a chart showing the order in which characters are stored in the core array;

FIGS. 22a and 22b disclose typical record cards which may be utilized with the present invention;

FIGS. 23a through 31a discloses the schematic details of a number of typical inverter circuits which are respectively shown in block diagram form in FIGS. 23b through 31b;

FIGS. 32a through 36a disclose the schematic details of a number of typical cathode follower circuits which are respectively represented in block diagram form in FIGS. 32b through 36b;

FIG. 37a discloses the schematic details of a typical logical OR circuit whose block diagram form is shown in FIG. 37b;

FIG. 38a discloses the schematic details of a logical AND circuit, which is also known as a switch, whose block diagram form is shown in FIG. 38b;

FIG. 39a shows an OR circuit having a cathode follower of the type CF1 connected to receive the output thereof, said circuit being illustrated in block diagram form in FIG. 39b;

FIG. 40a discloses an AND circuit having a cathode follower of the type CF2 connected to receive the output thereof this circuit being shown in block diagram form in FIG. 40b;

FIG. 41a discloses the schematic details of a single-shot multivibrator whose block diagram form is shown in FIG. 41b;

FIG. 42a discloses the schematic details of a trigger circuit whose block diagram form is shown in FIG. 42b;

FIG. 43a discloses the schematic details of a thyratron circuit for controlling a punch magnet, the block form of this circuit being shown in FIG. 43b;

FIG. 44a discloses the schematic details of an inverter-follower circuit whose block diagram form is shown in FIG. 44b;

FIGS. 45a and 46a disclose the schematic details of two different types of push-pull units whose block diagram forms are respectively illustrated in FIGS. 45b and 46b;

FIG. 47a discloses the schematic showing of a diode whose block diagram representation is shown in FIG. 47b;

FIG. 48a discloses the schematic details of a sense winding detector circuit which is shown in block form in FIG. 48b;

FIGS. 49a and 50a disclose the schematic details of two core drivers which are respectively of the type CX1 and CX2, the block diagram form of these circuits being shown respectively in FIGS. 49b and 50b;

FIG. 51a discloses the schematic details of a comparing unit whose block diagram form is shown in FIG. 51b;

FIG. 52a shows the schematic details of an amplifier whose block diagram form is shown in FIG. 52b FIGS. 53a and 53b disclose the punch thyratron matrix and its associated control circuitry.

GENERAL DESCRIPTION

Reference is made to FIG. 1 which illustrates a functional block diagram of the present invention. While the blocks shown are labeled with legends descriptive of certain structure used in the present invention, it should be understood that these legends are utilized to aid in understanding the functional concept of the invention rather than the specific structural relationship. The specific details of the invention are shown elsewhere in the drawings and will be described later in the description.

The character sensing apparatus in block 10 is adapted to supply information regarding the identity of characters arranged in fields on record media. As previously described, the arrangement is such that if the character sensing apparatus produces two or more signals representing different characters in response to the scanning of a particular character, an UNCERTAINTY signal is provided. Whether one of the two or more signals represents the actual character scanned is of no consequence. An UNCERTAINTY signal is also produced where enough information is received during the scanning of a character to know that an actual character has been scanned but insufficient information is available to identify the character.

For every information field on the record for which character identity signals are desired, the switch control block 11 is adapted to pass these signals to the input buffer area of a storage means 12. The characters entering the input buffer of the storage means are stored in the order received. When it is desired to perform an error correction operation for a particular field in a record, the signals representing what is believed to be the identities of the characters within the field are also supplied through the switch control 13 to an adder 14. This adder may be described as a single digit adder. That is, it may receive in succession signals representing one or more of the digits zero through nine, and produce an output signal, following the receipt of the last digit, representative of the units order digit of the sum of the digits.

At the end of an error correction field, the signal representing the units order digit of a field sum is supplied to the error correction buffer portion of storage means 12. The field sum signals for successive error corrected fields are stored in succession in error correction buffer.

The check digit for each field in the embodiment illustrated is equal to the units order digit of the field sum. When the first check digit in the check digit field is scanned, it enters only the adder. Thereafter, the field sum signal in error correction buffer for the first field which was error corrected is supplied through a complementing circuit 15 to the adder. The total effect of the complementing circuit is to supply the 10's complement of the field sum into the adder. Therefore, if an UNCERTAINTY is not found in the first field which was error corrected, a zero would exist in the adder.

A signal representing the condition of the adder is supplied back to the error correction buffer. Had there been an UNCERTAINTY in the field, the sum in the adder would be equal to the corrected digit. That is, the sum in the adder would be equal to the digit which should have been identified, but was not properly identified. The way in which the corrected digit is determined has ben previously discussed and will be explained in greater detail later in the description.

The corrected digit is generated for the first field which is to be error corrected, before the second check digit is read and supplied to the adder. This time the signal in the error correction buffer representing the field sum of the second field which is to be error corrected is supplied through the complementing circuit 15 to the adder for summing with the second check digit.

Succeeding check digits are read and the corrected digits produced in the same manner as in the first and second error corrected fields just described.

Information stored in the input buffer area of storage is supplied to the output buffer area during transfer time. Once the characters on the record have been scanned, a transfer operation ensues. Prior to the beginning of transfer, the first corrected digit in the error correction buffer is supplied directly to the adder so as to be available for immediate use if needed. Normally, the characters in input buffer are read in succession in the order stored and placed in output buffer in the same order under the control of switch control 16. There is furnished an UNCERTAINTY detection circuit 17 which receives the information being read from input buffer and produces an output signal in the event an UNCERTAINTY is stored in input buffer. This output signal governs switch control 16 in a manner to prevent the UNCERTAINTY signal from input buffer from being stored in output buffer. Instead, the corrected digit presently stored in the adder is inserted into output buffer through switch control 16.

Once the first error corrected field has been transferred to output buffer, the corrected digit for the second error corrected field is supplied to the adder to await the transfer of the second error corrected field information from input buffer to output buffer. When this time arrives, an action similar to that described with regard to the first error corrected field ensues.

The information in the output buffer of storage may be supplied to an output utilization device 18. The present invention is arranged such that once the information in input buffer has been transferred to output buffer, new information may be read into input buffer from the character sensing apparatus on a time sharing basis with the readout of information from an output buffer to the utilization device 18.

In the description and drawings, a number of conventional techniques are used to simplify the explanation and illustration of the present invention. Since there are certain figures of the drawing which are represented on a plurality of separate sheets, various output and input terminals are labeled with legends which are descriptive of the signal produced at the terminals and, where a plurality of terminals are provided with the same descriptive legend, it should be understood that all of the terminals are adapted to be connected together in a suitable fashion. In this manner, a large number of lines extending across several sheets is avoided. This serves to simplify the drawings and makes them more readily understandable. The circuits which are shown in block form in the drawings have previously been explained. There are instances where two circuits may be connected together to serve various logical operations. For example, two cathode followers may receive separate inputs but have their outputs commoned in a manner to form a logical OR circuit. Under these circumstances, one of the cathode followers will not have the cathode of the vacuum tube therein connected to the cathode D.C. return voltage. Instead, the cathode of this one tube will share the cathode resistor and power supply of the other tube. To indicate an instance where such a condition exists, an infinity sign ($\infty$) will be placed under the block of the cathode follower whose cathode is not connected to the cathode power supply within the block. Where the infinity sign is placed under an inverter block, it is an indication that the plate of the vacuum tube within the block is not connected to the power supply within the block. Instead, the plate shares the plate resistor and power supply of another inverter block to which the said one inverter block is connected.

In describing various logical circuits, it is a conventional technique to use various simple mathematical symbols to express certain logical conditions. For example, a plus sign ($+$) is used to represent a logical OR condition. Thus, if an OR circuit receives signals A, B and C, the output from the OR circuit may be expressed as $A+B+C$ i.e. if the output is relatively positive then an input A or B or C has been supplied to the OR circuit. To express a logical AND condition, the standard multiplying sign in the form of a dot ($\cdot$) is used. Thus, if a switch is connected to receive signals A, B and C, the output from the switch may be expressed as $A \cdot B \cdot C$, i.e., the signals A and B and C are relatively positive in coincidence and result in producing a relatively positive output signal. A logical NOT condition for a signal is indicated by placing a bar over a symbol representing the signal. Thus, if a signal A is supplied to an inverter, the output from the inverter would be $\overline{A}$. That is, the output of the inverter will be relatively positive and represent NOT A, i.e., $\overline{A}$, when the input signal A is relatively negative. Thus, the expression $\overline{A+B+C}$ may be indicative of the fact that a relatively positive output is obtained when neither A nor B nor C is relatively positive.

REPRESENTATIVE CIRCUITS

Before providing a detailed description of the present invention, an explanation of a number of typical circuits used in the invention is in order.

FIG. 23a shows a schematic diagram of an inverter of the type IN1. FIG. 23b discloses the manner in which the inverter will be illustrated in the drawings. This inverter comprises a vacuum tube triode 50 having its plate connected through resistors 51 and 52 to a positive source of potential, herein illustrated as +150 volts D.C. The cathode of triode 50 is connected to ground. The input to the inverter may be either by way of terminal 3 or terminal 4. The A.C. coupling path is from pin 3 through a capacitor 55 and a resistor 56 to the control grid, there being a grid return resistor 57 to ground. Actually, capacitor 55 and resistor 57 serve as a differentiating circuit for the input pulses at pin 3. The D.C. input path is from pin 4 through resistors 54 and 56.

The operation of this inverter is such that the polarity of an input signal supplied to either of pins 3 or 4 will be inverted and supplied from the plate of the triode to pin 5.

FIG. 24a discloses the schematic details of an inverter of the type IN2. FIG. 24b discloses the manner in which this inverter is shown in the drawings. This inverter comprises a vacuum tube triode 58 having its cathode connected to a negative source of potential, herein illustrated as —100 volts D.C., and its plate connected through resistors 59 and 60 to a positive source of potential, herein illustrated as being +15 volts D.C. The input to the grid of the triode is by way of a voltage divider comprising resistors 61 and 62, the upper end of the voltage divider being connected to pin 4 and the lower end thereof being connected to a negative source of potential, herein illustrated as being —250 volts D.C. A high frequency bypass capacitor 63 is provided in parallel with resistor 61. The midpoint between resistor 61 and 62 is connected by way of a resistor 64 to the grid of triode 58. The operation of the inverter is such that an input signal appearing at pin 4 will be inverted and amplified and appear at pin 3 which is connected to the plate of the triode.

FIG. 25a discloses the schematic details of an inverter of the type IN3, the block form of this inverter as it is used in the drawing being disclosed in FIG. 25b. There is provided a vacuum tube triode 65 whose cathode is connected to ground and whose plate is connected by way of resistors 66 and 67 to a positive source of potential, herein indicated as being +150 volts D.C. The input to the inverter is supplied to pin 3 which is connected to the grid of the triode by way of a resistor 68. The full plate output is taken at pin 5 while a tapped plate output is taken from pin 9. The inverted form of the input signal applied to pin 3 appears at pins 5 and 9, the voltage at pin 9 being somewhat higher than the voltage at pin 5 during intervals of triode conduction.

FIG. 26a discloses the details of a double inverter of the type IN4, the block form of this inverter being illustrated in FIG. 26b. This inverter comprises a vacuum tube duo-triode 69 whose cathodes are commoned and connected to ground. The plate of the right side of the tube is connected by way of resistors 72 and 73 to a positive source of potential, herein indicated as being +150 volts D.C. The plate of the left side of the tube is connected by way of resistors 70 and 71 to the last-mentioned potential. The input to the grid of the left side of tube 69 is by way of pin 3 and resistor 74. A way of supplying an input to the right side of tube 69 is by way of pin 5 which is connected to the plate of the left side. The plate of the left side is connected to the upper end of a voltage divider which is comprised of resistors 75 and 76, the lower end of resistor 76 being connected to a negative source of potential, herein illustrated as —60 volts D.C. A high frequency bypass capacitor 77 is provided in shunt with the resistor 75. The midpoint of the divider is connected by way of resistor 78 to the grid of the right side of tube 69. An alternative input to the right side of tube 69 is by way of pin 6 which is connected to resistor 78 by coupling capacitor 79. The full plate output from the right side of tube 69 is supplied to pin 8 while the tapped plate output is supplied to pin 7.

The double inverter described above is normally used in combination with an OR circuit and a cathode follower to form a latch. A positive-going voltage supplied to an input of the OR circuit results in a positive-going voltage being supplied to the grid of the left side of tube 69. This causes the left side to conduct and results in a negative-going voltage at its plate. This negative-going voltage, when supplied to the grid of the right side of the tube, causes the right side to go out of conduction, thereby producing a positive-going voltage at the plate of the right side. This plate output is normally supplied through a cathode follower and the previously mentioned OR circuit to pin 3, thereby holding the duo-triode in the state it was placed in by the original positive-going input voltage. The latch may be reset by supplying a positive-going voltage to pin 6. This causes a negative-going voltage from pin 8 which, when supplied through the associated cathode follower and an OR circuit to pin 3, causes the left side of tube 69 to go out of conduction. As this occurs, a positive-going voltage is supplied from the plate of the left side to the grid to the right side. The circuit will remain in this condition until new inputs are received.

For initially setting up the inverter, instead of supplying a positive-going voltage to pin 3, a negative-going voltage may be supplied to pin 5 and the same action will ensue in the circuit.

An inverter of the type IN5 is disclosed in FIG. 27a, the block form of this inverter which is used in the drawings being illustrated in FIG. 27b. This inverter comprises a vacuum tube triode 80 having its cathode connected to ground and its plate connected through resistors 81 and 82 to a positive source of potential, herein illustrated as +15 volts D.C. The input to the grid of triode 80 is from pin 3 to the upper end of a voltage divider comprising resistors 83 and 84, the lower end of resistor 83 being connected to a negative source of potential, herein illustrated as —250 volts D.C. A bypass capacitor 85 is provided in parallel with resistor 84 so that the high frequency portion of the input signal is more rapidly applied to the grid. The midpoint of resistors 83 and 84 is connected to one end of a resistor 86, the other end of which is connected to the grid of triode 80. The full plate output from this inverter is taken from the plate and supplied to pin 5 and a tapped plate output is available on pin 9.

An inverter of the type IN6 is illustrated in schematic form in FIG. 28a and in block form in FIG. 28b. This inverter comprises a vacuum tube triode 87 whose cathode is connected to ground and whose plate is connected by way of a resistor 88 to a positive source of potential, herein illustrated as +150 volts D.C. The output from the tube is taken from the plate and supplied to pin 5. One input path to the grid of triode 87 is from pin 3 through diode 92 and resistor 90, there being a grid return resistor 91 connected to one end of resistor 90 and to ground. The other input terminal is pin 7 which connects to resistor 90 by way of resistor 89. Diode 92 is a blocking diode, used to prevent back circuit action when pin 3 drops below the voltage existing at the point between resistors 90 and 91.

An inverter of the type IN7 is illustrated in schematic form in FIG. 29a and in block form in FIG. 29b. The circuit comprises a vacuum tube triode 112 having its plate connected through a resistor 113 to a supply potential, herein illustrated as +40 volts D.C., and its cathode connected to a negative source of potential, herein illustrated as —100 volts D.C. The input is adapted to be applied to pin 3 which connects through an RC network 114 and a resistor 115 to the control grid. The grid return resistor 116 is connected to one end of resistor 115 and to a negative source of potential, herein illustrated as —250 volts D.C. The output appears at pin 5.

An inverter of the type IN8 is illustrated in schematic form in FIG. 30a and in block form in FIG. 30b. This inverter comprises a vacuum tube triode 93 whose cathode is connected to ground and whose plate is connected to pin 7. The triode is normally in a cutoff condition and pin 7 is usually connected to the plate of another tube and shares in the plate load in the other tube. For example, this inverter may be used for plate pulldown purposes with triggers or latches. Pin 3 is connected to receive the input signals and couple them by way of a capacitor 94 and a resistor 95 to the grid of triode 93. The grid return resistor 96 connects one end of resistor 95 to a negative source of potential, herein illustrated as —60 volts D.C. A diode 97 is arranged in parallel with resistor 96, the plate of said diode being connected to the last-mentioned potential and the cathode of said diode being connected to a point between resistors 95 and 96. The arrangement is such that a positive pulse of relatively short duration to terminal 3 results in a positive spike at the leading edge of the input pulse and a negative spike at the trailing edge of the input pulse. The negative spike at the trailing edge of the input pulse is eliminated by diode 97 and therefore does not appear on the grid.

FIG. 31a discloses the schematic details of an inverter of the type IN9, the block form of this inverter being illustrated in FIG. 31b. This inverter comprises a vacuum tube triode 98 whose cathode is connected to ground and whose plate is connected to pin 7. An input signal is adapted to be connected to pin 3 and coupled by way of resistor 99 to the control grid. This type of inverter is adapted to be used where the plate of triode 98 is connected to the plate of a triode in another unit and serve as a plate pulldown or reset circuit.

A cathode follower of the type CF1 is illustrated in schematic form in FIG. 32a and in block form in FIG. 32b. Referring to FIG. 32a, the cathode follower comprises a vacuum tube triode 100 whose plate is connected to a positive source of potential, herein illustrated as +150 volts D.C., and whose cathode is connected by way of a resistor 101 to a negative source of potential, herein illustrated as −60 volts D.C. The input terminal is pin 3 which is connected to the grid of triode 100 by way of resistor 102. The output terminal is pin 5 which is connected to the cathode. It is well known that the operation of this type of circuit is such that the voltage at the cathode follows rather closely the voltage at the input terminal. The primary use of cathode followers is for impedance matching purposes.

A cathode follower possessing somewhat greater drive than that illustrated in FIG. 32a is illustrated in FIG. 33a and is of the type CF2. The block form of this circuit is illustrated in FIG. 33b. Referring to FIG. 33a, there is provided a vacuum tube triode 103 whose plate is connected to a positive source of potential, herein illustrated as +150 volts D.C., and whose cathode is connected by way of resistor 104 to a negative source of potential, herein illustrated as −60 volts D.C. The input is adapted to be supplied to a pin 3 which is connected to the grid of triode 103 by way of resistor 105. The output is taken from the cathode and supplied to pin 5. The primary difference between the cathode followers CF1 and CF2 lies in the fact that different tube types and resistor values are used.

A cathode follower of the type CF3 is shown in schematic form in FIG. 34a and in block form in FIG. 34b. Referring to FIG. 34a, there is provided a vacuum tube triode 106 whose plate is connected to a positive source of potential, herein illustrated as +150 volts D.C., and whose cathode is connected by way of a resistor 107 to a negative source of potential, herein illustrated as −60 volts D.C. The input signal is adapted to be supplied to pin 6 which is coupled by capacitor 108 and resistor 109 to the control grid. The grid return resistor 110 is connected to one end of resistor 109 and to a negative source of potential, herein illustrated as −60 volts D.C. A clamping diode 111 is provided in parallel with resistor 110, the plate of said diode being connected to said negative source of potential and the cathode of said diode being connected to a point between capacitor 108 and resistor 109. Diode 111 is used to prevent the voltage at the cathode thereof from going below −60 volts D.C. The output from this circuit is taken from the cathode and supplied to pin 8.

Reference is made to FIG. 35a which discloses the schematic form of a cathode follower of the type CF5, the block form of this cathode follower being illustrated in FIG. 35b. This cathode follower comprises a vacuum tube triode 117 whose plate is connected to a positive source of potential, herein illustrated as +150 volts D.C. The cathode of said triode is connected by way of a resistor 118 to a negative source of potential, herein illustrated as −60 volts D.C. A divider input is provided to the control grid of triode 117, the input signal being connected to pin 3 which is coupled to the upper end of the voltage divider comprising resistors 119 and 120, the lower end of said divider being connected to −250 volts D.C. A high frequency bypass capacitor 121 is provided in shunt with resistor 119. The midpoint between resistors 119 and 120 is connected by way of resistor 122 to the control grid of the triode. The output is adapted to be taken from the cathode and supplied to pin 5.

Reference is made to FIG. 36a which discloses the schematic details of a circuit of the type CF6, the block form of this circuit being shown in FIG. 36b. Referring to FIG. 36a, there is provided a duo-triode 123 having the plates of both sides commoned and connected to a positive source of potential, herein illustrated as +150 volts D.C. The cathodes of duo-triode 123 are also commoned and connected by way of resistor 125 to a negative source of D.C. potential. The input signal to the grid of the left side of tube 123 is supplied from pin 3 by way of capacitor 126. The input signal to the grid of the right side of tube 123 is supplied from pin 6 through resistor 132. It will be noted that the grid of the left side of tube 123 is returned to a positive source of potential, herein illustrated as +15 volts D.C. by way of resistor 127, there being a pair of diodes 128 and 129 which are serially arranged in parallel with resistor 127. Diodes 128 and 129 are used to limit the voltage input to the grid so that it will not exceed +15 volts. The commoned cathodes of tube 123 are connected to the cathode of a diode 131, the plate of said diode being connected to an output terminal 8 and through a resistor 130 to +150 volts D.C. A terminal 5 is connected to the cathode of a diode 133, the plate of the last-named diode being connected to the plate of diode 131. This circuit is normally used to receive the output of the sense windings of a core matrix and a negative pulse. The output from the sense winding is normally coupled to pin 3 and the negative pulse is supplied to pin 6. When relatively negative voltages in coincidence are supplied to pins 3 and 6, both sides of the tube 123 are cut off and a voltage drop will exist across resistor 130 due to current flow therethrough and through diode 131 and resistor 125. This means that a negative-going output signal will be produced at pin 8. The negative-going voltage at pin 8 is normally amplified by external circuitry and fed to pin 5. Thus, the tube 123 will remain cut off even though the negative inputs to terminals 3 and 6 no longer exist. To reset the circuit, the voltage at terminal 5 may be raised, by means external to the circuit and the cathodes of tube 123 are allowed to rise, said tube being biased on the +15 volt D.C. connected to the left control grid through resistor 127. Both sides of the tube will conduct due to the commoned plates and cathodes.

Reference is made to FIG. 37a which shows the schematic details of a conventional diode OR circuit, the block-form of which is shown in FIG. 37b. As shown in FIG. 37a, the circuit comprises a plurality of diodes, herein illustrated as diodes 134, 135 and 136, whose plates are connected to receive input signals and whose cathodes are commoned and connected by way of a resistor 137 to a negative source of potential, herein illustrated is −60 volts D.C. The output is adapted to be taken from the commoned cathodes. In a circuit of this type, the voltage appearing at the output terminal is equal to the most positive voltage supplied to the plate of any one of the diodes 134 through 136. Thus, in circuit logic, a positive pulse input to any or all of the plates of the diodes produces a positive pulse output.

Reference is made to FIG. 38a which discloses a conventional diode switch which is sometimes referred to as an AND circuit or coincidence circuit. The block form of this circuit is shown in FIG. 38b. This circuit is comprised of a plurality of diodes 138, 139 and 140 whose cathodes are adapted to receive input signals and whose plates are commoned and connected by way of a resistor 141 to a positive source of potential, herein illustrated as +150 volts D.C. The voltage at the commoned plates of these diodes follows the potential at the most negative cathode. Therefore, if and only if all three of the cathodes receive relatively positive inputs in coincidence, the plates, and thereby the output from the circuit, also becomes relatively positive.

Reference is made to FIG. 39a which discloses the combination of an OR circuit 142 and a cathode follower of the type CF1 which is illustrated by reference numeral 143. The block form of this circuit is illustrated in FIG. 39b, it being noted that the circuit is shown as a conventional OR circuit except that the letter K is included therein to indicate that there is a cathode follower which receives the output of an OR circuit and supplies an output therefrom.

Reference is made to FIG. 40a which shows the combination of an AND circuit 144 and a cathode follower 145 of the type CF2. The block form of the circuit shown in FIG. 40a is illustrated in FIG. 40b, it being noted that the ordinary diagrammatic showing for an AND circuit is used and that a K is inserted therein.

FIG. 41a discloses the schematic details of a single-shot multivibrator which is shown in block form in FIG. 41b. The single-shot multivibrator comprises a duo-triode vacuum tube 146 having a left side and a right side. The plate of the right side of the duo-triode is connected through a resistor 148 to a positive source of potential, herein illustrated as +15 volts D.C., the cathode of said right side being connected to a negative source of potential which is illustrated as −100 volts D.C. The plate of the left side of the tube 146 is connected through a resistor 147 to a positive source of potential, herein illustrated as +150 volts D.C., and the cathode is connected to ground. Positive-going input signals are supplied to pin 3 which is connected to the plate of a diode 149, the cathode of said diode being connected by way of a resistor 152 to the control grid of the left side of tube 146. The cathode of a diode 150 is also connected to the cathode of diode 149 and the plate of diode 150 is connected to the plate of the right side of tube 146. One end of a resistor 151 is connected to the cathodes of diodes 149 and 150 and the other end of the resistor is connected to the previously mentioned negative source of potential. Diodes 149 and 150 in combination with resistor 151 and the negative source of potential form an OR circuit for positive pulses. The right side of tube 146 is normally in conduction and the left side is normally cut off. Therefore, a positive-going input to pin 3 results in the left side of tube 146 being turned on so that a negative-going voltage is supplied from the plate of the left side. This negative-going voltage is coupled by way of a capacitor 153 and resistor 156 to the grid of the right side of tube 146 thereby turning the right side off. The grid return for the right side of tube 146 is by way of resistors 154 and 155 which are connected in parallel between the input end of resistor 156 and ground. When the plate of the right side rises relatively positively, a positive-going voltage will be supplied through diode 150 and resistor 152 to the left side of tube 146. The tube will stay in this condition for a time duration depending upon the RC time constant which is determined principally by capacitor 153 and resistors 154 and 155. Thus, by substituting various values for capacitor 153 and for resistor 154, it is possible to produce relatively positive output pulses which last for any predetermined period of time, within limits, in response to a positive-going input signal.

FIG. 42a discloses the schematic details of a trigger circuit which is shown in block form in FIG. 42b. This trigger comprises a duo-triode vacuum tube 157 having a left side and a right side. The plate of the right side of the duo-triode is connected through resistors 160 and 161 to a positive source of potential, herein illustrated as +150 volts D.C., while the plate of the left side is connected through resistors 158 and 159 to said source of positive potential. The cathodes of both sides of the tube are commoned and connected to ground. The arrangement in the trigger is such that the right side thereof is conducting when the trigger is considered to be OFF while the left side is conducting when the trigger is considered to be ON. Thus, when the trigger is OFF, a relatively negative voltage will be supplied from pin 8 and a relatively positive voltage from pin 7. When the trigger is ON, the voltages at pins 7 and 8 are reversed. With the trigger OFF, the relatively negative voltage from the plate of the right side is supplied through a resistor 162, and a capacitor 164 in shunt therewith, to one end of a resistor 165, the other end of said resistor being connected to the control grid of the left side of the tube. A resistor 163 has one end connected to the said one end of resistor 165 and the other end connected to a negative source of potential, herein illustrated as −100 volts D.C. Also, with the trigger OFF, a relatively positive voltage is supplied from the plate of the left side through resistors 166 and 169 to the control grid of the right side of the tube, there being a high frequency bypass capacitor 168 in parallel with resistor 166. A resistor 167 is connected from the junction between resistors 166 and 169 to a negative source of potential, herein illustrated as −100 volts D.C. The input terminal to turn the trigger ON is pin 3 which is coupled by a capacitor 171 to the junction between resistors 166 and 169. The input terminal to turn the trigger OFF is pin 6 which is coupled by a capacitor 170 to the junction between resistors 162 and 165. The arrangement is such that with the trigger OFF a negative-going voltage to pin 3 drops the voltage on the grid of the right side of the vacuum tube and causes the plate of the right side to supply a positive-going voltage to the grid of the left side. This of course causes the left side to go into conduction and the plate thereof begins to drop in potential. With the plate connected to the grid of the right side, the right side is driven further toward cutoff. A full plate output is taken from pins 7 and 8 while a tapped plate output is taken from pin 9 which is connected to the junction between resistors 160 and 161.

FIG. 43a discloses the schematic details of a thyratron circuit which is shown in block form in FIG. 43b. This circuit comprises a thyratron gas tube 173 having first and second grids which receive inputs through resistors 174 and 178, respectively, said resistors being respectively connected to terminals 9 and 7. The plate of thyratron 173 is connected to a positive source of potential, herein illustrated as +70 volts D.C. The cathode of the tube is connected through the punch magnet in the punch mechanism to ground. As is conventional in thyratron units of this type, the punch with which the thyratron is used has an arrangement whereby the +70 volts D.C. connected to the plate is interrupted at an appropriate time so that the thyratron may be returned to a nonconducting condition. Thereafter, if pins 7 and 9 coincidentally receive relatively positive input signals, the thyratron will go back into conduction and current will flow through the punch magnet. Following this, at a suitable time the +70 volts D.C. is removed from the plate and the thyratron will again return to its normal condition.

FIG. 44a discloses the schematic details of a combined inverter and cathode follower, the block form of this circuit being shown in FIG. 44b. The circuit comprises a duo-triode vacuum tube 186, the left side of this tube being used as an inverter and the right side being used as a cathode follower. The input to the left side is by way of pin 3 through a resistor 188 to the control grid of the left side. The cathode of the left side is grounded and the plate is connected through a resistor 187 to a positive source of potential, herein illustrated as +150 volts D.C. The plate of the left side is connected by way of resistors 189 and 192 to the control grid of the right side, there being a bypass capacitor 191 in parallel with resistor 189.

A resistor 190 is connected between the junction of resistors 189 and 192 and a negative source of potential, herein illustrated as −250 volts D.C. The cathode of the right side is connected through a resistor 193 to a negative source of potential, herein illustrated as −60 volts D.C. The arrangement is such that the input at pin 3 is inverted and supplied to the right side of the tube which acts as a cathode follower and produces an output at pin 8.

FIG. 45a discloses the schematic details of a push-pull driver of the type PP1 which is shown in block form in FIG. 45b. The input to this unit is supplied to pin 3 which is connected to the upper end of a voltage divider comprised of resistors 195 and 196, the lower end of resistor 196 being connected to a negative source of potential, herein illustrated as −250 volts D.C. A high-frequency bypass capacitor 197 is connected in shunt with resistor 195. A resistor 198 connects the junction between resistors 195 and 196 to the control grid of the left side of the duo-triode 194. The cathode of the left side is connected to a negative source of D.C. potential, herein illustrated as −100 volts D.C., while the plate is connected through a resistor 202 to an output pin 8. When a relatively negative input signal is supplied to pin 3, the left side of the duo-triode is cut off so that no longer is current drawn through resistor 202 from the output device connected to pin 8. This allows the control grid of the right side, by way of resistor 199 which is connected to the plate of the left side, to go positive and cause the right side to go into conduction, the plate of the right side being connected to +150 volts D.C. and the cathode being connected through resistor 200 to −60 volts D.C. This cathode is connected to the output pin 8. The push-pull unit shown in FIG. 45a is normally used in conjunction with one of the inverters of the type IN1 to form a stage of a counter. The relatively positive voltage appearing at pin 8, as described heretofore, is supplied to the control grid of the inverter which produces a relatively negative output back to pin 3. This would be the ON condition of the stage. In order to reset the unit, a negative voltage is supplied to pin 7 which is connected to the cathode of a diode 203, the plate of the diode being connected to the control grid of the right side. This causes the control grid to drop and the right side of the tube to go out of conduction. Pin 8 begins to drop negatively and the inverter associated therewith goes toward cutoff. This means that the output from the inverter will go positive which, when supplied to pin 3, will cause the left side of tube 194 to go into conduction. As this occurs, current will be drawn through resistor 202 from the output device connected to pin 8 and the right side will be maintained out of conduction because of the drop in voltage at the upper end of resistor 199.

FIG. 46a discloses the schematic details of a push-pull driver of the type PP2, the block form of this circuit being shown in FIG. 46b. This circuit is similar to that shown in FIG. 45a except that provision is made for a high level input to pin 3 and a low level input to pin 4. The high level input to pin 3 is applied to one end of a voltage divider comprising resistors 205 and 207 while the low level input is supplied to the upper end of a voltage divider comprising resistors 209 and 207. The lower end of the voltage divider, i.e. one end of resistor 207, is connected to a negative source of potential, herein illustrated as −250 volts D.C. Bypass capacitors 206 and 210 are connected in parallel with resistors 205 and 209, respectively. The midpoint of each of the dividers is connected to one end of a resistor 208 whose other end is connected to the control grid of the left side of the duo-triode 204. In this circuit, the plate of the left side is connected directly to the grid of the right side and to the plate of a diode 213 whose cathode is connected to +15 volts D.C. Under these circumstances, the plate of the left side, as well as the grid of the right side, cannot go above +15 volts D.C. The cathode of the right side of tube 204 is connected to the cathode of a diode 212 whose plate is connected to −40 volts D.C. Thus, the cathode cannot go below the last-mentioned negative voltage. The cathode is connected to pin 8 and through a resistor 211 to the grid of the right side. The circuit shown in FIG. 46a acts as an inverter with the provision for high level and low level inputs. Output is taken from pin 8.

FIG. 47a shows the schematic details of a diode unit of the type DD1 which is shown in block form in FIG. 47b. This unit comprises a vacuum tube diode 223 whose plate is connected to pin 3 and whose cathode is connected to pin 7.

FIG. 48a shows the schematic details of a circuit of the type PX1, the block form of this circuit being shown in FIG. 48b. As shown, there is provided a transformer having a primary 224 and a secondary 225. One end of the primary is connected to pin 2 which is also connected to ground. The other end of the primary is connected to pin 8 which receives input pulses. The secondary is center-tapped to ground and has one side connected to the cathode of a diode 227 and the other side connected to the cathode of a diode 228, there being a resistor 226 connected across the entire secondary for impedance matching purposes. The plates of diodes 227 and 228 are commoned and connected through a resistor 229 to ground. The plates are also connected to the output pin 6. The operation of the circuit is such that pulses of either polarity at pin 8 will result in negative pulses at pin 6. That is, if a positive pulse is supplied to pin 8, one side of the secondary will be relatively positive and the other side will be relatively negative with respect to the center-tapped ground. Current will flow from ground through whichever diode is connected to the side of the secondary which happens to be negative at this time, thereby bringing pin 6 negative. On the other hand, if a negative pulse is supplied to pin 8, the opposite side of the secondary which was previously negative will now be negative and the opposite diode will conduct so that pin 6 will again be brought to a negative potential.

FIG. 49a discloses the schematic details of a core driver of the type CX1 which is shown in block form in FIG. 49b. This circuit comprises a duo-triode 231 having its cathodes commoned and connected by way of a variable resistor 232 to a negative source of potential, herein illustrated as −60 volts D.C. The cathodes are also connected to the plate of a diode 235 whose cathode is connected to ground. Therefore, the cathodes can never go above ground potential. The plates of the tube are commoned and connected to one end of a primary winding 233 of a switch core, or transformer, the other end of said winding being connected to +250 volts D.C. This switch core is constructed of a material having a substantially square hysteresis loop. A reset winding 241 is also provided, which is connected to a positive source of potential, herein illustrated as +150 volts D.C., and through a resistor 240 to ground. Another winding on the switch core is the output winding 234 having one end thereof connected to the plate of a diode 236 whose cathode is connected to output pin 8. The other end of winding 234 is connected through a resistor 239 to ground. A resistor 237 and a capacitor 238 are connected in series with each other and in parallel with winding 234 and serve as a peaking network. Relatively positive pulses are adapted to be supplied from pin 5 through resistors 242 and 243 which are respectively connected to the left and right control grids of tube 231. The operation of this circuit is such that the winding 241 normally has a D.C. current flowing therethrough and will keep the core reset to one of its stable states except during the time when a positive pulse is supplied to pin 5. When such a pulse is supplied to pin 5, the entire tube goes into conduction and causes a current flow through winding 233. This changes the state of the core and induces a voltage in winding 234, the output path being from ground through resistor 239, winding 234, diode 236 and pin 8 to the output device, the output device in this instance being one of the windings in a core matrix, to be later described. The windings are so related that a positive pulse input to pin 5 results in a negative pulse output at pin 8. As soon as the positive pulse input to pin 5 terminates, the D.C. current flowing through winding 241 resets the switch core to its original condition. This induces a voltage in winding 234, which however has no effect on the load since it is blocked by diode 236.

FIG. 50a shows the schematic details of a core driver of the type CX2 which is shown in block form in FIG. 50b. This circuit differs somewhat from the circuit shown in FIG. 49a. In this circuit there is provided a duo-triode vacuum tube 244 having a left side and a right side which are adapted to be separately controlled. A relatively positive pulse is supplied to pin 3, which is connected by a resistor 245 to the control grid of the left side of tube 244, and a relatively positive pulse is supplied to pin 5, which is connected by way of resistor 251 to the control grid of the right side of tube 244. The plate of the left side is connected by way of a primary winding 246 on a switch core to a positive source of potential, herein illustrated as +250 volts D.C. The plate of the right side is connected to the last-mentioned D.C. potential by way of another primary winding 252. It will be noted that the polarity of windings 246 and 252 are opposite as indicated by conventional dot symbols. The secondary winding on the switch core is illustrated by reference numeral 247 and is shown to be wound in the same manner as winding 252. One end of winding 247 is connected to an output terminal 8 while the other end is connected through a resistor 250 to ground. A peaking network comprised of capacitor 248 and resistor 249 is connected across winding 247. The arrangement is such that a positive input pulse to pin 3 causes the left side of the tube to go into conduction and a current flow in winding 246. This induces a voltage in winding 247 so as to produce a negative pulse at pin 8. A positive pulse at pin 5 causes the right side of the tube to go into conduction, thereby resetting the switch core, and inducing a voltage in winding 247 so as to provide a positive pulse at pin 8. Thus, it is seen that a positive pulse to pin 3 produces a negative pulse at pin 8 while a positive pulse to pin 5 produces a positive pulse to pin 8. The core driver such as that shown in FIG. 50a is adapted to be used with each of the units and tens order windings to be later described.

FIG. 51a shows the schematic details of a comparing unit which is shown in block form in FIG. 51b. This circuit has as its objective the production of a relatively positive output signal at a time when the input pulses to pins 3 and 4 are of the same polarity. The circuit comprises a vacuum tube triode 214 whose plate is connected through a resistor 215 to +150 volts D.C. The cathode of the tube is connected to one side of a diode bridge, the other side of said diode bridge being connected to the upper end of a voltage divider comprises resistors 220 and 221, the lower end of resistor 221 being connected to −100 volts D.C. A bypass capacitor 222 is connected in shunt with resistor 220. The junction between resistors 220 and 221 is connected to the grid of tube 214. Referring again to the diode bridge, it is seen that this bridge comprises a pair of diodes 216 and 217 whose plates are commoned and connected to the cathode of the tube. The bridge also includes diodes 218 and 219 whose cathodes are commoned and connected to the aforementioned upper end of the voltage divider. The plate of diode 218 and the cathode of diode 216 are connected to pin 4 while the plate of diode 219 and the cathode of diode 217 are connected to pin 3. The operation of this circuit may be explained as follows. Let it be assumed, for example, that pins 3 and 4 are placed at a potential of +10 volts D.C. This means that the upper end of the voltage divider will also be at approximately +10 volts which means that the grid of tube 214 will be at a voltage of, say, −10 volts because of the divider action. The cathode of tube 214 will be at the voltage of pins 3 and 4, which in this case is +10 volts, and therefore tube 214 cannot conduct and the output will be a relatively positive voltage equal to the plate reference voltage. If now the voltage at pin 3 is dropped to −30 volts the grid voltage of grid 214 will remain the same, but the cathode voltage will drop to approximately −30 volts. This means that the tube will conduct to provide a relatively negative voltage at pin 6, thereby indicating that the inputs to pins 3 and 4 are not the same. If now, in addition to pin 3 being at −30 volts, pin 4 is also at −30 volts, the voltage at the cathodes of diodes 218 and 219 will also be at −30 volts and the grid voltage of tube 214 will be proportionately less. The cathode of the tube will be at −30 volts which is of course above the grid voltage. This means that the tube will be cut off and that a relatively positive voltage will be supplied at pin 6, thereby indicating that the voltages at pins 3 and 4 are substantially the same.

FIG. 52a discloses the schematic details of an amplifier which is adapted to be used in conjunction with the sense windings of the core matrix to be subsequently described. The block form of this circuit is shown in FIG. 52b. Basically, the circuit is adapted to receive a negative pulse at pin 7 and supply an amplified output pulse of the same polarity at pin 3. The circuit comprises a duo-triode vacuum tube 265 having a left side whose plate is connected through resistors 266 and 267 to +250 volts D.C. and a right side whose plate is connected through resistors 268 and 269 to the aforementioned voltage. The cathode of the left side is connected through a resistor 270 to ground, there being a capacitor 271 in shunt therewith, and the cathode of the right side is connected directly to ground. The plate of the left side is coupled by a capacitor 272 to the grid of the right side, said grid being connected through a resistor 273 to a negative source of potential, herein illustrated as −11 volts D.C. A diode 274 is arranged with its plate connected to the last-mentioned D.C. reference potential and its cathode connected to the grid of the right side. The diode serves the purpose of preventing the grid from going below −11 volts D.C. In response to a negative pulse input, the left side of the tube is turned off so as to supply a positive-going voltage to the grid of the right side of the tube. This causes the right side to go into conduction and supply a negative voltage from pin 3.

STORAGE

(a) General

The storage media utilized in the present invention is a three-dimensional core array which is illustrated in FIG. 9. Each core in the array is of the magnetic type having two stable remanent flux states and has windings associated therewith as shown in FIG. 10. Referring to FIG. 10, there is shown a core 300 having a units winding labeled U, a tens winding labeled T, an inhibit winding labeled Ih and a sense winding labeled SW associated therewith. Each of the windings pass through the core. A typical hysteresis loop for the core shown in FIG. 10 is illustrated in FIG. 11. When the core is in a first, or negative remanent flux state, the core is said to be in the binary "0" state and when the core is in a second, or positive remanent flux state, the core is said to be in the binary "1" state.

The core shown in FIG. 10 utilizes the well-known half-current concept for switching. That is, assuming the core to be in a binary 0 state, if a positive half-current pulse is applied to only winding U or winding T, the magnetization will move in a positive direction, i.e. counterclockwise to a point on the hysteresis loop short of the negative knee (in the fourth quadrant). The core will return to the negative remanent state when the positive half-current pulse ends. If positive half-current pulses are applied in coincidence to windings U and T, the core will be driven from the binary 0 state to a positive saturation point and will then relax to the binary 1 state where it will remain even after the coincident half-current pulses end. However, if a negative half-current pulse is applied to the inhibit winding I$h$ in coincidence with the two positive half-current pulses applied to windings U and T, the magnetization of the core will move in a positive direction only to a point on the hysteresis loop short of the negative knee and will return to the negative remanent state when the pulses end. Thus, it is seen that the negative half-current pulse applied to the inhibit winding I$h$ cancels out one of the positive half-current pulses applied to the other two windings.

Once the core is in the binary 1 state, coincident negative half-current pulses on windings U and T will return the core to the binary 0 state. It should be noted that the inhibit winding I$h$ is not operative during the time these last-mentioned pulses are applied. This is due to the fact that it is during the return of the core to the binary 0 state that an output is obtained on the sense winding SW. That is, when the core returns to the binary 0 state, a voltage will be induced in the sense winding which can be utilized as an output.

(b) The core array

Referring again to FIG. 9, the three-dimensional core array is seen to comprise six separate core planes 301. Each core plane comprises ten rows of cores, there being thirteen cores to each row. The windings for the core array are the units order windings, the tens order windings, the inhibit windings and the sense windings. Referring to the left side of the front core plane, as shown in the drawing, there is illustrated terminals U0 through U9. Referring to the terminal U0, it will be seen that a winding is passed through each of the top thirteen cores in the upper row of each plane, the other end of the winding terminating at a terminal U0'. While not shown, similar windings connect terminals U1 and U1', U2 and U2', U3 and U3', U4 and U4', U5 and U5', U6 and U6', U7 and U7', U8 and U8', and U9 and U9'. Thus, it will be seen that the units order windings are in separate horizontal planes. Terminals U0' through U9' are connected to ground.

The tens order windings are in vertical planes, there being thirteen tens order windings used in the core array. By way of illustration, the winding in FIG. 9 which has one end connected to terminal T0 and the other end connected to terminal T0' passes through the first core in each row of cores in each of core planes 301. While the other tens order windings are not shown in the drawing, it will be understood that there are separate windings connecting terminals T1 and T1', T2 and T2', T3 and T3', T4 and T4', T5 and T5', ECT and ECT', 0T0 and 0T0', 0T1' and 0T1,. 0T2 and 0T2', 0A3 and 0T3', 0T4 and 0T4', and 0T5 and 0T5'. Terminals T0' through T5', ECT', and 0T0' through 0T5' are connected to ground. There are six inhibit windings for the core array, there being one inhibit winding for each of the core planes 301. By way of illustration, the winding which passes through each of the cores in each row in the front plane and is connected between terminals I$h$R and I$h$R' is the inhibit winding for the front core plane. The winding for the next core plane is wound in a similar manner and is connected between terminals I$h$1 and I$h$1'. Other inhibit windings are connected between terminals I$h$2 and I$h$2', I$h$4 and I$h$4', I$h$8 and I$h$8', and I$h$6 and I$h$6'. Terminals I$h$R', I$h$1', I$h$2', I$h$4', I$h$8' and I$h$6' are connected to ground.

The sense windings for the core array are arranged such that there is one sense winding for each of the core planes 301. The sense winding for the front core plane is illustrated in FIG. 9 and is shown to pass through each core in the plane. The ends of this sense winding are connected to terminals SWR and SWR'. The sense windings for the other planes are connected between terminals SW1 and SW1', SW2 and SW2', SW4 and SW4', SW8 and SW8', and SW6 and SW6'.

There is a provision for six parallel bits of information to enter storage each digit time. Four of the bits are in binary coded decimal form and relate to the identity or decimal value of the character being stored. Another one of the bits is a redundancy bit R. The remaining bit has been termed a "6" bit and is used primarily for designating the first and last character in a field where error correction is being performed. While there are other uses of the "6" bit information, these uses will be discussed later in the description. The chart in FIG. 21a illustrates the coding for the characters 0 through 9. It is noted that a redundancy bit R is used only when there is an even number of binary 1's in the coded form of the character, except that an R bit is used where the decimal value zero is being transmitted. The use of the R bit as has been described may be termed an "odd bit" redundancy check.

It will be seen that there is a correspondence between the inhibit winding terminals I$h$R, I$h$1, I$h$2, I$h$4 and I$h$8 and the coding of the character bits shown in FIG 21a. Information relating to the R bit of each word is supplied to terminal I$h$R. Information relating to the 1, 2, 4 and 8 bits of each word are respectively supplied to terminals I$h$1, I$h$2, I$h$4 and I$h$8. Information relating to the 6 bit of the word is supplied to terminal I$h$6. Thus, it will be apparent that each of the core planes 301 store information regarding only one bit of each character.

The core array may be thought of as being divided into an input buffer, an error correction buffer and an output buffer. The input buffer includes the first six cores, from left to right, in each row of cores in each core plane. The error correction buffer includes the seventh core in each row, in each plane, and the output buffer includes the last six cores in each row, in each plane. Under these circumstances, sixty words, each representing a character, may be stored in the input buffer, ten words in the error correction buffer and sixty words in the output buffer. Referring to FIG. 21b, there is illustrated one of the core planes 301 with the windings removed. The cores in the input buffer are numbered 1 through 60, those in the error correction buffer 1 through 10 and those in the output buffer 1 through 60.

Referring to the input buffer, one of the bits of each of the first sixty words entering the input buffer is stored successively in the core positions 1 through 60 as shown. For example, let it be assumed that the core plane in FIG. 21b is that plane which is used to store the R bit information for each word. Thus, the R bit for the first word would be stored in core position 1, the R bit for the second word in core position 2, etc. The R bit for the first ten words entering the error correction buffer are stored in positions 1 through 10. When the words in the input buffer are transferred to the output buffer, the R bit in core position 1 in the input buffer is transferred to core position 1 in the output buffer, the R bit in core position 2 in the input buffer is transferred to core position 2 in the output buffer, etc. Therefore, taking all of the core planes 301 as shown in FIG. 9, the different bits of the first word entering input buffer are stored in core positions 1 of the core planes, the different bits of the second word are stored in core positions 2 of the core planes, etc.

From the above, it will be seen that some means must be provided for entering the words in core storage in the order described. The order of storage is controlled by the units order windings and the tens order windings. Suppose, for example, that it is desired to store the first word entering input buffer. To select core position 1 in the input buffer of each core plane, half-current pulses of the same polarity are applied to terminals U0 and T0 in coincidence. Normally, these inputs would change the cores in core position 1 of each core plane to the binary 1 state. However, whether this action can take place in each plane depends on the binary value of each information bit in the word. This is where the inhibit windings exercise control. If the first word contains an R bit, i.e. the R bit has a binary 1 value, then terminal I$h$R will not receive an input. That is, with no signal supplied to terminal I$h$R, core position 1 in the front core plane will be allowed to assume the binary 1 state. However, if the first word does not contain an R bit, i.e. the R bit has a binary 0 value, then a half-current pulse of a polarity opposite to that of the half-current pulses applied to terminals U0 and T0 is applied to terminal I$h$R. Thus, core position 1 in the front core plane will not be allowed to assume a binary 1 state. Since the units order winding connected to terminal U0 and the tens order winding connected to terminal T0 pass through core position 1 of each of the core planes, it will be apparent that the cores in core position 1 in each of the core planes will be selected. Whether the core in each plane will be allowed to assume a binary 1 state depends upon the input to the inhibit windings at terminals I$h$1, I$h$2, I$h$4, I$h$8 and I$h$6. It will be seen that any core position in the input buffer, the error correction buffer or the output buffer may be selected by proper selection of a units order winding, a tens order winding, and an inhibit winding.

(c) Clock circuit

Reference is made to FIG. 2 which discloses the clock circuit for generating a number of timing pulses the use of which will be better understood as the description proceeds. There is provided a conventional free-running multivibrator 310 which supplies a plurality of output pulses of a predetermined frequency. The frequency of the pulses in the preferred embodiment of the invention is of the order of 30 kc. The output of the multivibrator is supplied through a cathode follower 311 to a single-shot multivibrator 312. The single-shot multivibrator 312 produces a positive pulse of three microseconds duration in response to a positive-going voltage at the input thereto. The three microsecond pulse from the single-shot multivibrator 312 is supplied to a push-pull driver 314 whose output is in the form of a negative pulse of three microseconds duration, this pulse being termed $\overline{Ap}$. The output of the push-pull driver 314 is supplied through another push-pull driver 315 whose output is supplied to a terminal $Ap$.

Reference is made of FIG. 5 which shows the pulses just described. It is noted that the leading edges of succeeding $Ap$ signals are thirty-three microseconds apart.

Referring again to FIG. 2, it is seen that the output of the push-pull unit 314 is supplied to a single-shot multivibrator 316 which also produces a positive pulse of three microseconds duration. The positive pulse from the single-shot multivibrator 316 begins at the trailing edge of the negative pulse from push-pull unit 314. A push-pull unit 317 is connected to receive the three microsecond pulse from circuit 316 to produce a negative pulse of three microseconds duration which is labeled $\overline{LAp}$. The output of the push-pull unit 317 is also supplied to a push-pull unit 318 which produces $LAp$. The pulses $\overline{LAp}$ and $LAp$ are termed "late A" pulses and as noted in FIG. 5, they occur immediately following the trailing edge of the pulses $Ap$ and $\overline{Ap}$.

Referring again to FIG. 2, the output of multivibrator 310 is also supplied through cathode follower 311 to a single-shot multivibrator 319 which produces a positive output pulse of twenty microseconds duration. This pulse is supplied through an inverter 320 to a single-shot multivibrator 321 which produces a three microsecond positive pulse which begins at the end of the twenty microsecond pulse from the single-shot multivibrator 319. The output of the single-shot multivibrator 321 is supplied through a push-pull unit 322 to produce a pulse $\overline{Bp}$. The output of the push-pull unit 322 is also supplied to a push-pull unit 323 which produces a pulse labeled $Bp$, these pulses being illustrated in FIG. 5.

The output of the push-pull unit 322 is also supplied to a single-shot multivibrator 324 which supplies a positive output pulse of three microseconds duration to a push-pull unit 325. The output of push-pull unit 325 is labeled $\overline{Rp}$. A push-pull unit 326 is connected to receive the output of the unit 325 and produces as an output a signal labeled $Rp$. These pulses are the reset pulses and, as seen in FIG. 5, they occur immediately following $Bp$ and $\overline{Bp}$.

(d) Storage control circuits

In order to store information in the core array previously described, there is provided an entry counter and a control counter. Primarily, the entry counter is used to address the input buffer and error correction buffer through suitable switching means. The control counter is principally employed to control the flow of logic in the machine and also is used during regeneration of the information in the core array and during the transfer of information from the input buffer to the output buffer. Both of these counters have units order and tens order positions.

The entry units counter is shown in FIG. 3d. This counter comprises ten stages and operates in the fashion of a ring. That is, only one of the stages may be ON at any one time. When the ON stage goes OFF, the next stage is turned ON. In this fashion, the stages may be arbitrarily assigned decimal values from 0 through 9.

The entry units counter comprises push-pull units 330 through 339 having inverters 340 through 349, respectively, operatively associated therewith. The outputs from push-pull units 330 through 339 are connected by way of cathode followers 350 through 359, respectively to plug hubs EU0 through EU9, respectively. Each stage, which comprises one push-pull unit and one inverter, supplies a relatively positive output voltage when it is ON and a relatively negative output voltage when it is OFF. The push-pull unit and inverter of each stage are connected in the manner of a latch. Periodically, an ENTRY UNITS ADVANCE signal is supplied by way of an advance line to each of the push-pull units 330 through 339. When this signal occurs, the stage that is ON goes OFF, and in so doing, supplies an input to the inverter of the next stage to turn the next stage ON.

The output from the push-pull unit of the last stage, i.e. push-pull unit 339, is supplied by way of an inverter 361 to a single-shot multivibrator 362. Thus, at the trailing edge of the positive output from push-pull unit 339 a positive-going voltage will be supplied to the single-shot multivibrator 362 and result in a positive pulse of five microseconds duration being supplied therefrom to an inverter 363. The output of the inverter 363 will be a negative-going voltage which is supplied to inverter 340. It is in this manner that the last stage can turn the first stage ON.

If it is assumed for the moment that all of the stages in the entry units counter are OFF, the first stage may be turned ON by the application of a COUNTER SET Signal to inverter 360. The plate of inverter 360 shares the plate load in inverter 340. Thus, a positive-going COUNTER SET signal results in a negative-going voltage from inverter 360 which pulls down the plate in inverter 340. At the same time, the negative-going voltage from inverter 360 is supplied to the grid input circuit of the left side of push-pull unit 330. This negative-going voltage cuts off conduction in the left half of the push-pull unit which, in turn, causes the right half of the push-pull unit to go into conduction. A positive-going voltage is supplied from the cathode of the right half of the push-pull unit to the grid input circuit of inverter 340, thereby placing inverter 340 in conduction. This means that inverter 340 will continue to supply a relatively negative voltage from the plate thereof to the grid input circuit of the left half of push-pull unit 330. Thus, the first stage has been "latched up" and will remain on until an ENTRY UNITS ADVANCE pulse appears. The ENTRY UNITS ADVANCE signal is a negative-going voltage of three microseconds duration which pulls down the grids of the right half of push-pull units 330 through 339. When the grid of the right half of push-pull unit 330 is pulled down by the negative-going voltage, the cathode also drops and supplies a negative-going voltage to the grid of inverter 340. This means that the plate output from inverter 340 will be a positive-going voltage which is supplied back to the grid input circuit at the left side of the push-pull unit 330 to keep the push-pull unit 330 off. At the same time, the positive-going voltage from inverter 340 is supplied to the grid input circuit of inverter 341 and results in producing a negative-going output voltage from the plate of inverter 341. This negative-going voltage is supplied to the grid input circuit of the left side of push-pull unit 331, thus producing a positive-going voltage from the cathode of the right side of unit 331. This positive-going voltage is supplied back to the grid input circuit of inverter 341 so that the second stage, i.e. the stage comprising push-pull unit 331 and inverter 341 is now latched ON.

It will be apparent that succeeding ENTRY UNITS ADVANCE signals will cause the succeeding stages of the entry units counter to be turned ON. Under these circumstances, positive voltages will appear at the cathodes of the push-pull units 330 through 339 in succession. Push-pull unit 339 and inverter 349 form the last or tenth stage of the entry units counter. The output from inverter 349 is labeled TENS RING DRIVE. This output will be a negative-going voltage when the last stage is turned OFF. The use for the TENS RING DRIVE voltage is in the entry tens counter which will be described at a later time.

As previously explained, when the last stage goes OFF, the output from the cathode of the right side of push-pull unit 339 will be a negative-going voltage which results in a positive-going voltage being applied to a single-shot multivibrator 362. The output of the single-shot multivibrator 362 is a five microsecond positive pulse which becomes a five microsecond negative pulse out of inverter 363. This pulse is supplied to inverter 340 in the first stage of the counter and is thereby used to turn the first stage ON.

From the above description, it will be seen that the output voltage from the cathode at the right side of push-pull unit 330 will be relatively positive when the first stage of the entry units counter is ON. At this time the output voltages from the cathodes at the right sides of push-pull units 331 through 339 are relatively negative. However, after the first ENTRY UNITS ADVANCE signal is supplied to the advance line, the first stage is turned OFF and the second stage is turned ON, thereby resulting in a relatively positive voltage from the cathode of the right side of only push-pull unit 331. With succeeding ENTRY UNITS ADVANCE signals, relatively positive voltages will successively appear at the cathodes of the right sides of push-pull units 332 through 339. The output voltages from the cathodes of the right sides of push-pull units 330 through 334 are supplied to serve as inputs to AND circuits 370 through 374, FIG. 3b. The output voltages from the right sides of the cathodes of push-pull units 335 through 339 are supplied to serve as inputs to AND circuits 375 through 379, respectively, FIG. 3e. AND circuits 370 through 379 also receive an input signal labeled ENTRY UNITS SWITCH CONTROL.

The output from AND circuits 370 through 379 are supplied to OR circuits 380 through 389, respectively. Thus, as the successive stages of the entry units counter are turned ON, the output voltages from AND circuits 370 through 379 will be relatively positive in succession in coincidence with the occurrences of successive ENTRY UNITS SWITCH CONTROL signals. The output signals from OR circuits 380 through 389 are supplied to AND circuits 390 through 399, respectively, and to AND circuits 400 through 409, respectively, FIGS. 3c and 3f. AND circuits 390 through 399 are switched by the Ap signal while AND circuits 400 through 409 are switched by the Bp signals. The outputs from AND circuits 390 through 399 are supplied to the grid input circuits of the left sides of core drivers 410 through 419, respectively. The grid circuits of the right sides of these core drivers are connected to receive the outputs from AND circuits 400 through 409, respectively.

Referring to FIG. 5, the signals Ap begin about seven microseconds after the beginning of each digit time and last for three microseconds. Thus, as the outputs from the entry units counter supplied to AND circuits 390 through 399 are successively raised during successive digit times, an output will occur at Ap time from AND circuits 390 through 399 in succession. The output signals from AND circuits 400 through 409 will be successively raised during successive digit times at Bp time. Therefore, the output signals from the core drivers 410 through 419, which appear at terminals U0 through U9, respectively, are in the form of relatively negative pulses at Ap time and relatively positive pulses at Bp time. Of course, since AND circuits 390 through 399 and 400 through 409 are relatively positive in succession, outputs at terminals U0 through U9 also occur in succession.

The cathodes of units 410 through 419 are all commoned and connected to one end of a resistor 364 whose other end is connected to a negative source of D.C. potential. The said one end of the resistor is also connected to the plate of a diode 365 whose cathode is connected to ground.

Referring now to FIG. 9, the terminals U0 through U9 are connected to terminals U0 through U9 on FIGS. 3c and 3f. This means that during the first digit time a negative-going pulse is produced at terminal U0 at Ap time and a positive pulse is produced during Bp time, during the second digit time a relatively negative pulse will be produced at terminal U1 at Ap time and a relatively positive pulse will be produced at Bp time, etc.

The control units counter is shown in FIG. 3a and is similar to the entry units counter shown in FIG. 3d, except for the fact that the control units counter has eleven stages instead of the ten stages contained in the entry units counter. The control units counter comprises a plurality of push-pull units 420 through 430 having inverters 431 through 441, respectively, operatively associated therewith. A COUNTER SET signal is adapted to be supplied to an inverter 442 whose plate is connected to the plate of the inverter 441. The plate of inverter 442 shares the plate resistor of inverter 441. Therefore, a positive-going input to inverter 442 results in a negative-going voltage at the plate of inverter 442. This means that a negative-going voltage is supplied to the grid of the left side of push-pull unit 430. The output at the cathode of push-pull unit 430 is supplied to the terminal CUX and will be relatively positive during the time that the stage comprising push-pull unit 430 and inverter 441 is ON.

A CONTROL UNITS ADVANCE signal is supplied to each of the push-pull units 420 through 430. When this signal is produced, push-pull unit 430 returns to its OFF condition and supplies a negative-going voltage to the grid of inverter 441. This causes a positive-going voltage to be supplied from inverter 441 to the grid of inverter 431. The plate output of inverter 431 goes negative and causes push-pull unit 420 to supply a positive-going voltage from the cathode at the right side thereof back to inverter 431, thereby causing the stage comprising push-pull unit 420 and inverter 431 to be ON. At this time, an output voltage exists at the cathode of push-pull unit 420 which is relatively positive. This relatively positive voltage is supplied to a terminal labeled CU0. Of course, when the next CONTROL UNITS ADVANCE signal is produced, the stage comprising push-pull unit 420 and inverter 431 goes OFF, and in so doing, turns the stage comprising push-pull unit 421 and inverter 432 ON. In this fashion a relatively positive voltage is produced at the terminal labeled CU1. During successive CONTROL UNITS ADVANCE pulses, successive stages of the control units counter are turned ON to produce relatively positive voltages at terminals CU2 through CU9 in succession.

Two things occur when the stage comprising push-pull unit 429 and inverter 440 goes OFF. A positive-going voltage is produced from inverter 440 at this time which is supplied to a terminal labeled CARRY FOR CONTROL TENS COUNTER. At the same time, this positive-going voltage from inverter 440 is supplied to inverter 441 to turn the stage comprising push-pull unit 430 and inverter 441 ON. Thus, the counter has progressed through a complete cycle. The next CONTROL UNITS ADVANCE signal will turn the stage just mentioned OFF and begin a new cycle by turning the stage comprising push-pull unit 420 and inverter 431 ON.

From the above explanation, it will be seen that relatively positive pulses will be produced at terminals CUX and CU0 through CU9 in succession. The CONTROL UNITS ADVANCE signal occurs every thirty-three microseconds. Each one of the terminals CUX and CU0 through CU9 will have thirty microsecond pulses thereat. The reason the pulses are of thirty microseconds duration rather than thirty-three microseconds is due to the fact that the CONTROL UNITS ADVANCE signal lasts for three microseconds. During this signal, all of the terminals will be relatively negative. Reference may be made to FIG. 6 which shows the relationship of the pulses CUX and CU0 through CU9.

The output voltages from the cathodes of push-pull units 420 through 429 are supplied to AND circuits 450 through 459, respectively, on FIGS. 3b and 3e. Each of the AND circuits 450 through 459 are connected to receive a signal labeled CONTROL UNITS SWITCH CONTROL. At the time this last-mentioned signal occurs, an output signal will be produced from one of the AND circuits 450 through 459. The output signals from AND circuits 450 through 459 are supplied to OR circuits 380 through 389. The output signals from OR circuits 380 through 389 are supplied to the AND circuits on FIGS. 3c and 3f, 390 through 399 and 400 through 409, respectively, in the same manner as that previously described.

From the above description, it will be seen that by causing the CONTROL UNITS SWITCH CONTROL signal to be produced at a time different from the ENTRY UNITS SWITCH CONTROL signal that either the entry units counter or the control units counter can supply signals to the core drivers 410 through 419. The use of the two counters in controlling the core drivers will become more apparent as the description proceeds. For the moment, it is sufficient to say that it is possible for the entry units counter to control the core drivers 410 through 419 during one interval of time and for the control units counter to control the core drivers during another interval of time.

Now that the entry units counter and the control units counter have been described, along with the manner in which they can produce successive half-current pulses at terminals U0 through U9 in the core array shown in FIG. 9, a description will now be given regarding the manner in which half-current pulses can be produced at the tens order winding terminals T0 through T5 and OT0 through OT5 in the core array shown in FIG. 9.

Figure 4B:
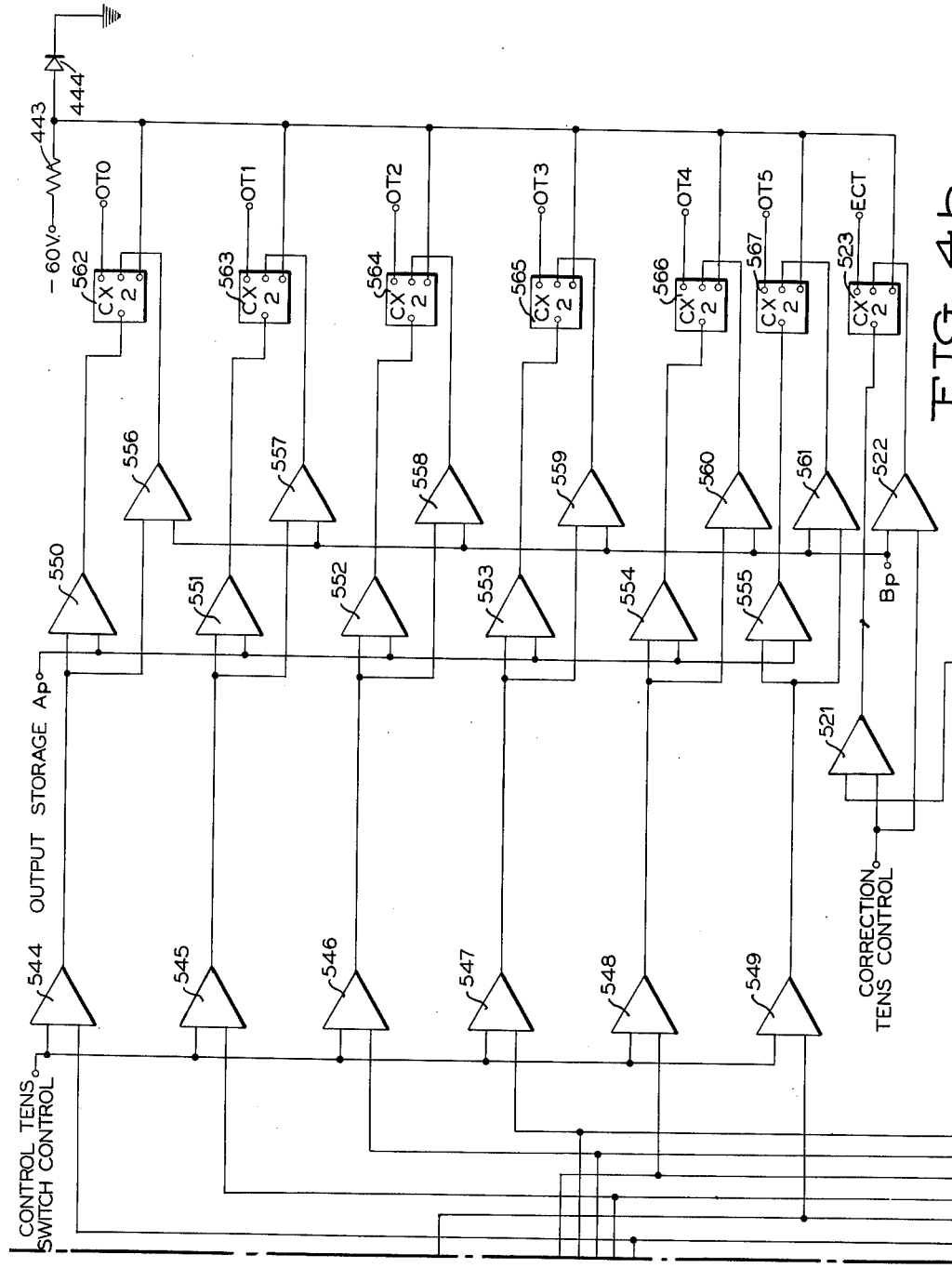

Reference is made to FIGS. 4a, 4b, 4c and 4d. FIG. 4c shows the entry tens counter while FIG. 4a shows the control tens counter. The switching for controlling the outputs of the entry tens counter and the control tens counter to the core drivers for supplying signals to terminals T0 through T5 is shown on FIG. 4d. The switching for controlling the outputs of the control tens counter to the core drivers for supplying signals to terminals OT0 through OT5 is shown on FIG. 4b.

Referring to FIG. 4c, the entry tens counter is seen to comprise a plurality of push-pull units 460 through 466 having inverters 467 through 473, respectively, operatively associated therewith. The push-pull unit 460 and the inverter 467 form the first stage and the successive combinations of push-pull units and inverters form the succeeding stages. The operation of this counter is similar to the previously described counters except that this counter contains six stages rather than ten as in the entry units counter, or eleven as in the control units counter. In order to reset the entry tens counter so that all stages are OFF a cathode follower 474 is adapted to receive a signal labeled LONG RESET. This signal is a positive pulse of at least forty microseconds duration in one instance and somewhat longer in another instance. This signal is supplied through the cathode follower 474 to the two inverters 475 which are connected in parallel. The plates of inverters 475 are connected to each of the push-pull units 460 through 466 and serve as a pulldown on these units. That is, when the plates of inverters 475 drop in voltage the grid in the right side of each of the units 460 through 466 is also pulled down. The circuit for the plates of inverters 475 is actually completed through the output load of the push-pull units. The application of this forty microsecond or more relatively negative voltage to each of the push-pull units causes each stage of the counter to go OFF. Let it be assumed, for example, that the stage comprising push-pull unit 462 and inverter 469 was ON at the time the LONG RESET signal occurs. When the LONG RESET signal occurs, the grid in the right side of push-pull unit 462 is pulled down so that a negative-going voltage is supplied from the cathode of push-pull unit 462 to the grid of inverter 469. This, of course, causes the output of inverter 469 to be in the form of a positive-going voltage which would normally cause inverter 470 in the next stage to go into conduction. However, it will be remembered that inverters 469 and 470, which are of the type IN1, are capacitively coupled. Since the LONG RESET signal at least is forty microseconds in duration, the positive-going voltage to inverter 470 is of much shorter duration and dies away before the end of the signal. Therefore, at the end of the LONG RESET signal, all of the stages will be OFF.

In order to turn the first stage of the entry tens counter ON, a positive pulse of three microsecond duration, which is termed COUNTER SET, is supplied to inverter 476. The output of this inverter is a negative pulse of three microseconds duration which pulls down the plate of inverter 467 which, as previously described, causes a relatively positive voltage to be supplied from the cathode of push-pull unit 460 to the grid of inverter 467, thus causing the push-pull unit and inverter to latch in the ON condition.

It will be remembered from FIG. 3d that an output signal labeled TENS RING DRIVE was produced from inverter 349. In FIG. 4c, there is a cathode follower 477 which is adapted to receive this signal. The output of the cathode follower is supplied to a single-shot multivibrator 478 which produces a positive pulse of three microseconds duration that is supplied to a cathode follower 479. The output of the cathode follower is supplied to inverters 475 which in turn produce a negative pulse of three microseconds duration. As has been described before, the output of inverters 475 is supplied to the advance line which connects to the right side of each of the push-pull units 460 through 466. Since the first stage is ON by reason of the COUNTER SET signal, a negative pulse to the grid of the right side of push-pull unit 460 results in a relatively negative output voltage from the cathode thereof. This relatively negative voltage is supplied to inverter 467 so as to place the inverter out of conduction. As this occurs, a positive-going voltage is supplied to inverter 468 which causes the last-mentioned inverter to go into conduction. The output of inverter 468 is a negative-going voltage which is supplied to push-pull unit 461. The output at the cathode of push-pull unit 461 begins to rise at the end of the negative pulse of the advance line. That is, the cathode of the push-pull unit 461 cannot rise until the negative pulse from inverters 475 is dropped from the grid of the right side of push-pull unit 461. Of course, when the cathode voltage does begin to rise, inverter 468 is retained in conduction. Thus, the second stage of the counter is ON. With succeeding ones of the TENS RING DRIVE signals, the entry tens counter will step from one stage to the next. Thus, it is seen that after the entry units counter in FIG. 3d progresses through one cycle and counts up to ten, the entry tens counter will progress from the first stage to the second stage. When the entry counter goes through another cycle, the entry tens counter progresses to the third stage, etc.

Output signals may be taken from the cathodes in the right sides of push-pull units 460 through 466 and supplied to cathode follows 480 through 486, respectively. The outputs of these cathode followers are connected to terminals ET0 through ET6, respectively. These terminals are actually control panel terminals, arranged so that interconnecting jumpers may be applied thereto, and whose use will be described later in the description.

The outputs from the cathodes of the right sides of push-pull units 460 through 465 are also supplied to AND circuits 490 through 495, respectively, FIG. 4d. The other input to each of the last-mentioned AND circuits is a CHARACTER READIN signal. The generation of the CHARACTER READIN signal will be described at a later time. However, when this signal is produced, an output signal is supplied from one of the AND circuits 490 through 495 to one of the OR circuits 497 through 502, respectively. The output signals from OR circuits 497 through 502 are connected to AND circuits 503 through 508, respectively, and to AND circuits 509 through 514, respectively. AND circuits 503 through 508 are sampled by the Ap pulses while the AND circuits 509 through 514 are sampled by INPUT STORAGE Bp pulses. The outputs of AND circuits 503 through 508 are supplied to the left sides of core drivers 515 through 520, respectively. Thus, it will be seen that if, for example, AND circuit 503 is receiving a relatively positive input from OR circuit 497 at a time when Ap occurs, the left side of core driver 515 will receive a positive pulse. This results in a negative current pulse at terminal T0 which is connected to core driver 515. When the signal INPUT STORAGE Bp occurs, the right side of core driver 515 will receive a positive pulse. This produces a positive half-current pulse from terminal T0. As shown, the remaining core drivers 516 through 520 are arranged to have their outputs connected to terminals T1 through T5, respectively. All of the output terminals T0 through T5 in FIG. 4d are connected to terminals T0 through T5 on FIG. 9.

The control tens counter is illustrated in FIG. 4a and is substantially identical to the entry tens counter shown in FIG. 4c. As illustrated, the counter comprises push-pull units 525 through 530 having inverters 531 through 536, respectively, operatively associated therewith. The LONG RESET signal is supplied by way of a cathode follower 537 and inverters 538 to the advance line which connects to each of the push-pull units 525 through 530. When a LONG RESET signal occurs, all of the stages of the control tens counter will be reset OFF. A COUNTER SET signal is adapted to be received by inverter 539 and is utilized to turn the first stage comprising push-pull unit 525 and inverter 531 ON. This counter is adapted to be advanced from one stage to the next for every eleven counts in the control units counter.

Referring to FIG. 3a, it will be remembered that a signal CARRY FOR CONTROL TENS COUNTER is supplied from inverter 449. This signal is received by a cathode follower 540 in FIG. 4a and supplied to a single-shot multivibrator 541. The output of this single-shot multivibrator is a positive pulse of three microseconds duration which is received by AND circuit 542. The other input to AND circuit 542 is a signal INHIBIT CONTROL TENS ADVANCE. If these two signals are relatively positive in coincidence at AND circuit 542, an output signal is supplied through cathode follower 543 and inverters 533 to the advance line which is connected to each of the push-pull units in the counter. If the first stage of the counter is ON, a CARRY FOR CONTROL TENS COUNTER signal will cause the first stage to go OFF and the second stage to go ON. Of course, succeeding CARRY FOR CONTROL TENS COUNTER signals will result in the counter being advanced successively to the succeeding stages.

The output voltages from the cathodes of the right sides of push-pull units 525 through 530 are supplied to terminals CT0 through CT5, respectively, and to AND circuits 544 through 549, respectively, on FIG. 4b. The other input to each of the last-mentioned AND circuits is a CONTROL TENS SWITCH CONTROL signal. The outputs from these AND circuits are supplied to AND circuits 550 through 555, respectively, and AND circuits 556 through 561, respectively. The signal OUTPUT STORAGE Ap is supplied to each of AND circuits 550 through 555 and the outputs therefrom are supplied to the left sides of core drivers 562 through 567, respectively. The AND circuits 556 through 561 are sampled by Bp and the outputs therefrom are supplied to the right sides of core drivers 562 through 567, respectively.

The output signals from the core drivers 562 through 567 are negative half-current pulses which appear at terminals 0T0 through 0T5, respectively, at OUTPUT STORAGE Ap time, and positive half-current pulses at Bp time. These terminals are connected directly to the terminals 0T0 through 0T5 in the core array shown in FIG. 9.

The output signals from the cathodes of the right sides of the push-pull units 525 through 530 are also supplied to AND circuits 568 through 573 in FIG. 4d, respectively. A signal ENTRY TENS SWITCH CONTROL is supplied to each of the last-named AND circuits and the outputs from these AND circuits are supplied to OR circuits 497 through 502, respectively. As previously described, the output signals from OR circuits 497 through 502 are adapted to be supplied to AND circuits 503 through 508, respectively, and AND circuits 509 through 514, respectively. These AND circuits may be sampled in the manner previously described in order to control the core drivers 515 through 520. It will be seen, therefore, that the entry tens counter can control the core drivers 515 through 520 and at a different time the control tens counter can control these core drivers. In addition, the control tens counter is used to control the core drivers 562 through 567 in FIG. 4b.

To this point, the means for supplying current pulses to terminals T0 through T5 and 0T0 through 0T5 have been described. The error correction buffer which has a tens winding connected to the terminal ECT receives its input from a core driver 523, FIG. 4b. The left side of this core driver is connected to receive the output of AND circuit 521 while the right side thereof is connected to receive the output of AND circuit 522. One input to each of the switches is a signal CORRECTION TENS CONTROL. The other input to AND circuit 521 is Ap while the other input to AND circuit 522 is Bp. Therefore, when a signal CORRECTION TENS CONTROL is received by both of the switches, AND circuit 521 will supply an output at Ap time and AND circuit 522 will supply an output at Bp time. The output from core driver 523 is connected to a terminal ECT which is connected to the terminal labeled ECT in FIG. 9.

Referring to FIG. 4b, it will be noted that the cathodes of core drivers 562 through 567 and 523 are all commoned and connected to one end of a resistor 443 whose other end is connected to a negative source of D.C. potential. The said one end of the resistor is also connected to the plate of a diode 444 whose cathode is connected to ground. Also, the cathodes of core drivers 515 through 520 are commoned and connected to one end of a resistor 445 whose other end is connected to a negative source of D.C. potential. The said one end of the last-named resistor is connected to the plate of a diode 446 whose cathode is connected to ground.

*(e) Regeneration*

The information in the core array is normally regenerated under the control of the control units counter and the control tens counter. It will be remembered from FIG. 10 that if core 300 is in a binary 1 state, the sense winding SW has a voltage induced therein when the core is switched from the binary 1 state to the binary 0 state by the negative half-current pulses which are applied to windings U and T at A$p$ time. This is the readout operation. If the sense winding has a voltage induced therein at A$p$ time, a separate circuits is provided such that a negative half-current pulse will not be supplied to inhibit winding I$h$ at the following B$p$ time. Therefore, when positive half-current pulses are applied to windings U and B$p$ time, the core will be returned to the binary 1 state. Thus, a binary 1 is read out of the core at A$p$ time and read back into the core at B$p$ time.

If the core was originally in the binary 0 state when the negative half-current pulses were applied to windings U and T at A$p$ time, a voltage would not have been induced in the sense winding SW. Under these circumstances, the aforementioned separate circuit is such that a negative half-current pulse will be supplied to inhibit winding I$h$ at B$p$ time. This means that even though the positive half-current pulses are applied to winding U and T at B$p$ time, the core will remain in the binary 0 state due to a negative half-current pulse on winding I$h$.

The same action takes place in the output buffer portion of the core array during regeneration. As previously mentioned, the control units counter and control tens counter control regeneration. Ordinarily, a complete set of outputs CUX and CU0 through CU9 as shown in FIG. 6 are produced during each cycle of the control units counter. Only the outputs CU0 through CU9 are used for regeneration since during CUX time character sense information is read into the input buffer. During successive series of the output signals CU0 through CU9, the outputs CT0 through CT5 are produced from the control tens counter. Thus during regeneration it is possible to supply successive inputs to terminals U0 through U9 during CU0 through CU9 times respectively. During a first set of inputs to terminals U0 through U9, outputs will be produced at the same time at terminal OT0. During the next successive sets of signals U0 through U9, signals are produced at the same time successively at terminals OT1, OT2, OT3, OT4 and OT5. In other words, it takes six sets of signals U0 through U9 to advance from OT0 through OT5.

To allow the control units counter to produce the outputs at terminals U0 through U9 during regeneration, a signal CONTROL UNITS SWITCH CONTROL signal is needed for each of AND circuits 450 through 459 in FIGS. 3$b$ and 3$e$. This signal is supplied by an inverter 1077 in FIG. 8$u$ which normally has a relatively positive output signal which is labeled CONTROL UNITS SWITCH CONTROL. In addition, a CONTROL TENS SWITCH CONTROL signal must be supplied to switches 544 through 549 in FIG. 4$d$. To produce this signal, reference is made to the circuit on FIG. 8$u$ which shows a push-pull unit 1014 which normally has a relatively positive output to produce the CONTROL TENS SWITCH CONTROL signal. The output of the push-pull unit is supplied to AND circuit 1067 which normally receives a relatively negative input except during the transfer operation. Therefore, a relatively negative output is supplied from the AND circuit through cathode follower 1068. This means that during regeneration, the ENTRY TENS SWITCH CONTROL signal is relatively negative and information is not read from the input buffer. It will be seen that both of these signals are relatively negative at CUX time since the signal CUX is supplied through OR circuit 1013 to push-pull unit 1014, thereby causing the output from the push-pull unit to go relatively negative. With inputs supplied in the manner described above, successive words in the output buffer will be read out at successive A$p$ times and read back into the same position at successive B$p$ times during times CU0 through CU9.

The circuitry for receiving the information on the sense windings is illustrated in FIG. 8$e$. There is provided a plurality of pairs of terminals SW6 and SW6', SWR and SWR', SW8 and SW8', SW4 and SW4', SW2 and SW2', and SW1 and SW1', which receive the information on the sense windings shown in FIG. 9. These pairs of terminals are connected to the pulse transformer units 850 through 855, respectively. The output signals from transformer units 850 through 855, which are in the form of negative pulses, are connected through amplifiers 856 through 861, respecively, to the coincidence circuits 862 through 867, respectively. The other input to units 862 through 867 is $\overline{Ap}$. Therefore, when negative inputs are supplied to the units 862 through 867 in coincidence with the negative $\overline{Ap}$, relatively negative outputs will be supplied therefrom to the inverter-follower units 868 through 873, respectively.

The output signals from the inverter-follower units 868 through 873 are connected to terminals which are labeled 6, R, 8, 4, 2 and 1, respectively. A plurality of inverter followers 874 through 879 are also connected to receive the outputs of inverter-followers 868 through 873, respectively. The output signals from inverter-followers 874 through 879 are fed back to the coincidence units 862 through 867, respectively, so as to hold the units 862 through 867 ON even after the $\overline{Ap}$ signal terminates. Thus it will be seen that each coincidence unit and the two inverter-follower units associated therewith form a latch. In order to reset these latches, a plurality of cathode followers 880 through 885 are connected to receive R$p$ as an input signal and to supply output signals to the coincidence units 862 through 867, respectively. In this manner, a relatively positive voltage, which is supplied to the cathode followers 880 through 885 at R$p$ time, produces relatively positive inputs to coincidence units 862 through 867, respectively, to turn the latches OFF.

To summarize the above-described action, since the sense windings may have outputs thereon at A$p$ time, these outputs are supplied to latches which are switched with the $\overline{Ap}$ signal. The latches remain ON until the reset signal R$p$ occurs.

Reference is now made to FIG. 8$f$ which shows a plurality of AND circuits 886 through 890 which are respectively connected to receive the 8, 4, 2, 1 and R signals from the sense latches shown in FIG. 8$e$. That is, the terminals 8, 4, 2, 1 and R on FIG. 8$f$ are connected to terminals 8, 4, 2 and 1 and R, respectively, on FIG. 8$e$. The other input to each of the AND circuits 886 through 890 is a signal labeled REGENERATION CONTROL. The outputs from AND circuits 886 through 890 are supplied to OR circuits 650 through 654, respectively. A plurality of inverters 655 through 659 are connected to receive the outputs from OR circuits 650 through 654, respectively, and supply inputs to AND circuits 660 through 664, respectively. Since the information in the sense latches is to be read back into the output buffer at B$p$ time, AND circuits 660 through 664 are switched by B$p$. The output from AND circuits 660 through 664 are used to control the core drivers 665 through 669, respectively, which supply outputs to terminals I$h$8, I$h$4, I$h$2, I$h$1 and I$h$R, respectively.

From the previous explanation of the manner in which regeneration can take place in a single core, it is believed that it will be apparent from the description above how regeneration takes place in the output buffer. To summarize, the information read out of the cores into the sense windings at A$p$ time sets up latches which are sampled at the following Bp time so as to place the same information back into the same cores from which it was read. Thereafter, at Rp time the latches are reset OFF.

CHARACTER SENSING

(a) General

Reference is now made to FIGS. 8a through 8k and 8m through 8u in general, and in particular to FIG. 8a. The block labeled CHARACTER SENSING APPARATUS which is provided with reference numeral 580, may contain apparatus identical to that described in the previously referenced Rohland and Greanias application.

In the referenced application, records similar to that shown in FIGS. 22a and 22b are adapted to be scanned by a suitable scanning apparatus. As illustrated, the cards have a plurality of characters thereon. The characters may exist in groups, each of the groups being termed a field. The significant characters of any field are the digits 0 through 9. In some instances, field marks in the form of special characters may be used to set off the characters within a field. While the special characters may take many different forms, the special characters illustrated are the asterisk (*), lozenge ( ◇ ), the dollar sign ($) and the dash (—). As shown in FIG. 22b, there are five information fields and one check digit field. Certain of the fields may be set off by field marks in the form of special characters. Each of the information fields may contain up to some predetermined maximum number of characters. The check digit field will contain a number of characters equal to the number of fields which are to be error corrected. In the card shown in FIG. 22b, the first field or group, designated as ORDER #, is not to be error corrected but is only to be stored. The second field, CUSTOMER #, is to be error corrected but the third field, INSPECTED BY, is to be completely ignored. The fourth and fifth fields, PART #, and AMOUNT, are to be error corrected. Therefore, since there are three fields which are to be error corrected, there are three characters in the check digit field. Scanning of the characters on the card takes place from right to left. Each character is scanned from right to left in a plurality of successive vertical scans. The signals produced in scanning each character are fed to a recognition circuit which produces output signals indicative of the identity of the characters scanned.

As shown in FIG. 8a, the character sensing apparatus 580 produces output signals on separate lines representing the digits 0 through 9 and the special characters *, ◇, $, and —. The lines having the digit signals 1 through 9 thereon from the character sensing apparatus 580 are connected to AND circuits 581 through 589, respectively. The line having the signal thereon representing the character 0 is connected to AND circuit 590. The signals representing the special characters *, ◇, $ and — are supplied to AND circuits 591 through 594, respectively. The other input to the AND circuits just described is a SAMPLE pulse which occurs on a periodic basis. The frequency of the SAMPLE pulse may be several times that of the rate at which successive characters are identified.

The output signals from AND circuits 581 through 594 are supplied to control panel terminals or plug hubs labeled CPH, these letters being followed by the particular characters represented. In addition, the AND circuits 581 through 590 are connected to OR circuits 595 through 599 in a manner to translate the information from the AND circuits, which is in a decimal or one-out-of-ten code, into a binary coded decimal code with a redundancy bit in accordance with the chart shown in FIG. 21a. Thus, the output from OR circuits 595 through 599, respectively, represent the bits 8, 4, 2, 1 and R of the coded character. To accomplish the above-described translation, OR circuit 595 receives inputs from AND circuits 588 and 589, OR circuit 596 receives inputs from AND circuits 584 through 587, OR circuit 597 is connected to receive inputs from AND circuits 582, 583, 586 and 587, and OR circuit 598 is connected to receive inputs from AND circuits 581, 583, 585, 587 and 589.

In the character sensing apparatus 580, as described in the previously referenced application and the early part of the present description, there is provided a circuit which produces a signal termed an UNCERTAINTY. An UNCERTAINTY signal is produced whenever a character is scanned but not definitely recognized. For example, the character 3 may be scanned with the result that sufficient information is produced to recognize the fact that a character has been scanned, rather than spurious data on the paper, but output signals representing both the character 3 and the character 8 are produced. Under these circumstances, since a signal is produced representative of two different characters for the scanning of a single character, an output signal labeled UNCERTAINTY is produced and a signal does not appear on one of the lines 0 through 9 in the character sensing apparatus 580. The UNCERTAINTY signal is supplied to OR circuits 595, 596 and 597. Thus, any time this particular coded signal is sensed from OR circuits 595 through 597, it will be known that an UNCERTAINTY has been sensed by the character sensing apparatus.

The output signals from OR circuit 595 through 599 are supplied to single-shot multivibrators 600 through 604, respectively. When one of the single-shot multivibrators receives a positive-going input voltage it will produce as a result thereof a positive pulse of five-hundred microseconds duration as an output therefrom. The output of the single-shot multivibrator 604 is supplied to a cathode follower 605 whose output is connected to the output of cathode follower 911, the input to which is termed INSERT ZERO. The function of the INSERT ZERO signal will be described later.

Referring to FIG. 8g, there is provided an OR circuit 606 which is connected to receive the outputs from single-shot multivibrators 600 through 603, and the output of single-shot multivibrator 604 by way of cathode follower 605, FIG. 8a. Therefore, any time a character is sensed a signal will be supplied from OR circuit 606 to AND circuit 607. The other input to AND circuit 607 is a CHARACTER SENSE LATCH signal which is supplied from an OR circuit 608.

(b) Character sense control

THE CHARACTER SENSE LATCH signal is produced by the circuitry shown on FIG. 7b and is indicative of the fact that the circuitry of the present invention is ready to receive characters. Referring to FIG. 7b, it will be seen that there are a plurality of control panel plug hubs which are arranged in pairs, the pairs being successively identified as FIELD 1 through FIELD 6. It is noted also that the legend CHARACTER SENSE ON is provided at the top of the pairs of plug hubs. One way of supplying control signals to these plug hubs is to connect each pair to some particular units and tens positions in the entry counter.

The successive pairs of terminals shown in FIG. 7b are connected to AND circuits 610 through 615 whose outputs are connected through an OR circuit 616 to a latch which is comprised of an inverter 617 and a push-pull unit 618. Thus, for example, if terminals EU0 and ET0 in the entry counter are connected to the pair of hubs labeled FIELD 1, an input will be supplied to AND circuit 610 when the entry counter is in that particular position and an output will be supplied from the AND circuit through OR circuit 616 to turn the latch ON. That is, a positive input to inverter 617 results in a relatively negative output from the inverter to the push-pull unit 618. This causes a relatively positive output from the cathode of push-pull unit 618 which is connected to the terminal labeled CHARACTER SENSE LATCH and to the grid circuit of inverter 617 to maintain the latch ON.

There is illustrated an alternative way of turning on the character sense latch. Reference is made to the AND circuit 629 which is connected to receive three input signals. By way of example, one of these input signals may be some one of the special characters which supply input signals to AND circuits 591 through 594 in FIG. 8a. The other two inputs, for example, may be EU0 and ET0 from the entry counters. The output of the AND circuit will be relatively positive when these three signals occur in coincidence and is supplied to each of the pair of plug hubs labeled FIELD 1. The determining factor as to whether a field mark must be used in turning on the character sense latch is whether there is material ahead of the field which must be ignored.

The first field which is sensed will usually be of some predetermined size. Since this size is known, it is possible to determine when to turn character sense off. If all information fields of a card are to be sensed and stored, then it is unnecessary to turn the character sense latch off until the last field has been sensed. For this purpose there is provided a plurality of pairs of plug hubs in FIG. 7a which are successively labeled FIELD 1 through FIELD 6, and designated generally as CHARACTER SENSE OFF. By supplying particular units and tens signals from the entry counters to pairs of these plug hubs, it is possible to turn off character sense after a particular number of characters have been sensed. For example, terminals EU4 and ET0 could be connected to the pair of plug hubs labeled FIELD 1.

The output signals from the pairs of plug hubs labeled FIELD 1 through FIELD 6 in FIG. 7a are supplied to AND circuits 619 through 624. An OR circuit 625 is connected to receive an input from each of the last-mentioned AND circuits and to supply an output to AND circuit 626. The other input to this switch is a signal designated CHARACTER LATCH and CU0. This signal is indicative of the fact that the character latch shown in FIG. 8g is ON, i.e. character sensing has been taking place, and that the signal occurs at CU0 time as determined by the control units counter previously described. The output of AND circuit 626 in FIG. 7a is supplied through an OR circuit 627 and an inverter 628 to turn the latch comprising inverter 617 and push-pull unit 618 OFF, FIG. 7b. Thus, the output labeled CHARACTER SENSE LATCH drops relatively negative.

Referring now to FIG. 8g, if it is assumed that the CHARACTER SENSE LATCH signal from FIG. 7b is relatively positive to indicate it is time to sense characters, a relatively positive input will be supplied through OR circuit 608 to AND circuit 607. This AND circuit will supply an output signal if a character has been sensed by the character sensing apparatus 580. The output signal from AND circuit 607 in FIG. 8g is supplied to AND circuit 630 which also receives a CU9 signal from the control units counter and a signal from an inverter 631, which signal, for the present, will be assumed to be relatively positive. The output from AND circuit 630 is supplied through an OR circuit 632 to a double inverter 633 whose output is supplied through a cathode follower 634 back to the OR circuit 632. Therefore, OR circuit 632, double inverter 633 and cathode follower 634 form the character latch, the output from cathode follower 634 being supplied to a terminal which is labeled CHARACTER LATCH. Since it is desired only to record the receipt of a particular character once, there is provided a character access latch which includes OR circuit 637, double inverter 638 and cathode follower 639. The output of the character latch is supplied from cathode follower 634 to OR circuit 637 which turns the character access latch ON. This causes the output of cathode follower 639 to supply a relatively positive voltage to AND circuit 636 which also receives the output of AND circuit 607. This means that the output of AND circuit 636 will be relatively positive as long as the output of AND circuit 607 remains relatively positive. At the same time, the output of cathode follower 639 is supplied to inverter 631 which produces a relatively negative input voltage at AND circuit 630 to inhibit the switch. Therefore, additional input signals cannot be received by OR circuits 632 until the character access latch is turned OFF. Before a character may be placed into the input buffer of storage, a number of conditions must be satisfied. First, the character latch must be ON to indicate that a character has been sensed. Second, this character must not have been in a check digit field. The third requirement is that the first and second conditions must exist at CU0 time. To detect that the apparatus is ready to read into storage, the output signal from cathode follower 634, which is termed CHARACTER LATCH, is supplied to AND circuit 640 which also receives a signal labeled CHECK DIGIT FIELD. This last-mentioned signal indicates the fact that the character sensing apparatus is not sensing a check digit field and is relatively positive under these circumstances. AND circuit 640 is sampled at CUX time so that its output is supplied through cathode followers 641 and 642 which are arranged in parallel and connected to a terminal labeled CHARACTER READIN. When this signal is relatively positive, it is indicative of the fact that a character may be read into storage.

*(c) Character storage in input buffer*

Referring now to FIG. 8f, there is provided a plurality of AND circuits 645 through 649 which are connected to receive the output signals from single-shot multivibrators 600 through 604, respectively, in FIG. 8a, it being remembered that the single-shot multivibrator 604 supplies its output first to cathode follower 605 which is connected to AND circuit 649. AND circuits 645 through 649 are sampled by the CHARACTER READIN signal which was just generated in the circuitry on FIG. 8g. Thus, the output of AND circuits 645 through 649 will be indicative of the particular character which was sensed by the character sensing apparatus 580 in FIG. 8a. A plurality of OR circuits 650 through 654 are connected to receive the output signals from AND circuits 645 through 649, respectively, and supply input signals through inverters 655 through 659, respectively, to AND circuits 660 through 664, respectively, on FIG. 8k. AND circuits 660 through 664 are sampled by Bp and supply inputs to core drivers 665 through 669, respectively. The arrangement is such in each of the core drivers 665 through 669 that if it receives a relatively positive input signal from the switch associated therewith, a negative current pulse will be produced at the output terminal thereof. The output terminals of core drivers 665 through 669 are labeled I$h$8, I$h$4, I$h$2, I$h$1 and I$h$R, respectively. These terminals are adapted to be connected directly to the terminals carrying the same legend on FIG. 9. These are the inputs to the inhibit windings. It should be kept in mind that a negative current output at one of the inhibit winding terminals is indicative of the fact that the core selected to be controlled by the inhibit winding connected to said terminal will remain in its binary 0 state.

Let it be assumed that the entry units counter shown in FIG. 3d and the entry tens counter shown in FIG. 4c were reset prior to the beginning of the character sensing operation and that thereafter the first stage of each of the counters was turned ON so that negative half-current pulses are supplied to terminals U0 and T0 in FIG. 1 at Ap time. These pulses will place all of the cores in the first word position in the input buffer in the binary 0 state. At Bp time, positive half-current pulses are supplied to terminals U0 and T0 in an effort to place all of the cores in the first word position of input buffer in a binary 1 state. Whether this occurs in each core depends upon the signals supplied to terminals I$h$1, I$h$2, I$h$4, I$h$8 and I$h$R in FIG. 9 from the terminals carrying the same reference characters in FIG. 8k.

Suppose, for example, that the first character sensed is the character "2." In this event, an output signal would have been produced from AND circuit 582 in FIG. 8a and supplied to OR circuit 597 whose output is indicative of the 2 bit in the binary decimal coding of the character. The output from OR circuit 597 produces a 500 microsecond pulse from single-shot multivibrator 602 to AND circuit 647, FIG. 8f, which is sampled by the CHARACTER READIN signal. The output of AND circuit 647 will be relatively positive, and when supplied through OR circuit 652 to inverter 657, will result in a relatively negative signal from said inverter. This relatively negative signal will prevent AND circuit 662 in FIG. 8k from supplying a relatively positive signal to core driver 667 so that a negative half-current pulse will not be produced at terminal I$h$2. However, negative half-current pulses will be produced at terminals I$h$R, I$h$1, I$h$4 and I$h$8 at B$p$ time.

Referring now to FIG. 9, if at B$p$ time, positive half-current pulses are supplied to terminals U0 and T0 and negative half-current pulses are supplied to terminals I$h$R, I$h$1, I$h$4 and I$h$8, then only the core in the third core plane in the first core position of input buffer, which does not receive a negative half-current pulse from terminal I$h$2, will be allowed to assume the binary 1 state. That is, all of the cores in core position 1 of input buffer will remain in the binary 0 state except for the core representing the 2 bit of the first word.

The manner in which signals are generated at U0 and T0 has been previously explained. Briefly, however, referring to FIG. 8u, there is provided an OR circuit 673 which receives the previously mentioned CHARACTER READIN signal and supplies an input to a cathode follower 674 whose output is connected to a terminal which is labeled ENTRY UNITS SWITCH CONTROL. By reference to FIGS. 3b and 3e it is remembered that the ENTRY UNITS SWITCH CONTROL signal is supplied to AND circuits 370 through 379 so as to read out to OR circuits 380 through 389, respectively, which feed to AND circuits 390 through 399, respectively and 400 through 409, respectively. It is, of course, the output from AND circuits 390 through 399 and 400 through 409 that control the core drivers 410 through 419 which produce the output signals U0 through U9, respectively. Assuming the entry counter to have been set by the COUNTER SET signal, a negative output will be produced at U0 and T0 to A$p$ time to assume that all of the cores in the first word position of input buffer are in their binary 0 state. Then at B$p$ time, relatively positive outputs will be produced at U0 and T0 to select the cores in the first word position. The inhibit windings control which of the selected cores will be allowed to to assume the binary 1 state.

Now that a character or a word has been entered into the first storage position in the input buffer, it is necessary to advance the entry units counter so that the second position thereof will be ON. It will be remembered that this is accomplished by way of the signal labeled ENTRY UNITS ADVANCE. This signal is generated in the circuit shown in FIG. 8p. The entry units advance latch is comprised of an OR circuit 675, a double inverter 676 and a cathode follower 677. One of the inputs to OR circuit 675 is the CHARACTER READIN signal. This signal turns the latch ON and results in a relatively positive output voltage from cathode follower 677 to AND circuit 678. This AND circuit is sampled by B$p$ at CU3 time so that an output from AND circuit 678 is supplied through OR circuit 679 to inverter 680. The output signal from inverter 680 will be a negative pulse of the same duration as B$p$ and is supplied to the ENTRY UNITS ADVANCE terminal on FIG. 3d. This results in turning the first stage of the entry units counter OFF and the second stage of the entry units counter ON.

The entry units advance latch in FIG. 8p is turned OFF at CU4 time. This is accomplished by providing an OR circuit 681 which receives the signal CU4 and supplies it to an inverter 682 whose plate shares the plate load in the right side of the double inverter 676. In this manner, the entry units advance latch is turned OFF and the output of cathode follower 677 to AND circuit 678 is no longer relatively positive.

To this point there has been described how a character is placed in the input buffer of storage at CUX time and how the entry units counter is advanced at CU3 time. Just preceding the entry units advance, the character latch shown in FIG. 8g is turned OFF at CU2 time. That is, a signal CU2 is supplied to an inverter 635 whose plate shares the plate load in the right half of the double inverter 633, thereby pulling the latch OFF. Thus, the output signal labeled CHARACTER LATCH is a signal which lasts from CU9 time in one digit time to CU2 time in the next digit time.

When the five-hundred microsecond pulse indicative of the first character terminates, AND circuit 607 will no longer supply a relatively positive input to AND circuit 636. Since the character access latch is being held ON by virtue of a relatively positive output from AND circuit 636, a relatively negative output from this AND circuit will result in the character access latch being turned OFF so that the output from cathode follower 639 will become relatively negative. It will be seen that it is in this manner that inverter 631, which receives the relatively negative output from cathode follower 639, will produce a relatively positive input to AND circuit 630 so that when the next five-hundred microsecond pulse for the next character is produced, AND circuit 630 need only receive in addition the signal CU9 in order to turn the character latch ON again. Thus, when the second character is sensed, AND circuit 607 will be turned on since the CHARACTER SENSE LATCH signal is still relatively positive. When AND circuit 607 supplies a relatively positive output to AND circuit 630, the last-mentioned AND circuit is sampled at CU9 time to turn the character latch ON and thereby produce another CHARACTER LATCH signal. The same process as before described ensues and the second character is stored.

Succeeding characters may be stored in the same manner until the character sense latch in FIG. 7b is turned OFF. Thus, for example, if only five characters existed in the first field, the signals EU4 and ET0 would be supplied to the pair of plug hubs labeled FIELD 1 in FIG. 7a. When the entry units counter advances at the end of the fourth character, AND circuit 619 will supply a relatively positive output through OR circuit 625 to AND circuit 626. It is noted that the other input to AND circuit 626 is a signal labeled CHARACTER LATCH and CU0. This signal is generated in FIG. 8g in a manner now to be described.

The output of the character latch, which is supplied from cathode follower 634, will be relatively positive after the fifth character is sensed and CU9 time has occurred. This relatively positive output is supplied to AND circuit 683 which is sampled at CU0 time and supplies an input through cathode followers 684 and 685, which are connected in parallel, to a terminal labeled CHARACTER LATCH and CU0.

Referring again to FIG. 7a, the output of AND circuit 626 is supplied through an OR circuit 627 and an inverter 628 to turn the character sense latch, which is comprised of inverter 617 and push-pull unit 618, OFF. In this manner, the output at the terminal labeled CHARACTER SENSE LATCH goes relatively negative.

Referring to FIG. 8g, AND circuit 607 will no longer receive a relatively positive input from OR circuit 608 and therefore, the storage of characters from the character sensing apparatus will cease for the moment. By making appropriate plugging through the entry units counter of the pair of plug hubs labeled FIELD 2 in FIG. 7b, it is possible to turn the character sense latch ON again so that the storage of the characters sensed by the character sensing apparatus may be initiated. The same procedure in storing the successive fields ensues.

ERROR CORRECTION

During an error correction operation, the characters in a field which is to be error-corrected are stored in the input buffer in the same manner as the characters from any other information field are stored. In addition, the characters are entered into an adder. When all of the characters in the field have been identified, the sum in the adder is read into the first word position of the error correction buffer.

The circuit for turning error correction on is illustrated in FIG. 12b. There is provided a plurality of pairs of plug hubs which are labeled FIELD 1 through FIELD 8. Above the plug hubs there is provided the legend ERROR CORRECTION ON which indicates that the inputs to these pairs of plug hubs turn error correction on when particular counts exist in the entry units and tens counter. As in FIGS. 7a and 7b, the units and tens positions of the entry counter may be supplied to the pair of plug hubs for each field.

The outputs from the pairs of plug hubs labeled FIELD 1 through FIELD 8 are supplied to AND circuits 690 through 697, respectively. The outputs from these switches are supplied to an OR circuit 698 whose output is labeled ERROR CORRECTION ON. The output of OR circuit 698 is also supplied to the error correction latch 699 which is comprised of an inverter 700 and a push-pull unit 701. The output from the cathode of push-pull unit 701 is labeled ERROR CORRECTION LATCH.

The error correction latch may be turned OFF by the circuitry shown in FIG. 12a. There is provided a plurality of pairs of plug hubs under the legend ERROR CORRECTION OFF. Thus, for example, when it is desired to turn error correction off, a particular units and tens count in the counter is plugged to a pair of plug hubs. It should be noted that while the character sense latch in FIG. 7b may remain ON for several fields, the error correction latch must be turned OFF at the end of one field and then turned ON again for the next field which is to be error-corrected. The output signals from the pairs of plug hubs labeled FIELD 1 through FIELD 8 are supplied to AND circuits 702 through 709, respectively. The output signals from AND circuits 702 through 709 are connected to terminals which are labeled ERROR CORRECTION OFF FIELD 1 through ERROR CORRECTION OFF FIELD 8. In addition, the outputs from AND circuits 702 through 709 are supplied to an OR circuit 710 whose output is connected to a terminal labeled ERROR CORRECTION OFF. The output from OR circuit 710 is supplied to AND circuit 711 which receives the CHARACTER LATCH and CU0 signal. The output from AND circuit 711 is supplied through an OR circuit 712 and an inverter 713 to the right side of the push-pull unit 701, thereby turning the error correction latch 699 OFF.

The ERROR CORRECTION LATCH signal from latch 699 is supplied to an OR circuit 715 in FIG. 8b, the output from this OR circuit being supplied through a cathode follower 716 to AND circuit 717. Since it is desired to not enter information into the adder when an UNCERTAINTY signal is produced, the UNCERTAINTY signal, which is supplied to FIG. 8a by the character sensing apparatus is fed to a single-shot multivibrator 718 in FIG. 8b, the output therefrom being supplied to an inverter 719. If an UNCERTAINTY exists, a relatively positive output will be supplied from the single-shot multivibrator 718 to the inverter 719, thereby placing the inverter in conduction. The output from the inverter will be relatively negative at this time and thereby inhibit AND circuit 714. However, if an UNCERTAINTY signal has not been received, the output from inverter 719 will be relatively positive and will not inhibit AND circuit 717. Another input to AND circuit 717 is the CHARACTER LATCH signal which is generated in FIG. 8g in the manner previously described. The signal CUX is supplied to AND circuit 717 and the circuit is sampled by Bp.

The output from AND circuit 717 is fed to each of AND circuits 720 through 723. The other inputs to AND circuits 720 through 723 are supplied from single-shot multivibrators 600 through 603, respectively. It will be seen that the output from AND circuit 720 will represent the fact that there is an 8 bit in the binary word, that from AND circuit 721 will indicate that there is a 4 bit in the binary word, that from AND circuit 722 will indicate that there is a 2 bit in the word, and that from AND circuit 723 indicates that there is a 1 bit in the word.

Before describing the manner in which the signals from AND circuits 720 through 723 are converted into pulses for entering into the adder, reference is made to FIG. 8c which discloses the adder. The adder is comprised of four stages, each stage being in the form of a trigger. Thus, triggers 724 through 727 make up the adder. The output of the first stage is coupled by way of a capacitor 744 to the grid of an inverter 745, said grid being connected to the midpoint of a voltage divider which comprises resistors 746 and 747. One end of resistor 746 is connected to a negative source of D.C. potential and the lower end of resistor 747 is connected to ground. The tapped plate output of inverter 745 is supplied to both grids of trigger 725. Thus, for example, when trigger 724 has been turned ON and thereafter turned OFF, a positive pulse is supplied to inverter 745 which, in turn, supplies a negative pulse to both sides of trigger 725. At the same time, the output of inverter 745 supplies a negative-going voltage to the grid of the left side of trigger 727. The effect of this input is to turn trigger 727 OFF if it was ON. The output from the right side of trigger 725 is coupled to both of the grids of trigger 726, and the output from the right side of trigger 726 is connected to the grid of the right side of trigger 727. In the adder shown, pulses may be entered to trigger 724 or to trigger 725. It will be seen that a pulse entering trigger 724 will add a count of one into the adder while a pulse entering trigger 725 will add a count of two into the adder. In order to make triggers 724 through 727 function as a decimal adder capable of returning to zero after a count of ten, the output from the plate of the left side of trigger 727 is connected by a capacitor 786 to the midpoint of a voltage divider formed by resistors 788 and 789. The aforementioned midpoint is connected to inverter 787 whose plate shares the plate load with the right half of trigger 725. Thus, when trigger 727 is ON and an input is supplied from inverter 745 to triggers 725 and 727, trigger 727 turns OFF and in so doing, biases trigger 725 to remain OFF until after the output of inverter 745 terminates. Since the above action ensues after a count of ten and the adder returns to zero, the proper action has occurred.

The adder is adapted to be reset to zero at the beginning of an error correction operation. Referring to FIG. 8h, there is furnished an AND circuit 1030 which receives the ERROR CORRECTION ON signal and the CHARACTER READIN signal and supplies an output through an OR circuit 1031 to AND circuit 1032. This circuit is sampled by Ap and supplies an input to the single-shot multivibrator 1033. The output from this single-shot multivibrator 1033 is a seven and one-half microsecond positive pulse which is supplied to an inverter 1034. The plate of this inverter is coupled by diodes 1035, 1036, 1037 and 1038 to the plates of the right sides of triggers 724, 725, 726 and 727, respectively. Since the plate of inverter 1034 shares the plate load in each of the triggers, each trigger will be reset OFF so that there is a count of zero therein prior to the entry of any information into the adder from the field to be error-corrected.

Referring now to FIG. 8b, the manner in which the output signals from AND circuits 720 through 723 are converted into pulses representative of the particular number in the AND circuits will now be described. The output of AND circuit 723 is supplied through an OR circuit 728 to an inverter 729, the output from the last-mentioned inverter being connected to both grids of trigger 724. Thus, for example, if AND circuit 723 supplies a relatively positive output signal, a count of one will be entered into the adder.

If AND circuit 722 supplies an output, indicating that there is a 2 bit in the word, a relatively positive voltage will be supplied through OR circuit 730 to a single-shot multivibrator 733. The last-mentioned single-shot multivibrator produces a twenty microsecond positive pulse in response to the input signal thereto, this pulse being supplied through an inverter 737 to an inverter 740. The output from AND circuit 721 indicates that there is a 4 bit in the word. This relatively positive voltage is supplied through an OR circuit 731 to each of the single-shot multivibrators 734 and 735. Single-shot multivibrator 734 will produce a thirty microsecond pulse which is supplied through inverter 738 to inverter 741. On the other hand, single-shot multivibrator 735 will supply a positive pulse of forty microseconds duration through inverter 714 to inverter 742. If there is an 8 bit in the word, a relatively positive voltage will be supplied from AND circuit 720 to OR circuit 732 whose output is also connected to OR circuits 730 and 731. The output of OR circuit 732 is also connected to a single-shot multivibrator 736 which produces a fifty microsecond positive pulse that is supplied through inverter 739 to inverter 743.

It will be seen that the plates of each of the inverters 740 through 743 share the plate load of inverter 745 in FIG. 8c so as to form a logical OR circuit. The fact that each of the single-shot multivibrators 733 through 736 supply different length positive pulses is quit important. It will be seen that the output from AND circuit 723 was supplied without delay to the trigger 724. Thus, if trigger 724 was already ON, it would have had time to turn OFF and supply a carry pulse through inverter 745 to trigger 725 before the end of the twenty microsecond pulse from single-shot multivibrator 733. Should there be a twenty microsecond pulse from single-shot multivibrator 733, the trailing edge of this pulse will result in a negative-going voltage being supplied from inverter 745 to trigger 725. Suppose now that there had been a binary 4 bit in the word so that an output is supplied from AND circuit 721. Since the output of AND circuit 721 is supplied to each of the single-shot multivibrators 734 and 735, the trailing edge of the pulses from these single-shot multivibrators will occur at different times, i.e. the trailing edge of the positive pulse from the single-shot multivibrator 735 will occur ten microseconds following the trailing edge of the positive pulse from single-shot multivibrator 734. This means that two negative pulses would be supplied to trigger 725 in succession. Should there be an 8 bit in the word, edge of the positive output pulses from these single-shot multivibrators 733 through 736. However, the trailing edge of the positive output pulses form these single-shot multivibrators all occur at different intervals and result in four separate negative-going pulses being supplied to trigger 725. Since these last-mentioned pulses are entered into the second stage of the counter, a count of eight will be entered into the counter.

The outputs from the right sides of triggers 724 through 727 are supplied through cathode followers 748 through 751, respectively, to the terminals labeled ADDER OUTPUT 1, ADDER OUTPUT 2, ADDER OUTPUT 4 and ADDER OUTPUT 8, FIG. 8i.

Since it is now necessary to generate a redundancy or R bit for the units order digit of the field sum, there is provided a circuit on FIG. 8i for this purpose. By reference to FIG. 21a, it will be seen that an R bit is generated only for the decimal digits 0, 3, 5, 6 and 9. However, since the information being supplied from cathode followers 748 through 751 is in a binary coded decimal form, the problem of generating the redundancy bit is somewhat complicated.

There is provided an OR circuit 752 which receives a first input from cathode follower 748. The second input to OR circuit 752 comes from an OR circuit 753 which is connected to receive inputs from cathode followers 749 through 751. Since the cathode followers 748 through 751, respectively, indicate the 1, 2, 4 and 8 bits of the sum in the adder, the output from OR circuit 753 may be termed $2+4+8$. Therefore, the output from OR circuit 752 may be termed $1+2+4+8$. That is, there will be a relatively positive output from OR circuit 752 if there is an output from any one of the cathode followers 748 through 751. The output from the OR circuit 752 is connected to an inverter 754 whose output will be relatively negative for a relatively positive input. However, the output from inverter 754 will be relatively positive under the circumstances when all of the outputs from cathode followers are relatively negative. Therefore, the output from the inverter 754 may be labeled $\overline{1+2+4+8}$. This output is connected to a terminal which is labeled ZERO IN ADDER. That is, the adder contains a count of zero if the output from inverter 754 is relatively positive. It is noted that the output of the inverter is also connected to an OR circuit 755. This means that if the output of the inverter 754 is relatively positive and indicates $\overline{1+2+4+8}$, a relatively positive input will be supplied to OR circuit 755 which will produce an output therefrom labeled ADDER OUTPUT R. If this is now checked with FIG. 21a, it will be seen that for the decimal digit 0, a binary 1 is required for the redundancy bit R.

An AND circuit 756 is connected to receive the output from cathode follower 748 as well as the output from OR circuit 753. The other input to AND circuit 756 will be relatively positive when there is an absence of positive pulses representing the 1, 2 and 4 bits of the adder output. This last-mentioned input signal is generated by utilizing AND circuit 757 which receives outputs from cathode followers 749 and 750. Therefore, the output of AND circuit 757 may be termed $2 \cdot 4$. This signal is supplied through a cathode follower 758 to AND circuit 759 which receives, in addition, the output from the cathode follower 748. Thus, the output from AND circuit 759 may be termed $1 \cdot 2 \cdot 4$. An inverter 760 is connected to receive this signal from AND circuit 759 so as to produce the signal $\overline{1 \cdot 2 \cdot 4}$. Therefore, if all of the inputs to AND circuit 756 are relatively positive in coincidence, the output signal therefrom will be indicative of the fact that there is a 1 bit and either a 2 bit or a 4 bit or an 8 bit, and not a coincidence of a 1 bit and a 2 bit and a 4 bit. Thus, the output from AND circuit 756 may be labeled $1 \cdot (2+4+8) \cdot (\overline{1 \cdot 2 \cdot 4})$. In the event of this signal, an R bit is produced from OR circuit 755. This arrangement generates an R bit for the decimal numerals 3, 5 and 9.

The output of inverter 760 is also supplied to AND circuit 761, this output being termed $\overline{1 \cdot 2 \cdot 4}$. The other input to AND circuit 761 is $2 \cdot 4$ from cathode follower 758. Thus, the output from switch 761 may be termed $2 \cdot 4 \cdot (\overline{1 \cdot 2 \cdot 4})$. That is, if there is a 2 bit and a 4 bit in the word, and there is not the coincidence of a 1 bit and a 4 bit, then an R bit should be produced. This takes care of supplying an R bit for the decimal numeral 6.

To this point, there has been described the manner in which the characters from an error correction field are entered into the adder and the manner in which the output from the adder is continuously supplied to the R bit generator on FIG. 8i to generate the R bit. It is desirable in the input buffer of the core array to identify the first and last characters in an error correct field. Referring now to FIG. 8k, there is provided an AND circuit 765 which is connected to receive the signal ERROR CORRECTION ON which was generated in FIG. 12b. The other input to AND circuit 765 is the signal CHARACTER READIN. Thus, when the first character is read after error correction has been turned on, an output signal will be supplied through AND circuit 765 and OR circuit 766 to an inverter 767. The output of the inverter 767 will therefore go relatively negative and will inhibit AND circuit 768. The output of this AND circuit will be relatively negative and will prevent a half-current pulse from being produced at terminal I$h$6 of core driver 769. Therefore, the first character in the error correction field will have a 6 bit included therewith.

When the entry units counter advances to the point where the core array is ready to store the last character in the error correct field, voltages will be supplied from the pair of plug hubs labeled FIELD 1 in FIG. 12a to AND circuit 702. The output from this circuit will be relatively positive and when supplied through OR circuit 710 will produce a signal labeled ERROR CORRECTION OFF.

There is provided an AND circuit 770 in FIG. 8k which is connected to receive the ERROR CORRECTION OFF signal and the CHARACTER READIN signal. Thus, for example, when the entry units counter has advanced to the position for reading the last character, and the last character has been identified and resulted in the production of a CHARACTER READIN signal, an output is supplied from AND circuit 770 through OR circuit 766 and inverter 767 to inhibit AND circuit 768. This, of course, causes a 6 bit to be entered with the last character in the field.

Once all of the characters in the field which is to be error corrected have been identified, and supplied to the adder, it is desired to enter the sum in the adder into the error correction buffer. Referring to FIG. 8r, there is provided an AND circuit 771 which is adapted to receive the signal CHARACTER LATCH and the signal ERROR CORRECTION OFF, and which is sampled at CU1 time so as to supply an input to OR circuit 772 which in turn feeds to a double inverter 773. The output of the inverter 773 is supplied to a cathode follower 775 whose output is fed back to the OR circuit 772. It will be appreciated that OR circuit 772, double inverter 773 and cathode follower 775 form a latch which is provided with a reference numeral 774. Thus, once a relatively positive input is supplied to OR circuit 772 from AND circuit 771, the latch will turn ON, and by feeding the output of cathode follower 775 back to the OR circuit 772, it is possible to retain the latch ON. The output of cathode follower 775 is connected to a terminal which is labeled READIN FIELD SUM LATCH. Latch 774 comes on at CU1 time, since AND circuit 771 is sampled at CU1 time, and goes OFF at the next CU0 time. This is accomplished by feeding the signal CU0 to an inverter 776 whose plate is connected to the plate of the right side of double inverter 773, thereby turning the latch OFF.

The READIN FIELD SUM LATCH signal from cathode follower 775 is also supplied to AND circuit 777 which is sampled at the next CUX time to produce a relatively positive output signal which is fed to cathode follower 778. The output signal from the cathode follower is connected to a terminal which is labeled READIN FIELD SUM. The output from AND circuit 777 is also connected through an OR circuit 779 and a cathode follower 780 to a terminal which is labeled ENTER ADDER INTO STORAGE.

Referring now to FIG. 8f, there is provided a plurality of AND circuits 781 through 785 which are respectively connected to receive the adder output signals 8, 4, 2, 1 and R which are supplied from FIG. 8i. The other input to each of the AND circuits 781 through 785 is the ENTER ADDER INTO STORAGE signal which was produced at CUX time in FIG. 8r. Therefore, the output of the adder, which is present at the input of AND circuits 781 through 785, will be supplied through OR circuits 650 through 654, respectively, and inverters 655 through 659, respectively, to AND circuits 660 through 664, respectively. In this manner, the R, 1, 2, 4 and 8 bits of the adder output may be used to supply the proper signals to the terminals I$h$R, I$h$1, I$h$2, I$h$4 and I$h$8 in FIG. 8k and FIG. 9. It is also desirable to enter a 6 bit with the adder sum which is to be placed in error correction buffer. This is accomplished by supplying the READIN FIELD SUM signal, which is also generated at CUX time, through OR circuit 766 and inverter 767 to switch 768, FIG. 8k. Thus, the output from switch 768 will be relatively negative and will not allow a negative half-current pulse to be produced at the terminal I$h$6 which is connected to core driver 769.

To this point, there has been described the manner in which the information from the adder controls the inhibit windings. There still remains the matter of selecting the proper units and tens windings in order to store the sum in the adder in the proper word position of error correction buffer. Arbitrarily, the field sum from the first information field which is error corrected is assigned to the first word position in error correct buffer.

Referring to FIGS. 3b and 3e, there is provided a plurality of cathode followers 791 through 798 which are adapted to receive the signals ERROR CORRECTION OFF FIELD 1 through ERROR CORRECTION OFF FIELD 8, respectively, from FIG. 12a. The output signals from cathode followers 791 through 798 are supplied to AND circuits 801 through 808, respectively. The other input to each of the AND circuits is the READIN FIELD SUM signal. The outputs from AND circuits 801 through 808 are supplied through OR circuits 380 through 387, respectively, to AND circuits 390 through 397, respectively and AND circuits 400 through 407, respectively. It is these last two sets of switches which control the core drivers 410 through 417 to produce signals at the units order winding terminals U0 through U7, respectively. Since it has been assumed that the first field which is error corrected will be stored in the first position in error correct buffer, the terminal labeled ERROR CORRECTION OFF FIELD 1 in FIG. 12a is connected to the terminal having the same legend in FIG. 3b. Therefore, the output from AND circuit 801, FIG. 3b, will be relatively positive after the last character in the first field has been sensed and a READIN FIELD SUM signal is produced. This relatively positive voltage is supplied from AND circuit 801 through OR circuit 380 to AND circuits 390 and 400. The output of AND circuit 390 is sampled by A$p$ and results in a negative half-current pulse being supplied from the core driver 410 to terminal U0. The signal B$p$ samples AND circuit 400 and results in a positive half-current pulse being supplied to terminal U0 which is connected to core driver 410. Therefore, it is seen that the winding connected to terminal U0 in FIG. 9 has been selected so that insofar as the units winding is concerned, the proper position in error correction buffer will be obtained.

Since there is only one tens winding in the error correction buffer, it is only necessary to produce a signal at terminal ECT in FIG. 9. This is accomplished first by supplying the READIN FIELD SUM LATCH signal through an OR circuit 810 to a cathode follower 811 in FIG. 8u. The output of cathode follower 811 is connected to a terminal which is labeled CORRECTION TENS CONTROL. The CORRECTION TENS CONTROL signal is supplied to AND circuits 521 and 522, on FIG. 4b. It will be seen from the previous description that a negative half-current pulse will be produced at the terminal ECT at A$p$ time and that a positive half-current pulse will be produced at said terminal at B$p$ time.

From the above-detailed description, it will be seen that the proper word position has been determined in the error correction buffer in which the sum from the adder for the first error correct field is to be entered. That is, the inhibit windings have been selected to assure that the proper output of the adder goes into the error correction buffer, and the units order windings and tens order windings have been selected to assure that the proper position is provided for the sum from the adder.

It will be remembered that normally the CHARACTER READIN signal is applied through an OR circuit 675 to a double inverter 676 in the entry units advance latch on FIG. 8p. That is, when the CHARACTER READIN signal occurs, the entry units advance latch is turned ON so that the entry units counter may be advanced at CU3 time following the occurrence of the CHARACTER READIN signal. When it is necessary to read in the field sum from the adder to the error correction buffer, it is desirable to withhold advance of the entry units counter after the last character in an error correction field has been identified until after the field sum has been read into error correction buffer. The reason for this is that the signals supplied from one of the AND circuits 702 through 709 in FIG. 12a is employed to gate the field sum into the proper location in the error correction buffer. Since these signals are dependent upon the position of the entry units and tens counters for their generation, the advance of the entry units counter must be inhibited until the readin field sum operation is completed. Therefore, when the last character in a field results in producing a CHARACTER READIN signal, the latch comprising OR circuit 675, double inverter 676 and cathode follower 677, FIG. 8p, is turned ON. However, it is turned OFF before the output can be sampled in AND circuit 678 by CU3 and Bp pulses. AND circuit 812 is connected to receive the signals CHARACTER LATCH and READIN FIELD SUM LATCH. The CHARACTER LATCH signal lasts from CU9 time to CU2 time while the READIN FIELD SUM LATCH signal occurs at CU1 time. These two signals in coincidence will result in a relatively positive voltage being applied through OR circuit 681 to inverter 682. Since the plate of inverter 682 is tied to the plate of the right side of double inverter 676, the entire latch will be turned OFF so that a relatively negative voltage will be supplied to AND circuit 678 from cathode follower 677. Since the latch is OFF at CU1 time, it will be seen that when the CU3 signal is supplied to switch 678 no outputs can be produced therefrom. Thus, the ENTRY UNITS ADVANCE signal will not be produced at CU3 time from inverter 680.

The character latch shown in FIG. 8g is turned OFF at CU2 time by way of inverter 635. The READIN FIELD SUM signal which occurs at the next CUX time will be supplied through OR circuit 675 in FIG. 8p to turn the entry units advance latch ON and provide a relatively positive output from cathode follower 677 to AND circuit 678. Thereafter, at CU3 time, AND circuit 678 will be sampled by Bp and an output will be supplied through OR circuits 679 to inverter 680. The output of the inverter is the ENTRY UNITS ADVANCE signal which is in the form of a negative pulse, this signal being supplied to the entry units advance line in FIG. 3d.

From the above, it is seen that the entry units counter in FIG. 3d is not advanced immediately upon the receipt of the last character of an error correction field. During the period following the receipt and storage of the last character, the field sum from the adder is read into error correction buffer and then at a later time the ENTRY UNITS ADVANCE signal will be produced to advance the entry units counter.

The present invention in the embodiment illustrated has the capacity to error correct as many as eight different fields of characters. Information from each of the fields to be error corrected is handled in the manner described above for the first field, the only difference being the fact that the remaining fields are successively stored in the error correction buffer in word positions 2 through 8. This is accomplished by virtue of the signals ERROR CORRECTION OFF FIELD 2 through ERROR CORRECTION OFF FIELD 8 which are supplied to cathode followers 792 through 798, respectively, on FIGS. 3b and 3e.

To this point in the description, there has been described the operation of a first embodiment of the invention during the reading of the various information fields in the record. It was explained that the characters in all selected information fields are stored in the input buffer of the core array shown in FIG. 9. It was also explained how the characters from each field which is to be error corrected are supplied to the adder. This adder is capable of counting repetitively to ten so that the condition of the adder at the end of an error correction field will be such that the units order digit of the sum of all the characters as recognized will be in the adder. This digit is read into the error correction buffer from the adder at the end of the error correction field.

CHECK DIGIT FIELD

After the information fields have been scanned, the check digit field is scanned. The first check digit in the check digit field will be equal to the units order digit of the sum of the characters in the first field which is error corrected, the second check digit in the check digit field will be equal to the units order digit of the sum of the characters in the second field which is error corrected, etc. The characters in the check digit field need not be stored in the input buffer since they are usually not part of the information which it is desired to supply as an output to the punch or other device which is to receive the information from the core array. Therefore the character sense latch in FIG. 7b will not be turned ON at this time.

It will be remembered from FIG. 8g that one of the conditions required in order to produce the CHARACTER READIN signal was that a signal $\overline{\text{CHECK DIGIT FIELD}}$ must be supplied to AND circuit 640. That is, in order to produce the CHARACTER READIN signal, the scanning device must not have been scanning characters in the check digit field. The $\overline{\text{CHECK DIGIT FIELD}}$ signal is produced in the circuitry in FIG. 8m by taking the output of an inverter 815, which is normally relatively positive, and supplying it through to a cathode follower 816 whose output is connected to a terminal which is labeled $\overline{\text{CHECK DIGIT FIELD}}$.

To prevent the production of the CHARACTER READIN signal, it is necessary to make the input to switch 640, FIG. 8g, which is labeled CHECK DIGIT FIELD, relatively negative. This is accomplished in FIG. 8m by utilizing an AND circuit 817 which is connected to receive inputs from particular positions of the outputs of the entry units and entry tens counters previously described. At the same time, AND circuit 817 is adapted to receive an input signal representing some specific field mark which is positioned ahead of the first character in the check digit field. For example, if an asterisk (*) was used to precede the first character in the check digit field, the output from the character sensing apparatus 589 in FIG. 8a representing the asterisk symbol would be supplied to AND circuit 591. The plug hub connected to the AND circuit 591 would then be connected to the plug hub which is connected to AND circuit 817 which is labeled SPECIFIC FIELD MARK.

The other input to AND circuit 817 is supplied from a circuit now to be described. There is provided a check digit field access latch which is comprised of a double inverter 818 and a cathode follower 819. The output from the double inverter 818 is normally relatively negative so that the output of cathode follower 819 to inverter 821 will be also relatively negative. The output of inverter 821 will be relatively positive and will be supplied to AND circuit 817. It is the check digit field access latch which allows the first check digit to come in and produce a CHECK DIGIT FIELD signal. The output of AND circuit 817 is supplied through a cathode follower 822 to OR circuits 823 and 824. It will be seen that the output of OR circuit 823 will be relatively positive, and when supplied through inverter 815, will produce a relatively negative input to cathode follower 816. This means that the output of cathode follower 816 at the terminal labeled $\overline{\text{CHECK DIGIT FIELD}}$ will also be relatively negative and will thereby inhibit AND circuit 640 in FIG. 8g. Thus, a CHARACTER READIN signal cannot be produced from cathode followers 641 and 642 which are connected to receive the output of AND circuit 640.

The relatively positive voltage supplied from cathode follower 822 through OR circuit 824 to an inverter 825 results in a relatively negative voltage being supplied from inverter 825 to an inverter 820. Inverters 825 and 820 are capacitively coupled so that the negative-going voltage from inverter 825 only results in turning inverter 820 further off which, of course, has no effect on the double inverter 818 which is part of the check digit field access latch. However, when the output voltage from AND circuit 817 goes negative, the output voltage from inverter 825 rises positively and causes a positive-going input to inverter 820. This produces a negative-going voltage from inverter 820 which shares the plate load of the left side of the double inverter 818 and results in producing a positive-going voltage from the double inverter 818 which is supplied to cathode follower 819. The output of the cathode follower is supplied back to the grid of the left side of the double inverter 818 and holds the check digit field access latch ON. The output of cathode follower 819 is also supplied to inverter 821 so that the output of inverter 821 drops relatively negative and inhibits AND circuit 817, thereby preventing additional signals from being supplied from AND circuit 817 for the first character in the check digit field.

It will be remembered that the voltage at the terminal labeled $\overline{\text{CHECK DIGIT FIELD}}$ is relatively negative when the output from switch 817 initially becomes relatively positive. This voltage is supplied through an OR circuit 826 to an inverter 827. The output of this inverter is relatively positive and is supplied through a cathode follower 828 to a terminal which is labeled CHECK DIGIT FIELD. At the same time, the output voltage from cathode follower 828 is fed back to OR circuit 823 to keep a relatively positive input to inverter 815 even after the output from switch 817 drops relatively negative. It will be seen, therefore, that OR circuit 823, inverter 815, cathode follower 816, OR circuit 826, inverter 827 and cathode follower 828 form a latch which may be termed the check digit field latch. This latch has now been turned ON and will remain ON until all of the characters in the first check digit field have been identified. It was the check digit field access latch comprising double inverter 818 and cathode follower 819 which permitted the check digit field latch to turn ON.

Referring now to FIG. 8b, it will be seen that OR circuit 715 is connected to receive the CHECK DIGIT FIELD signal and supply it through a cathode follower 716 to AND circuit 717. Assuming that an UNCERTAINTY signal has not been produced, the output from inverter 719 to AND circuit 717 will also be relatively positive. The CHARACTER LATCH signal supplied to AND circuit 717 will also be relatively positive when the first character in the check digit field has been identified. It will be seen that this is true by referring to FIG. 8g. Since the first character in the check digit field will result in a relatively positive input to OR circuit 606, a first input will be supplied to AND circuit 607. OR circuit 608 receives the CHECK DIGIT FIELD signal from cathode follower 828 in FIG. 8m and supplies the second input to AND circuit 607. The output from AND circuit 607 is supplied to AND circuit 630 which also receives a relatively positive input from inverter 631 at this time. AND circuit 630 is sampled at CU9 time and the output thereof will turn on the character latch which is comprised of OR circuit 632, double inverter 633 and cathode follower 634. The output from cathode follower 634 is the CHARACTER LATCH signal which will be relatively positive and serves as an input to AND circuit 717 in FIG. 8b.

Referring again to FIG. 8b, AND circuit 717 is sampled during CUX time by Bp so as to supply an output to each of AND circuits 720 through 723. As described heretofore, AND circuits 720 through 723 are connected to receive the outputs from single-shot multivibrators 600 through 603, respectively. The output signals from these switches provide an input into the adder which is equal to the decimal value of the first character in the first check digit field.

Once the first character in the check digit field has been entered into the adder, it is necessary to read out the first field sum in the error correction buffer, complement it and supply it to the adder. When this is accomplished, the adder will contain the corrected digit. The corrected digit is then read back into the first word position in the error correction buffer. This entire operation must be accomplished before the signal representing the next check digit in the check digit field is allowed to enter the adder.

Reference is made to FIG. 8q which includes a check digit delay latch 829, a readout field sum latch 835 and a readin corrected digit latch 839. These latches are successively turned ON in order during the operation which must now be performed. Starting with all of the latches OFF, the output from the readin corrected digit latch 839 which is supplied from the cathode follower 841 to an inverter 842 will be relatively negative. Therefore, the output from inverter 842 will be relatively positive and is supplied to each of the AND circuits 830, 831 and 836. AND circuit 830 is connected to receive in addition the CHECK DIGIT FIELD signal and the CHARACTER LATCH and CU0 signal. It will be remembered that the CHECK DIGIT FIELD signal is supplied from FIG. 8m while the CHARACTER LATCH and CU0 signal is supplied from FIG. 8g. When the inputs to AND circuit 830 occur relatively positive in coincidence, an output signal is supplied therefrom through OR circuit 832 to the double inverter 833. The output of the double inverter 833 is supplied through a cathode follower 834 to AND circuit 831. The other input to AND circuit 831 is supplied from AND circuit 843 which receives the signals CUX and Ap. When these signals occur in coincidence, a relatively positive output is supplied from the AND circuit through a cathode follower 844 to an inverter 845. However, before the signals CUX and Ap occur in coincidence, the output of inverter 845 will be relatively positive and therefore AND circuit 831 will supply a relatively positive voltage to the OR circuit 832 which will hold the check digit delay latch 829 ON.

When AND circuit 843 receives the signals CUX and Ap in coincidence, a relatively negative voltage will be supplied from inverter 845 to AND circuit 831 and result in the check digit delay latch 829 being turned OFF. When this occurs, a negative-going output voltage is supplied to the grid of the double inverter 837 in the readout field sum latch 835. This causes a relatively positive output signal to be supplied from the right side of the double inverter 837 to the cathode follower 838. The output from cathode follower 838 is supplied back to AND circuit 836 to hold the latch ON and in addition is supplied to a terminal labeled READOUT FIELD SUM LATCH.

When the READOUT FIELD SUM LATCH signal is produced, it is supplied to OR circuit 891 on FIG. 8u whose output is supplied to an inverter 1011. The output of this inverter is supplied to a cathode follower 1012 whose output is connected to a terminal labeled INHIBIT CONTROL TENS ADVANCE. Thus, the READOUT FIELD SUM LATCH signal inhibits the control tens advance in the control tens counter. The reason for this is due to the fact that when a readout to punch operation is being performed in conjunction with the present operation, it is desirable to stop the readout to punch at a particular time so that when it is possible to again read out to the punch after the first check digit has been processed, the punch can pick up with the readout operation where it left prior to the time that the first check digit was to be processed. The output of OR circuit 891 in FIG. 8u is also supplied through OR circuit 810 and cathode follower 811 to an OR circuit 1013. The output of the last-mentioned OR circuit is supplied to the push-pull unit 1014 so that the output therefrom drops relatively negative, thereby supplying a relatively negative voltage to the terminal labeled CONTROL TENS SWITCH CONTROL. It will be seen from FIG. 4b that if the signal CONTROL TENS SWITCH CONTROL goes negative, AND circuits 544 through 549 will be inhibited at this time and therefore outputs will not appear on terminals OT0 through OT5.

There is one further thing which occurs when the READOUT FIELD SUM LATCH signal is produced and that is that the readout to punch is inhibited. This is accomplished by the circuit shown on FIG. 8t comprising an OR circuit 1015 which is connected to receive the above-referenced signal from cathode follower 838 in FIG. 8q. The output of this OR circuit is supplied to the push-pull unit 1016 whose output will be relatively negative for the duration of this signal. The output from push-pull unit 1016 is termed READOUT TO PUNCH but it is operative to cause such an operation only when it is relatively positive.

When the signals CUX and Ap again occur in coincidence at the beginning of the next cycle of the control counter, AND circuit 843 in FIG. 8q will supply a relatively positive voltage through cathode follower 844 to inverter 845, the output from the inverter thereby becoming relatively negative and resulting in turning OFF the READOUT FIELD SUM LATCH 835. When this occurs, an output is taken from the right side of double inverter 837 and supplied to a double inverter 846 which is part of the readin corrected digit latch 839, thereby turning the latch ON. The output from double inverter 846 is supplied through a cathode follower 841 to the terminal READIN CORRECTED DIGIT LATCH. At the same time, the output of cathode follower 841 is supplied back to AND circuit 847 which is also connected to receive the output of inverter 845, the output of this AND circuit holding latch 839 ON. However, at the beginning of the next cycle of the control counter when the signal CUX and Ap occur in coincidence, there will be a relatively negative input to AND circuit 847 from inverter 845 which will turn the readin corrected digit latch 839 OFF.

In summary, referring to FIG. 8q, there has been described how the check digit delay latch 829 is turned ON by the CHECK DIGIT FIELD and CHARACTER LATCH and CU0 signals. At the beginning of the next cycle of the control counter, the check digit latch is turned OFF by the signals CUX and Ap so that the check digit delay latch in going OFF turns the readout field sum latch 835 ON. The last-mentioned latch is turned OFF at the beginning of the next cycle by CUX and Ap. As this last-mentioned latch goes OFF, the output thereof is supplied to the readin corrected digit latch 839, which is thereby turned ON. At the beginning of the following cycle, the signals CUX and Ap turn the readin corrected digit latch 839 OFF.

As the first character in the check digit field is being supplied to the adder, a CHARACTER LATCH and CU0 signal is produced from cathode followers 684 and 685 in FIG. 8g. This signal is supplied to AND circuit 830 along with a CHECK DIGIT FIELD signal and a signal indicative of the fact that the readin corrected digit latch 839 is OFF. The output of switch 830 turns the check digit delay latch 829 ON as previously described. The first check digit is entered into the adder during the same interval. At the beginning of the next cycle of the control counter, CUX and Ap pulses occur in coincidence and turn the check digit delay latch 829 OFF which turns on the readout field sum latch 835, thereby producing an output signal from cathode follower 838 labeled READ-OUT FIELD SUM LATCH. It will be seen that the READOUT FIELD SUM LATCH signal is supplied during CUX time. Referring to FIG. 8u, the last-mentioned signal is supplied through OR circuits 891 and 810 to cathode follower 811. The output of the last-mentioned cathode follower is supplied to a terminal which is labeled CORRECTION TENS CONTROL. Since the READOUT FIELD SUM LATCH signal and the CORRECTION TENS CONTROL signal occur during CU0 time, the first word in the error correction buffer will be read out to the adder. This is due to the fact that there will be an input to terminals U0 and ECT in FIG. 9. The input to terminal U0 is produced as a result of the fact that the control units counter supplies an output signal CU0 at this time. The input signals to terminal ETC result from the fact that the signal CORRECTION TENS CONTROL is supplied to AND circuits 521 and 522 in FIGS. 4b and 4d, which circuits respectively receive Ap and Bp.

As previously described, it is during the Ap time that the first word in error correction buffer is read out into the adder. It should be noted, however, that the first word in error correction buffer is not supplied to the adder in direct form but is instead supplied thereto in 9's complement form.

When the sense latches in FIG. 8e are set up with the information in the first word position of the error correction buffer at Ap time, the outputs from the latches are supplied to a 9's complementing circuit shown in FIG. 8d. The 9's complement of a particular number from 0 through 9 is found by subtracting the particular number from 9. Thus, the 9's complement of the digit 6 would be 3. It will be seen from FIG. 8e that the output signals from inverter followers 870 through 873 respectively represent the 8, 4, 2 and 1 bits in an information word. In this instance, the outputs represent the particular bits of the first word from error correction buffer since it is this word which has been selected from the core array.

Referring to FIGS. 8d and 8e, the 1 bit output from inverter-follower 873, which occurs at Ap time, is supplied to an inverter 892 whose output is connected to AND circuit 893. Thus, if the output from inverter-follower 873 is relatively negative there is not a 1 bit in the word and the output from inverter 892 will be relatively positive to represent $\bar{1}$. The output signal from inverter-follower 872 is supplied to OR circuit 894, AND circuit 895 and OR circuit 896. These inputs may be labeled 2, meaning that if the output from inverter-follower 872 is relatively positive, it represents the fact that there is a 2 bit in the word. The output from inverter-follower 871, which will be relatively positive if there is a 4 bit in the word, is also supplied to OR circuit 894, AND circuit 895 and OR circuit 896. The output signal from inverter-follower 870, which is relatively positive when there is an 8 bit in the word, is supplied to OR circuit 896.

The output from OR circuit 894, which may be termed 2+4, is supplied to AND circuit 897. AND circuit 895 will supply an output which will be relatively positive when there is a coincidence of a 2 bit and a 4 bit in the word in the sense latches of FIG. 8e, this output being termed 2·4. When the output of AND circuit 895 is supplied to an inverter 898, the output of the inverter will be labeled $\overline{2 \cdot 4}$. AND circuit 897 is also connected to receive an input from inverter 898 so that the output therefrom may be termed $2+4 \cdot \overline{(2 \cdot 4)}$. There is provided an AND circuit 899 which is connected to receive the 2 bit signal from inverter follower 872 of FIG. 8e. The output from OR circuit 896 will be relatively positive when there is a 2 bit, a 4 bit or an 8 bit in the word stored in the sense latches. Therefore, this output may be termed 2+4+8. An inverter 1000 is connected to receive the output of OR circuit 896 so that its output may be termed $\overline{2+4+8}$. AND circuit 1001 is connected to receive the output of inverter 1000.

Since the information in the first word position of error correction buffer is read out into the sense latches at Ap time, the inputs to AND circuits 893, 897, 899 and 1001 will also be supplied at Ap time. The 9's complement of this number now exists at AND circuits 893, 897, 899 and 1001. That is, the 1, 4, 2 and 8 bits in 9's complement form exists at AND circuits 893, 899 and 1001, respectively. The information in these switches is read out at Bp time under the control of a READOUT FIELD SUM signal which is generated in FIG. 8r.

Referring to FIG. 8r, there is provided a 6 bit control latch 1004. This latch is comprised of an OR circuit 1005 which is connected to receive the signal CU0. The output of the OR circuit is supplied through a double inverter 1006 whose output is supplied through a cathode follower 1007 back to the OR circuit 1005. The 6 bit control latch will be turned ON, if it is OFF, by CU0 so as to produce a relatively positive output signal from the cathode follower 1007. The 6 bit control latch is turned OFF by the end of a SENSE LATCH 6 signal. That is, the last-mentioned signal is supplied to an inverter 1405 whose output is supplied to inverter 1406. Inverter 1406 has a capacity coupled input circuit. Therefore, the negative-going trailing edge of the SENSE LATCH 6 signal causes a positive-going input pulse to inverter 1406. This results in a negative-going pulse out of the latter inverter which turns the latch 1004 OFF. While latch 1004 is ON, a relatively positive output signal is supplied to AND circuit 1008 which also receives the READOUT FIELD SUM LATCH signal from the readout field sum latch 835 in FIG. 8q. The other input to AND circuit 1008 is the SENSE LATCH 6 input which is supplied from inverter 868 in FIG. 8e.

When all of the inputs to switch 1008 are relatively positive in coincidence an output will be supplied through a cathode follower 1009 to produce the READOUT FIELD SUM signal. The last-mentioned signal is supplied to AND circuit 1002 in FIG. 8d which also receives Bp. The output of this AND circuit is supplied through a cathode follower 1003 to each of the AND circuits 893, 897, 899 and 1001. Therefore, since the last-mentioned AND circuits have been described as receiving one of their inputs relating to the 9's complement of the first word in error correction buffer at Ap time, they are read out at Bp time.

The next step is to get the 9's complement of the first word in the error correction buffer into the adder. This is accomplished by supplying the output signals from AND circuits 893, 897, 899 and 1001 in FIG. 8q to OR circuits 728, 731, 730 and 732, respectively on FIG. 8b. Thus it is seen that the 1, 2, 4, and 8 bits of the 9's complement of the first word in error correction buffer is supplied to OR circuits 728, 730, 731 and 732, respectively. The transfer of information from this point on into the adder takes place in the manner previously described.

There is one additional point and this is the fact that what is really desired in the adder is the 10's complement of the first word in error correction buffer. Since the 9's complement has been read into the adder, it is necessary only to supply an additional count of one to the adder to make it the 10's complement. This is accomplished by supplying the READOUT FIELD SUM signal to AND circuit 1010 in FIG. 8b, which receives in addition the signal LAp. The output of AND circuit 1010 is supplied through OR circuit 728 and goes on into the adder as a count of one.

It should be pointed out that the reason AND circuit 1010 is sampled at LAp time is due to the fact that the count of one must go in at a time different from Bp time since the output of AND circuit 893 in FIG. 8d, which is supplied to OR circuit 728 in FIG. 8b, is supplied at Bp time. Therefore, as soon as the READ OUT FIELD SUM signal is produced, it is possible to immediately enter a count of one into the adder. Thereafter, the 9's complement form of the first word in error correction buffer can be read into the adder so that in all, the 10's complement of the first word in error correction buffer has been placed in the adder.

The adder now contains the first check digit in the check digit field as well as the 10's complement of the first word in error corrction buffer. It will be remembered that the check digit should be equal to the units order of the sum of all of the digits in the first error correct field. Since the characters in the first error correct field were summed and supplied to the error correction buffer and thereafter the 10's complement of this sum is supplied to the adder, the output from the adder should be 0. However, it will be seen that if one of the characters in the error correction field resulted in producing an UNCERTAINTY, the output from the adder will not in general be 0 but will instead be equal to the true value of the character which resulted in producing the UNCERTAINTY, which, of course, may be 0 in some cases.

Reference is made to FIG. 22a which discloses a sample record card containing an information field having the characters 5, 4, 7, 6, 2, 1 and 2 therein and a check digit field having a digit 7 therein. The check digit field, as previously mentioned, is chosen to be equal to the units order of the sum of the digits in the information field. To this point, there has been described the manner in which the digits in the information field are stored and also supplied to the adder so that the units order digit of the sum of the digits in the information field is supplied the error correction buffer. When the check digit is read in the check digit field, it is also entered into the adder and thereafter the 9's complement of the digit 7, which was supplied to error correction buffer is read back into the adder. Since it is really desired to have the 10's complement of the digit in error correction buffer, an additional count of one is supplied to the adder. Therefore, the sum in the adder should be equal to 0.

Suppose, for example, that when the digit 4 in the information field was scanned, the character sensing apparatus was unable to determine whether the character was a 4 or an 8 and thereby produced an UNCERTAINTY signal. This means that instead of a total of 27 being counted in the adder when the information characters were read into the adder, a count of 23 would have been made so that the units order digit of this count, i.e., the digit 3, is entered into the error correction buffer. The 9's complement of the digit 3 is equal to 6. Therefore, when this digit is added to the check digit 7, and an additional count of one is added thereto, a count of 4 will be in the adder. It is seen that the output of the adder now is equal to the digit which was initially read as being either a 4 or an 8. Since the adder has a count of 4 therein, it is now known that the character was really a 4. Therefore, the correct digit, i.e., the digit 4, now exists in the adder. The next step which will be described subsequently is to read the corrected digit from the adder into error correction buffer.

In order to read the corrected digit into the adder, it will be seen that following the readout of the field sum from error correction buffer through the complementing circuit to the adder, the signals CUX and Ap will be supplied to AND circuit 843 in FIG. 8q during the following cycle of the control counter and result in turning the readout field sum latch 835 OFF. When this latch goes OFF, the readin corrected digit lacth 839 is turned ON, thereby producing an output signal from cathode follower 841 labeled READIN CORRECTED DIGIT LATCH. This last-mentioned signal is supplied to OR circuit 891 in FIG. 8u. The output of this OR circuit is supplied through an inverter 1011 and a cathode follower 1012 to produce a relatively negative voltage at the terminal labeled INHIBIT CONTROL TENS ADVANCE. Thus, as previously described, the control tens counter remains in the same position that it has been since the readout field sum latch 835 in FIG. 8q was turned ON.

The output of OR circuit 891 in FIG. 8u is also supplied through OR circuit 810 and cathode follower 811 to produce the CORRECTION TENS CONTROL signal which selects the error buffer, i.e., it produces a relatively positive input to the terminal ECT in FIG. 9 which connects to the error correction tens winding. The output of cathode follower 811 is also supplied through an OR circuit 1013 to a push-pull unit 1014. The output of the push-pull unit will be relatively negative and is labeled CONTROL TENS SWITCH CONTROL. This means that the output from the control tens counter cannot be read out at this time.

Referring to FIG. 8*t*, it will be seen that the READIN CORRECTED DIGIT LATCH signal from cathode follower 841 in FIG. 8*q* is supplied through an OR circuit 1015 to a push-pull unit 1016 to thereby produce a relatively negative voltage at the terminal labeled READ-OUT TO PUNCH. This means that during the time that the corrected digit is being read into the adder a readout to the punch or other utilization device will not be permitted.

Since the readin corrected digit latch 839 in FIG. 8*q* is turned ON by A*p* during CUX time, the first 6 bit which is sensed in the error correction buffer determines the location at which the corrected digit in the adder is to be placed. This is due to the fact that when the field sum is read from the first position in the error correction buffer into the adder, the 6 bit and all the rest of the information is regenerated and retained in the first position. This is accomplished by AND circuit 1017 in FIG. 8*k* which receives the 6 bit from the 6 sense latch, FIG. 8*e*, during the readout field sum operation. In addition, AND circuit 1017 receives the output of an inverter 1018 which is normally positive, the output from this inverter being labeled REGENERATION CONTROL. The output of AND circuit 1017 is supplied through OR circuit 766 and inverter 767 to AND circuit 768. Since the output of inverter 767 will be relatively negative, AND circuit 768 will supply a relatively negative voltage to the core driver 769, thereby resulting in the lack of a signal at the terminal I*h*6. Thus, under these circumstances, a 6 bit is read back into the error correct buffer at B*p* time during the readout field sum operation.

AND circuit 1019 in FIG. 8*r* is connected to receive the first 6 bit in the error correction buffer, which, in this instance, will come from the first word position of the error correction buffer. In addition, AND circuit 1019 receives the READIN CORRECTED DIGIT LATCH signal from latch 839 in FIG. 8*q*. The other input to AND circuit 1019 in FIG. 8*r* comes from the 6 bit control latch 1004 which was turned ON at CU0 time. The output of AND circuit 1019 is supplied through OR circuit 779 and cathode follower 780 to produce the ENTER ADDER INTO STORAGE signal.

During this digit time, it is desired to leave out the 6 bit from the error correction buffer for the corrected digit. Therefore, the ENTER ADDER INTO STORAGE signal is supplied to an OR circuit 1020 in FIG. 8*k* which supplies a relatively positive input to inverter 1018. The output of inverter 1018 will therefore be a relatively negative voltage which will inhibit switch 1017 and thereby prevent the application of a 6 bit with the corrected digit which is entered back into error correction buffer. At the same time it will be seen that the signal REGENERATION CONTROL will be relatively negative so that the output of AND circuits 886 through 890 in FIG. 8*f* will not be regenerated at this time. Instead, the output of the adder will be supplied to the error correction buffer.

To enter the corrected digit information in the adder into the error correction buffer, it is necessary to supply the ENTER ADDER INTO STORAGE signal to each of the AND circuits 781 through 785 in FIG. 8*f* which are connected to receive the output of the adder from FIG. 8*i*. It will be seen that the output of the adder will go into the proper place in storage since the CORRECTION TENS CONTROL signal has been supplied to the terminals ECT to select the error correction tens winding. In addition, since the 6 bit was sensed during CU0 time, i.e., the corrected digit is to go into the first position in error correction buffer, an output will be supplied to terminal U0 in FIG. 9. Therefore, a zero will now be in the first position of error correction buffer if no UNCERTAINTIES were encountered during the reading of the information field. However, if an UNCERTAINTY was encountered during the reading of an information field, the correct digit which should have been recognized will now exist in the first position of error correction buffer.

It will be remembered that three complete cycles of the control units counter were required to perform the operation of reading the first check digit from the check digit field, reading out the field sum from storage and reading the corrected digit back into the error correction buffer. During the first one of the three cycles, the first check digit in the check digit field was read into the adder. During the second cycle, the field sum in the error correction buffer was read into the adder. It will be remembered that a signal READOUT FIELD SUM LATCH produced in FIG. 8*q* was supplied to OR circuit 891 in FIG. 8*u* during this second digit time and resulted in producing the INHIBIT CONTROL TENS ADVANCE signal from the cathode follower 1012 and also resulted in producing a relatively negative voltage from the push-pull unit 1014 which prevented readout from the control tens counter, i.e., the signal CONTROL TENS SWITCH CONTROL was negative. During the third cycle, the readin corrected digit latch 839 in FIG. 8*q* was turned ON and during this time the sum in the adder, the corrected digit, was read back into the adder. The signal READIN CORRECTED DIGIT LATCH. which is produced during this third cycle, is also supplied to OR circuit 891 in FIG. 8*u* to produce the signals INHIBIT CONTROL TENS ADVANCE and to produce a negative voltage for the signal CONTROL TENS SWITCH CONTROL. During the last two cycles, the control tens counter is not allowed to advance and the output of the control tens counter is inhibited from controlling a reading operation from the output buffer.

Once the above-described three cycles have concluded, it is desirable to be ready for the next check digit in the check digit field, in the event there are additional check digits. Therefore, it is necessary to advance the control tens counter. As soon as the READIN CORRECTED DIGIT LATCH signal supplied to OR circuit 891 in FIG. 8*u* ends at the conclusion of the third cycle, the voltage from cathode follower 1012 will become relatively positive and will therefore no longer inhibit the advance of the control tens counter. In addition, the output signal from push-pull unit 1014, which is labeled CONTROL TENS SWITCH CONTROL, will become relatively positive and allow information to be read out of the output buffer to the punch.

As soon as the next check digit in the check digit field is recognized, a new three cycle process begins and the same operation ensues as that previously described. It will be understood of course that when reading out of error correction buffer for the second check digit, the word in the second word position of the error correction buffer is read out into the adder since it will be the first word in error correction buffer which has a 6 bit included therewith, it being remembered that when the previous corrected digit was read back into the error correction buffer in the manner explained that regeneration of the 6 bit was prevented by the ENTER ADDER INTO STORAGE signal supplied to OR circuit 1020 in FIG. 8*k*.

There may be instances in scanning the characters in the check digit field where an UNCERTAINTY signal will be produced. That is, the character sensing apparatus may be unable to determine which of two or more different characters properly identifies the check digit. The UNCERTAINTY signal which is supplied to sheet 8*a* is connected to a single-shot multivibrator 718 in FIG. 8*b*, the output from this single-shot multivibrator being a five hundred microsecond pulse which is termed CHARACTER SENSE UNCERTAINTY. The last-mentioned signal is adapted to be supplied to AND circuit 1021 in FIG. 8q, the other inputs to this circuit being the CHARACTER LATCH, CHECK DIGIT FIELD and CUX signal. Therefore, at CUX time, an output will be supplied from AND circuit 1021 through cathode follower 1022 and OR circuit 840 to turn the readin corrected digit latch 839 ON. It will be remembered that the output of this latch is supplied through inverter 842 to switch 830, FIG. 8q. Therefore, when the CHARACTER LATCH and CU0 signal occurs, switch 830 will be inhibited by the fact that the readin corrected digit latch 830 is ON. This means that the usual cycle for each check digit will not occur in this instance, i.e., when an UNCERTAINTY is detected in a check digit field.

The output of cathode follower 1022 in FIG. 8q is connected to a terminal which is labeled READ CORRECTED DIGIT UNCERTAINTY INTO ADDER. This signal will be used to enter the signal representing an UNCERTAINTY into the adder. Prior to this, however, AND circuit 1029 in FIG. 8h receives the CHARACTER LATCH signal and the CHECK DIGIT FIELD signal. At CUX time AND circuit 1029 supplies a signal through OR circuit 1031 to AND circuit 1032 which is sampled by Ap, to reset the adder to zero via elements 1033 to 1038, inclusive. While the READ CORRECTED DIGIT UNCERTAINTY INTO ADDER signal is being produced, relatively positive voltages are supplied from OR circuits 1023, 1024 and 1025 in FIG. 8h to inverters 1026, 1027 and 1028, respectively, in FIG. 8c. The plates of inverters 1026 through 1028 are connected to the plates of the left sides of triggers 725 through 727, respectively, and serve to turn these triggers ON. With triggers 725 through 727 in an ON condition, the coding for an UNCERTAINTY signal is entered into the adder. It will be seen that this action all takes place following Ap time during CUX since the adder was reset to zero by Ap during CUX.

Since AND circuit 830 in FIG. 8q is inhibited by the output of the readin corrected digit latch 839, the normal action regarding check digits does not ensue. However, the READIN CORRECTED DIGIT LATCH signal from cathode follower 841 is supplied to AND circuit 1019 in FIG. 8r which, in addition, receives the output from the 6 bit control latch 1004 and the 6 bit input from the SENSE LATCH 6 signal from FIG. 8e. As soon as the first 6 bit is sensed in the error correction buffer, an output is supplied from AND circuit 1019 through OR circuit 779 to cathode follower 780 to produce the ENTER ADDER INTO STORAGE signal. This signal is supplied to OR circuit 1020 in FIG. 8k whose output is connected to inverter 1018 which inhibits AND circuit 1017. Thus the 6 bit from the 6 bit sense latch in FIG. 8e cannot be regenerated so as to occur with the UNCERTAINTY signal to be entered in the error correction buffer.

The ENTER ADDER INTO STORAGE signal is also supplied to sample the AND circuits 781 through 785 in FIG. 8f which receive the R, 1, 2, 4 and 8 bit information from the adder, FIG. 8i. It will be seen that the coding for an UNCERTAINTY is supplied to the error correction buffer in lieu of the corrected digit which is normally supplied thereto during the check digit sensing operation.

At the end of the check digit field, a FIELD MARK ENDING signal may be produced as a result of scanning the special character following the check digits. This signal is supplied through OR circuit 900 in FIG. 8m to AND circuit 901. For example, for the card shown in FIG. 22b, the field work ending signal would be from the terminal CPH—. That is, the sensing of the special character, the dash, will produce a relatively positive voltage at the aforementioned terminal. A signal is also supplied to AND circuit 901 in FIG. 8m from cathode follower 819, which signal is relatively positive during the reading of the check digit field. The output of AND circuit 901 is supplied through OR circuit 826 to inverter 827. The output voltage from inverter 827 will be relatively negative and when supplied through cathode follower 828 to OR circuit 823, causes the check digit latch to be turned OFF, that is, a relatively negative voltage from cathode follower 828 causes a relatively positive voltage from inverter 815 and cathode follower 816. This voltage, by way of OR circuit 826 holds inverter 827 in a conducting state and the output of inverter 828, which is the CHECK DIGIT FIELD signal, relatively negative.

A second check digit field may be read in the same manner as the first check digit field, with the exception that AND circuit 903 and cathode follower 904 in FIG. 8m are used in lieu of switch 817 and cathode follower 822, respectively.

TRANSFER

Before a transfer operation is allowed to begin, circuitry is provided to assure that information is not being read out of the output buffer into the punch or other output device. An INDEX 9 pulse is supplied from the punch through a filtering circuit 1040 to AND circuit 1041, FIG. 8s. The INDEX 9 pulse is produced at the beginning of the time that all of the "nines" in the output buffer are supplied to the punch. Another input signal to AND circuit 1041 is the CARD END signal which is supplied after the card has been completely scanned. The remaining input may be termed READ-OUT TO PUNCH and is supplied from the latch 1042 shown in FIG. 8t. This latch is comprised of an OR circuit 1043, a double inverter 1044 and a cathode follower 1045. The output of the cathode follower is relatively positive when the latch is ON and is supplied back through OR circuit 1043 to hold the latch ON.

Normally, latch 1042 is held OFF by the PUNCH INDEX signal which is supplied through the filtering circuit 1046 to AND circuit 1047. The PUNCH INDEX signal is produced by the punch with which the present invention is adapted to be associated. This signal is provided at a time when the punch is ready to perform a punching operation. AND circuit 1047 is sampled by CUX and supplies an input to an inverter 1048 which shares the plate load in the right side of the double inverter 1044. Therefore, during the intervals that information is being read out of the output buffer to the punch, latch 1042 is held OFF. However, as soon as the END READOUT TO PUNCH signal is produced by the punch, the latch is turned ON, it being understood that the PUNCH INDEX signal has terminated. The END READOUT TO PUNCH signal is supplied through the filtering circuit 1049 to AND circuit 1050 which also receives CUX. The output of AND circuit 1050 is capable of turning the latch ON. Therefore, during this interval, it will be seen that the output of cathode follower 1045 will be relatively positive to indicate that information is not being read out of output buffer to the punch, this output being termed READOUT TO PUNCH.

Referring again to FIG. 8s, when all three of the input signals to AND circuit 1041 are relatively positive in coincidence, an output is supplied therefrom through an OR circuit 1051 to a single-shot multivibrator 1052. This single-shot multivibrator produces a forty microsecond positive output pulse which is supplied to the reset latch 1053. This latch is comprised of OR circuit 1054, double inverter 1055 and cathode follower 1056, the output from the cathode follower being termed RESET. The RESET signal may also be produced by a manual switch 1407 which supplies a voltage through the filter network 1408 to OR circuit 1051. In addition, the RESET signal is always generated by the first card into the punch. That is, the punch supplies a FIRST CARD IN signal through a filter network 1409 to OR circuit 1051 whose output will result in a RESET signal.

The RESET signal is supplied to an AND circuit 1064 which also receives $\overline{Rp}$, the output from this circuit being supplied to OR circuit 1054 to hold the reset latch 1053 ON. Therefore, the RESET signal lasts at least forty microseconds and continues until $\overline{Rp}$ occurs sometime following the end of the forty microsecond period.

Referring to FIG. 8p, an OR circuit 1400 is connected to receive the RESET signal just described and by way of cathode follower 1401 produce a LONG RESET signal. The last-mentioned signal is a combination of the RESET signal and the output of a single-shot multivibrator 1402 whose purpose will be later described.

One function of the LONG RESET signal is to reset the entry units and tens counters and the control units and tens counters as previously explained. Referring to FIG. 8p, the LONG RESET signal is adapted to be supplied to the cathode follower 1062 whose output is connected to an inverter 1063. The output of this inverter is the CONTROL UNITS ADVANCE signal which is supplied to the control units advance line in FIG. 3a, thereby resetting all of the stages of the control units counter OFF. The LONG RESET signal is also supplied to OR circuit 679 in FIG. 8p whose output is connected to inverter 680. The output of this inverter is termed the ENTRY UNITS ADVANCE signal. This signal is utilized in the entry units counter shown in FIG. 3b to reset all of the stages in the entry units counter OFF. The LONG RESET signal is supplied to cathode follower 537 in FIG. 4a to reset the control tens counter and is supplied to cathode follower 474 in FIG. 4c to reset the entry tens counter. Both of these last-mentioned counters are reset so that all of the stages therein are OFF.

Referring again to FIG. 8p, the LONG RESET signal from cathode follower 1401 is supplied through an inverter 1057 which is coupled to a cathode follower 1058 whose output is a COUNTER SET signal. As soon as the LONG RESET signal ends, the trailing edge thereof will be a negative-going voltage which, when supplied to inverter 1057, will appear as a positive-going voltage out of the inverter which is A.C. coupled to cathode follower 1058, the positive-going voltage to the cathode follower results in a positive pulse at the output.

The COUNTER SET signal is produced immediately following the LONG RESET signal. It is the COUNTER SET signal which is supplied to inverter 360 in FIG. 3d, inverter 442 in FIG. 3a, inverter 476 in FIG. 4c, and inverter 539 in FIG. 4a, thereby resetting the entry units counter, the control units counter, the entry tens counter and the control tens counter, respectively, so that the first stage in each counter is ON.

As soon as $\overline{Rp}$ goes negative, latch 1053 in FIG. 8s goes OFF and the RESET and LONG RESET signals go relatively negative. When this occurs, a positive-going voltage is supplied from the left side of the double inverter 1055 to a capacitively coupled cathode follower 957, the output signal from this cathode follower being termed TRANSFER START. This signal is also supplied through an OR circuit 1057 in FIG. 8t to an inverter 1058. The output from inverter 1058 will be a negative-going voltage at this time and is supplied through a cathode follower 1059 and an OR circuit 1060 to push-pull unit 1061. The output of the push-pull unit will be a positive-going voltage which, when supplied back through OR circuit 1057 to inverter 1058, causes the inverter to continue to stay in conduction and supply a relatively negative output.

The circuit comprising OR circuit 1057, inverter 1058, cathode follower 1059, OR circuit 1060 and push-pull unit 1061 form a latch which may be termed the transfer latch. The output from the push-pull unit 1061, is termed the TRANSFER signal and is relatively positive when the transfer latch is ON. The output from cathode follower 1059 is relatively negative when the transfer latch is ON and is termed $\overline{TRANSFER}$.

The TRANSFER START signal produced from cathode follower 957 in FIG. 8s is supplied to an OR circuit 1072 in FIG. 8n whose output is supplied to a double inverter 1073. The output of the double inverter is supplied to each of the cathode followers 1074 and 1075, the cathodes thereof being commoned and connected to a terminal which is labeled TRANSFER CORRECTER DIGIT TO ADDER. The TRANSFER CORRECTED DIGIT TO ADDER signal is supplied to AND circuit 1071 which also receives $\overline{Rp}$. The output of this circuit is supplied to OR circuit 1072. The OR circuit 1072, double inverter 1073, cathode followers 1074 and 1075, and AND circuit 1071 may be termed the TRANSFER CORRECTED DIGIT TO ADDER latch which is provided with reference numeral 1076. Since the TRANSFER START signal was in the form of a relatively short positive pulse to turn latch 1076 ON, this latch will stay ON only so long as the output voltage from AND circuit 1071 in FIG. 8n is relatively positive. When the signal $\overline{Rp}$ goes negative, latch 1076 will go OFF.

The TRANSFER CORRECTED DIGIT TO ADDER signal is supplied to OR circuit 1031 on FIG. 8h and to the remainder of the circuitry which follows the last-mentioned OR circuit to reset the adder shown in FIG. 8c to zero at Ap time in the manner previously described.

The TRANSFER CORRECTED DIGIT TO ADDER signal is also supplied to an OR circuit 673 in FIG. 8u whose output is connected to the cathode follower 674. The output of this cathode follower results in producing the ENTRY UNITS SWITCH CONTROL signal which is utilized by AND circuits 370 through 379 in FIGS. 3b and 3e to produce outputs at Ap and Bp time at one of the terminals U0 through U9. The TRANSFER CORRECTED DIGIT TO ADDER signal is also supplied to OR circuit 810 whose output is connected through cathode follower 811 to produce the CORRECTION TENS CONTROL signal. It is this signal which is used in selecting the tens winding in the error correction buffer. That is, the CORRECTION TENS CONTROL signal is supplied to AND circuits 521 and 522 on FIG. 4d, AND circuit 521 being sampled at Ap time and AND circuit 522 being sampled at Bp time. The outputs of these AND circuits are connected to core driver 523 which produces a negative half-current pulse followed by a positive half-current pulse at terminal ECT. This terminal is, of course, adapted to be connected to the terminal designated by the same reference letters in FIG. 9.

The TRANSFER CORRECTED DIGIT TO ADDER signal is also supplied to an inverter 1077 in FIG. 8u whose output will be relatively negative. It is seen, therefore, that the signal CONTROL UNITS SWITCH CONTROL will be relatively negative during the time that the TRANSFER CORRECTED DIGIT TO ADDER signal is relatively positive. This means that switches 450 through 459 on FIGS. 3b and 3e will be inhibited at this time.

The output from cathode follower 811 in FIG. 8u, when supplied through OR circuit 1013 to the push-pull unit 1014, will produce a relatively negative output at the terminal CONTROL TENS SWITCH CONTROL. This means that during the time that the corrected digit from the first word position in the error correction buffer is read out into the adder, the CORRECTION TENS SWITCH CONTROL signal will be relatively negative so that AND circuits 544 through 549 in FIG. 4b are inhibited at this time. Since the output of push-pull unit 1014 is relatively negative at this time, the output of AND circuit 1067, which is connected to the push-pull unit, will also be relatively negative, thereby causing the ENTRY TENS SWITCH CONTROL signal from cathode follower 1068 to also be relatively negative. This means that AND circuits 568 through 573 in FIG. 4d are also inhibited.

With the CORRECTION TENS CONTROL signal from cathode follower 811 and the ENTRY UNITS SWITCH CONTROL signal from cathode follower 674, both of these cathode followers being shown in FIG. 8u, it is possible to read out at Ap time that information which is in the first word position of the error correction buffer into the sense latches which are shown on FIG. 8e. That is, the AND circuit 370 in FIG. 3b receives a relatively positive voltage from push-pull unit 330 in the first stage of the entry units counter shown in FIG. 3d, and also receives the ENTRY UNITS SWITCH CONTROL signal. The output of AND circuit 370 is supplied through OR circuit 380 to AND circuit 390 which also receives Ap. Thus, at Ap time, an output is supplied from the AND circuit to core driver 410. The core driver produces a negative half-current pulse at terminal U0 which is connected to the first units order winding in the core array shown in FIG. 9. As previously explained, the CORRECTION TENS CONTROL signal is supplied to AND circuit 521 in FIG. 4b which also receives Ap. Thus, at Ap time an output is supplied from the AND circuit to core driver 523 which produces a negative half-current pulse at the terminal ECT which connects to the error correction tens winding in the core array shown in FIG. 9. With negative half-current pulses at terminals U0 and ECT in FIG. 9 at Ap time, the first word in the error correction buffer will be read into the sense latches shown in FIG. 8e.

The 1, 2, 4 and 8 bit outputs from the sense latches in FIG. 8e are respectively supplied to AND circuits 1080, 1081, 1082 and 1083 on FIG. 8h. All of the last-mentioned switches are connected to receive the TRANSFER CORRECTED DIGIT TO ADDER signal which was produced in the latch 1076 and supplied from cathode followers 1074 and 1075 in FIG. 8n. It will be remembered that in the past the information in 1, 2, 4 and 8 bit form was translated into a series of pulses and supplied to the adder. However, under the circumstances where the corrected digit is transferred to the adder from error correction buffer, the information is read into the adder in parallel since it must be accomplished in one digit time.

The output from AND circuit 1080 in FIG. 8h is connected to an inverter 1084 in FIG. 8c whose plate is connected to the plate of the left side of trigger 724 in the adder. AND circuits 1081 through 1083 in FIG. 8h are connected to supply inputs through OR circuits 1023 through 1025, respectively, to inverters 1026 through 1028, respectively, in FIG. 8c. As has been previously described, the plates of inverters 1026 through 1028 are respectively connected to the plates of the left side of triggers 725 through 727 in the adder.

It will be seen from the above that the information which was read out of the sense windings during Ap time is supplied directly into the adder by way of the circuits just described. Therefore, the corrected digit in the first word position of the error correction buffer has been transferred to the adder as called for by the TRANSFER CORRECTED DIGIT TO ADDER signal which was supplied to AND circuits 1080 through 1083 in FIG. 8h.

Inasmuch as the entry units counter will be used to read the second word from the error correction buffer when the second error correction field is encountered during the transfer operation, the entry units counter is advanced so that the second stage is ON. This is accomplished by circuitry in FIG. 8p. AND circuit 1085 is connected to receive the TRANSFER CORRECTED DIGIT TO ADDER signal. The AND circuit is sampled by Bp and supplies a relatively positive input to a single-shot multivibrator 1086 which produces an eleven microsecond relatively positive pulse. This pulse is supplied through a cathode follower 1087 to AND circuit 958 which is sampled by Rp. The output of this circuit is supplied through OR circuit 679 to inverter 680, the output from the inverter being termed the ENTRY UNITS ADVANCE signal. It is this signal which is supplied to the entry units counter in FIG. 3d to turn the first stage OFF and the second stage ON.

During the read in corrected digit to adder operation, the units order winding connected to terminal U0 was impulsed so as to read the first word from error correction buffer into the adder. It will be seen, however, that it will be desirable to impulse the same winding again in order to read the first digit from the input buffer into the output buffer following the transfer of the first digit in error correction buffer to the adder. Since the control units counter governs the latter operation during transfer, the counter advance must be inhibited during the transfer of the corrected digit to the adder. This is accomplished in FIG. 8p wherein there is the previously described AND circuit 1085 which is connected to receive the TRANSFER CORRECTED DIGIT TO ADDER signal. The last-mentioned AND circuit is sampled at Bp time and produces a relatively positive input to a single-shot multivibrator 1086. The output of this single-shot multivibrator as previously described is a positive pulse of eleven microseconds duration which is supplied through a cathode follower 1087 to an OR circuit 1088. The output of OR circuit 1088 is supplied through an inverter 1089 to inhibit AND circuit 1090. The other input to this last-mentioned AND circuit is Rp. Since the AND circuit is inhibited, it will be seen that the output thereof will be relatively negative and when supplied through cathode follower 1091 to an inverter 1063 produces a relatively positive voltage at the output of the inverter. Therefore, the control units advance signal will remain relatively positive and the control units counter will not be able to advance immediately following a readin corrected digit to adder operation. Thus, the control units counter will still have its first stage ON following the last-mentioned operation. This, in effect, causes two CUX digit times in succession.

To this point in the description, it has been explained how the corrected digit in the first word position of the error correction buffer has been transferred to the adder. The corrected digit will remain in the adder until an UNCERTAINTY is sensed in the input buffer which was produced in sensing the digits in the first information field which was error corrected. It will be appreciated that the corrected digit in the adder is the proper identity of the digit which originally resulted in the producion of the UNCERTAINTY signal.

During the character sensing operation, the digits in the information fields in the record card were scanned, identified and stored in the input buffer of the core array. When a particular information field was to be error corrected, a 6 bit was entered in storage with each of the first and last digits in the information field which was error corrected. Thus, it will be seen that the first and succeeding digits in the input may or may not have a 6 bit included therewith. If the first information field which was scanned was to be error corrected, then a 6 bit would be found in the first digit in the input buffer. If the first information field was not to be error corrected, then a 6 bit would not be found with the aforementioned first digit. In any event, as soon as a digit is reached in the input buffer which has a 6 bit included therewith, presence of the 6 bit indicates that this digit is the first digit in the first field which is to be error corrected. The next digit which has a 6 bit included therewith indicates that it is the last digit in the first field which is to be error corrected. Therefore, if an UNCERTAINTY indication is stored anywhere between the first and second 6 bits, including the digits having the 6 bits included therewith, there is generated a signal to read out the corrected digit in the adder to the output buffer instead of the UNCERTAINTY, since the corrected digit is the same as the digit which, when scanned, resulted in the production of an UNCERTAINTY signal.

Assuming for the moment that the first few digits in input buffer did not have a 6 bit included therewith and therefore were not part of a field to be error corrected, an explanation will be given regarding the transfer of these digits to output buffer.

During the transfer operation, the information is read out of the input buffer at A𝑝 time and into the output buffer at B𝑝 time. That is, A𝑝 is supplied to AND circuits 390 through 399 in FIGS. 3c and 3f and to AND circuits 503 through 508 in FIG. 4d, thus reading the information from input buffer. The signal B𝑝 is supplied to AND circuits 400 through 409 in FIGS. 3c and 3f and to AND circuits 556 through 561 in FIG. 4b, thus reading the information which was sensed at the preceding A𝑝 time into the output buffer at B𝑝 time.

Reference is made to FIG. 8t which shows an AND circuit 1100 which receives the TRANSFER signal from push-pull unit 1061. This AND circuit is sampled by LA𝑝 and supplies a relatively positive output at LA𝑝 time to cathode followers 1101 and 1102. The output of cathode follower 1101 is supplied to a terminal labeled INPUT STORAGE B𝑝 while the output of cathode follower 1102 is supplied to a terminal labeled OUTPUT STORAGE A𝑝. The signal from the terminal labeled INPUT STORAGE B𝑝 is adapted to be connected to each of the AND circuits 509 through 514 in FIG. 4d while the signals from the terminal labeled OUTPUT STORAGE A𝑝 is adapted to be connected to each of the AND circuits 550 through 555 in FIG. 4b. Thus, during transfer, the signals from these AND circuits occur at LA𝑝 time.

At times other than during transfer, the INPUT STORAGE B𝑝 occurs at B𝑝 time and the signal OUTPUT STORAGE A𝑝 occurs at A𝑝 time. This is due to the fact that AND circuits 1103 and 1104 in FIG. 8t are connected to receive the output of cathode follower 1059 which is relatively positive during times other than transfer time. Since the AND circuit 1103 is sampled by B𝑝, its output will occur at B𝑝 time. Since AND circuit 1104 is sampled by A𝑝, its output will occur at A𝑝 time.

The reason that the INPUT STORAGE B𝑝 signal occurs at LA𝑝 time during transfer is due to the fact that the pulse transformers in the core drivers 515 through 520 in FIG. 4d must be switched back to their original state so that when information is to be read out of the next core position of input buffer during the next digit time, the pulse transformers in the core drivers 515 through 520 will be returned to their original condition for the next readout operation. In the case of the OUTPUT STORAGE A𝑝 signal, this must occur at LA𝑝 time during the transfer operation due to the fact that the pulse transformers in core drivers 562 and 567 in FIG. 4b must be returned to the proper state prior to the readin operation at B𝑝 time.

Once the circuit is in readiness to begin the transfer operation, the control units and control tens counters take over and govern the transfer. Thus, the output from the first ten stages of the control units counter shown in FIG. 3a are supplied to AND circuit 450 through 459 in FIGS. 3b and 3e. Each of these last-mentioned AND circuits is sampled by the signal CONTROL UNITS SWITCH CONTROL. It will be seen from FIG. 8u that the last-mentioned signal, which is supplied from inverter 1077, becomes relatively positive as soon as the TRANSFER CORRECTED DIGIT TO ADDER signal ends. That is, inverter 1077 will receive a relatively negative voltage after the TRANSFER CORRECTED DIGIT TO ADDER signal ends so that the output from the inverter will be a relatively positive voltage which is supplied to the terminal labeled CONTROL UNITS SWITCH CONTROL. Therefore, as the successive stages of the control units counter go ON, AND circuits 450 through 459 will supply successive outputs through OR circuits 380 through 389, respectively, to AND circuits 390 through 399, respectively, and AND circuits 400 through 409, respectively. At A𝑝 time, successive half-current pulses will appear at terminals U0 through U9 for use in the readout operation from input buffer, and at B𝑝 time successive positive half-current pulses will appear at terminals U0 through U9 for use in the readin operation to output buffer.

Referring again to FIG. 8u, the terminal labeled CONTROL TENS SWITCH CONTROL will be relatively positive during times CU0 through CU9. This is due to the fact that the TRANSFER signal from push-pull unit 1061 in FIG. 8t, when supplied through OR circuit 1065 to inverter 1066 in FIG. 8u, results in producing a relatively negative voltage to OR circuit 1013. Since the output of this OR circuit is relatively negative, the output from the push-pull unit 1014 connected thereto will be relatively positive. This means that the CONTROL TENS SWITCH CONTROL signal will be relatively positive and will be used to sample AND circuits 544 through 549 in FIG. 4b which receive the outputs from the control tens counter in FIG. 4a. At the same time, it is seen that AND circuit 1067 in FIG. 8u also receives the relatively positive output of the push-pull unit 1014 and in addition receives the TRANSFER signal from push-pull unit 1061 in FIG. 8t. The output of AND circuit 1067 is supplied through the cathode follower 1068 to produce the ENTRY TENS SWITCH CONTROL signal. This last-mentioned signal is supplied to AND circuit 568 through 573 on FIG. 4d, these last-mentioned circuits also being connected to receive the output of the control tens counter shown in FIG. 4a. With the ENTRY TENS SWITCH CONTROL signal being supplied to AND circuits 568 through 573 in FIG. 4d, the outputs from the control tens counter in FIG. 4a are successively passed to AND circuits 503 through 508, respectively, these last-mentioned AND circuits being sampled by A𝑝 to supply inputs to core drivers 515 through 520, respectively. This results in negative half-current pulses being successively supplied from terminals T0 through T5 at A𝑝 time. Thus, the negative half-current pulses at terminals U0 through U9 in FIGS. 3e and 3f at A𝑝 time, as previously described, and the negative half-current pulses at terminals T0 through T5 at A𝑝 time, result in reading the information from successive word positions in the input buffer during successive A𝑝 times into the sense latches in FIG. 8e.

With the CONTROL TENS SWITCHES CONTROL signal being supplied to AND circuits 544 through 549 in FIG. 4b, the outputs from the control tens counter in FIG. 4a are successively passed to AND circuits 556 through 561, respectively, these last-mentioned AND circuits being sampled by B𝑝 to supply inputs to core drivers 562 through 567, respectively. This results in positive half-current pulses being successively supplied from terminals 0T0 through 0T5 at B𝑝 time. Thus, the positive half-current pulses at terminals U0 through U9 in FIGS. 3e and 3f at B𝑝 time, as previously described, along with the positive half-current pulses at terminals 0T0 through 0T5 at B𝑝 time, result in reading the information from the sense latches in FIG. 8e into successive word positions in the output buffer during successive B𝑝 times.

The inhibit windings are controlled in the manner previously described under regeneration. Briefly, the sense latch outputs produced at A𝑝 time in FIG. 8e are sampled by the REGENERATION CONTROL signal at AND circuits 886 through 890 in FIG. 8f. The outputs of these AND circuits control the core drivers for the inhibit windings which are sampled at B𝑝 time in the manner previously described.

From the above, it will be seen that as the control units counter and the control tens counter progress through their operation in the manner which has been previously described, the information in the input buffer will be sensed during A𝑝 time and read into the output buffer at B𝑝 time.

As previously mentioned, the INPUT STORAGE B$p$ signal, which is supplied to AND circuits 509 through 514 in FIG. 4d at LA$p$ time during transfer, returns the transformers in the core drivers 515 through 520 to the proper state for the succeeding readout operation at the next A$p$ time. Also, the OUTPUT STORAGE A$p$ signal which is supplied to AND circuits 550 through 555 in FIG. 4b at LA$p$ time during transfer, returns the transformers in core drivers 562 through 567 to the proper condition so that a read in operation at B$p$ time may be made into the output buffer.

The transfer operation will proceed as described above until the first digit containing a 6 bit is sensed. Referring to FIG. 8n, there is provided an AND circuit 1105 which is connected to receive the TRANSFER signal and in addition LA$p$ and the SENSE LATCH 6 bit. The first 6 bit which is sensed during transfer will result in producing a relatively positive output from AND circuits 1105 at LA$p$ time. This positive-going voltage is supplied to inverter 1106 which produces a negative-going voltage therefrom. The leading edge of this negative-going voltage is eliminated in the A.C. coupled cathode follower 1107. However, the trailing edge of the output of inverter 1106, which is a positive-going voltage, results in supplying a positive pulse to the error compare latch 1108. This latch is comprised of an OR circuit 1109, a double inverter 1110 and a cathode follower 1111. The output of the cathode follower is supplied back to the OR circuit 1109 to hold the latch ON. The output signal from cathode follower 1111 is termed ERROR COMPARE LATCH. This signal is supplied to AND circuit 1112 in FIG. 8o to await the first UNCERTAINTY signal which is supplied from the input buffer.

There is provided an AND circuit 1113 in FIG. 8o which is adapted to receive the 8, $\bar{1}$ and 2 bits from the sense latches in FIG. 8e. That is, when this particular combination of signals is supplied from the sense latches, it is an indication that an UNCERTAINTY has been sensed in the input buffer. When this occurs, a relatively positive voltage will be supplied from AND circuit 1113 through cathode follower 1114 to produce a STORAGE UNCERTAINTY signal. This signal is supplied to AND circuit 1112 which receives the ERROR COMPARE LATCH signal. At this time, the output of AND circuit 1112 will become relatively positive and is supplied through a cathode follower 1115 to AND circuit 1116. The last-mentioned AND circuit is sampled at B$p$ time and supplies an input to turn the uncertainty latch 1117 ON. The uncertainty latch is comprised of OR circuit 1118, a double inverter 1119 and the cathode follower 1120, the output of the cathode follower being supplied back to the OR circuit 1118 to hold the latch ON.

It is not desired to transfer the UNCERTAINTY signal from the input buffer to the output buffer. Instead, it is desired to insert the corrected digit which is in the adder at this time into the output buffer in the same storage position where an UNCERTAINTY has just been sensed in the input buffer. Therefore, as soon as the STORAGE UNCERTAINTY signal is produced from cathode follower 1114, in FIG. 8o, a relatively positive voltage is supplied to AND circuit 1121 in FIG. 8r which also receives the ERROR COMPARE LATCH signal. The output of AND circuit 1121 is supplied through OR circuit 779 to cathode follower 780 and results in producing an ENTER ADDER INTO STORAGE signal. This signal is supplied to AND circuits 781 through 785 in FIG. 8f which receive respectively the 8, 4, 2, 1 and R bits of the information in the adder. Therefore, it is seen that the output of these AND circuits will be supplied to the inhibit core drivers 769 and 665 through 669. The ENTER ADDER INTO STORAGE signal is also used by OR circuit 1020 and inverter 1018 in FIG. 8k to prevent regeneration. That is, the aforementioned signal causes the REGENERATION CONTROL signal to be relatively negative and to inhibit AND circuits 886 through 890 in FIG. 8f which receive the sense latch outputs.

From the above, it will be appreciated that when an UNCERTAINTY is sensed in an error correction field in input storage, the number in the adder is placed in the output buffer in lieu of the UNCERTAINTY signal in the sense latches.

When a second 6 bit is received, indicating that the last character in the error correction field has been sensed, AND circuit 1105 in FIG. 8n will again supply a relatively positive output voltage at LA$p$ time. This time the signal from AND circuit 1105 is supplied through a cathode follower 1122 to an AND circuit 1123, the other input to this AND circuit being relatively positive at this time since it is supplied from the error compare latch 1108. The output of AND circuit 1123 is supplied to a single-shot multivibrator 1124 which produces a relatively positive output voltage which lasts for forty microseconds. There is provided an AND circuit 1125 which is connected to receive this forty microsecond relatively positive voltage and in addition the R$p$ signal. At R$p$ time, a relatively positive voltage will be supplied from AND circuit 1125 through OR circuit 1126 to an inverter 1127. The plate of the inverter 1127 shares the plate load with the plate in the right side of the double inverter 1110 and thereby will turn the error compare latch 1108 OFF. That is, the relatively positive input voltage to inverter 1127 results in a relatively negative volatge at the output thereof which pulls down the plate of the right side of the double inverter 1110. Thus, a relatively negative voltage is supplied through cathode follower 1111 to OR circuit 1109 so that the latch will remain OFF.

As the error compare latch 1108 in FIG. 8n was turned OFF when the second 6 bit was sensed, a positive-going output was capacitively coupled from the left side of the double inverter 1110 to a cathode follower 1128. This means that the output of the cathode follower will be relatively positive and when supplied to OR circuit 1072, will turn on the transfer corrected digit to adder latch 1076. This, of course, produces a new TRANSFER CORRECTED DIGIT TO ADDER signal from cathode followers 1074 and 1075. The same procedure ensues that previously ensued when the first TRANSFER CORRECTED DIGIT TO ADDER signal was produced. However, this time, the corrected digit in the second position of error correction buffer will be selected and placed in the adder, since, as previously mentioned, the second stage of the entry units counter is ON at this time.

The description up to this point has dealt with instances where a single UNCERTAINTY signal is produced in scanning the characters in a single information field. There is also a provision in the present invention for producing an error signal should there be two UNCERTAINTY signals produced in a single error correction information field. Referring to FIG. 8o, there is provided an AND circuit 1129 which is connected to receive the output of cathode follower 1115 and the output of the UNCERTAINTY latch 1117. It will be remembered that the UNCERTAINTY latch will supply a relatively positive output signal after the first UNCERTAINTY has been sensed. Should there now be another UNCERTAINTY signal supplied from the sense latches to AND circuit 1113, the output of the AND circuit will be supplied through cathode follower 1114 to the AND circuit 1112. Since the ERROR COMPARE latch input to AND circuit 1112 will also be relatively positive at this time, the output will be relatively positive and supply an input through cathode follower 1115 to AND circuit 1129. This switch is sampled by LA$p$ and supplies an output signal through OR circuit 1130 to a single-shot multivibrator 1131. This single-shot multivibrator is adapted to produce a one hundred microsecond relatively positive output signal which is labeled ANALYZER ERROR.

Thus, if two UNCERTAINTIES are produced in scanning a single information field which is to be error corrected, an ANALYZER ERROR signal is produced. An ANALYZER ERROR signal is also produced when a substitution error has been made by the character sensing apparatus. Suppose, for example that the digit 4 in the information field in the record card shown in FIG. 22a is read as the digit 8. This would amount to a substitution error. In this event, it will be seen that the field sum would be 31 instead of 27. Thus, the units order digit 1 would have been entered in the error correction buffer during the readin field sum operation. When the check digit 7 is sensed and supplied to the adder, the digit 8, which is the 9's complement of the digit 1 in the error correction buffer, will also be supplied to the adder. An additional count of one is entered into the added since it is actually desired, as previously explained, to have the 10's complement of the digit 1, which is in the error correction buffer, supplied to the adder. The sum of these digits supplied to the adder is 7+8+1=16 and the adder will have the digit 6 stored therein. This digit is read back to error correction buffer to await the transfer operation. It will be seen that if there were no UNCERTAINTIES in the information field, the adder actually should have a sum of zero therein.

During the transfer corrected digit to adder operation, the digit 6 in the error correction buffer is read into the adder in the usual manner. With the digit 6 in the adder, the output from inverter 754 in FIG. 8i, which produces the signal ZERO IN ADDER will be relatively negative. This indicates that the adder does not have zero therein. This relatively negative voltage is supplied through an OR circuit 1132 in FIG. 8o to an inverter 1133. The output of inverter 1133 will be relatively positive and is supplied to AND circuit 1134. Another input is supplied from the single-shot multivibrator 1124 in FIG. 8n, this input being relatively positive for forty microseconds following the coincidence of the second 6 bit in an error correct field with LAp during a transfer operation.

AND circuit 1134 in FIG. 8o is sampled by Bp and supplies an output through OR circuit 1130 to single-shot multivibrator 1131. Therefore, a relatively positive output voltage of one hundred microseconds duration will be supplied from the single-shot multivibrator 1131 to produce an ANALYZER ERROR signal.

It will be appreciated from the previous description of instances where an UNCERTAINTY occurs in an error correct field that the adder does not usually have a sum of zero therein. That is, if there is a single UNCERTAINTY in the particular information field, then the adder should have the corrected digit therein rather than zero, unless, of course, the corrected digit happens to be zero. In order to prevent the production of an ANALYZER ERROR signal where there is an UNCERTAINTY in an error correct field, the OR circuit 1132 in FIG. 8o is connected to receive the output of cathode follower 1115 as well as the output of the uncertainty latch 1117. Cathode follower 1115 is connected to receive the output of AND circuit 1112 which is relatively positive when the error compare latch is ON and a STORAGE UNCERTAINTY signal is produced. The relatively positive voltage from cathode follower 1115 or the relatively positive voltage from cathode follower 1120 in the uncertainty latch 1117 will be supplied through OR circuit 1132 and result in a relatively positive voltage therefrom. It will be remembered that an OR circuit supplies as its output the most positive voltage which is supplied thereto as an input. It is due to this fact that either of these relatively positive voltages can override the effect of the relatively negative voltage ZERO IN ADDER. Therefore, the relatively positive voltage from OR circuit 1132 results in a relatively negative voltage from inverter 1133 so that AND circuit 1134 is inhibited. This means that an ANALYZER ERROR signal will not be produced even though there is not a zero in the adder, providing, however, that there is an UNCERTAINTY in the error correct field.

It will be remembered from the preceding description that when an UNCERTAINTY signal is produced in scanning a character in the check digit field, a READ CORRECTED DIGIT UNCERTAINTY INTO ADDER signal is supplied from cathode follower 1022 in FIG. 8q. This means that the coding for an UNCERTAINTY is supplied to the adder in lieu of the proper identification for the check digit. Thereafter, the UNCERTAINTY signal is supplied to error correction buffer where it remains until the transfer operation. During transfer the UNCERTAINTY signal will be supplied back to the adder in the same manner as the other corrected digits in the error correction buffer are supplied to the adder. During the TRANSFER CORRECTED DIGIT TO ADDER signal, the output of the sense latches will have the coding for an UNCERTAINTY signal therein and result in the production of a relatively positive voltage from AND circuit 1113 in FIG. 8o through cathode follower 1114 to produce the STORAGE UNCERTAINTY signal. This signal is supplied to AND circuit 1135 which also receives the Bp signal and the TRANSFER CORRECTED DIGIT TO ADDER signal. The TRANSFER CORRECTED DIGIT TO ADDER signal is also supplied to AND circuit 1136 which is sampled by Ap. The output of this AND circuit is supplied to an inverter 1137 whose plate shares the plate load of the right side of the double inverter 1119, thereby turning the uncertainty latch 1117 OFF in the event it had been ON. Thereafter, AND circuit 1135 is sampled by Bp and supplies an input through OR circuit 1118 to turn the uncertainty latch 1117 ON.

The fact that the uncertainty latch is ON does not necessarily mean that the ANALYZER ERROR signal will be produced. Whether such a signal is produced, is dependent upon whether an additional UNCERTAINTY signal is sensed in input buffer for the corresponding error correction field while the UNCERTAINTY latch is ON. That is, if all of the characters in the information field with which the check digit UNCERTAINTY is associated were properly identified, then there is not need to refer to the adder during transfer. However, if an UNCERTAINTY is sensed in the information in input buffer while an UNCERTAINTY signal is stored in the adder, the output of AND circuit 1113 in FIG. 8o will be supplied through cathode follower 1114 to AND circuit 1112. The other input to AND circuit 1112 is the ERROR COMPARE LATCH signal. The output of AND circuit 1112 is supplied through cathode follower 1115 to AND circuit 1129. Since the UNCERTAINTY latch 1117 was turned ON by the sending of an UNCERTAINTY for the corrected digit, a relatively positive voltage will be supplied from cathode follower 1120 to AND circuit 1129. This means that when this AND circuit is sampled by LAp, a relatively positive voltage will be supplied therefrom through OR circuit 1130 to the single-shot multivibrator 1131. The output from the single-shot multivibrator is a one hundred microsecond pulse which, as previously described, is termed ANALYZER ERROR. To summarize, if an UNCERTAINTY is sensed in scanning one of the check digits, it does not result in the production of an ANALYZER ERROR signal unless there is also an UNCERTAINTY in the information field associated with the check digit.

The transfer operation proceeds in the manner described above until all sixty positions in the input buffer have been sensed and entries made into the output buffer. As the last character in input buffer is read out, the signal CT5, which is supplied from push-pull unit 530 in FIG. 4a, goes relatively negative. This negative-going voltage is supplied to inverter 1140 in FIG. 8t and results in a positive-going voltage from the inverter. This last-mentioned voltage is supplied through cathode follower 1141 to OR circuit 1060. The output of the OR circuit results in producing a relatively negative voltage from the push-pull unit 1061, this being the TRANSFER signal. This causes the transfer latch to be turned OFF. That is, the relatively negative output voltage from push-pull unit 1061 is supplied through OR circuit 1057 to inverter 1058. This results in a relatively positive voltage from inverter 1058 to cathode follower 1059. Thus, the output of this cathode follower, which is termed $\overline{\text{TRANSFER}}$, goes relatively positive. This voltage is supplied through OR circuit 1060 to push-pull unit 1061, thereby holding the transfer latch OFF. The $\overline{\text{TRANSFER}}$ signal, which is now relatively positive, is supplied through OR circuit 1126 on FIG. 8n to inverter 1127. The negative-going output voltage from inverter 1127 is supplied to the plate of the right side of double inverter 1110. This concludes the transfer operation by turning the error compare latch 1108 OFF.

ZERO INSERTION

The number of significant digits in an information field may vary over a wide range. For example, the card shown in FIG. 22b is made up for each of a plurality of different parts which are to be sold and the part numbers may vary from one to a particular maximum number of significant digits. The dollar amount for the part may also contain from one to some maximum number of digits and exist in an adjacent field. Let it be assumed, by way of example, that from one to a maximum of ten significant digits may exit in the part number fielded and from one to a maximum of five significant digits may exist in the dollar amount field. In the record card to be punched with this information, a part number field containing ten columns and a dollar amount field containing five columns will be assigned. Thus, if the maximum number of digits exist in each field, the columns in the card to be punched which are assigned to the part number and dollar amount fields will be filled with significant digits.

Now let it be assumed that a part number field is scanned which has only three significant digits. Since the scanned information ordinarily will be supplied to input buffer in the order sensed, it will be seen that unless some special provision is made the dollar amount field information in the card being scanned would appear in the part number field of the card to be punched. That is, the dollar amount digits would immediately follow the three part number digits. The obvious solution of this problem would be to print zeros to the left of the significant digits in the part number field of the record card to be scanned. In the above example, seven zeros would have to be printed. It will be appreciated that this would be a time-consuming operation and possibly result in a miscount by the person typing the document.

The present invention overcomes this problem by automatically inserting zeros in the input buffer, after the last significant digit in the field has been sensed, until the number of digits supplied to the input buffer for a field is equal to the maximum number of digits the field may contain. Thus, in the example above, after the first three digits are identified in the part number field and supplied to the input buffer, seven zeros would be generated and supplied to the input buffer. Therefore, by the time the dollar amount field is sensed, the digits therein will be entered into the input buffer in the proper relationship following the part number information. When the information in the input buffer is transferred to the output buffer and thereafter transferred to the punch, it will be seen that the seven columns following the significant digits in the part number field will have zeros punched therein so that the dollar amount information follows the last of the seven zeros. It is, of course, possible in punches to suppress the punching of zeros to the left of the last significant digit in accordance with standard accounting machine practice. Thus, the choice of whether the zeros are actually punched may be left up to the operator. The important thing to note is that the dollar amount information stays in the punched card field to which it is assigned and does not jump over into the part number field.

It should be pointed out at this time that it is not necessary to perform the zero insertion operation for every information field. The selection is left completely up to the operator and may be made by plugboard control. In order to begin a zero insertion operation, it is necessary to select a particular units and tens order position from the entry units and tens counters for controlling the beginning of the field which is to have a zero innsertion operation performed, and also the units and tens order position of the end of the field.

Reference is made to FIGS. 13a and 13b which disclose the circuitry for turning the zero insertion OFF and ON, respectively. Referring to FIG. 13b, there is provided a plurality of pairs of plug hubs under the legend ZERO INSERTION ON which are labeled FIELD 1 through FIELD 8, these pairs of plug hubs being respectively connected to AND circuit 1142 through 1149. The output from each of these AND circuits is supplied through an OR circuit 1150 to an AND circuit 1151. The output of the OR circuit is labeled 1st POSITION ZERO INSERTION FIELD. The other input to AND circuit 1151 is supplied from the field mark latch 1154. A field mark may generally be used at the beginning of each field. This field mark may be one of the special characters previously described as being supplied from the character sensing apparatus 580 in FIG. 8a to the AND circuits 591 through 594. Whichever one of the field marks is used, when it is sensed by the character sensing apparatus just prior to the beginning of the scanning operation for the first character within the field, a relatively positive output signal is produced from the AND circuit associated therewith. This signal terminates however and produces a negative-going voltage which is supplied to inverter 1152 in FIG. 13b. The output from this inverter will be a positive-going voltage which is supplied through a cathode follower 1153 to the field mark latch 1154, turning the latch ON. This latch is comprised of an OR circuit 1155, a double inverter 1156 and a cathode follower 1157. The output of cathode follower 1157 is supplied to AND circuit 1151. It will be seen that the field mark latch 1154 can be reset OFF by the CHARACTER READIN OR TRANSFER signal which is supplied from OR circuit 1069 in FIG. 8m to the inverter 1158 in FIG. 13b. The plate of inverter 1158 shares the plate load of the right side of the double inverter 1156 and when a relatively positive input is supplied to inverter 1158, the field mark latch 1154 is turned OFF.

When the two inputs to AND circuit 1151 in FIG. 13b are relatively positive in coincidence, a signal is supplied through cathode follower 1159 to the zero insertion field latch which is comprised of an inverter 1160 and a push-pull unit 1161. The manner in which this latch is turned ON will be now described. The relatively positive voltage from cathode follower 1159 produces a relatively negative voltage from the inverter 1160 which results in a relatively positive voltage being supplied from the push-pull unit 1161. This relatively positive voltage is supplied back to the inverter 1160 and thereby holds the inverter 1160 and the push-pull unit 1161 in the condition in which they were placed by the relatively positive voltage from cathode follower 1159. The output of push-pull unit 1161 is termed ZERO INSERTION FIELD. This signal is supplied to an AND circuit 905 in FIG. 8p.

It will be remembered that the field mark latch 1154 in FIG. 13b was turned ON by the end of the field mark signal representing the field mark at the beginning of the field. Therefore, the signal ZERO INSERTION FIELD is produced following the identification of the field mark, The other input to AND circuit 905 in FIG. 8p is the field mark at the end of the field. Thus, when some specific field mark at the end of the field is sensed, a relatively positive voltage is supplied to AND circuit 905 which in turn supplies a relatively positive voltage to the insert zero latch 906, this latch being comprised of OR circuit 907, double inverter 908 and cathode follower 909. The output of the cathode follower is the INSERT ZERO signal which is fed back to OR circuit 907 to maintain the latch ON.

The INSERT ZERO signal serves as an input to cathode follower 911 in FIG. 8a. It is noted that the output of this cathode follower shares the cathode resistor in the cathode follower 605. This means that these two cathode followers form a logical OR circuit. Therefore, when the INSERT ZERO signal is positive, a relatively positive voltage will be supplied to AND circuit 649 in FIG. 8f and to OR circuit 606 in FIG. 8g. It will be seen that this particular signal represents an R bit which, as previously mentioned, represents the digit zero. The other signal required by AND circuit 649 is the CHARACTER READIN signal. This signal is generated by the character latch in FIG. 8g. That is, the INSERT ZERO signal through cathode follower 911 in FIG. 8a and OR circuit 606 in FIG. 8g supplies one of the inputs to AND circuit 607. The other input is the CHARACTER SENSE LATCH signal which is supplied through OR circuit 608. The output signal from AND circuit 607 causes a CHARACTER LATCH signal which in turn, at CUX time produces the CHARACTER READIN signal from cathode followers 641 and 642.

Referring again to FIG. 8f, since AND circuit 649 is receiving relatively positive inputs in coincidences, an output will be produced therefrom which, in a manner previously described, will result in the lack of a negative half-current pulse on the terminal IhR in storage. Signals are provided on the proper ones of terminals U0 through U9 and T0 through T5 to assure that a zero will be placed in the proper position of storage. With the information supplied to AND circuit 649 and OR circuit 606 in the manner previously described, a zero will be inserted into the input buffer.

When the insert zero latch 906 in FIG. 8p first went ON, a relatively positive voltage was supplied therefrom to AND circuit 913. This circuit also receives a relatively positive voltage from the inverter 912 since the input to this inverter is relatively negative at this time. The other input to AND circuit 913 is the CHARACTER READIN signal. Therefore, when the first zero is read into input buffer, a relatively positive voltage will be supplied from AND circuit 913 through OR circuit 1088 to inverter 1089. The output of inverter 1089 will be relatively negative and will inhibit AND circuit 1090 so that this circuit cannot be sampled by the reset pulse Rp. Therefore, a relatively negative CONTROL UNITS ADVANCE signal cannot be supplied at Rp time from the inverter 1063 in the normal manner. This means that the control units counter stops while zeros are being inserted into the input buffer. At the same time, however, there is an AND circuit 914 provided in FIG. 8p which is connected to receive the output of the insert zero latch 906, the output of inverter 912 and the CHARACTER READIN signal. This AND circuit is also sampled by Rp and will produce a relatively positive output signal at Rp time when the other three inputs thereto are relatively positive in coincidence. The output of this AND circuit is supplied through OR circuit 679 and an inverter 680 to produce an ENTRY UNITS ADVANCE signal. Therefore, as each zero is inserted in the input buffer, the ENTRY UNITS ADVANCE signal advances the entry units counter by a count of one.

Reference is made to FIG. 13a which discloses a plurality of pairs of plug hubs under the legend ZERO INSERTION OFF which are labeled FIELD 1 through FIELD 8, these pairs of plug hubs being connected respectively to AND circuits 1162 through 1169. Particular units and tens outputs from the entry units and tens counters are connected to each pair of plug hubs for the number of fields in the card where zero insertion may occur. For example, if the very first field in the card is to contain a maximum of ten digits, the EU9 output from the entry units counter and the T0 output from the entry tens counter are connected to the pair of plug hubs which are labeled OFF FIELD 1. As soon as the counters advance to this point, a relatively positive voltage will be supplied from AND circuit 1162 through OR circuit 1170 to produce the ZERO INSERT OFF signal. This signal is supplied to inverter 912 on FIG. 8p. The output of the inverter will be relatively negative and will therefore inhibit AND circuit 913. This means that AND circuit 913 will no longer inhibit AND circuit 1090 so that at Rp time AND circuit 1090 will supply an output through cathode follower 1091 to inverter 1063 which produces the CONTROL UNITS ADVANCE pulses. Since AND circuit 914 is also inhibited by the ZERO INSERT OFF signal supplied to inverter 912, it will not be able to supply an output signal at Rp time. This means that the entry units counter will not advance at this time. However, the CHARACTER READIN signal which is produced at CUX time, as shown in FIG. 8g, is supplied through OR circuit 675 in FIG. 8p to turn ON the entry units advance latch. This results in a relatively positive voltage being supplied from cathode follower 677 to AND circuit 678. Since the control units counter was allowed to advance by virtue of the CONTROL UNITS ADVANCE signal being supplied from inverter 1063, successive signals CU0 and CPU9 will be produced, it being understood that the counter was stopped at CUX time during the insert zero operation. At CU3 time, AND circuit 678 in FIG. 8p is sampled by Bp and supplies an output through OR circuit 679 and inverter 680 to produce the ENTRY UNITS ADVANCE signal. Therefore, the entry units counter is advanced so that it is ready to control the selection of the proper windings in the input buffer for the first digit in the next information field.

Referring again to FIG. 13a, it will be seen that when CU0 time arrives in the control units counter, the CHARACTER LATCH and CU0 signal will be relatively positive and, when supplied to AND circuit 1171 will produce a relatively positive output from this switch. An OR circuit 1172 receives the output from AND circuit 1171 and supplies it through an inverter 1173 to reset the zero insertion field latch, which is shown in FIG. 13b, OFF. That is, the output from inverter 1173 will be relatively negative and when this is supplied to push-pull unit 1161, a relatively negative output will be supplied from the push-pull unit which will no longer hold the inverter 1160 in conduction. Thus, zero insertion has been completed for the field.

Additional fields requiring zero insertion may be handled in the same manner as that described above.

The character sensing apparatus 580, as described in the aforementioned Rohland and Greanias application, has the ability to produce a RECOGNITION BLANK signal. This signal is produced by the apparatus when a predetermined number of scans have elapsed since the last character identity signal without obtaining sufficient information to satisfy minimum character requirements. In other words, as far as the machine is concerned, a character was not printed in this space although the space is sufficient in size to contain a character. It is possible that during the preparation of the document an attempt was made to print a character in the space but it was so poorly printed that the character sensing apparatus decided that it was not a character at all. It will be seen that a problem develops during a zero insertion operation if a character is so poorly printed that the character sensing apparatus does not provide a character identity signal.

Suppose, for example, that the PART # field in the card shown in FIG. 22b can contain a a maximum of ten digits and that the character 2 is so poorly printed that the character sensing apparatus fails to find minimum character requirements. This means that instead of inserting five 0's to the left of the digit 7 six 0's would be inserted. Thus an error will occur that is not detectable unless error correction is also being carried on at the same time. This is one of the reasons, among others, that a RECOGNITION BLANK signal is produced.

In a zero insertion field, a rule may be established that a blank space of such a size as to be capable of producing a RECOGNITION BLANK signal is not allowed between characters in the field, except under special circumstances. The special exception occurs in one specific instance in the card shown in FIG. 22b. The decimal point, between the dollar and cents portions which is not one of the characters to be recognized nevertheless takes up a full character space. Therefore, a RECOGNITION BLANK signal will be produced. Under these circumstances, however, a blank is expected at this point and can be programmed in advance. That is, when the machine is programmed up for a particular run of cards of the type shown in FIG. 22b, the entry units and entry tens counters would always be in the same position at the time the space taken by the decimal point is scanned, and at this time a signal DECIMAL POSITION ZERO INSERTION FIELD can be generated. This signal will be relatively positive pulse which occurs only for this setting of the entry units and entry tens counters, the signal being relatively negative at all times. When this signal is supplied through an inverter, a $\overline{\text{DECIMAL POSITION INSERTION FIELD}}$ signal is produced. This signal is relatively positive except during the particular chosen setting of the units and tens counters, at which setting the signal is relatively negative.

Keeping the above conditions in mind, reference is made to FIG. 8n where an AND circuit 1370 is adapted to receive the RECOGNITION BLANK signal and the ZERO INSERTION FIELD signal, the former signal being supplied from the character sensing apparatus and the latter signal being supplied from the push-pull unit 1161 in FIG. 13b. The output of AND circuit 1370 is inverted in inverter 1371 and supplied to the first stage of a two stage counter, the counter comprising triggers 1372 and 1373. The counter is normally reset at zero by way of an AND circuit 1374 which receives the CHARACTER READIN signal and Bp, the output of this AND circuit being supplied through an OR circuit 1375 to inverters 1376 and 1377. Inverter 1376 shares the plate load of the right side of trigger 1372 while inverter 1377 shares the plate load of the right side of trigger 1373.

Let it be assumed that the two stage counter is reset to zero and following this a RECOGNITION BLANK signal is produced during a zero insertion field. This means that AND circuit 1370 will supply an output through inverter 1371 to turn trigger 1372 ON. Thus, the voltage from the right side of trigger 1372 will be relatively positive and when supplied through cathode follower 1378 will raise one of the inputs to AND circuit 1379. In the event the RECOGNITION BLANK signal was produced at a point in the field other than where an anticipated decimal point is placed, the $\overline{\text{DECIMAL POSITION ZERO INSERTION FIELD}}$ will be relatively positive. The relatively positive output will be supplied from AND circuit 1379 through a cathode follower 1380 to an AND circuit 1381 in FIG. 8o. This AND circuit 1381 receives another signal from an inverter 1382, the input to said inverter being the 1ST POSITION ZERO INSERTION FIELD signal supplied from OR circuit 1150 in FIG. 13b. In other words, AND circuit 1381 will be inhibited until after the first character has been identified in a zero insertion field. Once the first character has been identified, and the entry units counter has advanced, the output from inverter 1382 will be relatively positive. When the next CHARACTER READIN signal is produced, i.e., there must be another character in the zero insertion field after the RECOGNITION BLANK signal is produced, AND circuit 1381 will supply a relatively positive output signal at LAp time through an OR circuit 1130 to single-shot multivibrator 1131, the output from the last-mentioned circuit being a relatively positive pulse of one hundred microseconds duration which is the ANALYZER ERROR signal where there is a sufficient space between characters in a zero insertion field to produce a RECOGNITION BLANK signal and the space was not between the dollar and cents portions, i.e., at the decimal point, of the field.

Now let it be assumed that the RECOGNITION BLANK signal is produced at the time when it is expected that such a signal will be produced, i.e., between the dollar and cents portions of the field. Under these circumstances AND circuit 1379 in FIG. 8n will be inhibited since the $\overline{\text{DECIMAL POSITION INSERTION FIELD}}$ will be relatively negative so that the ANALYZER ERROR signal will not be produced under these circumstances. However, should a second RECOGNITION BLANK signal be produced at the time the $\overline{\text{DECIMAL POSITION INSERTION FIELD}}$ is relatively negative, trigger 1372 will be turned OFF and will in turn cause trigger 1373 to be turned ON. The output of the last-mentioned trigger will be relatively positive and when supplied through cathode follower 1383 to AND circuit 1381 in FIG. 8o will produce an ANALYZER ERROR signal, providing the other inputs to AND circuit 1381 are relatively positive in coincidence with the relatively positive signal from trigger 1373. Thus, the machine will tolerate a single blank space at the decimal point in a zero insertion field but will not tolerate two blank spaces.

It will be remembered that AND circuit 1381 in FIG. 8o was inhibited during the first position of zero insertion field. This means that once the first character has been identified suitable precautions are thereafter taken in a zero insertion field to assure the proper detection of blank spaces between characters in the field. Once the last character in the field has been detected and an INSERT ZERO signal is produced so as to place the proper number of 0's in storage with the identified characters in the field, each INSERT ZERO signal, which is supplied to OR circuit 1373 in FIG. 8n, can keep the two stage counter reset to zero. Thus, ANALYZER ERROR signals will not be produced for the blank spaces to the left of the highest significant digit in the zero insertion field.

READOUT TO PUNCH

To this point there has been described the manner in which characters are identified and stored in the input buffer and then transferred to the ouput buffer during the transfer operation. Once the output buffer is filled with characters a new group of characters cannot be read into the output buffer until the characters therein have been supplied to an appropriate utilization device. Insofar as this first detailed embodiment of the present invention is concerned, the utilization device is considered to be a card punch.

As is well known, record cards may be divided into eighty vertical columns, each column having twelve index points. These index points are designated 12, 11, 0, 1, 2, 3, 4, 5, 6, 7, 8 and 9. Similar numbered index points in the many columns are in rows which may be identified by the index point number. In the present embodiment the record card is considered to be fed to the punching mechanism twelve row first. The punching mechanism may, by way of example, be similar to that shown in Reissue Patent No. 21,133 granted to C. D. Lake on June 27, 1939, for Perforating Machine. Punches of this type or those having somewhat similar characteristics are well known in the business machine field today. In this type of punch, there is a row of eighty separate punches. These punches are arranged in a line with each other and may be selectively made operative so that when the entire row of punches are moved toward a card to be punched, only the punches selected will cause a perforation in a particular column of the card. The card is fed intermittently, row by row, under the aforementioned row of eighty punches. When the 0 row of the card is under the punches, all of the 0's to be punched in the card are read out of the output buffer of storage and used to set up punch magnets for those punches in the columns of the card in which 0's are to be punched. Once all of the punch magnets are set up for punching 0's, punching takes place. Next, the card advances until row 1 is under the punches. All of the 1's in storage are read out as in the case of the 0's and punching again takes place. This action continues until the card passes from the punching station.

Two basic conditions must be met before punching can take place. The first condition is that the output buffer must be ready to supply information for the punching operation and the second condition is that the punch must be ready to punch. These conditions are checked by a circuit shown in FIG. 8j. Readout to punch is accomplished after a transfer operation. Before punching, however, it is desirable to know that no ANALYZER ERROR signals were produced during the transfer operation. To check this condition, there is provided a latch which includes an OR circuit 1222 which is adapted to receive the TRANSFER START signal. It will be remembered that the TRANSFER START signal is supplied from the reset latch 1053 in FIG. 8s through a cathode follower 957. The TRANSFER START signal causes a relatively positive output from OR circuit 1222 to inverter 1223. The output of the inverter will be relatively negative, and when supplied through cathode follower 1224 and OR circuit 1225 to an inverter 1226, causes a relatively positive output from the last-mentioned inverter to be supplied through a cathode follower 1227 to OR circuit 1222. In this manner the latch is turned ON so that the relatively positive output from cathode follower 1227 is supplied as one input to an AND circuit 1221. A check is made during transfer for an ANALYZER ERROR signal. That is, if such a signal is produced during transfer, OR circuit 1225 will supply a relatively positive output to inverter 1226 whose output will be relatively negative which will inhibit AND circuit 1221. Thus, if an ANALYZER ERROR signal is not produced during transfer AND circuit 1221 will not be inhibited.

Another input to AND circuit 1221 is the READOUT TO PUNCH signal. When this punch is ready to punch, a PUNCH INDEX signal is supplied therefrom through the filter circuit 1046 in FIG. 8t to AND circuit 1047. This AND circuit is sampled by CUX and turns the transfer latch 1042 OFF. The relatively negative output therefrom is supplied through cathode follower 1045 and OR circuit 1015 to the push-pull unit 1016. The relatively positive output from the latter unit is the READOUT TO PUNCH signal which, as previously mentioned, is supplied to AND circuit 1221 in FIG. 8j. With the punch receiving the card 12 edge first, the first punching will occur when the punch is aligned with the 0 index of the card. Next, it is necessary to look for all of the 0's in the output buffer. This means that the punch must supply a particular coded output which can be compared with each digit being supplied from the output buffer. The punch generates its outputs by means of code cams. These cams operate circuit breakers which supply a relatively negative voltage to indicate a binary 1 condition and a relatively positive voltage to indicate a binary 0 condition. Referring to FIG. 8j there is illustrated a plurality of terminals labeled CB R, CB 8, CB 4, CB 2 and CB 1 which are respectively connected to the center tap of resistors 1200, 1201, 1202, 1203 and 1204. One end of each of the resistors is connected to a positive source of potential, herein illustrated as +15 volts D.C. The other end of resistors 1200 through 1204 is respectively connected to the input circuit of inverters 1205 through 1209. The outputs from inverters 1205 through 1209 are respectively connected to comparing units 1210 through 1214.

If the punch is ready to punch all 0's, for example, terminal CB R will be relatively negative and terminals CB 8, CB 4, CB 2 and CB 1 will be relatively positive. This means that the input to comparing unit 1210 from inverter 1205 will be relatively positive and the input to each of the comparing units 1211 through 1214 from inverters 1206 through 1209, respectively, will be relatively negative. Thus, the comparing units receive the coding for a 0 from the punch. Before an output can be supplied from these comparing units as an entity, the same coding must be supplied thereto from the output buffer.

The control units and control tens counters go through their normal cycle, except when interrupted for some reason during the reading of information into input buffer for the next card, read out the information in all sixty positions of output buffer storage. As previously described, the information appears in the sense latches shown in FIG. 8e. The 6, R, 8, 4, 2 and 1 bits of each storage position are supplied from inverter-follower units 868 through 873, respectively. It will be remembered that the outputs of the last-mentioned output inverters are respectively supplied to inverter-followers 874 through 879. Since the punch is only interested in the R, 8, 4, 2 and 1 bits, only the outputs of inverter-follower 875 through 879 are utilized, these outputs being supplied through inverters 1215 through 1219, respectively, FIG. 8j, to comparing units 1210 through 1214, respectively.

The characters in positions 1 through 60 of output buffer are successively read and supplied to the sense latches in FIG. 8e.

The comparing units 1210 through 1214 in FIG. 8j each continuously looks for two inputs thereto which are identical. It will be remembered that the comparing unit will supply a relatively positive output as long as the two inputs thereto are the same. As soon as the coding for the character 0 shows up in the comparing units from output buffer, the comparing units recognize that it is the same as that supplied from the circuit breakers in the punch and a relatively positive eoutput is supplied from the comparing units through a cathode follower 1220 to AND circuit 1221. When all of the inputs to AND circuit 1221 are relatively positive in coincidence a relatively positive output signal will be supplied therefrom through cathode follower 1228 to produce the READOUT CONTROL signal.

It has been previously mentioned that the conventional punch has eighty separate punches arranged in a row for use in making selected perforations in specific columns of the card. Each of the punches is controlled by a punch magnet which is in turn controlled by a thyratron, the punch magnet being connected in the cathode circuit of the thyratron. Each thyratron is adapted to receive two inputs. When these two inputs are relatively positive in coincidence the thyratron will be caused to conduct. The arrangement ordinarily is such that the thyratrons for controlling punches one through eighty are conditioned for conduction in sequence. All of the thyratrons form what may be termed a thyratron matrix.

The thyratron matrix in the present invention is comprised of the thyratron units 1301 through 1360 which are shown in FIG. 53a and FIG. 53b. As shown, this matrix is comprised of six horizontal rows of thyratrons and ten vertical rows of thyratrons. The reason that only sixty thyratrons are utilized in the present invention, in contrast with conventional punching apparatus which have eighty punches, is due to the fact that in the illustrated embodiment only sixty characters are stored in output buffer. It will be appreciated that the number of characters to be punched is dependent upon the particular problem at hand which is to be solved. The drive for the vertical rows of thyratrons is supplied by the signals $\overline{CU0}$ through $\overline{CU9}$ which are produced in the control units counter in FIG. 3a. The signal $\overline{CU0}$ is supplied through inverter 1250 to the upper grid of each of the thyratrons 1301, 1311, 1321, 1331, 1341 and 1351. This means that when the control units counter is set so that the first position thereof is ON the signal $\overline{CU0}$ will be relatively negative so that the output of inverter 1250 will be relatively positive. Therefore, each of the thyratrons to which the inverter is connected will be conditioned for conduction. That is, if the other input to the thyratron is relatively positive when the thyratron will conduct. The signal $\overline{CU1}$ is supplied through an inverter 1251 to the upper grid of each of the thyratrons 1302, 1312, 1322, 1332, 1342 and 1352. Thus, when the second stage of the control units counter is ON the signal $\overline{CU1}$ will be relatively negative which means that the input to each of the thyratrons connected to inverter 1251 will be relatively positive so that the thyratons in the second vertical row will be conditioned for conduction. In a similar manner the successive vertical rows of thyratrons are conditioned by the signals $\overline{CU2}$ through $\overline{CU9}$ which are respectively supplied through inverters 1252 through 1259.

To this point the thyratron matrix has been described to illustrate only that as the control units counter makes a complete cycle successive vertical rows of thyratrons are conditioned for conduction, but since this is only one input to each thyratron in a row the thyratron will not conduct unless it receives in addition a second input. Since each vertical row of thyratrons contains six thyratrons, it will be seen that some form of horizontal drive to the thyratrons must be furnished in order to select a particular thyratron for conduction.

In FIG. 8j a READOUT CONTROL signal was produced which was indicative of the fact that the character being read out of output buffer at that time corresponded with a character for which the punch is presently conditioned to produce. The READOUT CONTROL signal is supplied to each of the plurality of AND circuits 1230 through 1235 in FIG. 53a which are respectively connected to receive the signals CT0 through CT5. The last-named signals are supplied from the control tens counter in FIG. 4a. AND circuits 1230 through 1235 are adapted to supply their outputs through inverters 1236 through 1241, respectively, and the pairs of inverters 1242 through 1247, respectively, to the six horizontal drives for the thyratron matrix. That is, the horizontal drive for thyratrons 1301 through 1310 is supplied from the pair of inverters 1242, the horizontal drive for thyratrons 1311 through 1320 comes from the pair of inverters 1243, etc.

The operation of the matrix shown in FIGS. 53a and 53b may perhaps be easier understood if it is first assumed, for illustration that the READOUT CONTROL signal is relatively positive during an entire cycle of the control counter. Under these conditions, while CT0 is relatively positive, the control units counter will progress through its cycle and thyratrons 1301 through 1310 will be placed in conduction in succession. Then CT1 becomes relatively positive and thyratrons 1311 through 1320 are placed in conduction in succession. This action continues until CT5 becomes relatively positive and thyratrons 1351 through 1360 are placed in conduction in succession. Therefore, under these circumstances, thyratrons 1301 through 1360 will be successively placed in conduction.

Let it now be assumed that the READOUT CONTROL signal is not always relatively positive but is instead relatively positive, by way of example only, during the time that $\overline{CT2}$ is relatively positive and $\overline{CU4}$ is relatively negative. Under this condition, the only thyratron which will be placed in conduction during a complete run through all sixty thyratrons would be thyratron 1325. From the above, it will be seen that any one or more thyratrons 1301 through 1360 may be placed in conduction at a particular unique time under the control of the READOUT CONTROL signal. Since the control counter controls the order in which information is read out of the output buffer and also controls the order in which the thyratrons are successively conditioned, it will be seen that in the embodiment illustrated herein, thyratrons 1301 through 1360 are adapted to be controlled respectively by the characters in positions 1 through 60 of the output buffer.

To summarize the readout to punch operation, when the output buffer is ready to supply information relative to the characters stored therein and the punch is ready to begin receiving it, the punch sets up code cams for the first character which is to be punched. Thus, when the 0 index row in the card is under the punches, one or more serial runs through positions 1 through 60 of the output buffer is made to pick out all 0's. At the same time the thyratron is being conditioned such that a 0 found in one or more of positions 1 through 60 of output buffer will respectively cause one or more of thyratrons 1301 through 1360 to be placed in conduction. The punch retains its particular code setup for 0's for a predetermined period of time during which at least one complete run is made through the output buffer. At the end of this period of time, the punch operates to place a perforation in one or more of columns 1 through 60 in the card in accordance with which storage positions had 0's therein. Then the plate voltage of all of the thyratrons is disconnected from the plates thereof to allow the thyratrons to go out of conduction. Next the code cams in the punch change to set up the code for numeral 1 and supplies a PUNCH INDEX signal to initiate a READOUT TO PUNCH signal so as to begin searching output buffer for all of the numeral 1's therein. This action continues until all of the 9's have been read out of output buffer. Then an END READOUT TO PUNCH signal from the punch is utilized in FIG. 8t to turn latch 1042 ON at CUX time. The relatively positive output from this latch is supplied to AND circuit 1041 in FIG. 8s which also receives CARD END and INDEX 9 signals from the punch. A relatively positive output from AND circuit 1041 initiates production of the RESET and LONG RESET signals for the counters, the end of the RESET signal initiating production of a TRANSFER START signal and a TRANSFER signal.

A typical operation for utilizing the present invention with the card shown in FIG. 22b will now be described. It will be noticed that different operations are to be performed during the different fields on the card. Inasmuch as the card is read from right to left, the lozenge ◊ at the beginning of the ORDER NUMBER FIELD will be recognized first and a relatively positive output will be supplied from switch 592 in FIG. 8a to a plug hub terminal. This plug hub terminal will be the special character input to the AND circuit 629 shown in dotted outline in FIG. 7b, said switch also receiving the signals EU0 and ET0 from the entry units and entry tens counter, respectively. That is EU0 will be supplied from FIG. 3d while ET0 will be supplied from FIG. 4c. Since the entry counter will be conditioned so that relatively positive signals will be supplied from terminals EU0 and ET0 when the special character, the lozenge, is sensed, a relatively positive output will be supplied from AND circuit 629 to the pair of plug hubs connected to AND circuit 610 in FIG. 7b. As has been previously explained, this causes the character sense latch to be turned ON and the characters which are sensed in the first field will be supplied to storage in the manner previously explained.

Since there are four characters in the first field, the fifth character occurs in the CUSTOMER # field which is to be error corrected. This means that the two plug hubs labeled FIELD 1 under the legend ERROR CORRECTION ON in FIG. 12b must be connected to receive the signals ET0 and EU4. The reason that EU4 is used rather than EU5 is due to the fact that the first character is sensed at EU0 rather than EU1. This means that when the entry counter gets to the point where ET0 and EU4 supply relatively positive inputs to AND circuit 690 in FIG. 12b, the error correction latch will be turned ON and this particular field will be error corrected in the manner previously explained.

Inasmuch as the next field following the CUSTOMER # field is to be ignored, it is necessary to turn the character sense latch and error correction latch OFF at the end of the CUSTOMER # field. By counting the characters it will be seen that the signals ET0 and EU8 must be supplied to the pairs of plug hubs labeled FIELD ONE under the legend ERROR CORRECTION OFF in FIG. 12a and CHARACTER SENSE OFF in FIG. 7a. This means that after the 10th character from the beginning has been stored, character sense and error correction will be turned off.

The next thing which the character sensing apparatus must look for is the dash (—) which is the special character at the beginning of the PART # field. Inasmuch as the PART # field is going to be error corrected and also have a provision made for zero insertion, reference must now be made to FIG. 13b in addition to FIGS. 7b and 12b. Referring to FIG. 7b, for the present card shown in FIG. 22b, it would be necessary to provide an additional AND circuit similar to that illustrated by reference numeral 629, which would have its outputs connected to both of the plug hubs labeled FIELD TWO. The inputs to this additional AND circuit would be the signal for the special character, the dash, ET1 and EU0. Since the entry counter will be conditioned so that ET1 and EU0 are relatively positive following a time that the last character in the CUSTOMER # field is sensed, as soon as the dash is recognized, the character sense latch in FIG. 7b is turned ON. The plug hubs labeled FIELD TWO in FIG. 12b are connected to receive inputs from terminals ET1 and EU0 so that as soon as the entry counter gets to this position, the error correction latch in FIG. 12b is turned ON. Since this is the first zero insertion field, the plug hubs labeled FIELD ONE under the legend ZERO INSERTION ON in FIG. 13b are connected to receive inputs from the terminals ET1 and EU0. This supplies one of the inputs to AND circuit 1151 in FIG. 13b. The other input is produced by virtue of the field mark, which in this instance is the dash. That is, referring to the terminal labeled FIELD MARK in FIG. 13b, the terminal labeled C.P.H. — in FIG. 8a is connected to serve as the input to inverter 1152. This means that as soon as the input to this inverter goes negative, after having been positive to indicate the recognition of the dash, the latch 1154 is turned ON, so that AND circuit 1151 receives a relatively positive input therefrom. Following this the signal ZERO INSERTION FIELD will be produced from a push-pull unit 1161 which receives the output of AND circuit 1151 by way of cathode follower 1159 and inverter 1160. After the character 7 has been sensed, no more characters will be sensed until the asterisk is sensed at the end of the part number field.

Let it be assumed that the PART # field may contain up to ten digits. This means that since five digits have been sensed up to the time the asterisk is sensed, five zeros must be inserted in the PART # field in storage. Sensing of the asterisk will provide a relatively positive output signal from AND circuit 591 to plug hub C.P.H. * in FIG. 8a. This signal is adapted to be supplied as the SPECIFIC FIELD MARK signal to AND circuit 905 in FIG. 8b. The output of this AND circuit is utilized by the latch 906 to generate the INSERT ZERO signal, the last switching signal being utilized in FIG. 8a by the cathode follower 911 to produce a signal which, when supplied through the circuitry shown in FIGS. 8f and 8k, generates a zero in storage. As soon as the proper number of zeros have been inserted in storage, the zero insertion operation will end. Since the PART # field is adapted to contain ten characters, the last zero to be inserted will be the nineteenth character in storage. Therefore, the signals ET1 and EU8 will be supplied to the plug hubs labeled FIELD ONE in FIG. 13a which will turn zero insertion off. The same signals will be supplied to the pair of plug hubs labeled FIELD TWO in FIG. 12a to turn error correction off.

After the nineteenth character, which in this instance is the zero, has been entered in storage, the entry counter will advance so that relatively positive voltages will be supplied from ET2 and EU0. These signals are supplied to the pair of plug hubs labeled FIELD TWO on FIG. 13b and Field Three on FIG. 12b. This means that zero insertion and error correction will be turned on again for the AMOUNT field.

Between the two and the nine in the AMOUNT field, it will be noticed that a space is provided in which the decimal point is placed. In the present invention, provision is made for allowing such a space in the AMOUNT field. Since the character two in the AMOUNT field is the 21st character on the card, the entry counter will be at count of 22 following the recognition of the character two. This means then that relatively positive voltages will be supplied from the entry counter at terminals ET2 and EU2. It is these signals which are combined in a suitable AND circuit to produce the DECIMAL POSITION ZERO INSERTION FIELD signal, the inverse of this being utilized by AND circuit 1379 in FIG. 8a. Therefore, a recognition BLANK signal will be allowed at this time.

The AMOUNT field has been chosen to include no more than five digits. Therefore, when the special character at the end of the AMOUNT field occurs, in this instance the dollar sign ($), zero insertion will occur as described with respect to the PART NUMBER field except that this time the specific field mark will be the $ rather than the *. The first digit in the CHECK DIGIT FIELD will be the 25th digit in the card. It is the check digit for the ORDER # field. The second and third check digits are respectively for the PART # and AMOUNT fields. To turn the check digit field latch on in FIG. 8m, the signals ET2 and EU5 are supplied to the TENS and UNITS plug hubs connected to AND circuit 817 in FIG. 8m. The SPECIFIC FIELD MARK signal in this instance will be supplied from plug hub C.P.H. * in FIG. 8a. The output of AND circuit 817 turns on the check digit field latch which places the apparatus in condition for performing those operations scheduled at this time. It will be noticed that the OR circuit 900 in FIG. 8m is adapted to receive the signal FIELD MARK ENDING NO. 1. Referring to FIG. 22b it is seen that the special character at the end of the CHECK DIGIT FIELD is the dash (—). Therefore, the output from plug hub C.P.H. — FIG. 8a will be supplied as the FIELD MARK ENDING NO. 1 signal to OR circuit 900. This causes the check digit field latch to be turned off and the inspection of the card is at an end.

The foregoing description describes in detail a preferred embodiment of the invention, in which the check digits are the units' digits of the sums of the values in the error correction field and which are complemented to the base 10 (actually to base 9 and then incremented by 1). The number system can, of course, be other than decimal, such as, for example, 26 for checking alphabetic characters, 36 for decimal and numerical characters, 47 for decimal, alphabetic and 11 special characters, and so on, or to any particular base equal to or larger than the number of different numerals, letters, and/or special symbols that may occur in the field which is to be checked for errors. Also, any suitable complement can be used, choice depending upon design and economy. The system of controls would remain essentially the same as that described in the preferred embodiment, the principal differences in the data handling portions of the system residing in the adder, the complementing circuitry and the storage buffers, which would be modified to accommodate the numbering system employed, and the manner of coding the information for processing.

There are several advantages to the use of the complement form of check digit. One advantage is that only the status of the single digit adder used be checked, on a yes- or-no basis instead of making a comparison of two digits which is required when the true value of the check digit is employed. Another advantage is that no additional storage is necessary if the check digit immediately precedes or follows the number to be checked, or is part of the number to be checked. Since the check digit can be part of the number to be checked, neither the operator nor the machine need to know which of the digits is the check digit in order to check the validity of a number. Thus, as far as the operator is concerned, by varying the position of the check digit, identification of account number, personnel number, etc., by unauthorized personnel can be avoided. Insofar as the machine is concerned, the circuitry remains the same for different positions of the check digit.

While the invention has been particularly shown and described with reference to preferred embodiments thereof, it will be understood by those skilled in the art that various changes in form and details may be made therein without departing from the spirit and scope of the invention.

What is claimed is:

1. In a data processing system in which data is represented by predetermined numbers of digits arranged in fields, each of said fields having associated therewith a check digit having a value equal to the units order of the sum of the digits in said field, and in which an uncertainty of the value of any digit in a field is indicated by an uncertainty signal substituted for the uncertain digit, means for detecting errors in said digit values and substituting the correct value therefor, comprising, in combination, storage means for receiving and storing said digits in sequence, computing means for computing the units order sum digit for each field of digits stored, and storing said units order sum digit in said storage means, means including said computing means for obtaining the difference between said units order sum digit for a given field and the check digit for the given field, and means connected to said computing means and said storage means for substituting the computed difference for an uncertainty signal in said field.

2. In a data processing system in which data is represented by predetermined numbers of digits arranged in fields, each of said fields having associated therewith a check digit having a value equal to the units of the sum of the digits in said field, and in which an uncertainty of the value of any digit in a field is indicated by an uncertainty signal substituted for the uncertain digit, means for detecting errors in said digit values and substituting the correct value therefor, comprising, in combination, storage means connected to receive and store said digits and said uncertainty signals in sequence, adding means connected to receive and add said digit values to produce a sum digit value equal to the units order sum of the digits in each of said fields, said sum digit values being stored in said storage means, means including said adding means for computing the difference between the value of the check digit for each of said fields and the units order sum digit for the corresponding field, and means including said adding means and said storage means for substituting a digit value equal to said difference for said uncertainty signals in said fields in said storage means.

3. In a data processing system in which data is represented by data items arranged in groups, each of said items having a preassigned decimal numerical value, and each of said groups having associated therewith a check item having a decimal numerical value determined by the units order sum of the numerical values of the data items in the corresponding group, and in which system an uncertainty of any item in a group is designated by an uncertainty indication substituted for the uncertain item, means for correcting an uncertainty occurring in any one of said groups comprising, in combination, storage means for receiving and storing in sequence decimal numerical values of the items in said groups and uncertainty indications in each of said groups, adding means connected to said storage means for adding the successive numerical values for each item in a group and for supplying the computed units order sum digit for each of said groups to said storage means, means connected to said adding means and said storage means for generating the 9's complement of said computed unit order sum digits, means connected to the 9's complement generating means for supplying an additional count of 1 to said 9's complement values, means connected to said 9's complement generating means for supplying the augmented 9's complement values to said adding means concurrently with the check item numerical value for the associated group, and means connected to said adding means and said storage means for substituting the output of said adding means, following the addition of the augmented 9's complement value to the check digit value, in said storage means in lieu of any uncertainty indication, when the output of said adding means is other than zero.

4. The combination as claimed in claim 3 in which said data items and said check items are alphabetic items having preassigned decimal numerical values.

5. The combination as claimed in claim 3, in which said data items and said check items are numerical items having identical preassigned decimal values.

6. In a data processing system in which data is represented by data items arranged in groups, each of said items having a preassigned decimal numerical value, and each of said groups having associated therewith a check item having a decimal numerical value determined by the units order sum of the numerical values of the data items in the corresponding group, and in which system an uncertainty of any item in a group is designated by an uncertainty indication substituted for the uncertain item, means for correcting an uncertainty occurring in any one of said groups comprising, in combination, storage means for receiving and storing in sequence decimal numerical values of the items in said groups and uncertainty indications in each of said groups, adding means connected to said storage means for adding the successive numerical values for each item in a group and for supplying the computed units order sum digit for each of said groups to said storage means, complement generating means connected to said adding means for generating the 10's complement of said computed unit order sum digit, means connected to said complement generating means and said adding means for supplying the 10's complement values to said adding means concurrently with the check item numerical value for the associated group, and means connected to said adding means and said storage means for substituting the output of said adding means, following the addition of the 10's complement value to the check digit values, in said storage means in lieu of any uncertainty indication, when the output of the adding means is other than zero.

7. The combination as claimed in claim 6 in which said data items and said check items are numerical items having identical preassigned decimal values.

8. Apparatus for checking and correcting the accuracy of readings by character identification equipment of data represented by a group of characters having assigned values and by a check character, the assigned value of which bears a desired numeric relationship with the value of a preselected checking function which is a function of each character in the group, comprising means reponsive to character identifying signals derived from said equipment for calculating the value of the preselected checking function, means determining the existence of said relationship between the value of the check character and the calculated value of the checking function and determining the correct value of an uncertainty character in the absence of said relationship, means for storing the data represented by the identifying signals in selected positions thereof, and means effective in the event of an uncertainty character in a character group for storing the correct value of the uncertainty character in its selected position.

9. Apparatus for checking and correcting the accuracy of readings by character identification equipment of data represented by a group of characters having assigned values and by a check character the assigned value of which bears a desired numeric relationship with the value of a preselected checking function which is a function of each character in the group, comprising means responsive to character identifying signals derived from said equipment for calcuating the value of the preselected checking function, means determining the existence of said relationship between the value of the check character and the calculated value of the checking function and determining the correct value of an uncertainty character in the absence of said relationship, means for storing the data represented by the identifying signals in selected positions thereof, and means effective in the event of one but only one uncertainty character in a character group for storing the correct value of the uncertainty character in its selected position.

10. Apparatus for checking and correcting the accuracy of readings by character identifying equipment of data represented by a group of characters having assigned values and by a check character having an assigned value equal to the value of a preselected checking function which is a function of each character in the group, comprising means responsive to character identifying signals derived from said equipment for calculating the value of the preselected checking function, means determining the equivalency of the value of the check character and the calculated value of the checking function and determining the correct value of an uncertainty character in the absence of said equivalency, means for storing the data represented by the identifying signals in selected positions thereof, and means effective in the event of an uncertainty character in a character group for storing the correct value of the uncertainty character in its selected position.

11. Apparatus for checking and correcting the accuracy of readings by character identifying equipment of data represented by a group of characters having assigned values and by a check number having an assigned value equal to the value of a preselected checking function which is a function of each character in the group, comprising means responsive to character identifying signals derived from said equipment for calculating the value of the preselected checking function, means effective to determine alternatively the equivalency of the calculated value and the value of the check character or the correct value of an uncertainty character, means for storing the data represented by the identifying signals in selected positions thereof, and means effective in the event of one but only one uncertainty character in a character group for storing the correct value of the uncertainty character in its selected position.

12. Apparatus for checking and correcting the accuracy of readings by character sensing equipment of data represented by a group of characters having assigned values and by a check character the assigned value of which bears a desired numeric relationship with the value of a preselected checking function which is a function of each character in the group, comprising an adder responsive to character identifying signals derived from said equipment for calculating the value of the checking function, means for storing said calculated value, means for inserting the check character value into the adder, means including the adder effective to determine the existence of the desired numeric relationship and to determine the correct value of an uncertainty character in the absence of said relationship, means for storing the data represented by the identifying signals in selected positions thereof, and means effective in the event of an uncertainty character in a character group for storing the correct value of the uncertainty character in its selected position.

13. Apparatus for checking and correcting the accuracy of readings by character sensing equipment of data represented by a group of characters having assigned values and by a check character the assigned value of which bears a desired numeric relationship with the value of a preselected checking function which is a function of each character in the group, comprising an adder responsive to character identifying signals derived from said equipment for calculating the value of the checking function, means for storing said calculated value, means for inserting the check character value into the adder, means controlled by the calculated value for entering a value into the adder in accordance with said desired numeric relationship to determine alternatively the existence of the relationship or the correct value of an uncertainty character, means for storing the data represented by the identifying signals in selected positions thereof, and means effective in the event of one but only one uncertainty character in a group for storing the correct value of the uncertainty character in its selected position.

14. Apparatus for checking and correcting the accuracy of readings by character sensing equipment of data represented by a group of characters having assigned values and a check character having an assigned value equal to the value of a preselected checking function which is a function of each character in the group, comprising an adder responsive to character identifying signals derived from said equipment for calculating the value of the checking function, means for storing said calculated value, means for inserting the check character value into the adder, means entering a desired complement value of the calculated value into the adder to determine alternatively the existence of the desired numeric relationship or the correct value of an unidentified character in the group, means for storing the data represented by the identifying signals in selected positions thereof, and means effective in the event of one but only one unidentified character for storing its correct value in its selected position.

15. Apparatus for checking and correcting the accuracy of readings by character identifying equipment of data represented by groups of characters having assigned values and by a group of check characters, each having an assigned value which bears a desired numeric relationship with the value of a preselected checking function which is a function of each character in a respective one of the groups corresponding to the check character, comprising input storage responsive to character identifying signals derived from said equipment for storing the data representative of the groups, error correction storage, means including an adder responsive to the identifying signals for calculating the values of the preselected checking functions for said groups and for inserting the calculated values into the error correction storage, means for inserting the value of each of the check characters in the adder in sequence, means determining alternatively the existence of the desired numeric relationship between the check character value and the calculated value of the checking function of the corresponding character group or the correct value of an uncertainty character in the group, output storage, and means for transferring the data from input storage to output storage and effective in the event that there is one but only one uncertainty character in a group for transferring its correct value to output storage.

16. Apparatus for checking and correcting the accuracy of readings by character identifying equipment of data represented by groups of characters, the characters in at least one group having assigned values, and by at least one check character having an assigned value which bears a desired numeric relationship with the value of a preselected checking function which is a function of each character in said one group, comprising means including an adder responsive to character identifying signals from said equipment for calculating the value of the preselected checking function for said one group and for storing in selected positions at least data representative of said one group and the calculated value, means for inserting the value of the check character in the adder, means determining alternatively the existence of the desired numeric relationship between the check character value and the calculated value or the correct value of an unidentified character in said one group, and means for inserting the character corresponding to said correct value in the position of the first-mentioned means selected for the unidentified character.

17. In character identification equipment producing output signals each identified with one of the characters read thereby, apparatus for checking and correcting the accuracy of readings by said equipment of data represented by a group of characters having assigned values and by a check character the assigned value of which bears a desired numeric relationship with the value of a preselected checking function which is a function of each character in the group, comprising means responsive to character identifying output signals for calculating the value of the preselected checking function, means effective to determine alternatively the existence of the desired numeric relationship between the value of the checking function and the check character or the correct value of an uncertainty character in the absence of said relationship, means for storing the data represented by the identifying signals in selected positions thereof, and means for storing the character corresponding to the correct value of the uncertainty character in its selected position.

18. Apparatus for checking the accuracy of readings by automatic character identification apparatus and the like of a multicharacter group of characters having assigned values and for selectively completing incompletely read groups of characters, wherein at least one character in the group is so selected that the value of a preselected checking function which is a function of each character in the group is equal to a preselected checking value, comprising means responsive to character identifying signals derived from said character identification apparatus to assume distinguishable conditions in accordance with the assigned values of the characters identified by said signals, means for applying said character identifying signals to said conditionable means, means including an adder for calculating the departure of the value of the checking function of the identified characters of a group from a preselected condition of the adder following receipt of said signals, storage means for recording the characters identified in accordance with their location in the group read and for recording the character corresponding to the departure value at the location of the unidentified character in the group read, and means responsive to the absence of the identifying signal for one character, but not more than one character, in the signals received from any of said character groups for filling the character corresponding to the departure value in said storage means at the location corresponding to the location of the unidentified character.

19. Apparatus for checking the accuracy of and correcting uncertainty errors in readings by automatic character identifying equipment and the like of a multicharacter group of characters having assigned values and for selectively completing incompletely read groups of characters, wherein at least one character in the group is so selected that the value of a preselected checking function which is a function of each character in the group is equal to a preselected checking value, comprising means including an adder controlled in accordance with character identifying signals derived from said equipment for calculating alternatively the non-departure or the departure of the value of the checking function of the identified characters of a group from a preselected condition of the adder following receipt of said signals, storage means for recording the characters identified in accordance with their location in the group read and for recording the character corresponding to the departure value at the location of the unidentified character in the group read, and means responsive to the absence of the identifying signals for one character, but not more than one character, in the signals received from any of said character groups for filling the character corresponding to the departure value in said storage means at the location corresponding to the location of the unidentified character.

20. Apparatus for checking and correcting the accuracy of readings by character identification equipment of data represented by a group of characters having assigned values and by a check character, the assigned value of which bears a desired numeric relationship with the value of a preselected checking function which is a function of each character in the group, comprising one and only one accumulating means, said means responsive to character identifying signals derived from said equipment for calculating the value of the preselected checking function, means including said accumulating means determining the existence of said relationship between the value of the check character and the calculated value of the checking function and determining the correct value of an uncertainty character in the absence of said relationship, means for storing the data represented by the identifying signals in selected positions thereof, and means effective in the event of an uncertainty character in a character group for storing the correct value of the uncertainty character in its selected position.

21. Apparatus for checking the accuracy of and correcting uncertainty errors in readings by automatic character identifying equipment and the like of a multicharacter group of characters having assigned values and for selectively completing incompletely read groups of characters, wherein at least one character in the group is so selected that the value of a preselected checking function which is a function of each character in the group is equal to a preselected checking value, comprising one and only one accumulating means, means including said accumulating means controlled in accordance with character identifying signals derived from said equipment for calculating alternatively the non-departure or the departure of the value of the checking function of the identified characters of a group from a preselected condition of the accumulatings means following receipt of said signals, storage means for recording the characters identified in accordance with their location in the group read and for recording the character corresponding to the departure value at the location of an unidentified character in the group read, and means responsive to the absence of the identifying signals for a character in the signals received from a character group for filling the character corresponding to the departure value in said storage means at the location corresponding to the location of the unidentified character.

References Cited by the Examiner

UNITED STATES PATENTS

| | | | |
|---|---|---|---|
| 2,854,653 | 9/58 | Lubkin | 340—174 |
| 2,977,047 | 3/61 | Bloch | 340—174 X |
| 3,013,718 | 12/61 | Shephard | 235—61.7 |
| 3,013,719 | 12/61 | Shephard | 235—61.7 |

OTHER REFERENCES

Book, The Language and Symbology of Digital Computer Systems; RCA Service Company, RCA 1959, pages 37 and 41.

MALCOLM A. MORRISON, *Primary Examiner.*

IRVING L. SRAGOW, *Examiner.*